US011751716B2

(12) United States Patent
Roberts et al.

(10) Patent No.: US 11,751,716 B2
(45) Date of Patent: Sep. 12, 2023

(54) SYSTEMS FOR CONTROLLED HEATING AND AGITATION FOR LIQUID FOOD OR BEVERAGE PRODUCT CREATION

(71) Applicant: COMETEER, INC., Gloucester, MA (US)

(72) Inventors: Matthew P. Roberts, South Boston, MA (US); Paul Kalenian, Santa Fe, NM (US); Douglas M. Hoon, Guilford, CT (US); Karl Winkler, Bedford, MA (US)

(73) Assignee: COMETEER, INC., Gloucester, MA (US)

( * ) Notice: Subject to any disclaimer, the term of this patent is extended or adjusted under 35 U.S.C. 154(b) by 34 days.

(21) Appl. No.: 17/408,066

(22) Filed: Aug. 20, 2021

(65) Prior Publication Data
US 2022/0218144 A1 Jul. 14, 2022

Related U.S. Application Data

(63) Continuation of application No. 16/389,552, filed on Apr. 19, 2019, now Pat. No. 11,096,518, which is a (Continued)

(51) Int. Cl.
A47J 31/40 (2006.01)
A23L 3/36 (2006.01)
(Continued)

(52) U.S. Cl.
CPC ............ A47J 31/407 (2013.01); A23F 5/243 (2013.01); A23L 2/385 (2013.01); A23L 2/54 (2013.01);
(Continued)

(58) Field of Classification Search
CPC .. A47J 31/407; A47J 31/0615; A47J 31/3695; A47J 31/0673; A47J 31/4403;
(Continued)

(56) References Cited

U.S. PATENT DOCUMENTS 1,478,908 A 12/1923 Oldham
1,505,592 A 8/1924 Epperson
(Continued)

FOREIGN PATENT DOCUMENTS

CA 1157310 A 11/1983
CA 2087242 A1 7/1993
(Continued)

OTHER PUBLICATIONS

"Clever Cocktail Presentation Trick: How to Make an Ice Wedge Glass (for Free!)", https://www.manmadediy.com/diy-whiskey-wedge-glass, Aug. 27, 2018 (13 pages).
(Continued)

Primary Examiner — Brian W Jennison
(74) Attorney, Agent, or Firm — Wilmer Cutler Pickering Hale and Dorr LLP

(57) ABSTRACT

Systems for controlled heating and/or agitation for liquid food or beverage product creation are disclosed. A dispenser for producing a food or beverage liquid product from a frozen contents in a receptacle includes a chamber configured to hold a receptacle containing the contents and a dilution liquid inlet configured to supply a dilution liquid to the interior of the receptacle. The dispenser also includes a perforator configured to perforate the receptacle and form a product outlet from the receptacle for the liquid product and an agitator configured to impart motion to the receptacle and/or the contents in the receptacle that increases a flow path from the liquid inlet to the product outlet taken by at least a portion of dilution liquid, when supplied, relative to
(Continued)

a flow path from the liquid inlet to the product outlet taken by the portion of dilution liquid without the imparted motion.

21 Claims, 74 Drawing Sheets

Related U.S. Application Data continuation of application No. 15/352,245, filed on Nov. 15, 2016, now Pat. No. 10,264,912, which is a continuation of application No. 15/347,591, filed on Nov. 9, 2016, now Pat. No. 10,111,554, which is a continuation-in-part of application No. 15/265,379, filed on Sep. 14, 2016, now Pat. No. 9,615,597, which is a continuation of application No. 15/185,744, filed on Jun. 17, 2016, now Pat. No. 9,487,348, which is a continuation-in-part of application No. 15/099,156, filed on Apr. 14, 2016, now abandoned, which is a continuation-in-part of application No. PCT/US2016/023226, filed on Mar. 18, 2016, which is a continuation-in-part of application No. 14/801,540, filed on Jul. 16, 2015, now Pat. No. 9,346,611.

(60) Provisional application No. 62/380,170, filed on Aug. 26, 2016, provisional application No. 62/350,928, filed on Jun. 16, 2016, provisional application No. 62/344,212, filed on Jun. 1, 2016, provisional application No. 62/275,506, filed on Jan. 6, 2016, provisional application No. 62/136,072, filed on Mar. 20, 2015.

(51) Int. Cl.
*A23L 2/54* (2006.01)
*A47J 31/06* (2006.01)
*A47J 31/36* (2006.01)
*A47J 31/44* (2006.01)
*A23L 2/385* (2006.01)
*B65D 85/804* (2006.01)
*A23F 5/24* (2006.01)
*A47J 31/46* (2006.01)
*A47J 43/042* (2006.01)

(52) U.S. Cl.
CPC ............ *A23L 3/36* (2013.01); *A47J 31/0615* (2013.01); *A47J 31/0673* (2013.01); *A47J 31/3695* (2013.01); *A47J 31/441* (2013.01); *A47J 31/4403* (2013.01); *A47J 31/4492* (2013.01); *A47J 31/462* (2013.01); *B65D 85/8052* (2020.05); *A23V 2002/00* (2013.01); *A47J 43/042* (2013.01)

(58) Field of Classification Search
CPC .... A47J 31/441; A47J 31/4492; A47J 31/462; A47J 43/042; A23F 5/243; A23L 2/385; A23L 2/54; A23L 3/36
See application file for complete search history.

(56) References Cited

U.S. PATENT DOCUMENTS

| | | |
|---|---|---|
| 2,155,971 A | 4/1939 | Houseman |
| 2,282,138 A | 5/1942 | Kellogg |
| 2,312,046 A | 2/1943 | Warren |
| 2,324,526 A | 7/1943 | Morgenthaler |
| 2,332,553 A | 10/1943 | Benedict |
| 2,432,759 A | 12/1947 | Heyman |
| 2,515,794 A | 7/1950 | Palmer |
| 2,559,032 A | 7/1951 | Tacchella |
| 2,620,276 A | 12/1952 | Heyman |
| 2,629,663 A | 2/1953 | Gogler et al. |
| 2,863,776 A | 12/1958 | Lisher |
| 2,887,038 A | 5/1959 | Axel |
| 2,955,044 A | 10/1960 | Tupper |
| 3,153,377 A | 10/1964 | Bosak |
| 3,228,876 A | 1/1966 | Mahon |
| 3,235,390 A | 2/1966 | Vischer |
| 3,246,786 A | 4/1966 | Holley |
| 3,261,507 A | 7/1966 | Cornelius |
| 3,296,822 A | 1/1967 | Gram |
| 3,349,691 A | 10/1967 | Austin et al. |
| 3,385,201 A | 5/1968 | Martin |
| 3,412,572 A | 11/1968 | Kesling |
| 3,432,027 A | 3/1969 | Mueller |
| 3,450,070 A | 6/1969 | Kaufman |
| 3,458,320 A | 7/1969 | Niven |
| 3,484,245 A | 12/1969 | Goto |
| 3,582,351 A | 6/1971 | Austin et al. |
| 3,589,272 A | 6/1971 | Bouladon et al. |
| 3,607,280 A | 9/1971 | Durchholz |
| 3,620,034 A | 11/1971 | Ganiaris |
| 3,655,398 A | 4/1972 | Pitchon et al. |
| 3,682,649 A | 8/1972 | Orozovich |
| 3,700,466 A | 10/1972 | Bergeron et al. |
| 3,762,177 A | 10/1973 | Ganiaris |
| 3,762,930 A | 10/1973 | Mahlmann |
| 3,769,033 A | 10/1973 | Panzer et al. |
| 3,788,860 A | 1/1974 | Mahlmann |
| 3,790,689 A | 2/1974 | Pitchon et al. |
| 3,799,049 A | 3/1974 | Smith, Jr. |
| 3,800,055 A | 3/1974 | Gallagher |
| 3,830,940 A | 8/1974 | Sivetz |
| 3,843,824 A | 10/1974 | Roselius et al. |
| 3,908,033 A | 9/1975 | Ganiaris |
| 3,914,956 A | 10/1975 | Knight, Jr. |
| 3,920,226 A | 11/1975 | Walt |
| 3,922,361 A | 11/1975 | Vann |
| 3,995,067 A | 11/1976 | Marsh et al. |
| 4,039,693 A | 8/1977 | Adams et al. |
| 4,105,802 A | 8/1978 | Cho et al. |
| 4,110,476 A | 8/1978 | Rhodes |
| 4,136,202 A | 1/1979 | Favre |
| 4,156,031 A | 5/1979 | Hamell et al. |
| 4,158,329 A | 6/1979 | McKnight |
| 4,189,991 A | 2/1980 | Haddad |
| 4,226,891 A | 10/1980 | Lewis |
| 4,276,315 A | 6/1981 | Katz et al. |
| 4,277,509 A | 7/1981 | Wouda |
| 4,285,490 A | 8/1981 | Hanley |
| 4,310,468 A | 1/1982 | Reiners |
| 4,352,829 A | 10/1982 | Noyes et al. |
| 4,377,970 A | 3/1983 | Kenkel |
| 4,414,113 A | 11/1983 | LaTerra |
| 4,426,573 A | 1/1984 | Fudickar et al. |
| 4,427,701 A | 1/1984 | Morley |
| 4,505,191 A | 3/1985 | Longo |
| 4,534,985 A | 8/1985 | Gasau |
| 4,579,048 A | 4/1986 | Stover |
| 4,633,771 A | 1/1987 | Anderl |
| 4,641,572 A | 2/1987 | Varga |
| 4,681,030 A | 7/1987 | Herbert |
| 4,721,035 A | 1/1988 | Chang-Diaz |
| 4,737,374 A | 4/1988 | Huber et al. |
| 4,750,645 A | 6/1988 | Wilson et al. |
| 4,784,678 A | 11/1988 | Rudick et al. |
| 4,794,008 A | 12/1988 | Schmidt et al. |
| 4,811,872 A | 3/1989 | Boyd |
| 4,813,646 A | 3/1989 | Fujio |
| 4,842,884 A | 6/1989 | Bookwalter et al. |
| 4,844,918 A | 7/1989 | Hoashi |
| 4,853,234 A | 8/1989 | Bentley et al. |
| 4,882,982 A | 11/1989 | Muttoni |
| 4,899,976 A | 2/1990 | Cederroth |
| 4,907,725 A | 3/1990 | Durham |
| 4,929,462 A | 5/1990 | Moorman et al. |
| 4,998,462 A | 3/1991 | Sekiguchi |
| 5,041,245 A | 8/1991 | Benado |

(56) References Cited

U.S. PATENT DOCUMENTS

| | | |
|---|---|---|
| 5,043,178 A | 8/1991 | Gottesman et al. |
| 5,080,008 A | 1/1992 | Helbling |
| 5,094,153 A | 3/1992 | Helbling |
| 5,114,047 A | 5/1992 | Baron et al. |
| 5,114,728 A | 5/1992 | Ben-Nasr et al. |
| 5,114,731 A | 5/1992 | Belville et al. |
| 5,115,730 A | 5/1992 | Gockelmann |
| 5,127,318 A | 7/1992 | Selby, III |
| 5,151,287 A | 9/1992 | Schlecht et al. |
| 5,168,794 A | 12/1992 | Glucksman |
| 5,185,505 A | 2/1993 | Grzywana |
| 5,204,136 A | 4/1993 | Hellemons |
| 5,216,327 A | 6/1993 | Myers et al. |
| 5,230,278 A | 7/1993 | Bunn et al. |
| 5,242,700 A | 9/1993 | Schlecht |
| 5,255,593 A | 10/1993 | Bunn et al. |
| 5,267,506 A | 12/1993 | Cai |
| 5,284,028 A | 2/1994 | Stuhmer |
| 5,297,472 A | 3/1994 | Suzuki et al. |
| 5,301,694 A | 4/1994 | Raymond et al. |
| 5,303,639 A | 4/1994 | Bunn et al. |
| 5,323,691 A | 6/1994 | Reese et al. |
| 5,325,765 A | 7/1994 | Sylvan et al. |
| 5,335,589 A | 8/1994 | Yerves, Jr. et al. |
| 5,337,652 A | 8/1994 | Fischer et al. |
| 5,343,799 A | 9/1994 | Fond |
| 5,347,916 A | 9/1994 | Fond et al. |
| 5,353,692 A | 10/1994 | Reese et al. |
| 5,363,745 A | 11/1994 | Lin |
| 5,372,832 A | 12/1994 | Bunn et al. |
| 5,392,694 A | 2/1995 | Muller et al. |
| 5,393,032 A | 2/1995 | Cederroth |
| 5,393,540 A | 2/1995 | Bunn et al. |
| 5,398,596 A | 3/1995 | Fond |
| 5,427,806 A | 6/1995 | Ekanayake et al. |
| 5,473,973 A | 12/1995 | Cortese |
| 5,480,189 A | 1/1996 | Davies et al. |
| 5,497,792 A | 3/1996 | Prasad et al. |
| 5,507,415 A | 4/1996 | Sizemore |
| 5,525,746 A | 6/1996 | Franke |
| 5,637,343 A | 6/1997 | Ryan, Jr. |
| 5,638,740 A | 6/1997 | Cai |
| 5,651,482 A | 7/1997 | Sizemore |
| 5,656,316 A | 8/1997 | Fond et al. |
| 5,669,208 A | 9/1997 | Tabaroni et al. |
| 5,699,719 A | 12/1997 | Lucas et al. |
| 5,704,950 A | 1/1998 | Putatunda |
| 5,707,673 A | 1/1998 | Prevost et al. |
| 5,724,883 A | 3/1998 | Usherovich |
| 5,739,364 A | 4/1998 | Franke |
| 5,770,003 A | 6/1998 | Tabaroni et al. |
| D395,821 S | 7/1998 | Tabaroni et al. |
| 5,778,765 A | 7/1998 | Klawuhn et al. |
| D397,292 S | 8/1998 | Tabaroni et al. |
| 5,789,005 A | 8/1998 | Tabaroni et al. |
| 5,799,501 A | 9/1998 | Leonard et al. |
| 5,847,127 A | 12/1998 | D'Alessio et al. |
| 5,853,785 A | 12/1998 | Nayyar et al. |
| 5,868,062 A | 2/1999 | Enomoto |
| 5,897,899 A | 4/1999 | Fond |
| 5,901,636 A | 5/1999 | Witziers et al. |
| 5,927,085 A | 7/1999 | Waldman |
| 5,958,481 A | 9/1999 | Hodges |
| 5,997,936 A | 12/1999 | Jimenez-Laguna |
| 6,026,732 A | 2/2000 | Kollep et al. |
| 6,041,697 A | 3/2000 | Maoz |
| 6,079,315 A | 6/2000 | Beaulieu et al. |
| 6,082,247 A | 7/2000 | Beaulieu |
| 6,102,213 A | 8/2000 | Gurol |
| 6,112,537 A | 9/2000 | Broadbent |
| 6,142,063 A | 11/2000 | Beaulieu et al. |
| 6,180,149 B1 | 1/2001 | Gramm |
| 6,182,554 B1 | 2/2001 | Beaulieu et al. |
| 6,203,837 B1 | 3/2001 | Kalenian |
| 6,224,683 B1 | 5/2001 | Tanikawa et al. |
| 6,277,426 B1 | 8/2001 | Reust |
| 6,286,415 B1 | 9/2001 | Leung |
| 6,311,500 B1 | 11/2001 | Fraenkel |
| 6,339,985 B1 | 1/2002 | Whitney |
| 6,407,224 B1 | 6/2002 | Mironov et al. |
| 6,440,256 B1 | 8/2002 | Gordon et al. |
| 6,444,160 B1 | 9/2002 | Bartoli |
| 6,511,963 B1 | 1/2003 | Maccecchini |
| 6,513,578 B2 | 2/2003 | Frank |
| 6,514,552 B1 | 2/2003 | Sivetz |
| 6,534,108 B2 | 3/2003 | Jimenez-Laguna et al. |
| 6,548,094 B2 | 4/2003 | Kalenian |
| 6,551,646 B1 | 4/2003 | Baker |
| 6,589,577 B2 | 7/2003 | Lazaris et al. |
| 6,602,538 B1 | 8/2003 | Watkins, Jr. et al. |
| 6,602,879 B2 | 8/2003 | Murthy et al. |
| 6,606,938 B2 | 8/2003 | Taylor |
| 6,607,762 B2 | 8/2003 | Lazaris et al. |
| 6,609,821 B2 | 8/2003 | Wulf et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,727,484 B2 | 4/2004 | Policappelli |
| 6,740,345 B2 | 5/2004 | Cai |
| 6,887,506 B2 | 5/2005 | Kalenian |
| 6,948,420 B2 | 9/2005 | Kirschner et al. |
| 7,004,322 B1 | 2/2006 | Bartoli |
| 7,093,816 B2 | 8/2006 | Lacan et al. |
| 7,165,488 B2 | 1/2007 | Bragg et al. |
| 7,168,560 B2 | 1/2007 | Finetti et al. |
| 7,192,629 B2 | 3/2007 | Lammertink et al. |
| 7,258,061 B2 | 8/2007 | Campbell et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| D574,182 S | 8/2008 | Shannon |
| 7,419,692 B1 | 9/2008 | Kalenian |
| 7,464,636 B2 | 12/2008 | Mariller |
| 7,473,869 B2 | 1/2009 | Chun |
| 7,493,930 B2 | 2/2009 | Finetti et al. |
| 7,513,192 B2 | 4/2009 | Sullivan et al. |
| 7,523,695 B2 | 4/2009 | Streeter et al. |
| 7,591,217 B2 | 9/2009 | Kodden et al. |
| 7,640,845 B2 | 1/2010 | Woodnorth et al. |
| 7,726,233 B2 | 6/2010 | Kodden et al. |
| 7,820,948 B1 | 10/2010 | Renau |
| 7,875,304 B2 | 1/2011 | Kalenian |
| 7,959,851 B2 | 6/2011 | Finetti et al. |
| 7,959,967 B2 | 6/2011 | Pattenden |
| 8,087,347 B2 | 1/2012 | Halliday et al. |
| 8,151,694 B2 | 4/2012 | Jacobs et al. |
| 8,361,527 B2 | 1/2013 | Winkler et al. |
| 8,402,781 B2 | 3/2013 | Cocchi et al. |
| 8,475,153 B2 | 7/2013 | Finetti et al. |
| 8,495,949 B2 | 7/2013 | Tinkler et al. |
| 8,516,948 B2 | 8/2013 | Zimmerman et al. |
| 8,524,306 B2 | 9/2013 | Robinson et al. |
| 8,534,501 B2 | 9/2013 | Nevarez et al. |
| 8,535,748 B2 | 9/2013 | Robinson et al. |
| 8,541,042 B2 | 9/2013 | Robinson et al. |
| 8,563,058 B2 | 10/2013 | Roulin et al. |
| 8,573,114 B2 | 11/2013 | Huang et al. |
| 8,609,170 B2 | 12/2013 | Tinkler et al. |
| 8,628,811 B2 | 1/2014 | Panyam et al. |
| 8,663,080 B2 | 3/2014 | Bartoli et al. |
| 8,667,892 B2 | 3/2014 | Cominelli et al. |
| 8,685,479 B2 | 4/2014 | Dogan et al. |
| 8,709,519 B1 | 4/2014 | dePoo |
| 8,722,124 B2 | 5/2014 | Ozanne |
| 8,752,478 B2 | 6/2014 | Nocera |
| 8,758,844 B2 | 6/2014 | Nocera |
| 8,800,431 B2 | 8/2014 | Sullivan et al. |
| 8,808,775 B2 | 8/2014 | Novak et al. |
| 8,826,811 B2 | 9/2014 | Kim |
| 8,834,948 B2 | 9/2014 | Estabrook et al. |

(56) References Cited

U.S. PATENT DOCUMENTS

| | | |
|---|---|---|
| 8,863,987 B2 | 10/2014 | Jacobs et al. |
| 8,877,276 B2 | 11/2014 | Cominelli et al. |
| 8,889,203 B2 | 11/2014 | York |
| 8,916,215 B2 | 12/2014 | Yoakim et al. |
| 8,920,858 B2 | 12/2014 | Yauk et al. |
| 8,956,672 B2 | 2/2015 | Yoakim et al. |
| 8,960,078 B2 | 2/2015 | Hristov et al. |
| 8,962,048 B2 | 2/2015 | Gerbaulet et al. |
| 8,973,341 B2 | 3/2015 | Bartoli et al. |
| 9,016,196 B2 | 4/2015 | Hensel |
| 9,023,412 B2 | 5/2015 | Doleac et al. |
| 9,079,705 B2 | 7/2015 | Digiuni |
| 9,085,410 B2 | 7/2015 | Beer |
| 9,107,444 B2 | 8/2015 | Lynn et al. |
| 9,113,744 B2 | 8/2015 | Digiuni |
| 9,120,617 B2 | 9/2015 | Beer |
| 9,161,652 B2 | 10/2015 | Kamerbeek et al. |
| 742,679 A1 | 11/2015 | Bartoli et al. |
| 9,192,189 B1 | 11/2015 | McDermott et al. |
| 9,205,975 B2 | 12/2015 | Giovanni |
| 9,232,871 B2 | 1/2016 | Rivera |
| 9,247,430 B2 | 1/2016 | Kountouris et al. |
| 9,259,114 B2 | 2/2016 | Nevarez et al. |
| 9,277,758 B2 | 3/2016 | Zeller et al. |
| 9,346,611 B1 | 5/2016 | Roberts et al. |
| 9,408,492 B1 | 8/2016 | Roberts et al. |
| 9,408,493 B1 | 8/2016 | Roberts et al. |
| 9,468,230 B2 | 10/2016 | Roberts et al. |
| 9,516,970 B2 | 12/2016 | Roberts et al. |
| 9,538,877 B2 | 1/2017 | Roberts et al. |
| 9,615,597 B2 | 4/2017 | Roberts et al. |
| 9,630,770 B2 | 4/2017 | Roberts et al. |
| 9,675,203 B2 | 6/2017 | Roberts et al. |
| 10,111,554 B2 | 10/2018 | Roberts et al. |
| 10,264,912 B2 | 4/2019 | Roberts et al. |
| 10,501,248 B2 | 12/2019 | Ghiam et al. |
| 11,096,518 B2 | 8/2021 | Roberts et al. |
| 11,484,041 B2 | 11/2022 | Hoon et al. |
| 2001/0002269 A1 | 5/2001 | Zhao |
| 2001/0006695 A1 | 7/2001 | Jimenez-Laguna et al. |
| 2001/0043954 A1 | 11/2001 | Sweet |
| 2001/0052294 A1 | 12/2001 | Schmed |
| 2002/0048621 A1 | 4/2002 | Boyd et al. |
| 2002/0148356 A1 | 10/2002 | Lazaris et al. |
| 2003/0006185 A1 | 1/2003 | Hepler |
| 2003/0118707 A1 | 6/2003 | Kalenian |
| 2003/0172813 A1 | 9/2003 | Schifferle |
| 2003/0222089 A1 | 12/2003 | Hale |
| 2004/0045265 A1 | 3/2004 | Bartoli et al. |
| 2004/0075069 A1 | 4/2004 | Bartoli et al. |
| 2004/0077475 A1 | 4/2004 | Bartoli |
| 2004/0118290 A1 | 6/2004 | Cai |
| 2004/0144800 A1 | 7/2004 | Danby et al. |
| 2004/0232595 A1 | 11/2004 | Bartoli |
| 2004/0247721 A1 | 12/2004 | Finetti et al. |
| 2004/0250686 A1 | 12/2004 | Hale |
| 2004/0256766 A1 | 12/2004 | Finetti et al. |
| 2005/0008754 A1 | 1/2005 | Sweeney et al. |
| 2005/0017118 A1 | 1/2005 | Finetti et al. |
| 2005/0034580 A1 | 2/2005 | Finetti et al. |
| 2005/0034817 A1 | 2/2005 | Finetti et al. |
| 2005/0039849 A1 | 2/2005 | Finetti et al. |
| 2005/0051033 A1 | 3/2005 | Lassota |
| 2005/0112253 A1 | 5/2005 | Kalenian |
| 2005/0130820 A1 | 6/2005 | Finetti et al. |
| 2005/0138902 A1 | 6/2005 | Bartoli et al. |
| 2005/0160918 A1 | 7/2005 | Winstanley et al. |
| 2005/0160919 A1 | 7/2005 | Balkau |
| 2005/0163892 A1 | 7/2005 | Breslow et al. |
| 2005/0247205 A1 | 11/2005 | Chen et al. |
| 2005/0266122 A1 | 12/2005 | Franceschi et al. |
| 2006/0000363 A1 | 1/2006 | Streeter et al. |
| 2006/0019000 A1 | 1/2006 | Zanetti |
| 2006/0083835 A1 | 4/2006 | Raghavan et al. |
| 2006/0107841 A1 | 5/2006 | Schifferle |
| 2006/0115573 A1 | 6/2006 | Singer et al. |
| 2006/0121173 A1 | 6/2006 | Black |
| 2006/0127555 A1 | 6/2006 | Breslow et al. |
| 2006/0174769 A1 | 8/2006 | Favre et al. |
| 2006/0185372 A1 | 8/2006 | Conde Hinojosa |
| 2006/0196363 A1 | 9/2006 | Rahn |
| 2006/0219098 A1 | 10/2006 | Mandralis et al. |
| 2006/0243838 A1 | 11/2006 | Nakato |
| 2006/0255066 A1 | 11/2006 | Kannar et al. |
| 2006/0273013 A1 | 12/2006 | Chin et al. |
| 2007/0077343 A1 | 4/2007 | Ma et al. |
| 2007/0175334 A1 | 8/2007 | Halliday et al. |
| 2007/0202237 A1 | 8/2007 | Yoakim et al. |
| 2007/0210105 A1 | 9/2007 | Malachowsky et al. |
| 2007/0251260 A1 | 11/2007 | Baxter et al. |
| 2007/0251397 A1 | 11/2007 | Dorsten et al. |
| 2008/0038441 A1 | 2/2008 | Kirschner |
| 2008/0041236 A1 | 2/2008 | Raouf et al. |
| 2008/0089983 A1 | 4/2008 | Coste |
| 2008/0233264 A1 | 9/2008 | Doglioni Majer et al. |
| 2009/0061219 A1 | 3/2009 | Spynda et al. |
| 2009/0092724 A1 | 4/2009 | Mattie |
| 2009/0109793 A1 | 4/2009 | Xue |
| 2009/0126577 A1 | 5/2009 | Ternite |
| 2009/0127297 A1 | 5/2009 | Zirps |
| 2009/0214713 A1 | 8/2009 | Banim et al. |
| 2009/0223375 A1 | 9/2009 | Verbeek |
| 2009/0235827 A1 | 9/2009 | Bongers et al. |
| 2009/0235828 A1 | 9/2009 | Kerstens |
| 2009/0266239 A1 | 10/2009 | Noordhuis |
| 2010/0015313 A1 | 1/2010 | Harris |
| 2010/0018405 A1 | 1/2010 | Duvall |
| 2010/0034929 A1 | 2/2010 | Dogan et al. |
| 2010/0083843 A1 | 4/2010 | Denisart et al. |
| 2010/0098812 A1 | 4/2010 | Le et al. |
| 2010/0104695 A1 | 4/2010 | Faella et al. |
| 2010/0107889 A1 | 5/2010 | Denisart et al. |
| 2010/0143565 A1 | 6/2010 | McGill |
| 2010/0209563 A1 | 8/2010 | Mark |
| 2010/0215808 A1 | 8/2010 | Versini |
| 2010/0239734 A1 | 9/2010 | Yoakim et al. |
| 2010/0266740 A1 | 10/2010 | Van Den Aker et al. |
| 2010/0282088 A1 | 11/2010 | Deuber et al. |
| 2010/0287951 A1 | 11/2010 | Lynn et al. |
| 2010/0288131 A1 | 11/2010 | Kilber et al. |
| 2010/0303964 A1 | 12/2010 | Beaulieu et al. |
| 2011/0024409 A1 | 2/2011 | Shah et al. |
| 2011/0041701 A1 | 2/2011 | Chatterjee et al. |
| 2011/0045144 A1 | 2/2011 | Boussemart et al. |
| 2011/0070348 A1 | 3/2011 | Burton-Wilcock et al. |
| 2011/0071009 A1 | 3/2011 | Bartoli et al. |
| 2011/0076361 A1 | 3/2011 | Peterson et al. |
| 2011/0094195 A1 | 4/2011 | Bartoli et al. |
| 2011/0117259 A1 | 5/2011 | Storek et al. |
| 2011/0183043 A1 | 7/2011 | Reati |
| 2011/0200726 A1 | 8/2011 | Tinkler et al. |
| 2011/0203740 A1 | 8/2011 | Finetti et al. |
| 2011/0226343 A1 | 9/2011 | Novak et al. |
| 2011/0244099 A1 | 10/2011 | Perentes et al. |
| 2011/0274802 A1 | 11/2011 | Rivera |
| 2011/0293805 A1 | 12/2011 | Perentes et al. |
| 2011/0300276 A1 | 12/2011 | Ozanne |
| 2012/0030869 A1 | 2/2012 | Del Saz Salazar |
| 2012/0063753 A1 | 3/2012 | Cochran et al. |
| 2012/0070542 A1 | 3/2012 | Camera et al. |
| 2012/0100275 A1 | 4/2012 | Bishop et al. |
| 2012/0121779 A1 | 5/2012 | Lai et al. |
| 2012/0207895 A1 | 8/2012 | Rivera |
| 2012/0207896 A1 | 8/2012 | Rivera |
| 2012/0267036 A1 | 10/2012 | Bartoli et al. |
| 2012/0276264 A1 | 11/2012 | Rivera |
| 2012/0291634 A1 | 11/2012 | Startz |
| 2012/0308688 A1 | 12/2012 | Peterson et al. |
| 2012/0308691 A1 | 12/2012 | Alvarez et al. |
| 2013/0043151 A1 | 2/2013 | Bartoli et al. |
| 2013/0055902 A1 | 3/2013 | Berto et al. |
| 2013/0077148 A1 | 3/2013 | Ribi |
| 2013/0098249 A1 | 4/2013 | Fidler et al. |
| 2013/0101716 A1 | 4/2013 | Beaulieu et al. |

(56) References Cited

U.S. PATENT DOCUMENTS

| | | | |
|---|---|---|---|
| 2013/0118360 A1 | 5/2013 | Dogan et al. | |
| 2013/0139699 A1 | 6/2013 | Rivera | |
| 2013/0156897 A1 | 6/2013 | Goldstein | |
| 2013/0180406 A1 | 7/2013 | Hay et al. | |
| 2013/0193616 A1 | 8/2013 | Bartoli et al. | |
| 2013/0199378 A1 | 8/2013 | Yoakim et al. | |
| 2013/0202748 A1 | 8/2013 | Fountain et al. | |
| 2013/0202761 A1 | 8/2013 | McKee | |
| 2013/0209627 A1 | 8/2013 | MacPherson | |
| 2013/0232992 A1 | 9/2013 | Bisceglie | |
| 2013/0239817 A1 | 9/2013 | Starr et al. | |
| 2013/0243929 A1 | 9/2013 | Matsui | |
| 2013/0327223 A1 | 12/2013 | Bartoli et al. | |
| 2014/0007776 A1 | 1/2014 | Mori et al. | |
| 2014/0026761 A1 | 1/2014 | Bartoli et al. | |
| 2014/0057033 A1 | 2/2014 | Lai et al. | |
| 2014/0076167 A1 | 3/2014 | Boggavarapu | |
| 2014/0106033 A1 | 4/2014 | Roberts | |
| 2014/0134299 A1 | 5/2014 | Guidorzi et al. | |
| 2014/0137210 A1 | 5/2014 | Kountouris et al. | |
| 2014/0154387 A1 | 6/2014 | Almblad et al. | |
| 2014/0199442 A1 | 7/2014 | Orsi | |
| 2014/0216276 A1 | 8/2014 | Soderman | |
| 2014/0272077 A1 | 9/2014 | Robinson et al. | |
| 2014/0287105 A1 | 9/2014 | Husband et al. | |
| 2014/0295030 A1 | 10/2014 | Downes et al. | |
| 2014/0331987 A1 | 11/2014 | Ford et al. | |
| 2014/0342060 A1 | 11/2014 | Bartoli et al. | |
| 2014/0352543 A1 | 12/2014 | Boni et al. | |
| 2015/0001100 A1 | 1/2015 | Bartoli et al. | |
| 2015/0024179 A1 | 1/2015 | Huang | |
| 2015/0047509 A1 | 2/2015 | Trombetta et al. | |
| 2015/0068405 A1 | 3/2015 | Bartoli et al. | |
| 2015/0072052 A1 | 3/2015 | Bartoli et al. | |
| 2015/0107275 A1 | 4/2015 | Papalia | |
| 2015/0108011 A1 | 4/2015 | Bartoli et al. | |
| 2015/0128525 A1 | 5/2015 | Bartoli et al. | |
| 2015/0140251 A1 | 5/2015 | Bartoli et al. | |
| 2015/0151903 A1 | 6/2015 | Bartoli et al. | |
| 2015/0201790 A1 | 7/2015 | Smith et al. | |
| 2015/0201796 A1 | 7/2015 | Kuempel et al. | |
| 2015/0210030 A1 | 7/2015 | Bartoli et al. | |
| 2015/0217880 A1 | 8/2015 | Bartoli et al. | |
| 2015/0217881 A1 | 8/2015 | Bartoli et al. | |
| 2015/0232279 A1 | 8/2015 | Bartoli et al. | |
| 2015/0257588 A1 | 9/2015 | Stein et al. | |
| 2015/0327717 A1 | 11/2015 | Burrows | |
| 2015/0329282 A1 | 11/2015 | Bartoli et al. | |
| 2015/0344219 A1 | 12/2015 | Bartoli et al. | |
| 2015/0367269 A1 | 12/2015 | Bartoli et al. | |
| 2016/0000135 A1 | 1/2016 | Evans et al. | |
| 2016/0001903 A1 | 1/2016 | Bartoli et al. | |
| 2016/0023226 A1 | 1/2016 | Wickert et al. | |
| 2016/0051079 A1 | 2/2016 | Abegglen et al. | |
| 2016/0183544 A1 | 6/2016 | Fitch et al. | |
| 2017/0014836 A1 | 1/2017 | Fisher | |
| 2017/0055557 A1 | 3/2017 | Roberts et al. | |
| 2018/0319533 A1 | 11/2018 | Hogan | |
| 2020/0085231 A1 | 3/2020 | Roberts et al. | |
| 2020/0146308 A1 | 5/2020 | Roberts et al. | |
| 2020/0178553 A1 | 6/2020 | Roberts et al. | |
| 2020/0216237 A1 | 7/2020 | Meager | |
| 2020/0385160 A1 | 12/2020 | Hoon | |
| 2021/0037847 A1 | 2/2021 | Hoon et al. | |

FOREIGN PATENT DOCUMENTS

| | | |
|---|---|---|
| CA | 2789993 A1 | 10/2004 |
| CA | 2902391 A1 | 9/2014 |
| CN | 1071810 A | 5/1993 |
| CN | 1615780 A | 5/2005 |
| CN | 101035719 A | 9/2007 |
| CN | 201005504 Y | 1/2008 |
| CN | 101322523 A | 12/2008 |
| CN | 101720842 A | 6/2010 |
| CN | 102144703 A | 8/2011 |
| CN | 201957705 U | 9/2011 |
| CN | 201987311 | 9/2011 |
| CN | 201987311 U | 9/2011 |
| CN | 102326810 A | 1/2012 |
| CN | 202197798 U | 4/2012 |
| CN | 102574638 A | 7/2012 |
| CN | 102816875 A | 12/2012 |
| CN | 103180225 A | 6/2013 |
| CN | 103380066 A | 10/2013 |
| CN | 103815788 A | 5/2014 |
| CN | 104968218 A | 10/2015 |
| DE | 3318317 A1 | 11/1984 |
| DE | 19706005 A1 | 8/1998 |
| EP | 0256567 A2 | 2/1988 |
| EP | 0412496 A2 | 2/1991 |
| EP | 0812558 A1 | 12/1997 |
| EP | 0893065 A2 | 1/1999 |
| EP | 0916266 A1 | 5/1999 |
| EP | 0941668 A1 | 9/1999 |
| EP | 1440910 A1 | 7/2004 |
| EP | 1488838 A1 | 12/2004 |
| EP | 1787523 A2 | 5/2007 |
| EP | 2468159 A1 | 6/2012 |
| EP | 2384133 B1 | 3/2013 |
| EP | 3503770 | 4/2021 |
| EP | 3503770 B1 | 4/2021 |
| EP | 3868261 | 8/2021 |
| GB | 691845 A | 5/1953 |
| GB | 1169586 A | 11/1969 |
| GB | 2410998 A | 8/2005 |
| JP | H01194915 A | 8/1989 |
| JP | 02-031663 | 2/1990 |
| JP | 02138938 | 5/1990 |
| JP | H02119748 A | 5/1990 |
| JP | 4045747 B2 | 2/1992 |
| JP | H04088948 | 3/1992 |
| JP | H11-221061 A | 8/1999 |
| JP | 2008081208 A | 4/2008 |
| JP | 2008-521399 A | 6/2008 |
| JP | 2010220642 A | 10/2010 |
| JP | 2011025951 A | 2/2011 |
| JP | 2012510267 A | 5/2012 |
| JP | 5101941 B2 | 12/2012 |
| JP | 2013-502925 A | 1/2013 |
| JP | 2013-537095 A | 9/2013 |
| JP | 2014-030768 A | 2/2014 |
| JP | 2014-505564 A | 3/2014 |
| JP | 2014520552 A | 8/2014 |
| JP | 2019-531780 A | 11/2019 |
| JP | 6791941 B2 | 11/2020 |
| KR | 101075465 B1 | 10/2011 |
| NL | 6803767 A | 5/1968 |
| WO | WO-1993/09684 A1 | 5/1993 |
| WO | WO-199710720 A1 | 3/1997 |
| WO | WO-0019833 A2 | 4/2000 |
| WO | WO-0032058 A1 | 6/2000 |
| WO | WO-00/56163 A1 | 9/2000 |
| WO | WO-0130173 A2 | 5/2001 |
| WO | WO-2002059035 A2 | 8/2002 |
| WO | WO-2002/098759 | 12/2002 |
| WO | WO-2004067386 | 8/2004 |
| WO | WO-2004/091305 A1 | 10/2004 |
| WO | WO-2005/092160 A1 | 10/2005 |
| WO | WO-2006/017893 A1 | 2/2006 |
| WO | WO-2006/077259 A1 | 7/2006 |
| WO | WO-2006121353 A1 | 11/2006 |
| WO | WO-2008148604 | 12/2008 |
| WO | WO-2010014201 | 2/2010 |
| WO | WO-2010/066736 A1 | 6/2010 |
| WO | WO-2011084603 | 7/2011 |
| WO | WO-2011094677 | 8/2011 |
| WO | WO-2012/121779 A1 | 9/2012 |
| WO | WO-2012/174331 A1 | 12/2012 |
| WO | WO-2013039591 | 3/2013 |
| WO | WO-2013/124811 A1 | 8/2013 |
| WO | WO-2013121421 A1 | 8/2013 |
| WO | WO-2014/053614 A1 | 4/2014 |
| WO | WO-2014057094 | 4/2014 |

(56) References Cited

FOREIGN PATENT DOCUMENTS

| WO | WO-2014060724 | | 4/2014 |
|---|---|---|---|
| WO | WO-2014147256 | | 9/2014 |
| WO | WO-2014206799 | | 12/2014 |
| WO | WO-2015/001340 | A1 | 1/2015 |
| WO | WO-2015/049049 | A2 | 4/2015 |
| WO | WO-2015075535 | A1 | 5/2015 |
| WO | WO-2015112192 | A1 | 7/2015 |
| WO | WO-2016096611 | | 6/2016 |
| WO | WO-2016154037 | A1 | 9/2016 |
| WO | WO-2018039675 | | 3/2018 |
| WO | WO-2018200922 | | 11/2018 |
| WO | WO-2018222677 | | 12/2018 |
| WO | WO-2022235921 | | 11/2022 |

OTHER PUBLICATIONS

"How Come: Cold hard fact: Surface area matters", https://www.newsday.com/news/health/how-come-cold-hard-fact-surface-area-matters-1.1866438, updated Apr. 23, 2010, accessed Feb. 23, 2021 (3 pages).

40° Below Joe—Beaded Coffee, https://40belowjoe.com, accessed May 20, 2020 (7 pages).

Chemwiki, "Overview of Alcohol," http://chemwiki.ucdavis.edu/Organic_Chemistry/Alcohols/Properties_of_Alcohols/Overview_of_Alcohol, 3 pages (2015).

Colonna and Smalls, "Catch Up", https://colonnaandsmalls.wordpress.com/2015/10/, Oct. 11, 2015 (5 pages).

Corrochano, et al., "A new methodology to estimate the steady-state permeability of roast and ground coffee in packed beds", Journal of Food Engineering, 150:106-116, 2015, available online Nov. 22, 2014 (11 pages).

European Extended Search Report issued in European Application No. EP21167377.7, dated Jul. 12, 2021 (8 pages).

Helmenstine, "What is the Freezing Point of Alcohol," http://chemistry.about.com/od/factsstructures/fl/What-Is-the-Freezing-Point-of-Alcohol-Freezing-Temperature-of-Alcohol.htm, 4 pages (2015).

Helmenstine, "What is the Freezing Point of Water," http://chemistry.about.com/od/waterchemistry/f/freezing-point-of-water.htm, 3 pages (2015).

Helmenstine, "What is the Melting Point of Water?", http://chemistry.about.com/od/waterohemistry/f/What-Is-The-Melting-Point Of-Water.htm, 3 pages (2015).

Hendon, et al., "The Grinder Paper: Explained", https://baristahustle.com/blogs/barista-hustle/the-grinder-paper-explained, Jan. 30, 2017 (9 pages).

International Search Report and Written Opinion as issued by the European Patent Office as International Searching Authority issued in International Application No. PCT/US18/29735, dated Sep. 17, 2018 (19 pages).

International Search Report and Written Opinion for International Application No. PCT/US16/40116 dated Oct. 4, 2016 (16 pages).

Todd, "Iced Mocha with Coffee Cubes", URL: https://honestlyyum.com/4320/iced-mocha-with-coffee-cubes/, accessed Sep. 4, 2021, Honestly Yum, published Jun. 20, 2013 (16 pages).

International Search Report and Written Opinion for International Application No. PCT/US2017/027149 dated Sep. 20, 2017 (29 pages).

International Search Report and Written Opinion issued by European Patent Office as International Searching Authority in International Application No. PCT/US18/35073, dated Oct. 9, 2018 (18 pages).

International Search Report and Written Opinion issued by the European Patent Office as International Searching Authority for International Application No. PCT/US2016/023226 dated Jun. 27, 2016 (10 pages).

International Search Report and Written Opinion issued by the European Patent Office for International Application No. PCT/US2017/048932 dated Nov. 14, 2017 (13 pages).

International Search Report and Written Opinion issued by the Korean Intellectual Property Office for PCT/US13/64634, dated Mar. 21, 2014 (8 pages).

International Search Report issued by the European Patent Office for International Application No. PCT/US00/29651 dated Jun. 19, 2001 (6 pgs.).

International Search Report issued by the European Patent Office for International Application No. PCT/US99/23178 dated Oct. 24, 2000 (7 pgs.).

Karpuschewski, B, et al., "Ice Blasting—An Innovative Concept for the Problem-Oriented Deburring of Workpieces", Burrs—Analysis, Control, and Removal, Springer-Verlag Berlin Heidelberg; pp. 197-201 (2010).

Perlmutter, "Solid-liquid filtration basics", Processing Magazine, http://www.processingmagazine.com/solid-liquid-filtration-basics/, Feb. 5, 2016 (13 pages).

Sahin, et al., "Chapter 1: Size, Shape, Volume and Related Physical Attributes", in Physical Properties of Foods, Heldman Ed., Springer Science + Business Media, LLC, pp. 1-37, 2006 (50 pages).

Sheu, M.J. and Wiley, R.C., "Preconcentration of Apple Juice by Reverse Osmosis", Journal of Food Science, vol. 48, No. 2, pp. 422-429 (1983).

Spiro, M. and Selwood, R.M., "The Kinetics and Mechanism of Caffeine Infusion from Coffee: The Effect of Particle Size", J. Sci. Food Agric., 35:915-924, 1984 (10 pages).

Stewart, "Keep Cool Cubes," http://www.marthastewart.com/356419/flavored-ice-cube-ideas, 9 pages (Jul. 2012).

The Kitchn, "Why You Can Store Vodka But Not Beer in the Freezer," http://www.thekitchn.com/why-doesnt-alcohol-freeze-weve-got-chemistry-217962, 2 pages (2015).

Uman, et al., "The effect of bean origin and temperature on grinding roasted coffee", https://www.nature.com/articles/srep24483, Scientific Reports, 6, Article No. 24483, Apr. 18, 2016 (24 pages).

International Search Report and Written Opinion issued by U.S. Patent and Trademark Office as International Searching Authority in International Application No. PCT/US22/27855 dated Jul. 26, 2022 (13 pages).

"Loring™ S15 Falcon™, Convection Drum Roaster with Paddle Stirring," Technical Data Sheet, Downloaded from https://loring.com/wp-content/uploads/2015/11/Loring-S15_EN_Tech-data_1002695_revB.pdf, accessed on Apr. 28, 2016 (2 pages).

"Loring™ S35 Kestrel™, Convection Drum Roaster with Paddle Stirring," Technical Data Sheet, Downloaded from https://loring.com/wp-content/uploads/2017/06/S35.pdf, accessed Apr. 28, 2016 (2 pgs.).

"Loring™ S70 Peregrine™, Convection Drum Roaster with Paddle Stirring," Technical Data Sheet, Downloaded from https://documents.pub/download/loring-s70-peregrine-2017-06-01-technical-data-sheet-depending-on-roaster-model, accessed on Apr. 28, 2016 (2 pages).

Basile, M. and Kikic, I., "A Lumped Specific Heat Capacity Approach for Predicting the Non-stationary Thermal Profile of Coffee During Roasting," Chem. Biochem. Eng. Q., 23(2):167-177, 2009 (11 pages).

Brown, N., "A Quantitative Description of the Sounds of Cracks During Roasting," Downloaded from http://dailycoffeenews.com/2014/05/26/a-quantitative-description-of-the-sounds-of-cracks-during-roasting/ May 26, 2014, accessed on Apr. 28, 2016 (3 pages).

Escudero, D. R., "Paper 11656: Bed height and material density effects on fluidized bed hydrodynamics," Thesis, Iowa State University, Ames, Iowa (2010) (117 pages).

Fabbri, A., et al., "Numerical model of heat and mass transfer during roasting coffee using 3D digitised geometry," 11th International Congress on Engineering and Food (ICEF11), Procedia Food Science, 1:742-746, 2011 (5 pages).

Schwartzberg, H., "Batch coffee roasting; roasting energy use; reducing that use," Advances in Food Process Engineering Research and Applications, Part II, Springer Science and Business Media, New York, pp. 173-195, Sep. 13, 2013 (15 pages).

European Extended Search Report issued in European Application No. EP21200410.5, dated Jan. 27, 2022 (8 pages).

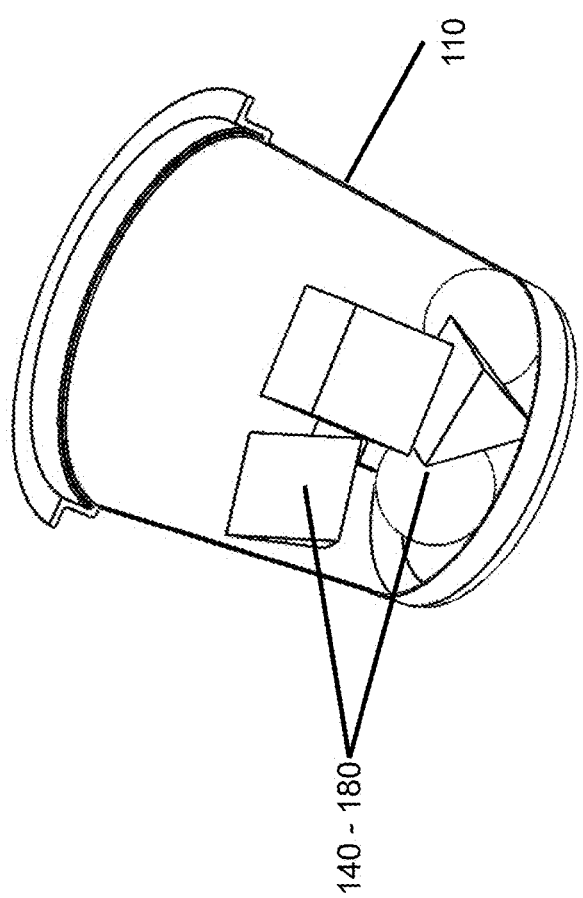

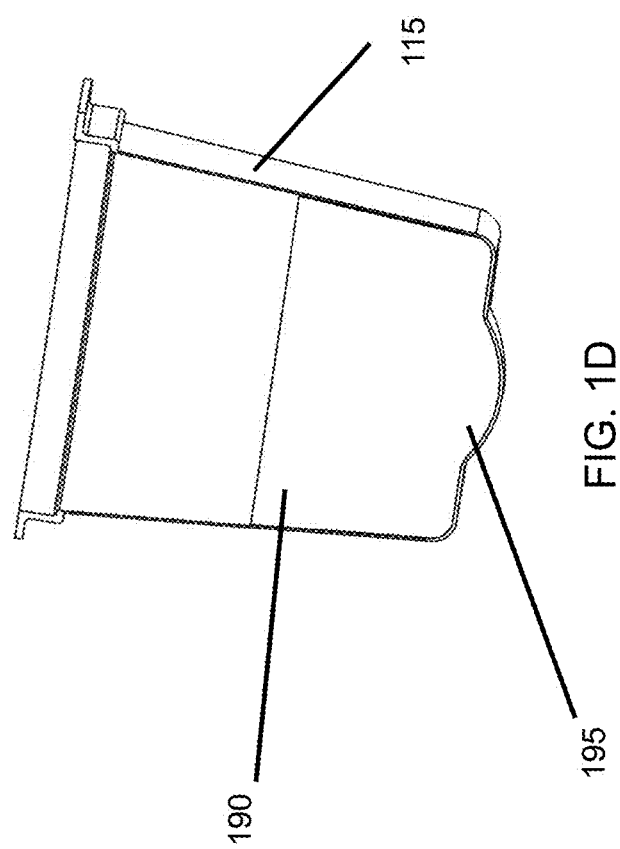

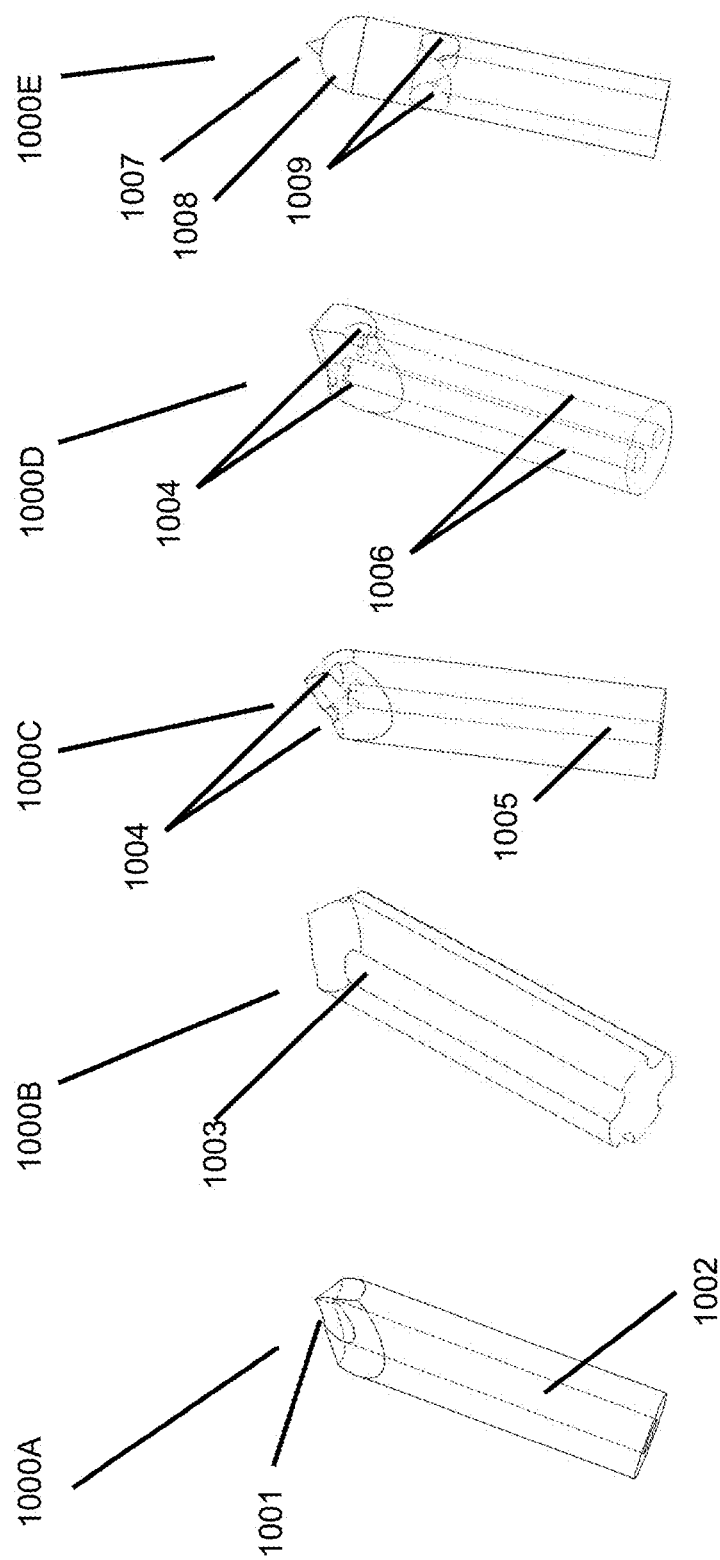

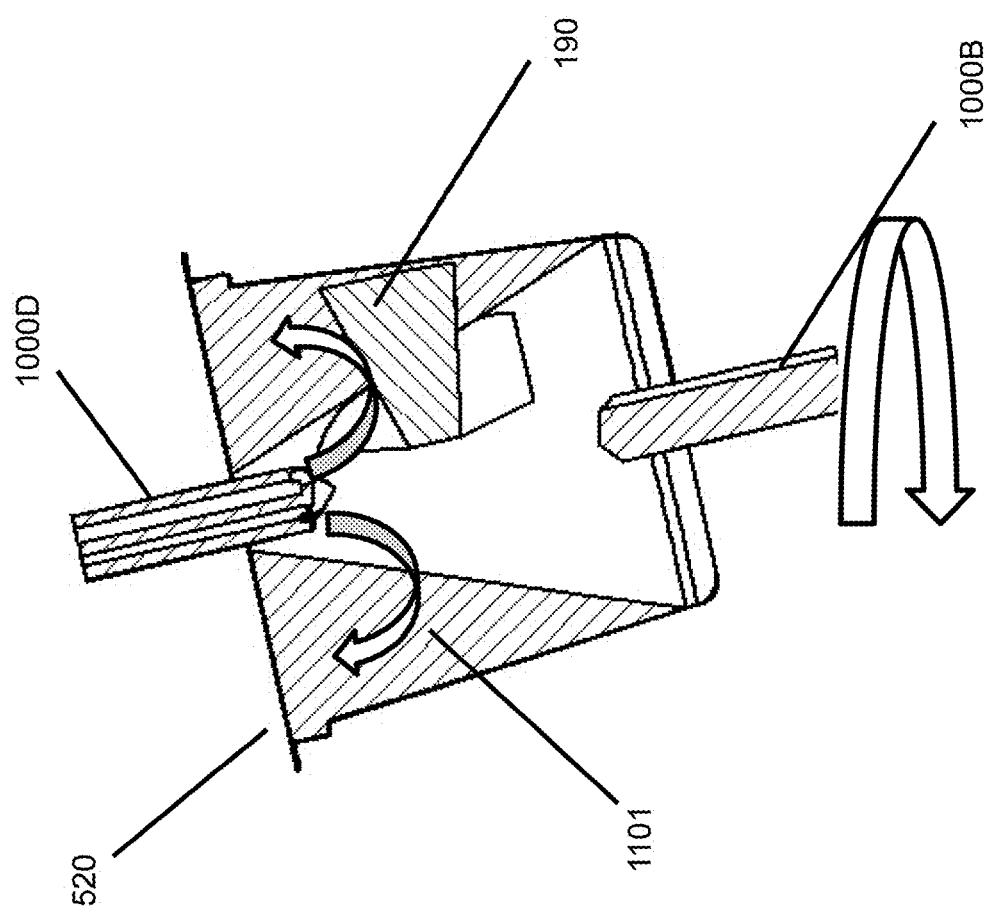

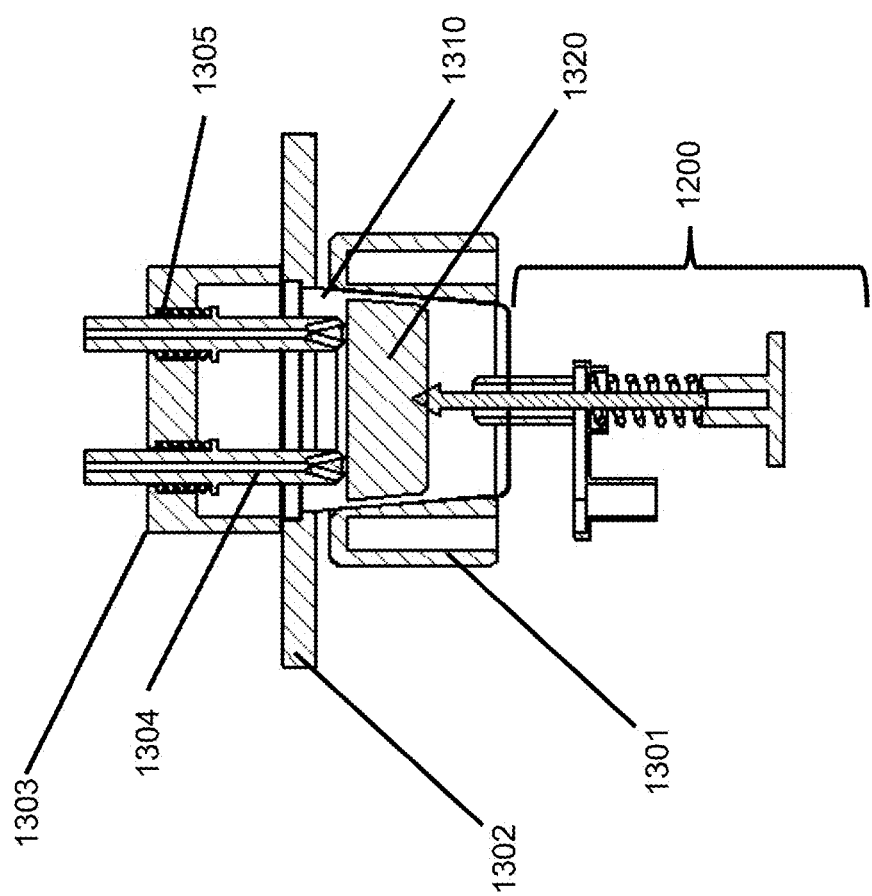

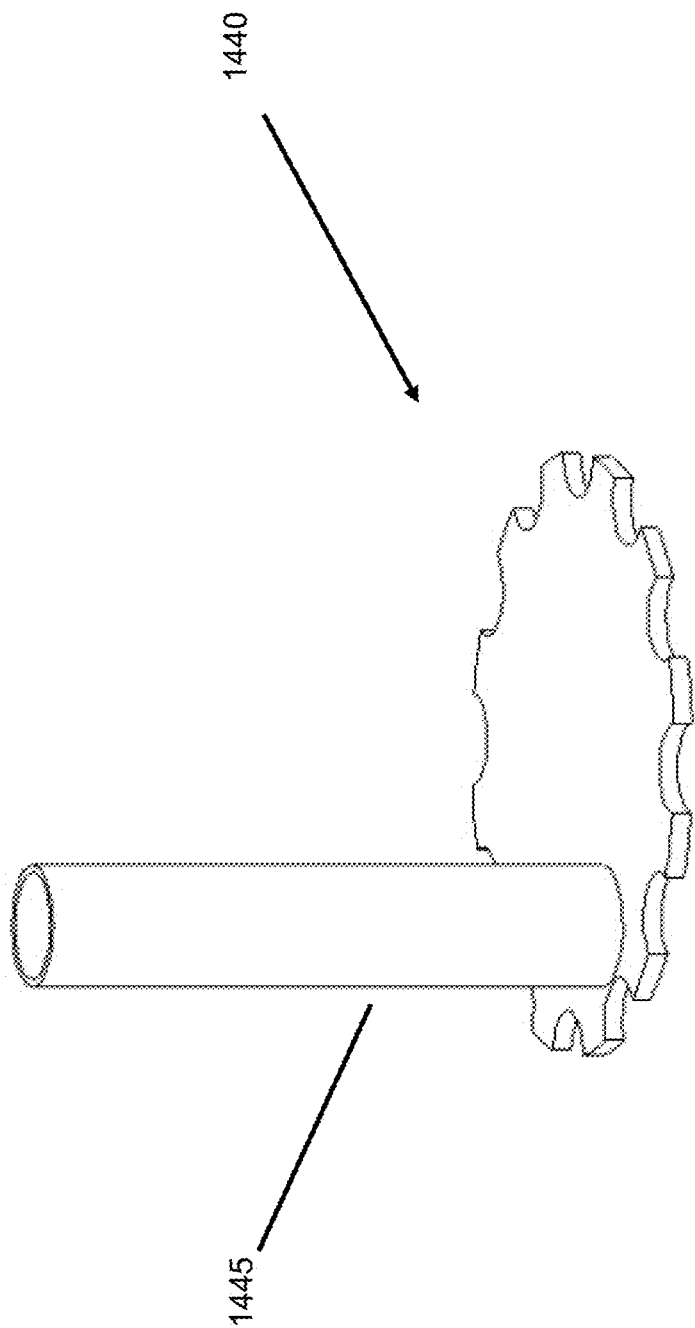

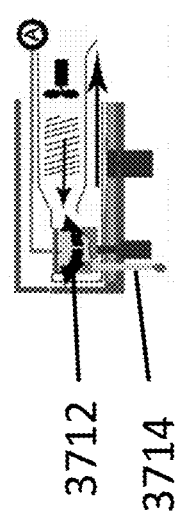
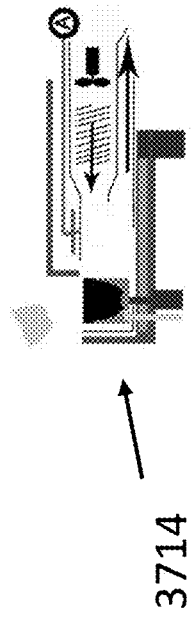
FIG. 37D
FIG. 37E
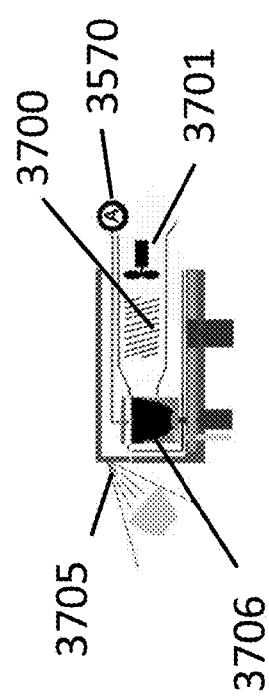
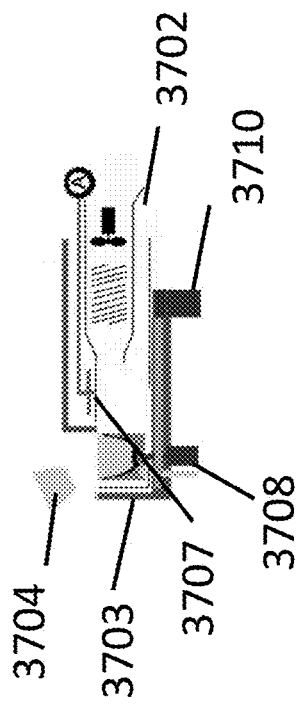
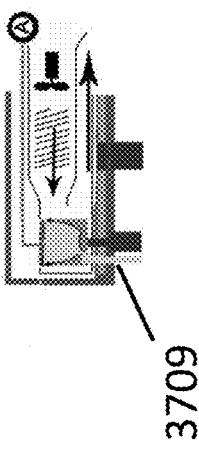
FIG. 37A
FIG. 37B
FIG. 37C

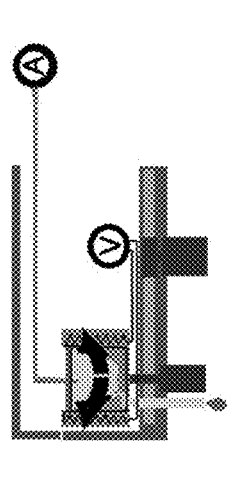
FIG. 38D
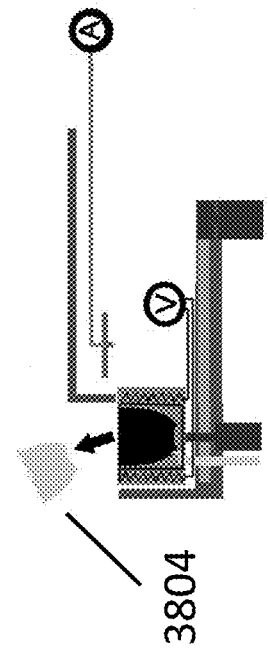
FIG. 38E
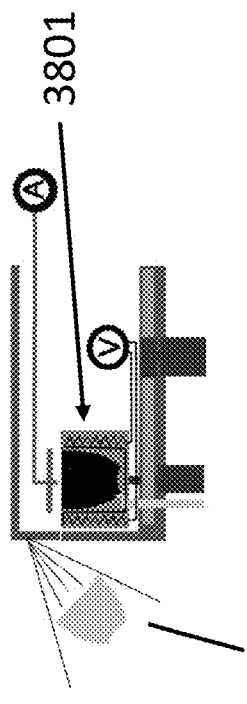
FIG. 38A
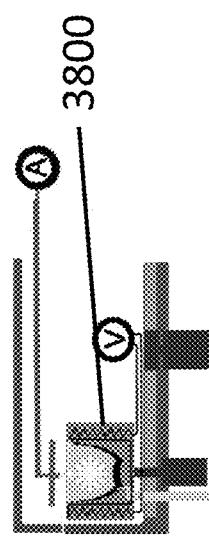
FIG. 38B
FIG. 38C

SYSTEMS FOR CONTROLLED HEATING AND AGITATION FOR LIQUID FOOD OR BEVERAGE PRODUCT CREATION

RELATED APPLICATIONS

This application is a continuation of U.S. patent application Ser. No. 16/389,552, entitled "Systems for Controlled Heating and Agitation for Liquid Food or Beverage Product Creation", filed Apr. 19, 2019, which is a continuation of and claims priority under 35 U.S.C. § 120 to U.S. patent application Ser. No. 15/352,245, entitled "Systems for Controlled Heating and Agitation for Liquid Food or Beverage Product Creation", filed Nov. 15, 2016, now U.S. Pat. No. 10,264,912, which is a continuation of and claims priority under 35 U.S.C. § 120 to U.S. patent application Ser. No. 15/347,591, entitled "Systems for and Methods of Controlled Liquid Food or Beverage Product Creation", filed Nov. 9, 2016, now U. S. Pat. No. 10,111,554, which relates to and claims priority under 35 U.S.C. § 119(e) to U.S. Provisional Patent Application No. 62/350,928, entitled "Systems for and Methods of Creating Liquid Food and Beverage Product from a Portion-Controlled Receptacle", filed on Jun. 16, 2016, and U.S. Provisional Patent Application No. 62/380,170, entitled "Systems for and Methods of Creating Liquid Food and Beverage Product from a Portion-Controlled Receptacle", filed on Aug. 26, 2016, and said U.S. patent application Ser. No. 15/347,591 is a continuation-in-part of and claims priority under 35 U.S.C. § 120 to U.S. patent application Ser. No. 15/265,379, entitled "Systems for and Methods of Agitation in the Production of Beverage and Food Receptacles from Frozen Contents", filed Sep. 14, 2016, now U.S. Pat. No. 9,615,597, which is a continuation of U.S. patent application Ser. No. 15/185,744, entitled "Systems for and Methods of Providing Support for Displaceable Frozen Contents in Beverage and Food Receptacles", filed Jun. 17, 2016, now U.S. Pat. No. 9,487,348, which claims priority under 35 U. S. C. § 119(e) to U.S. Provisional Patent Application No. 62/344,212, entitled "Systems for and Methods of Providing Support for Displaceable Frozen Contents in Beverage and Food Receptacles", filed Jun. 1, 2016, and said U.S. patent application Ser. No. 15/185,744 is a continuation-in-part of and claims priority under 35 U.S.C. § 120 to U.S. patent application Ser. No. 15/099,156, entitled "Method of and System for Creating a Consumable Liquid Food or Beverage Product from Frozen Liquid Contents", filed on Apr. 14, 2016, which is a continuation-in-part of and claims priority under 35 U. S. C. § 120 to International Patent Application No. PCT/US16/23226, entitled "Method of and System for Creating a Consumable Liquid Food or Beverage Product from Frozen Liquid Contents", filed on Mar. 18, 2016, which relates to and claims priority under 35 U. S. C. § 119(e) to U.S. Provisional Patent Application No. 62/136,072, entitled "Packaging an Iced Concentrate", filed on Mar. 20, 2015, and U.S. Provisional Patent Application No. 62/275,506, entitled "Method of and System for Creating a Consumable Liquid Food or Beverage Product from Frozen Liquid Contents", filed on Jan. 6, 2016, and said PCT/US16/23226 is a continuation-in-part of and claims priority under 35 U.S.C. § 120 to U.S. patent application Ser. No. 14/801,540, entitled "Apparatus and Processes for Creating a Consumable Liquid Food or Beverage Product from Frozen Contents", filed on Jul. 16, 2015, now U.S. Pat. No. 9,346,611, which relates to and claims priority under 35 U.S.C. § 119(e) to U.S. Provisional Patent Application No. 62/136,072, filed Mar. 20, 2015, all of which are incorporated by reference herein in their entirety.

TECHNICAL FIELD

The technical field relates generally to systems for and methods of creating liquid food and/or beverage products from frozen contents in a controlled manner, and in particular to controlling the melting of the frozen contents into liquid and controlling the vaporization of the liquid into gas.

BACKGROUND

Current or prior machine-based coffee brewing systems and coffee packed in filtered pods allow consumers to produce purportedly fresh-brewed beverages at the touch of a button while eliminating the need for additional process steps such as measuring, handling of filters, and/or messy disposal of used grounds. These machine-based systems typically utilize a receptacle that contains dry solids or powders such as dry coffee grinds, tea leaves, or cocoa powder, as well as a filtration media to prevent migration of unwanted solids into the user's cup or glass, and some type of cover or lid. The receptacle itself is often thin-walled so it can be perforated with needles or other mechanisms so that a solvent (e.g., hot water) can be injected into the receptacle. In practice, the receptacle is inserted into the machine and, upon closing the machine's cover, the receptacle is pierced to produce an inlet and an outlet. Thereafter, the hot solvent is delivered to the inlet, added into the receptacle, and a brewed beverage exits via a filter to the outlet.

Such systems often suffer from problems with being able to maintain freshness of the contents in the receptacle, brew strength from a finite sized package, and/or the inability to conveniently recycle the large number of filtered receptacles with spent grinds/leaves created each year.

The issue of maintaining freshness can occur, for example, when the dry solid is a finely ground coffee. This issue is largely the result of unwanted oxidation of critical flavor and aroma compounds in the coffee grounds, a problem that can be exacerbated by the fact that ground coffee presents a very large surface area to its ambient environment. While some manufactures may attempt to address this problem using MAP (Modified Atmosphere Packaging) methods (e.g., the introduction of a non-oxidizing gas in place of ambient air), their efforts are often largely unsuccessful for a number of reasons. For example, freshly roasted whole bean or ground coffee profusely outgases $CO_2$, thus requiring a pre-packaging step to allow the grounds to "degas" prior to packaging so the receptacle does not swell or puff outwardly due to pressure created from within the receptacle, which in turn would cause the receptacle to take on the appearance of spoiled product. In addition, this $CO_2$ outgassing carries with it and depletes a rich mixture of fresh coffee aromas from the ground coffee. Further, coffee beans and grinds are approximately 44% oxygen by composition, which may impact the flavor and fragrance of the coffee internally after the roasting process.

Another downfall of these receptacles that contain dry solids or powders is often their inability to create a wide range of beverage potency and serving sizes from a given packaging size. A pod that holds ten grams of ground coffee can only produce about two grams of actual brewed coffee compounds if brewed according to SCAA (Specialty Coffee Association of America) brewing guidelines. In turn, when two grams of brewed coffee compounds are diluted in a ten ounce cup of coffee, a concentration of about a 0.75 total dissolved solids (TDS) results. TDS (in % throughout) is a measure of the combined content of inorganic and organic substances contained in a liquid in molecular, ionized or micro-granular colloidal solids suspended form. Therefore, such a cup of coffee is often considered a very weak cup of coffee for many consumers. Conversely, some brewers can over-extract the same ten grams of coffee grounds to create a higher TDS; however, the additional dissolved solids that are extracted are often harsh on the palate and can ruin the flavor integrity of the coffee. Soluble/instant coffee is often added to reduce this drawback. In addition, most brewers designed for extracting cannot deliver pressure and temperature to remove all desired compounds from the ground product, therefore often good coffee is wasted, up to 25%, and an often weaker or smaller cup of coffee is produced than desired.

Turning to the matter of recycling, the presence of leftover coffee grounds, tea leaves and/or other residual waste after brewing (e.g., spent filters left within the receptacles) typically makes receptacles unsuitable for recycling. Consumers could remove the cover from the spent receptacles and rinse out the residual material, but this is time consuming, messy, a waste of water, and/or a waste of valuable soil nutrients that could otherwise be recycled back into the farming ecosystem. Therefore, most consumers will not bother to recycle in return for such an insignificant apparent ecological gain. Recycling can also be impacted by the type of thermoplastic material used in some receptacles. For example, in an effort to minimize loss of freshness as discussed above, some manufacturers have chosen to use materials that have exceptional vapor barrier properties, for example, a laminated film material with an inner layer of ethylene vinyl alcohol (EVOH) copolymer. The combination of different thermoplastic materials in such a laminated film, which could be some combination of EVOH, polypropylene, polyethylene, PVC and/or others material is unsuited to recycling.

Despite the disadvantages above, there still exist a number of different machine-based systems on the market today that create beverages from single-serving capsuled products. These have become extremely popular with consumers, primarily for the convenience they offer in making an acceptable (not necessarily excellent) cup of coffee, often causing the consumer to swap café quality brewed coffee for the convenience of a single serving home-brewed cup.

In addition to single serving capsule products, there exist frozen products such as coffee extracts and juice concentrates that are currently packaged in large containers and cans (e.g., 2 liters) for creating multiple servings of beverages from a single container. However, it is usually inconvenient and time-consuming to prepare a beverage from these frozen extracts or concentrates. Some coffee products, for example, must be slowly melted prior to use, typically over a period of several hours or days. The end product is required to be stored in a refrigerator thereafter to preserve its product safety when less than all servings are consumed. Further, for beverages that are enjoyed hot, like coffee and tea, the melted extract must then be heated appropriately. Many of these products are not shelf stable, for example coffee that has a high percentage of solids in the grounds, as these solids are the result of hydrolyzed wood, which are subject to decomposition and spoilage. Accordingly, the flavor and quality in these large batch frozen products can deteriorate in a matter of hours even at refrigeration temperatures. In addition, the method of forming the final consumable beverage is not often not automated and is therefore subject to over- or under-dilution, leading to an inconsistent user experience.

SUMMARY

The techniques and systems described herein include integrated systems that enable a wider variety of food and beverage products to be dispensed than known portion control brewing systems currently available. In certain embodiments, the systems include a multi-function and multi-use dispenser that works in cooperation with multi-content frozen receptacles. The receptacles contain previously-prepared concentrates and extracts in a frozen state in a sealed MAP gas environment. Because the food or beverages contained therein are maintained in a preserved state, they exist in an FDA food-safe format. In addition, the frozen liquid contents are preserved at peak levels of flavor and fragrance without the use of conventional preservatives or additives.

Meanwhile, the dispenser may prepare these foods and beverages in both hot or cold format by utilizing specific receptacles containing the frozen liquid content. The integrated system that includes the dispenser and receptacles can safely provide, e.g., coffee, tea, cocoa, sodas, soups, nutraceuticals, vitamin waters, medicines, energy supplements, lattes, cappuccinos, chai lattes, to name a few. While dispensing the product, the receptacles are rinsed substantially clean, free of grounds, leaves, filters powders or crystals by the dispensing system, thereby qualifying them for recycling.

In some examples, the receptacle is configured such that the receptacle can be perforated before the receptacle is inserted into the apparatus, can be perforated after the receptacle is inserted into the apparatus, or both. The receptacle may include an unfilled region, e.g., headspace between the frozen liquid content and the closure, wherein the region is configured to include an inert or reduced reactivity gas in place of atmospheric air in the receptacle. This region also allows movement of the frozen liquid contents within the receptacle to allow for creation of a flow path for diluting/melting fluids around the frozen liquid contents during product preparation.

The disclosed subject matter includes a process for producing a liquid food or beverage from a package containing frozen liquid contents. The process includes providing frozen liquid contents in a sealed container, wherein the container is configured to store the frozen liquid contents. In this embodiment, the process always includes melting the frozen liquid contents in the sealed container to generate a melted liquid. The process includes perforating the sealed container at a first location to permit dispensing of the melted liquid from the container to create a consumable liquid food or beverage.

In some examples, melting the frozen liquid contents includes perforating the sealed container at a second location to permit injection of a heated liquid or heat in another format into the container to melt and dilute the frozen liquid contents in the sealed container. Melting the frozen liquid contents can include applying heat or electric frequency energy externally to the sealed container or within the sealed container via an injected liquid, gas, or steam to melt the frozen liquid contents into a consumable liquid form.

In addition to the food and beverage packaging system, the systems and techniques described herein include an apparatus for melting and/or diluting frozen liquid contents stored within this packaging system, wherein the frozen liquid contents of the package are made from food and beverage concentrates, extracts and other consumable fluid types with or without nutrients, and various methods for delivering these melted and/or diluted contents for immediate consumption. The techniques described herein allow, for example, consumers to conveniently and spontaneously create a single-serve, or multi serve consumable beverage or liquid-based food directly from a receptacle such that the product has the desired fresh taste, potency, volume, temperature, texture and/or the like. To achieve this goal, frozen liquid contents and preferably flash-frozen liquid contents, made from concentrates, extracts, and other consumable fluid types can be packaged in a gas impermeable, MAP packaged, full barrier and residue-free filterless recyclable receptacle. Further, this receptacle is designed to be accommodated and used by a machine-based dispensing system to facilitate the melting and/or diluting of the contents and deliver a product with desired characteristics, including taste, aroma strength, volume, temperature, color and texture, so that consumers can consistently and conveniently experience a level of superb taste and freshness that is unavailable by any other means in use today. Unlike current single-serve coffee makers, which create a finished product via a brewing process (e.g., the extraction of soluble products from solid coffee grounds), the disclosed approach creates a product by melting and diluting a frozen extract or concentrate created through an earlier manufacturing process, which can take place in a factory environment under ideal conditions to capture and preserve flavor.

In one aspect of the invention, a dispenser for producing a food or beverage liquid product from a frozen contents in a receptacle includes a chamber configured to hold the receptacle and a non-diluting heater configured to heat at least one of the receptacle when held in the chamber and the frozen contents within the receptacle when held in the chamber. The non-diluting heater does not add liquid to an interior of the receptacle when held in the chamber. The dispesner also includes a reservoir configured to contain a liquid in which the reservoir includes a reservoir outlet configured to withdraw liquid from the reservoir. The dispenser further includes a product outlet configured to withdraw a food or beverage liquid product from the receptacle when held in the chamber and a controller and a computer readable memory comprising instructions that when executed by the controller cause the dispenser to selectively perform at least one of: heating at least one of the receptacle and the frozen contents within the receptacle using the non-diluting heater and withdrawing liquid from the reservoir through the reservoir outlet.

In another aspect of the invention, a method of producing a melted food or beverage liquid product from a receptacle containing frozen liquid contents includes receiving a receptacle in a chamber of a dispenser. The receptacle defines an enclosed inner volume containing a frozen liquid contents. The method also includes identifying a characteristic of at least one of the receptacle and the frozen liquid contents and melting at least a portion of the frozen liquid contents to generate a melted food or beverage liquid product by selectively performing at least one of: heating at least one of the receptacle when held in the chamber and the frozen liquid contents within the receptacle when held in the chamber without adding liquid to an interior of the receptacle when held in the chamber, supplying a dilution liquid to the interior of the receptacle, and applying motion to at least one of the receptacle and the frozen liquid contents. The selectively performing at least one of heating, supplying a dilution liquid, and applying motion is based on the identified characteristic. The method further includes perforating the receptacle and dispensing the melted food or beverage liquid product from the receptacle.

In a further aspect of the invention, a method of producing a melted food or beverage liquid product from a receptacle containing frozen liquid contents includes receiving a receptacle in a dispenser. The receptacle defines an enclosed inner volume containing a frozen liquid contents. The method also includes identifying a characteristic of at least one of the receptacle and the frozen liquid contents and removing the frozen liquid contents from the receptacle into a chamber. The method further includes melting at least a portion of the frozen liquid contents to generate a melted food or beverage liquid product by selectively performing at least one of: heating the frozen contents without combining a liquid with the frozen liquid contents, combining a dilution liquid with the frozen liquid contents, and applying motion to the frozen liquid contents. The selectively performing at least one of heating, combining a dilution liquid, and applying motion is based on the identified characteristic. The method still further includes dispensing the melted food or beverage liquid product.

In yet another aspect of the invention, a dispenser for producing a food or beverage liquid product from a frozen contents in a receptacle includes a chamber configured to hold a receptacle defining an enclosed inner volume containing a frozen liquid contents and a dilution liquid inlet configured to supply a dilution liquid to the inner volume of the receptacle when held in the chamber. The dispenser also includes a perforator configured to perforate the receptacle and form a product outlet from the receptacle for a food or beverage liquid product and an agitator configured to impart motion to at least one of the receptacle and the frozen liquid contents in the receptacle that increases a flow path from the dilution liquid inlet to the product outlet taken by at least a portion of dilution liquid, when supplied, relative to a flow path from the dilution liquid inlet to the product outlet taken by the portion of dilution liquid without the imparted motion.

In an aspect of the invention, a dispenser for producing a food or beverage liquid product from a frozen contents in a receptacle includes a chamber configured to hold a receptacle defining an enclosed inner volume containing a frozen liquid contents and a perforator configured to perforate the receptacle and remove at least a portion of the frozen liquid contents from the receptacle into a melting vessel. The dispenser also includes an agitator configured to impart motion to at least one of the melting vessel and the frozen liquid contents in the melting vessel and a non-diluting heater configured to heat at least one of the melting vessel and the frozen contents within the melting vessel. The non-diluting heater does not add liquid to an interior of the receptacle when held in the chamber. The dispenser further includes a product outlet configured to dispense the food or beverage liquid product.

Accordingly, there has thus been outlined, in broad terms, features of the disclosed subject matter in order that the detailed description thereof that follows may be better understood, and in order that the present contribution to the art made by the apparatus and techniques disclosed herein may be better appreciated. There are, of course, additional features of the disclosed apparatus and techniques that will be described hereinafter. It is to be understood that the phraseology and terminology employed herein are for the purpose of description and should not be regarded as limiting. Moreover, any of the above aspects and embodiments can be combined with any of the other aspects and embodiments and remain within the scope of the invention.

BRIEF DESCRIPTION OF THE DRAWINGS

Various objects, features, and advantages of the disclosed techniques can be more fully appreciated with reference to the following detailed description of the disclosed subject matter when considered in connection with the following drawings, in which like reference numerals identify like elements.

FIGS. 1A-1G illustrate various embodiments of receptacle geometries and frozen liquid contents configured in different forms and packaged to allow a desired flow of a liquid through the frozen liquid contents, according to some embodiments.

FIGS. 10A-10E illustrate five possible needle geometries that may be used to perforate a receptacle, according to some embodiments.

FIG. 11 illustrates the use of centrifugal motion to expedite liquefying a frozen liquid content, according to some embodiments.

FIGS. 13A-13D illustrate a process for producing a food or beverage from a frozen liquid content, according to some embodiments.

FIG. 14D illustrates a liquid frozen contents platform with an overflow tube, according to some embodiments.

FIG. 37A-E illustrate portions of a dispenser system, according to some embodiments.

FIG. 38A-E illustrate portions of a dispenser system, according to some embodiments.

DETAILED DESCRIPTION

Figure 1A:
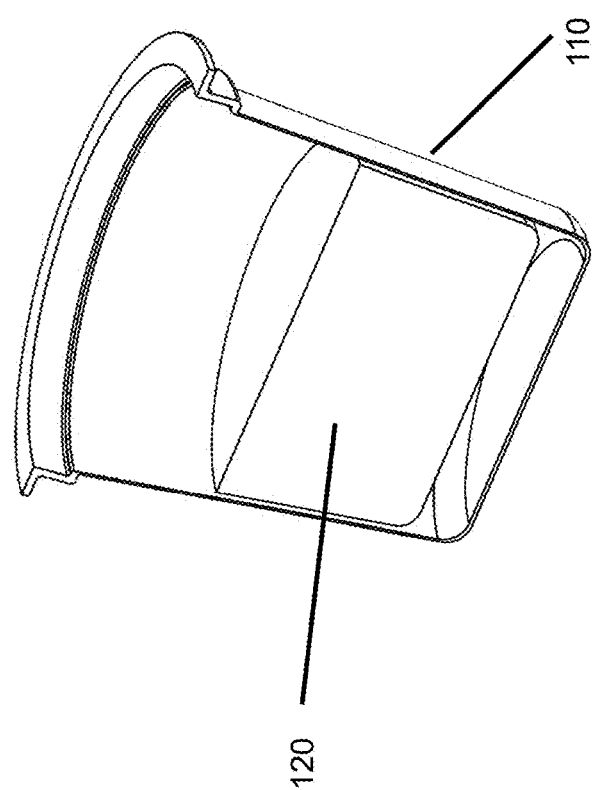

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are exemplary, and that it is contemplated that there are other systems and methods that are within the scope of the disclosed subject matter.

The various techniques described herein provide for the packaging of one or more frozen foods or beverage liquids, using a filterless receptacle, and how to efficiently convert this frozen liquid contents into a high quality, tasty food or beverage product. The single chamber filterless receptacle can be designed such that a machine-based system may accommodate the receptacle and facilitate the melting and/or diluting of the frozen liquid contents to conveniently produce a consumable liquid beverage or food product directly therefrom with a desired flavor, potency, volume, temperature, and texture in a timely manner without the need of brewing. For simplicity, a frozen food or beverage liquid may be referred to as the "frozen liquid contents" or "frozen liquid content".

In some embodiments, the liquid that is frozen to create the frozen liquid content may be any frozen liquid matter, which in some embodiments can be derived from a so-called extract, e.g., a product obtained through the removal of certain dissolvable solids using a solvent. For example, the extract may be created using water to remove certain desirable dissolvable solids from coffee grounds or tea leaves. Somewhat confusingly, certain liquid extracts with a high-solids content are often referred to as a concentrated extract. The use of the term "concentrated" in this context may or may not be entirely accurate depending on whether the high solids content was achieved purely through solvent extraction of the solids or through a secondary step of concentration wherein solvent was removed from the liquid by some means, for example, by reverse osmosis or evaporation using heat or refrigeration, to increase its potency or strength.

In contrast to a "brewer", which is a system for creating beverage products through extracting or dissolving solids (e.g., separately at a factory where the grinds/leaves etc. may be processed in bulk), the apparatus described herein to facilitate beverage creation is not a brewer. Rather, it melts and/or dilutes with dispensing functions that may be used to create a beverage from a previously brewed frozen liquid content.

The liquid used to make the frozen liquid content may also be a pure concentrate, e.g., a product obtained only by removing water or another solvent from a consumable compound such as a fruit juice or a soup, to create a fruit juice concentrate or a broth concentrate. In some embodiments, water may be removed from milk to create condensed milk. High TDS values and/or concentrations may be desirable either to reduce transportation costs and shelf space, or for convenience, for potency and serving size versatility of created products via dilution, or for enhanced shelf life due, for example, to enhanced anti-microbial activity due to reduced water activity. These specifics are intended to exemplify variation, but any liquid food or beverage product, regardless of how it is created, and regardless of its solids content falls within the scope of the present disclosure.

In some embodiments, the frozen liquid content can be one of a coffee or tea extract, lemonade, a fruit juice, a broth, a liquid dairy, an alcohol, a syrup, a viscous liquid, or any liquid food product that is frozen. Frozen liquid content can be matter created with or without nutritive value, may be flavored naturally or artificially, and be packaged with or without a preservative, and/or the like. The frozen liquid contents may compose carbohydrates, proteins, dietary minerals and other nutrients that support energy or metabolism. The frozen liquid contents may include or be enhanced with additives such as vitamins, calcium, potassium, sodium, and/or iron, among others. The frozen liquid contents may include preservatives such as antimicrobial additives, antioxidants and synthetic and/or non-synthetic compounds. Examples of preservative additives may include lactic acid, nitrates and nitrides, benzoic acid, sodium benzoate, hydroxybenzoate, propionic acid, sodium propionate, sulfur dioxide and sulfites, sorbic acid and sodium sorbate, ascorbic acid sodium, tocopherols, ascorbate, butylated hydroxytoluene, butylated hydroxyanisole, gallic acid and sodium gallate, an oxygen scavenger, disodium EDTA, citric acid (and citrates), tartaric acid, and lecithin, ascorbic acids, phenolase, rosemary extract, hops, salt, sugar, vinegar, alcohol, diatomaceous earth and sodium benzoate, among others. It will be understood that this listing of additives is intended to be within the scope of the techniques described herein, and the specifically referenced additives are exemplary only, and can also include derivatives thereof as well as other chemical compounds.

The frozen liquid contents or matter may or may not have suspended solids, and may include non-dissolvable solids. In some embodiments, the concentrate, extract, or other consumable fluid form which the frozen liquid contents are made may include additives that completely dissolve in a solvent before freezing. In some embodiments, the frozen liquid contents may also include a mass of a composition that is not dissolved within the frozen liquid contents during the packaging process, but is dissolved by the machine-based system during the creation of a beverage or food product with desired characteristics.

FIGS. 1A-1E show various embodiments of how the frozen liquid contents may be structured and packaged to allow for a desired flow of a pressurized or gravity fed diluting liquid by a machine-based system through the receptacle holding the frozen liquid contents. In addition to facilitating heat transfer to the frozen liquid contents, the diluting liquid may be effective at creating turbulent motion to thereby expedite melting in a variety of ways that are not outside the scope of the techniques described herein. Within the receptacle, the frozen liquid contents may be frozen into any useful shape or size.

Figure 1B:
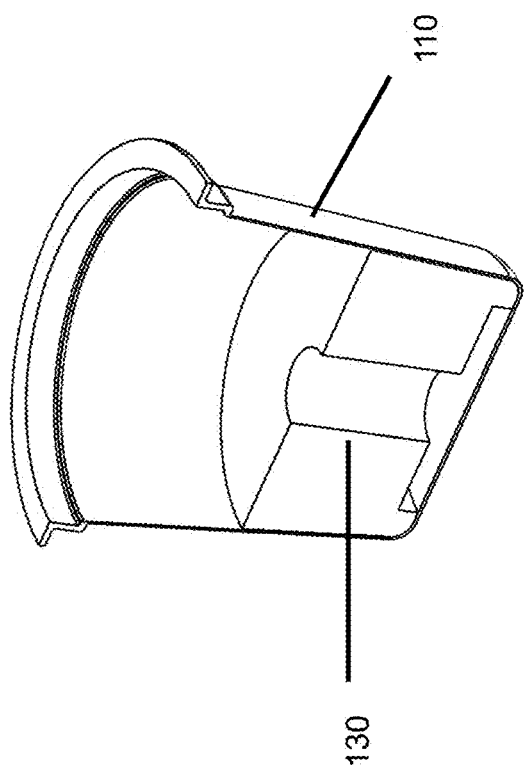

In FIG. 1A, a section view of receptacle 110 is shown (without a sealing lid in place), wherein the receptacle defines a cavity for packaging of the frozen liquid contents 120. The frozen liquid contents 120 can be frozen in-place by filling the receptacle with a liquid and then freezing the liquid, or the frozen contents can be frozen into a particular shape and then placed in the receptacle. In this instance, the frozen liquid contents are shown displaced away from the bottom portion of the receptacle to allow clearance for an exit needle perforation and to create a pathway around the outer surface of the frozen liquid contents in the receptacle for creating a desired flow of a melting/diluting liquid through the receptacle and around the frozen liquid contents to produce a beverage of a desired flavor, strength, volume, texture and temperature. FIG. 1B illustrates another embodiment, wherein the frozen liquid contents have been molded to a shape configured to match the outside of the receptacle and subsequently loaded, such that the pre-molded shape defines a through-hole 130 in its body and a relief portion 132 below for accommodating an exit needle perforation to provide for a desired liquid flow there through without blockage or back pressure. FIG. 1C shows a plurality of frozen liquid content pieces 140-180 provided in multiple and various shapes and sizes, with large interstitial spaces to provide for a desired liquid flow though the receptacle and around the frozen liquid contents. In some embodiments the frozen liquid contents within the sealed receptacle may include a plurality of concentrates and compositions. For example, frozen liquid contents 140 and 150 could comprise a lemonade concentrate, while frozen beverage concentrates 160, 170, and 180 may comprise a tea concentrate, resulting in an "Arnold Palmer".

Figure 1E:
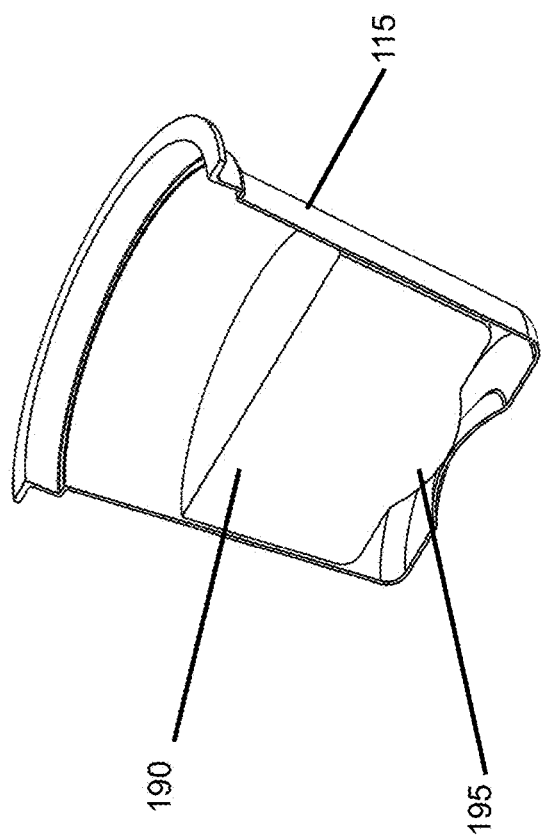

FIGS. 1D and 1E illustrate an embodiment for an alternatively shaped receptacle 115 that includes a bottom portion having a dome 195 (bistable or otherwise). In FIG. 1D the receptacle 115 is shown in its initial condition when the frozen liquid contents are added and frozen in place, complete with a frozen dome structure 195 in the bottom, with the dome structure in a primary or initial position, distended outwardly from the receptacle. FIG. 1E shows the condition of the receptacle 115 after the dome 195 has been displaced to a secondary position directed inward into the cavity of the receptacle such that the liquid frozen liquid contents 190 are displaced upwardly, into the headspace, reverting or "exchanging" the space or void between the inside bottom of the receptacle and the bottom portion of the frozen liquid contents. This displacement desirably creates a space for an exit perforation needle in the bottom of the receptacle and also creates flow paths for any melting/dilution liquid to pass around the outside of the frozen liquid contents.

Figure 1F:
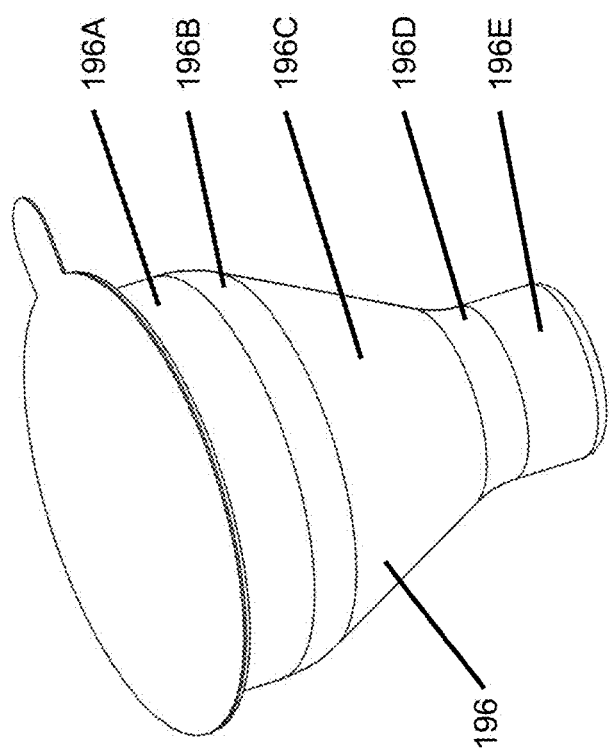

FIG. 1F illustrates a receptacle 196 comprising a multi-faceted shape. In this embodiment, the receptacle 196 includes different shape portions 196A-E. In some embodiments, the process of filling, melting and diluting a frozen liquid content may be generally unaffected by the size or shape of the receptacle. In some embodiments, certain design considerations can be taken into account with regard to using geometries that may, for example, promote and facilitate unrestricted release of the frozen liquid contents, accommodate needle perforation, enable the development of clearance around the frozen liquid contents to promote a ready flow path for diluting liquids, and/or the like. For example, one or more of such design considerations can be met with positive (non-locking) draft in the sidewalls of the receptacle where it is in contact with the frozen liquid contents. Draft can be achieved by, for example, tapering the sidewalls of the receptacle, such as tapering the sidewalls outward from bottom of the receptacle to top of the receptacle (e.g., the diameter of the receptacle gets larger nearer the top of the receptacle). This can create a positive draft such that pushing the frozen liquid contents away from the bottom of the receptacle creates clearance around the sides of the frozen liquid contents (e.g., which avoids mechanical locking of the frozen liquid contents against the sides of the receptacle). Such positive draft can be used to create a natural flow path for diluting liquids to travel through the receptacle, such as liquids flowing from an entry needle to an exit needle that perforate the receptacle.

Figure 1G:
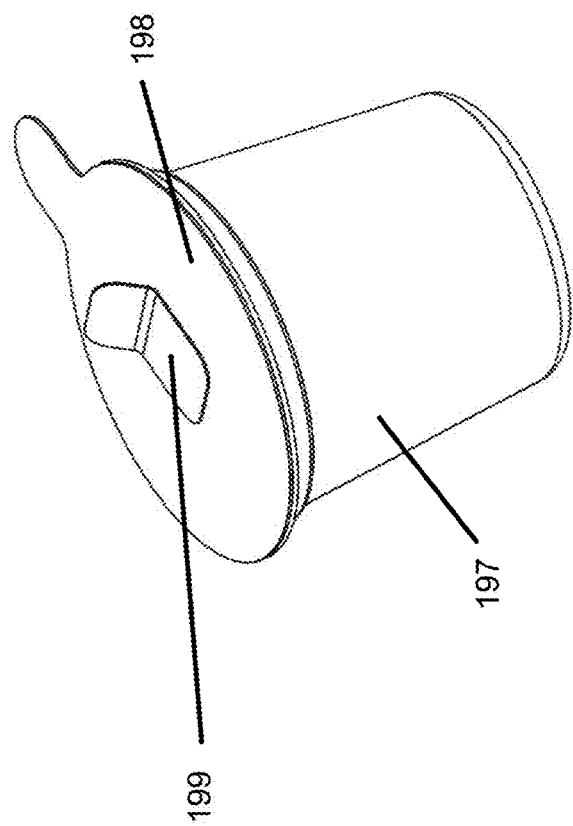

FIG. 1G illustrates a receptacle 197 with a lid 198 that includes a pull tab 199 that may be removed by the consumer. The pull tab 199 can be removed to facilitate use of a straw or similar device in combination with the receptacle 197. As another example, the pull tab 199 can be removed to facilitate introduction of diluting fluids into the receptacle 197.

Figure 2A:
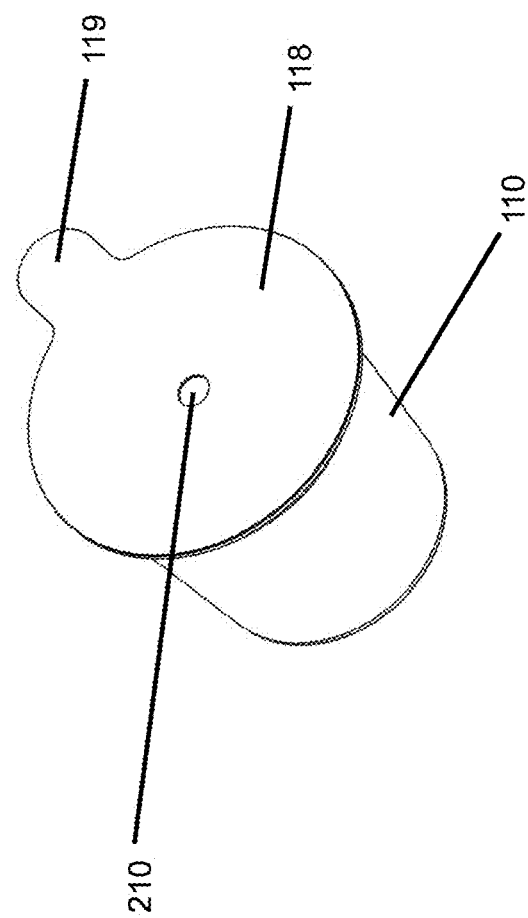
FIGS. 2A-2D illustrate various embodiments showing how the dilution system may add or deliver a liquid to/from the frozen liquid contents by piercing the packaging and externally and controllably heating the packaging so melting and dilution is a result, according to some embodiments.

FIG. 2A illustrates a perspective view of the receptacle, including a formed seal closure such as a lid structure 118, which may include a puncture 210 therein, whereby, in some embodiments, a dilution fluid, which may also act as a melting agent, can be introduced into the receptacle. The lid structure 118 can include a tab 119 for allowing manual removal of the lid to access the frozen liquid contents without a need for perforation of the lid in certain instances. This lid structure can be made from the same material as the receptacle to better support efforts toward single-stream recycling. The lid structure can be made of sufficient gage thickness to adequately withstand internal pressure created by, for example, the melting/diluting liquid, which may increase and decrease with forces created by the accommodating system. For example, a vibratory, centrifugal, or rotation platform or the like that facilitates melting, or the flow rate of a diluting liquid injected will affect the pressure put on the lid, seal, and receptacle. Furthermore, the perforations made by the accommodating system may impact the pressures created on the hermetic seal, lid, and receptacle. The lid may be attached to the receptacle by any suitable technique such as, for example, heat sealing or crimping, radial folding, sonic welding, and the function can be achieved by any mechanism or form of the lid that seals the internal cavity and acts as a barrier against gas or moisture migration.

Figure 2B:
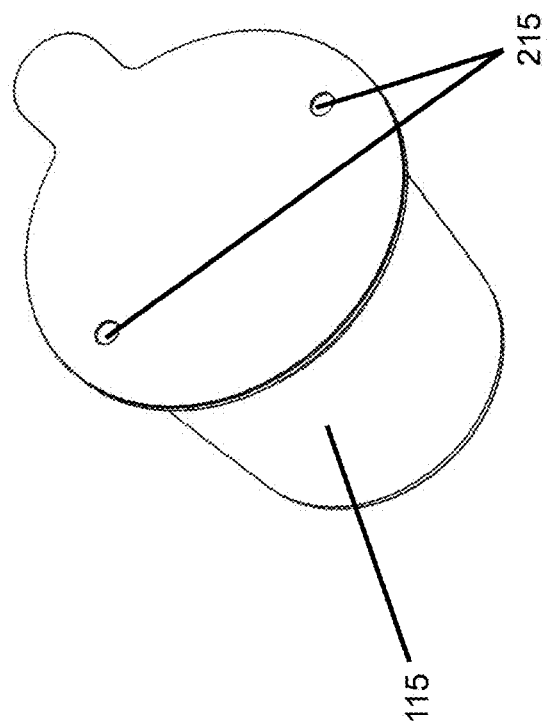
Figure 2C:
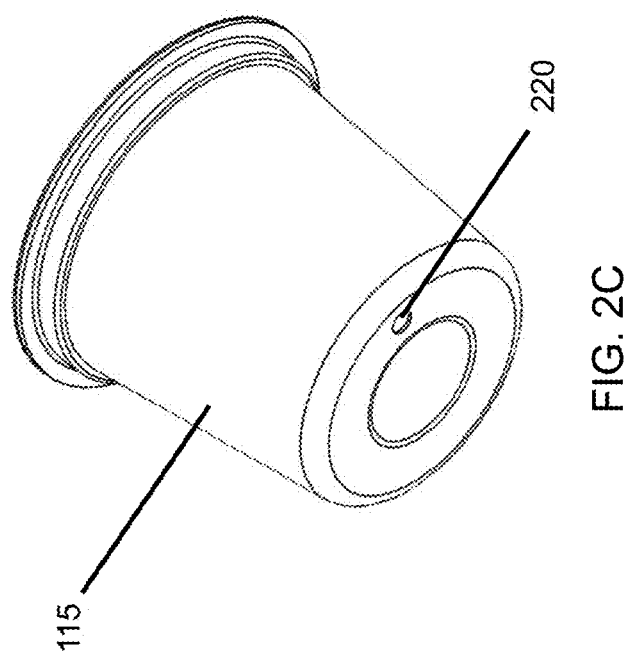

FIG. 2B shows an alternative embodiment of a punctured lid including two perforations 215. FIG. 2C illustrates a bottom puncture 220 to allow the dilution liquid to exit the sealed receptacle. These examples are meant to be illustrative, however, as the puncture, or punctures, may be made anywhere on the receptacle. The punctures may be made in a specific location to dispense a solvent, diluting agent, liquid, such as water, gas or steam for a desired melting and dilution environment, and ultimately the creation of a desired beverage in a timely manner. The punctures may be of any size as needed, for example, to allow oversize solids (frozen or non-dissolvable solids) to be dispensed from the receptacle. In some variations, the perforation may be made to allow frozen structures of a specific size to escape and to be distributed from the receptacle to create a fluid, iced, slush, or smoothie-like beverage. In addition, multiple punctures may be advantageous in providing venting of the receptacle when melting/diluting fluid is input therein.

Figure 2D:
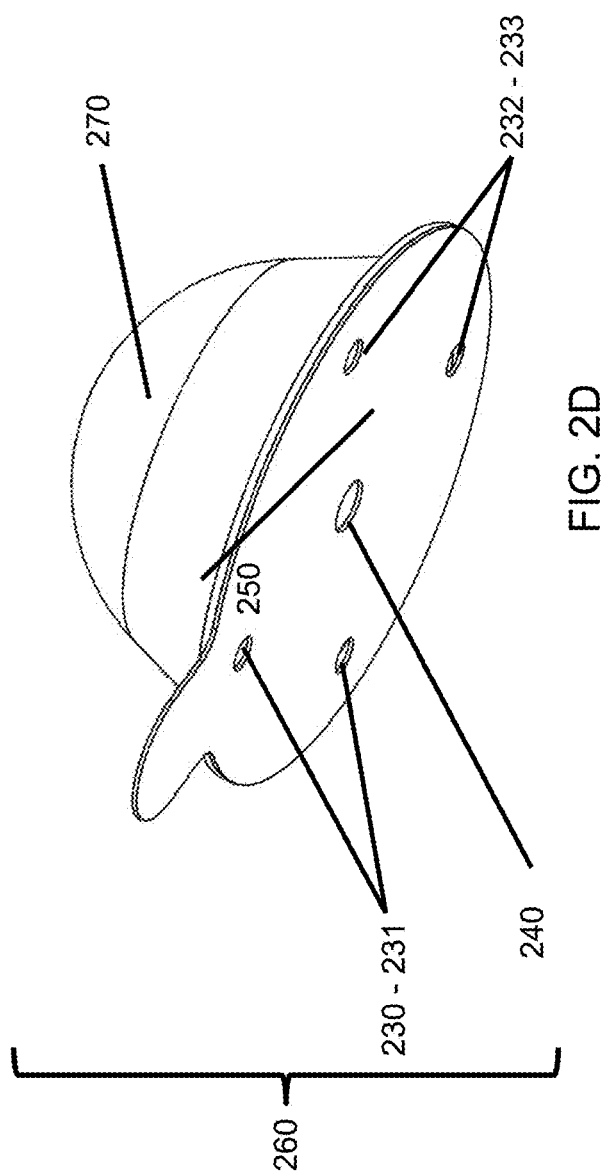

FIG. 2D illustrates an embodiment having four punctures (230-233) situated in proximity to the periphery of a receptacle 270 for entry of a liquid through the lid 250 of a receptacle 260 that is loaded top-down into a machine-based system. As shown in this embodiment, a puncture 240 may be provided near the center of the receptacle lid for allowing the melted and diluted frozen liquid contents to exit the receptacle. In this figure, the frozen liquid contents (not shown) are frozen within the domed bottom of the upside down receptacle to allow for a desired flow environment, wherein the liquid is redirected by the tapered sides of the receptacle to the exit perforation. The melted and diluted liquid, in this example, may flow out of the receptacle into a secondary receptacle for consumption from a single or plurality of nozzles provided by an accommodating apparatus.

In some embodiments, the frozen liquid contents contained in these receptacles can be better preserved when deaerated, or deoxygenated, including use of deaerated or deoxygenated solvents (e.g., water) during an extraction process when appropriate. In some embodiments, the liquid used to make the frozen liquid contents may be frozen at a time of peak quality in terms of freshness, flavor, taste and nutrition. In some embodiments, such as for a coffee-based beverage, the frozen liquid content is flash-frozen during the period of peak flavor immediately following extraction to preserve the optimum taste, aroma and overall quality and thereafter distributed in a frozen state for preserving taste and aroma thereof. For example, an espresso concentrate may be preserved and may taste best when it is ground within 0-36 hours following roasting, brewed immediately after grinding, and using deoxygenated water during the brewing process. By flash freezing the liquid concentrate, extract, or other consumable fluid during this period of peak flavor immediately following brewing, it is possible to capture the peak flavor, optimum taste, aroma and overall quality of the extract. Further, by packaging this flash frozen liquid in a gas impermeable and recyclable receptacle using MAP techniques (as described further herein), and providing the frozen liquid contents are maintained in a frozen state during subsequent storage and delivery to the final consumer, the fresh flavor can be maintained almost indefinitely. In some embodiments, the frozen liquid content may be frozen by removing heat from a selected and controlled portion of the receptacle so as to later facilitate dislodging the bonds (adhesion) created between the frozen liquid content and the sides of the receptacle. For example, in certain embodiments, a liquid content is placed in a receptacle, and heat is removed so as to cause the liquid to freeze starting at the top surface of the liquid and then to freeze downward. Doing so reduces the adhesion between the frozen liquid content and the interior of the sidewalls of the receptacle.

In some embodiments the packaging may be distributed above freezing if the quality of the content can be maintained by some other FDA food safe method e.g., a syrup used to make carbonated beverages. In some embodiments, the frozen liquid contents may be frozen and never melted, melted once or numerous times during distribution. Distributing and maintaining the receptacles at a temperature below the freezing point of the frozen liquid contents may increase aspects of quality preservation and nutrient-rich food safety, but is not required for all embodiments. In some embodiments, the beverage concentrate is flash-frozen and kept frozen in its receptacle until it is ready to be melted and/or diluted immediately prior to being prepared for consumption.

In some embodiments the frozen liquid content can also be packaged as a plurality of frozen liquid contents, configured in a layered and/or blended format. In some embodiments, the frozen liquid contents can be configured in any shape or multiple geometric shapes so long as the contents will fit within the cavity volume of the receptacle while maintaining an unfilled region and are capable of being repositioned for certain puncture implementations by an accommodating system. In some embodiments, the frozen liquid contents may be crushed or macerated to increase the surface area of the frozen liquid contents to increase melting rates.

In some embodiments the liquid comprising the frozen liquid content may be frozen after it has been measured into the receptacle. In some embodiments the fluid used to create the frozen liquid content may be frozen prior to delivery to the receptacle, e.g., pre-frozen in a mold, extruded, frozen and cut to size, or by other means and then deposited in the receptacle as a frozen solid of some desirable shape. This may be done in cooperation with the dimensions of a receptacle with a tapered portion such that the frozen liquid content does not interfere with areas of the receptacle designated for puncture. For example, the frozen liquid content can be shaped so as to be displaced away from a puncture area because its diameter is larger than that of a top, bottom, or other first or second end of a receptacle, as shown in FIG. 1A. Stated another way, the frozen liquid contents may be created in a first phase or separate step, and then received, inserted and sealed in a receptacle that can be accommodated by a machine-based dispensing system. In some embodiments the liquid beverage concentrate is received as a slurry or liquid, to be frozen, and sealed in the receptacle in turn, or in unison. In some embodiments the frozen liquid contents are of a potency, shape and size, and are structured within a receptacle such that a machine-based system can easily melt and/or dilute the liquid frozen liquid contents, converting the contents to a consumable liquid of a desired flavor, potency, volume, temperature, and texture.

In some embodiments the receptacle for holding/storing the frozen liquid contents using the techniques described herein includes a cup-shaped portion having a continuous and closed bottom portion, a continuous sidewall extending from the bottom portion, and a sealable top opening defined by a continuous sidewall that tapers outwardly as it extends away from the bottom portion. The wall is uninterrupted by filters or other internal features that would interfere with certain puncture, frozen liquid content displacement and flow implementations.

In some embodiments, the receptacle includes a cavity for storing the frozen liquid content. The packaging in which the frozen liquid contents are sealed, before and hereinafter referred to as a "receptacle" could otherwise be described as a cartridge, a cup, a package, a pouch, a pod, a container, a capsule or the like. The receptacle can be in any shape, styling, color or composition, and may be styled to enhance the liquefaction environment in cooperation with the dispensing apparatus. The packaging may be flexible, have a definitive shape, or combination thereof. For aesthetic or functional reasons, for example, to complement pod detection or motion drive functions applied to the pod, the walls of the receptacle may be concave and/or convex to provide for different pod sizes while keeping certain interfacing dimensions constant. Likewise, the color and/or shape can be used to convey information to the dispenser.

Figure 6:
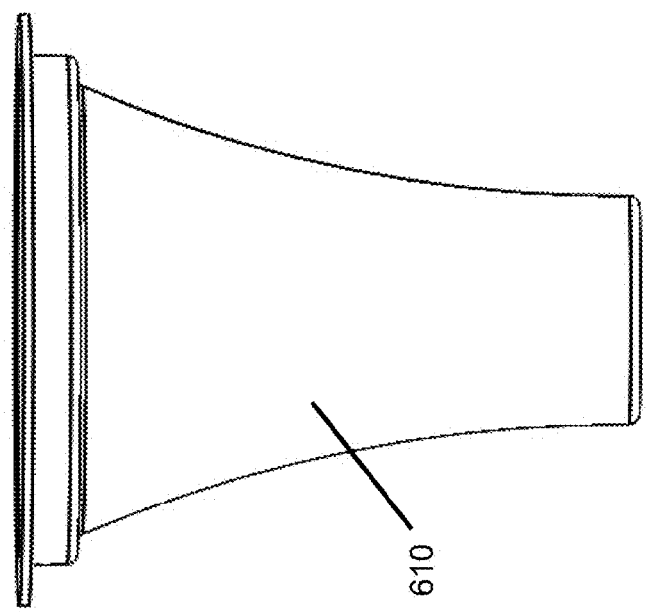
FIGS. 6 and 7 illustrate two versions of receptacles with identical end geometries and height, but different sidewall profiles, according to some embodiments.
Figure 7:
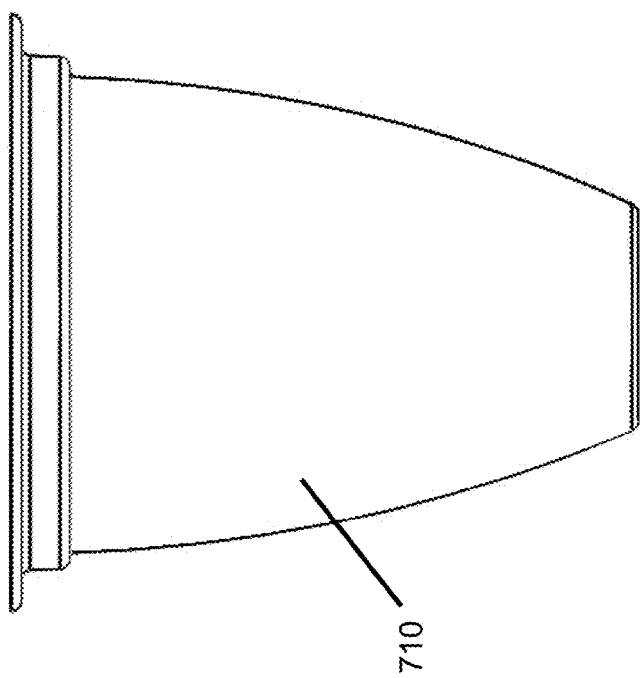

For example, FIGS. 6 and 7 illustrate two versions of receptacles 610 and 710 with identical end geometries and height, but different sidewall profiles. The differently curved sidewalls produce different internal volumes available for the frozen liquid contents and headspace, but the diameter of their two ends and their overall heights are the same.

In some embodiments the receptacle's outer surface is colored or coated with a material designed to enhance absorption of infrared energy that may be used to heat and/or melt the frozen liquid contents. In some embodiments the shape of the receptacle's sidewall, when seen in section view from a first or second end, would be the shape of a star or other non-circular shape, e.g., one whose perimeter surface area would be much greater than that of a smooth cylinder or cone and thereby promote heating and melting of the frozen concentrate proportionally faster. This may effectively facilitate melting in many ways, including increasing that surface area for heat to be transferred to the frozen liquid content through the receptacle, creating a more turbulent environment in the receptacle that expedites melting, or directing liquid away from the exit perforation(s) to promote greater heat transfer efficiency within the receptacle.

Figure 8:
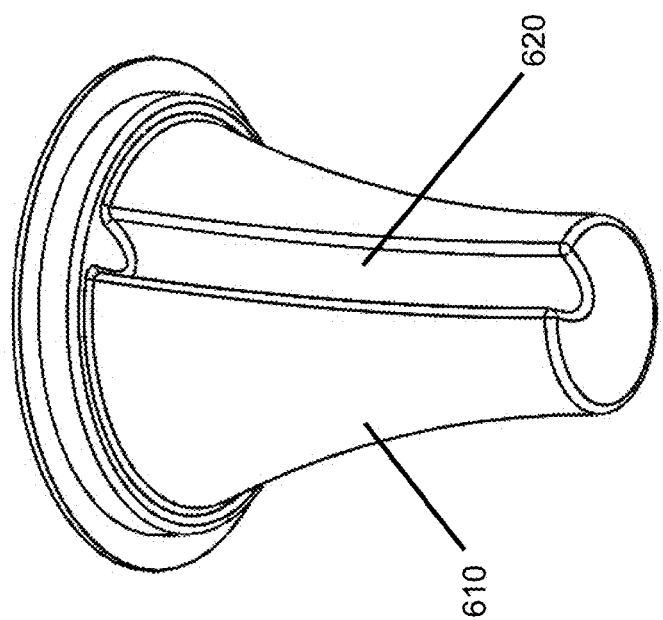
FIGS. 8 and 9 illustrate two versions of a sidewall indentation in a receptacle, a feature that may be used both for expediting liquefaction and for product identification, according to some embodiments.
Figure 9:
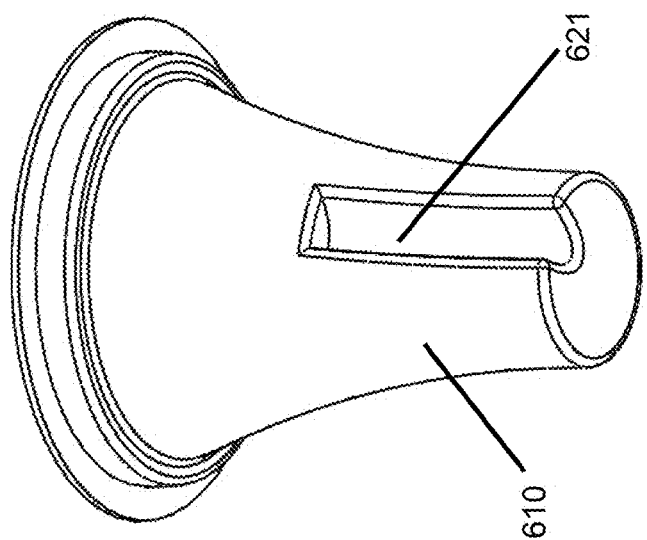

In some embodiments, as shown in FIGS. 8 and 9, there is a "keying feature" 620 or 621, which can help to promote internal turbulence during melting and dilution of the frozen liquid contents and can also be of use in identifying the contents or family of products used to fill the receptacle.

In some embodiments, the receptacle includes a closure for sealing the receptacle to assist in maintaining a MAP gas environment. In this case, a hermetic seal formed between a lid and the receptacle may be accomplished using a variety of methods, including, but not limited to a patch, glue, cork, heat seal, crimp, and/or the like. In some embodiments, the closure may be designed to be manually removable, e.g., with a pull tab on a lid as previously noted, so that the frozen liquid content can be used in other ways if a machine-based system for preparing a consumable beverage is not available. In some embodiments, the apparatus may require a manual perforation instead of a machine implemented perforation before loading the receptacle into the machine-based dispensing system.

The frozen liquid contents may be packaged in a material that provides control of gas migration, e.g., the receptacle may be comprised of a gas impermeable material for creating a long lasting storage package for preserving freshness and aroma of the packaged frozen liquid contents. For example, the receptacle may be comprised of an aluminum substrate or other metal material and typically prepared with a coating approved by the FDA for contact with food, if needed. As another example (e.g., if recyclability is not a critical concern), the receptacle may be comprised of a multi-layer barrier film including, for example, a layer of EVOH plastic. In some embodiments, if the receptacle is fabricated from a metal, the receptacle will preferably be made from a highly thermally conductive material such as aluminum and thereby be supportive of faster heat transfer, especially if a heated dilution liquid is not the primary means for melting the frozen liquid contents. In some embodiments the packaging may include edible packaging materials that may be dissolved and consumed. In some embodiments the receptacle and its closure are comprised of a gas impermeable, recyclable material such that a spent receptacle, including the closure and other packaging features, can be recycled in its entirety In some embodiments, the frozen liquid contents is packaged with headspace, with no headspace or limited headspace. As mentioned above, headspace refers to any excess atmosphere within a sealed receptacle, which, optionally, is located between a top portion of the frozen liquid contents and the lid or closure portion of the receptacle. Furthermore, any headspace in the packaging receptacle may be advantageously filled using a MAP gas, such as argon, carbon dioxide, nitrogen, or another gaseous compound which is known to be less chemically active than air or oxygen. In some embodiments the top or outermost layer or envelope of the frozen liquid contents may be layered with a frozen, deaerated coating of water which may act as a preservative barrier. In some embodiments the frozen liquid contents are vacuum sealed in a flexible receptacle. In some embodiments the frozen liquid contents are packaged in a receptacle in a manner that minimizes the surface area contact of contents with the atmosphere, especially oxygen gas, but also any gas that carries off aroma.

In some embodiments the receptacle is coated on the inside with a material that significantly reduces the force needed to dislodge the frozen liquid contents from the sides or bottom of the receptacle to facilitate movement of the frozen liquid contents out of the way or by the action of a perforating needle and to create unrestricted pathways for melting and/or diluting liquids to pass around the exterior surface of the frozen liquid contents en route to the exit perforation. In some embodiments the bottom of the receptacle incorporates a dome structure (bistable or otherwise) which can be distended downward, away from the bottom of the receptacle during filling and freezing of the liquid contents and subsequently inverted upward to a its second stable position after freezing to hold the frozen liquid contents away from the bottom of the receptacle to facilitate needle penetration and/or flow of diluting liquids around the exterior surface of the frozen liquid contents en route to the exit perforation. In some embodiments the dome is inverted at the factory prior to shipment of the product to consumers. In some embodiments the dome is inverted by the consumer immediately prior to use or by the machine as a part of insertion and needle penetration. In some embodiments the dome is inverted by the machine. These embodiments are merely examples and not cited to limit the functions or features of the receptacle that may facilitate dislodging frozen liquid contents or beverage creation. Moreover, in the example above, the frozen liquid content is displaced upward into a headspace by the perforating needle or dome. However, in other embodiments, the frozen liquid content can be displaced in a different direction (e.g., downward or sideways) into an unfilled region of the receptacle and remain within the scope of the invention. Similarly, the frozen liquid content can be of a shape and size to facilitate fracture by a needle penetrating the bottom or top of the receptacle.

In some embodiments the frozen liquid contents may be packaged and structured in a receptacle of a specific size and shape that allows the receptacles to be accommodated by current machine-based dilution systems or systems on the market that are designed for extracting solutes or brewing coffee for the facilitation of creating a beverage of a desired flavor, potency, volume, temperature and texture.

In some embodiments the packaging of the frozen liquid contents includes additional barriers or secondary packaging that protects the frozen concentrates from melting or exposure to ultraviolet light during distribution. For example, packaging frozen liquid contents in a receptacle that is further packaged within a cardboard box adds a layer of insulation and would thereby slow temperature loss or melting of the frozen liquid contents, e.g., when such temperature loss or melting is undesirable.

In embodiments of the present techniques, the apparatus for creating a food or beverage from frozen liquid contents advantageously includes a receptacle that is filterless, as distinguishable from the filtered receptacles currently available, as exemplified, for example, by U.S. Pat. No. 5,325,765, among other filtered beverage receptacles. A filterless receptacle, and, for example, (1) the (virtually) complete removal of the frozen liquid contents during melting and/or dilution and subsequent delivery and (2) the use of a homogeneous material of construction, renders the receptacle ideally suited for recycling.

In some embodiments the receptacle is configured to be accommodated by a machine-based system and capable of receiving a liquid dispensed therefrom to further facilitate the melting and/or dilution of the frozen liquid contents into a consumable liquid product with a desired set of characteristics.

In some embodiments the receptacle may be large enough that it can contain the melted contents and all of the added dilution liquid from the machine-based system and the finished product can be consumed immediately therefrom. The perforation used to add dilution liquid may be suitable for subsequent use with a straw or other means to allow consumption directly from the receptacle, as opposed to dispensing the diluted and/or melted contents into a secondary container.

In some embodiments the receptacles with frozen liquid contents are provided in a controlled portion arrangement, wherein the controlled portion arrangement can comprise a single-serving sized format, or a batch-serving sized format for producing multiple servings. In some embodiments the machine-based system may accommodate the receptacle, or a plurality thereof, in any method, shape, or form to facilitate the melting and dilution of the frozen liquid contents. In some embodiments a machine-based system may accommodate multiple receptacle types and sizes for a larger array of product possibilities.

In some embodiments the receptacle may be perforated either by the consumer or by the machine-based system. For example, the consumer may remove a patch to expose a perforation built into the receptacle before it is received by the machine-based system. Alternatively, the machine-based system may perforate the sealed receptacle using a variety of methods, including a puncture needle or pressure to rupture the receptacle.

In some embodiments the packaging may become perforable only after exposure to higher temperature or mechanical action. For example, the packaging may be made of a sponge-like material that the frozen liquid contents can permeate when heated. In an alternative example, the frozen liquid content is thawed or liquefied from the action as to allow a machine-driven needle to penetrate the receptacle and content with less force.

As previously stated, the perforation may be a single hole. In some embodiments multiple perforations may be provided in the receptacle at multiple locations. In general, since there is no need for filtration of the melted frozen liquid contents, the perforations described herein are intended for the introduction of a melting/diluting liquid, gas, or steam or to allow the melted frozen liquid contents to exit the receptacle. In some embodiments, the receptacle is perforated and a push-rod or the like is introduced to displace the entire frozen liquid contents out of the receptacle before melting and diluting. In some embodiments the perforations may be staged—one perforation then another or multiple perforations staged at different intervals in the dispensing process. The machine-based system may displace the frozen liquid contents, or the consumer may displace the frozen liquid contents, remove it from its packaging, and load only the frozen liquid contents into the system. In some embodiments the receptacle is perforated by the machine-based system in a location that allows the entire frozen liquid contents to exit the receptacle before or after melting so as not to waste any of the beverage product and to remove any recycling contaminants from the receptacle. In some embodiments, the frozen content is squeezed from the receptacle. In other embodiments, a perforator pushes the frozen content from the receptacle. A blade may be used to remove the lid, or alternatively, pressure may cause the lid to burst and remove from the pod.

For embodiments in which all or a part of the frozen liquid contents is displaced from the receptacle into a separate chamber (i.e., melting vessel), all of the various techniques used to prepare the final food or beverage product relevant to preparation in the receptacle apply equally, and the final product can be dispensed from the vessel. For example, the separate chamber can be heated, be agitated (as described below), and receive dilatation liquid in the same manner as set forth for heating, agitating, and injecting dilution liquid into the receptacle. For the sake of clarity, implementations of the invention are described in terms of performing the product preparation actions on a receptacle containing the contents, but it is within the scope of the invention to conduct these actions on the separate chamber.

The perforation may be made before, after, or during the time when the frozen liquid contents are melted and/or diluted. In some embodiments the frozen liquid contents are melted and exit the receptacle before being diluted by a dispensed diluting agent for an ideal beverage. In some examples of the present techniques the frozen liquid contents may be diluted using a dispensed liquid before the contents are distributed into a subsequent or secondary receptacle. In some embodiments the frozen liquid contents are melted and diluted simultaneously. For example, in some embodiments, a liquid may be introduced into the receptacle containing frozen liquid contents to melt and/or dilute the frozen liquid contents simultaneously or in unison.

Figure 3:
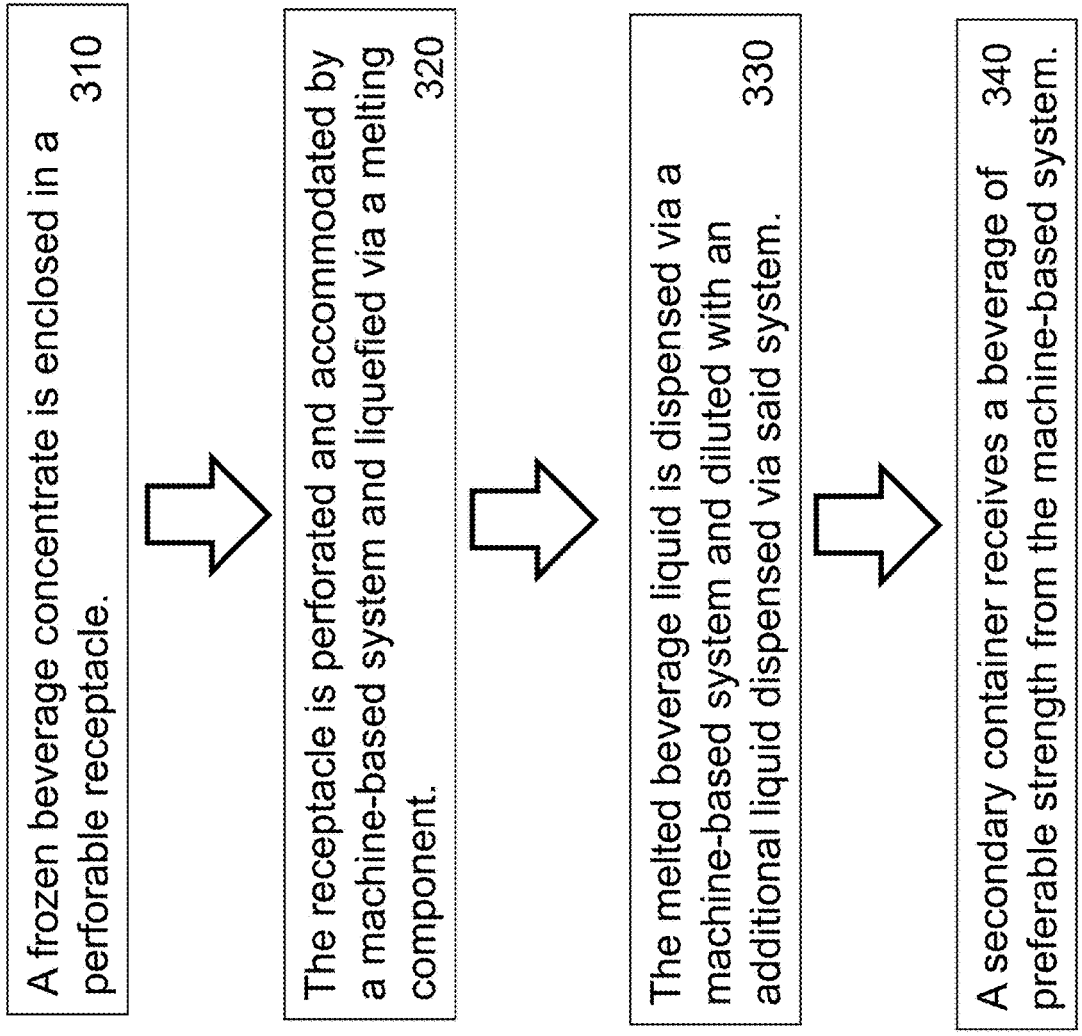
FIG. 3 illustrates a method of melting the frozen liquid contents without the use of a melting/diluting liquid, but rather with some alternative source of heat, according to some embodiments.

Although pushing a pressurized liquid around or through the frozen liquid contents within a receptacle can be effective at expediting melting rates, other methods exist to achieve the same outcome and enhance the speed of this process. FIG. 3 illustrates a method for producing a desired beverage that does not use a pressurized liquid to simultaneously melt and/or dilute the frozen liquid contents. The frozen liquid contents 310 are enclosed in a perforable receptacle. The receptacle 320 is perforated and accommodated by a machine-based system and the frozen liquid contents are liquefied via a melting component such as an external heat source or the like. The process for producing a consumable liquid product from a frozen liquid content of the techniques described herein may be carried out by an initial step of providing the content in a sealed receptacle for storing therein. The receptacle is accommodated by a machine-based system that applies heat to the receptacle via an external heat source for melting the frozen food or beverage into a consumable liquid food or beverage form, wherein the sealed enclosure is perforated for permitting dispensing of the consumable liquid beverage directly from the sealed enclosure.

In some embodiments, the negative energy contained in the frozen liquid content absorbs excess heat from the diluting liquid, gas or steam used to make the consumable food or beverage as a method of facilitating a cold beverage from a dispenser without need for a refrigeration system within the dispenser. In this embodiment involving beverages intended to be served cold, melting and dilution of the frozen liquid contents is carefully managed using a combination of external heat, energy contained within an ambient temperature diluting liquid, and the use of relative motion between the melting/diluting liquid and frozen liquid contents to enhance liquefaction with the goal to minimize the overall temperature of the finished product.

Further referring to FIG. 3, the melted beverage content 330 exiting its receptacle is diluted with an additional liquid dispensed via the machine-based system in a secondary step or in unison with a desired diluting agent. The melted contents may be dispensed undiluted, before, after, or simultaneously with the addition of a distinct liquid for dilution. This may include capturing the melted beverage content in a liquid reservoir that mixes the two liquids before being dispensed together by the machine-based system. When distributed, a secondary receptacle 340 receives the melted contents and diluting agent when appropriate.

In some embodiments, a secondary receptacle used to collect the melted/diluted contents may include any receptacle known to hold liquid food or beverages. This secondary receptacle could be a container, thermos, mug, cup, tumbler, bowl, and/or the like. This secondary receptacle may or may not be included in the secondary packaging. Note: an example of this would be a consumer package with a soup bowl containing instant rice or noodles sold along with a receptacle of frozen liquid broth concentrate that combines to make a bowl of soup after the frozen liquid contents are melted and/or diluted and discharged into the secondary packaging. Alternatively, the secondary receptacle may be separately provided by the consumer.

In some embodiments, the consumer may desire a beverage with no dilution of the frozen liquid contents. e.g., the frozen liquid contents are already at the correct flavor, volume and potency. For example, the frozen liquid contents may already be at a desired TDS level for consumption, e.g., an espresso, or hot fudge sauce and need to only be melted and dispensed at the desired temperature and texture. For example, the machine-based system may melt the frozen liquid contents by putting a thermally conductive receptacle against a coil heater or by irradiating it with infrared light or by impinging a heated gas or steam against the outside of the receptacle and then puncturing the receptacle after the contents reach a desired temperature. Furthermore, the frozen liquid contents may be conveniently dispensed from the machine-based system into a subsequent container. In some examples, the lid is removed prior to or after melting and heating for direct consumption from the receptacle.

FIGS. 4A through 4D illustrate an exemplary machine-based apparatus that can accommodate a variety of different receptacles, according to some embodiments. The system can be, for example, a melting system. The receptacles can include, for example, a variety of different filterless receptacles, of varying sizes and shapes, each holding some amount of frozen liquid contents. The apparatus can be configured to perform melting, diluting, and delivery functions for the purpose of creating a beverage or food product with desired characteristics, as described herein.

Figure 4A:
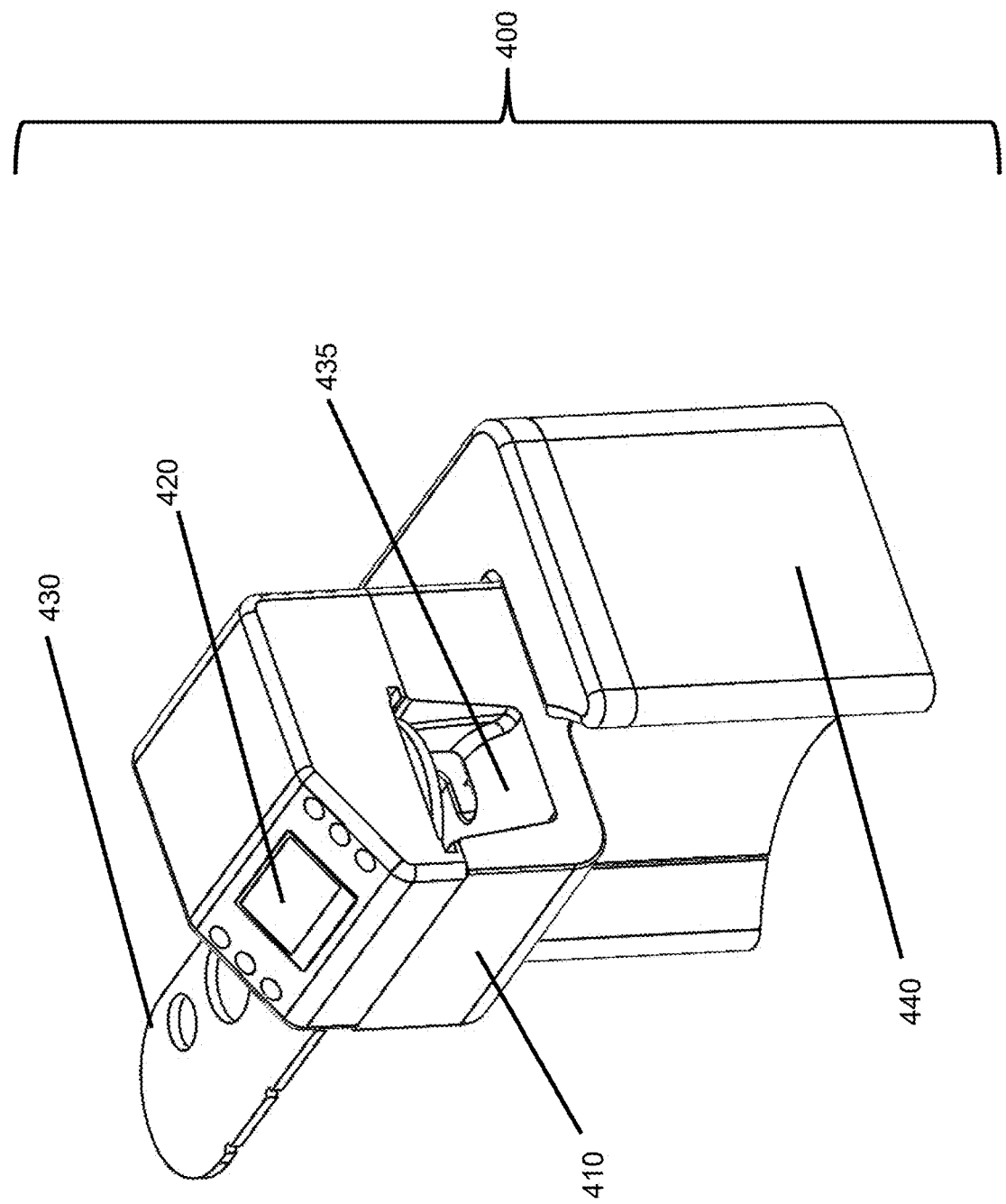
FIGS. 4A-4D illustrate an exemplary machine-based apparatus that can accommodate a variety of receptacles geometries, according to some embodiments.

In FIG. 4A, the system 400 (also called a "dispenser" herein) includes a cassette 430 into which receptacles of different sizes and/or shapes can be loaded. Once loaded with a single receptacle, the cassette 430 can be slid into place, with the receptacle passing through a clearance tunnel 435 until it is centered on the main system body 410. Instructions for use of the melting system 400 can be communicated to a user via a display 420. Solvent (e.g., water) to be used for melting/diluting the frozen liquid contents of the receptacle is stored in the holding tank 440 until needed.

Figure 4B:
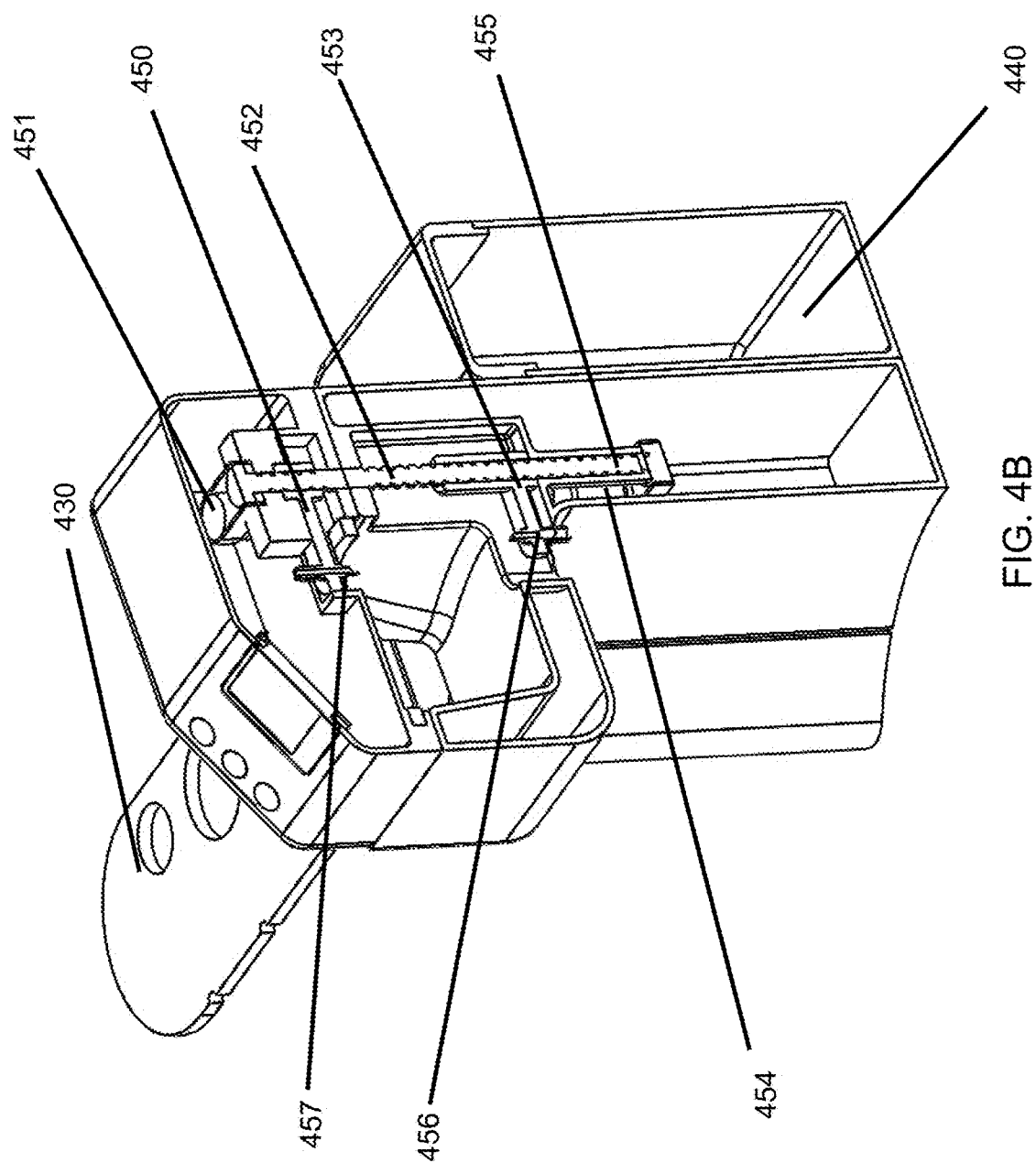
Figure 4C:
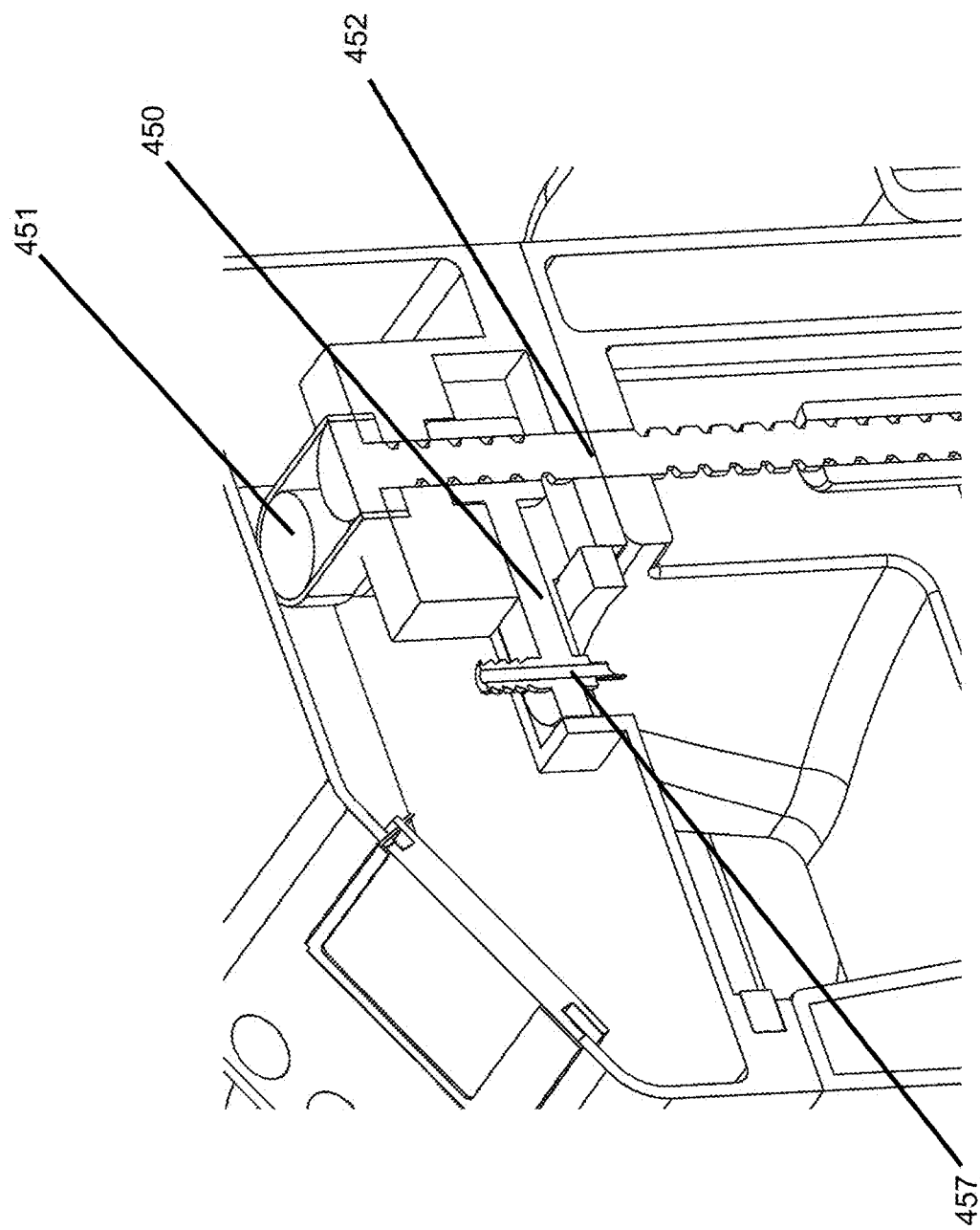

Referring to FIGS. 4B and 4C, once the receptacle is properly placed for interaction with the system, a needle support arm 450 is moved toward the receptacle using any known means, which, by way of example only, could include a motor 451, including electric or gas-driven variations and/or a screw 452, until the needle 457 punctures the closure end of the receptacle. Use of a manual lever to puncture the receptacle is also within the scope of the invention. The shape of the needle may comprise a protruding tip such that it may be inserted into the receptacle to a certain depth and angle to chip, fracture, or dislodge a portion of frozen liquid content to promote flow paths to an exit point. The needle 457 may spin in a screw motion at a certain depth to facilitate penetration of the receptacle and/or frozen liquid content. Alternatively, the needle may retract after puncture to a second depth within the receptacle or from the receptacle completely to ease initial dispensing pressures or provide unobstructed perforation exits. The needle may be heated before or during insertion into the receptacle. A heated probe may be inserted into the receptacle through one of the puncture to accelerate melting of dispensed contents. Depending on the receptacle design and its contents, a second needle support arm 455 can be moved toward the receptacle to penetrate the bottom of the receptacle using a similar motor 454 and drive screw 455. A heater, such as a plate heater or an IR heating source (not shown) may be used to preheat or melt the frozen liquid contents depending on the selected product and process desired. When needed, a melting/diluting liquid stored in a holding tank 440 can be passed through a heat exchanger (not shown), using tubing (not shown), to pass through needle 457 and into the now punctured receptacle. Thereafter the melted liquid can exit from the receptacle through needle 456. In one embodiment, the perforation needle 457 may inject a hot liquid, steam, gas, or any combination thereof directly into the pod as a way to aerate the liquefied product for creating, in a specific example, a froth-like texture for a coffee-based dairy product like cappuccinos and lattes. In one embodiment, a needle injected into the pod may include no exiting structure and be used purely to stabilize a pod.

In further embodiments, the cavity of a dispenser for receiving receptacles of different sizes may alternatively have perforators that can be retractable based on the shape of the receptacle being received. The perforator, which may be a needle, guillotine, blade, crusher or the like, may be retractable utilizing any known mechanical means, e.g., a pivot to rotate the perforator away from the receptacle to avoid piercing the receptacle, a telescoping mechanism to slide the perforator away from obstructing an inserted receptacle, a screw mechanism driven by a stepper motor or the like to raise or lower the perforator as needed, a spring driven device, a flexible tube that is "dispensed" from a roll or coil and retracted back to this location after use, or other alternative. In some embodiments, the perforators may be moved by a motor or solenoid. In some embodiments the perforator may be moved linearly while in other embodiments the perforator may be moved through some more complex path, for example, in a circular path around the periphery of the opening. In some embodiments, this circular path could describe a full circle to fully release a portion of the lid. In other embodiments the circular path could describe less than a full circle to leave a small "hinge" in the lid to retain the lid to the receptacle and keep it from coming loose.

In some embodiments, the fixed or adjustable perforators may be spring loaded as a means to prevent damage to the perforator or the dispenser if the frozen contents blocks the penetration of the needle. The pressure of the spring load may be detected by the dispenser when interrupted by a receptacle or its frozen contents. The spring load and release may also be used to begin a sequence involving the melting and diluting processes, for example, to trigger or terminate a supply of heat, agitation, or a diluting agent. In some embodiments the needles may be attached to flexible tubing to provide for channels that may move and adjust with movement, e.g., to accommodate planned agitation of the receptacle as a means for enhancing the liquefaction of the frozen contents.

In some embodiments, the perforators are constructed of thermal stable polymers. In other embodiments, the perforators are constructed of one or more metals, such as stainless steel or aluminum. In some implementations, regardless of the materials of construction, the perforators resist physical degradation when exposed to temperatures between about −40° F. and about 300° F. In other embodiments, the perforators resist physical degradation when exposed to temperatures between about 0° F. and about 250° F. The characteristics of the various embodiments of the perforators for use on the outlet side of the dispenser and the characteristics of the various embodiments of the perforators for use on the inlet side of the dispenser apply equally to each other.

As illustrated in FIGS. 10A-10E, the dispensing or drain orifice(s) or reliefs of the needle may be located at its point 1001, as in 1000A, or elsewhere and aligned axially as in FIG. 10A or to the sides 1004 as in FIGS. 10C and 10D, but in fluid communication with axial passage(s) 1005, 1006, so the liquid injected into the receptacle can be directed away from the center of the frozen liquid contents, possibly to help move or rotate the frozen liquid contents relative to the side walls of the receptacle. Concerns about needle strength and durability may be addressed with a cruciform 1003 needle structure 1000B as in FIG. 10B. Example 10E might be used to first easily pierce the closed end of the receptacle with the sharp point 1007 and then bear against the frozen liquid contents with the domed end 1008 without penetration, while melted/diluted liquid drains out of the side holes 1009 of the needle, wherein those side holes are positioned adjacent to the inside surface of the closed end of the receptacle. A screw like section of a perforation needle that spins may be used like an Archimedes pump to direct the flow of exiting fluid.

Figure 4D:
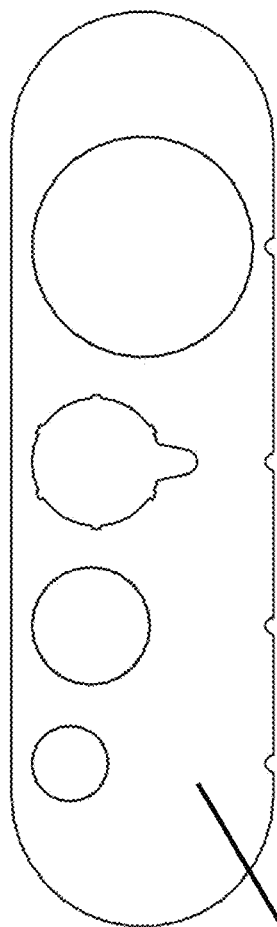

FIG. 4D illustrates one embodiment for a cassette or other device that is capable of holding a variety of receptacle sizes and shapes to allow a wide range of beverages, soups, etc. to be used with a melting apparatus.

Figure 5:
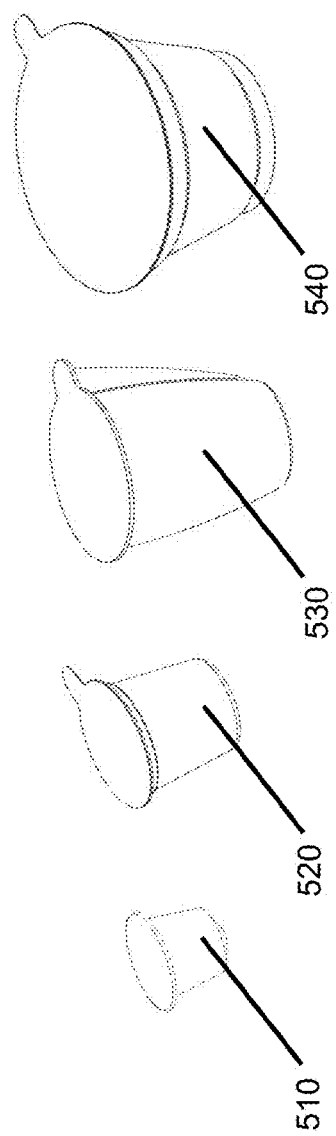
FIG. 5 illustrates a range of exemplary packaging options and receptacle shapes that could be accommodated by a machine-based apparatus, according to some embodiments.

FIG. 5 illustrates a range of receptacle sizes and shapes that could be accommodated by the cassette of the machine (e.g., cassette 430 of FIG. 4A). With different cassettes, each interchangeable with the original, but with differing hole sizes and shapes, an unlimited number of different receptacles can be accommodated by the brewer. It will be recognized by one skilled in the art that the process of filling, melting and diluting a frozen liquid content may be, in some embodiments, generally unaffected by the size or shape of the receptacle.

The melting system may use any source of heat, motion, or a combination thereof to expedite the liquefaction of the frozen liquid contents. Therefore, the melting system may include various sources of heat and/or motion. Electromagnetic radiation (e.g., radio frequency energy, microwave energy, etc.), a heated coil, hot air, a thermo-electric plate, a heated liquid bath, steam, a chemical reaction and the like are all examples of possible sources of heat that may expedite the rate of melting. In addition, motion may be introduced using a centrifuge. The motion may be one or more of rotational, rocking, whirling, rotary or linear reciprocation, including agitation both back and forth and/or up and down (e.g., shaking), or a vibration platform or the like as a means of expediting the melting rate. In another embodiment, the perforations and pressures caused by an injected liquid may spin and move the frozen liquid content inside of the receptacle to create a desirable environment for liquefaction. One skilled in the art, however, will recognize that various other physical action principles and mechanisms therefore can be used to expedite liquefaction. As described herein, manual or automatic (electronic) machine-based methods can be used to expedite the melting and an increase in temperature of the frozen liquid contents using various forms of motion, electric frequency/electromagnetic energy, and/or heat. In such examples, the perforation needles may be given a range of motion so that they may implement or complement a range of motion. For example, in a centrifuge system the needles may spin with the receptacle.

The system 400 includes internal electronic components, memory, and the appropriate controllers, along with programming instructions to automatically create the desired food and/or beverage. The system 400 can be given instructions by a user via a display or other known methods, e.g., wireless instructions from a handheld device.

The finished food or beverage serving can be made from the frozen liquid content of the receptacle at the temperature desired by the consumer, and via a method that is appropriate for direct consumption by the consumer. In one embodiment, the frozen liquid content is melted and diluted with a cool, or ambient temperature liquid, such that the frozen liquid content is melted and minimally heated for a beverage that is normally consumed cold, like a juice, iced coffee, soda, etc.

In a specific example, represented in FIG. 11, a receptacle with tapered sides 520 is punctured on the top and bottom of the receptacle, and an ambient-temperature liquid is injected via a top-puncturing needle 1000D. As the liquid is injected into the receptacle, the machine-based apparatus spins, torques, and cooperates with the receptacle in such a manner that the liquid 1101 in the receptacle flows away from the exit perforation(s) of the receptacle, formed by the bottom-puncturing needle 1000B. Thus, the diluting liquid may interact with the frozen liquid content 190 for a longer duration of time within the receptacle and provide more thermal exchange between the frozen content and diluting liquid. The exit of the liquid may be controlled effectively by the flow of the water in, which will push water out when the pod nears or hits capacity or by decreasing or stopping the agitating motions. Optionally, the bottom-puncturing needle 1000B dislodges the frozen liquid content from the bottom of the receptacle.

In some implementations of the embodiment shown in FIG. 11, the dispensing system includes a motor or other known mechanism to spin the receptacle 520 around an axis of rotation. In cooperation with the radius and geometry of the receptacle, the spinning motion imparted to the liquid by the rotation around the axis overcomes the normal pull of gravity on the liquid, thereby displacing the liquid along the sides of the receptacle and away from the bottom of the receptacle 1101. The puncture formed by needle 1000B is positioned to be in the empty space created when the liquid is displaced.

In some embodiments, the inertia of the spinning liquid holds the liquid against the sidewall of the receptacle until the addition of new liquid into the receptacle forces out a desired product or rotation speed is decreased. In other words, the motion imparted to the receptacle and/or the frozen liquid contents increases the flow path the liquid takes from the liquid inlet (via top-puncturing needle 1000D) to the liquid outlet (via bottom-puncturing needle 1000B). Without imparted motion, the injected liquid would tend to take a direct path from inject to outlet; with imparted motion, the injected liquid travels along the outer walls of the receptacle to the outlet. In such embodiments, the flow rate of liquid entering the receptacle, in part, controls the amount of time the melted frozen content is in the receptacle. This residence time influences the temperature exchange between the frozen content and diluting liquid, and ultimately the temperature of the exiting liquid product. In some embodiments, the flow rate and pressure of the diluting liquid supplied into the receptacle influence the amount of liquid pushed through the exit perforation(s) by overcoming the displacing force imparted by the rotational motion applied to the receptacle for a clean, uniform flow out of the receptacle. In some embodiments, the motor, or other mechanism to drive the spinning of the receptacle is positioned such that it is not an obstacle for supplied or exiting liquid. For example, a belt or gear system, or the like, is used to drive the receptacle around the axis without the need to position the motor or other mechanism above or below the receptacle.

Other examples of agitation/imparted motion are described herein and are within the scope of the invention. These other types of agitation also increase the residence time of liquid in the receptacle and likewise increase the flow path of liquid through the receptacle from the liquid inlet to the liquid/product outlet. Advantageously, the liquid injected into the receptacle continues to flow within the receptacle during agitation, and does so for a longer time relative to a lack of agitation. This increases the heat transfer between the injected liquid and frozen contents.

In embodiments in which the frozen liquid content is displaced away from the bottom of the receptacle, the displacement may be accomplished by domed needle 1000E. In some implementations, the displacement by the domed needle is coupled with inversion of a dome (bistable or otherwise) mentioned above. In such case, the dome takes a new stable position curved inward toward the interior of the receptacle and holds the frozen contents away from the bottom of the receptacle. This can occur even if the domed needle 1000E does not remain in contact with the receptacle. In some embodiments, the domed needle 1000E pushes against the receptacle bottom and creates a small displacement through bending or plastic deformation of the receptacle material. In some embodiments, a delayed action takes place to perforate the bottom of the receptacle with the needle. This may occur simply by applying enough force to the needle that the domed end ruptures the closed end.

In some embodiments, a secondary piercing head 1007, as shown in FIG. 10E, emerges out of the domed needle 1000E. This piercing head easily creates an initial puncture which is more easily expanded by the domed surface 1008 of the needle, allowing the needle to move further into the receptacle and enlarge the space around the periphery of the frozen liquid contents. In some embodiments, the emergence of the piercing head 1007 of the needle is driven by a pneumatic cylinder. In some embodiments this movement forms a slight tear in the closed end of the receptacle such that the domed end 1008 can expand the breach and easily pass through. Meanwhile, the piercing head 1007 can immediately retreat back into the needle body.

In some embodiments a component of the machine-based system used for dilution may include a liquid reserve, or a plurality thereof. In some embodiments the machine-based system may connect to a piping system that distributes a diluting agent from a larger liquid reserve or from an appropriate plumbing system, e.g., a filtered water system tied into a building's water supply. The diluting liquid may be water, however, any liquid, including carbonated liquids, dairy liquids, or combinations thereof, including any nutritive or non-nutritive liquids suitable for human consumption, may be used to dilute the frozen liquid contents to a desired composition. In some embodiments, the liquid for dilution may be carbonated to create soft drinks and the machine-based system may include a carbonating component. In some embodiments, a diluting liquid may be increased to a certain temperature or pressurized so as to melt the frozen liquid contents with room temperature or chilled fluids to make chilled or iced beverages. In some examples, the apparatus includes a refrigerated chamber for storing receptacles that may automatically load receptacles to a location to be created into a beverage without a human interacting with the receptacle. The previous example may be combined with a user interface (i.e., human machine interface) on the machine to load a desired receptacle in a vending style application.

In some embodiments for creating desired products that require dilution, a diluting agent is heated and/or allowed to flow to create a consumable liquid product of a desired flavor, potency, volume, temperature, and texture in a just-in-time manner from the frozen liquid contents. In some embodiments the diluting component may also act as the melting component. In some embodiments a diluting agent is heated and/or allowed to flow such that it complements an arbitrary melting component (e.g., an electric heater) to create a consumable liquid product with desired characteristics in a timely manner.

In some embodiments, water is heated to steam inside the dispenser and used as a means to externally heat the receptacle or the exit path for the melted/diluted fluid. In some embodiments, this external heat may be used at different levels (quantities) or locations based on different possible objectives. For example, these objectives could include, but are not limited to: (a) melting just the outer layer of the frozen liquid contents to allow it to be more easily displaced away from the closed end of the receptacle; (b) partially melting the bulk of the frozen liquid contents as a supplement to lower temperature water used for melting/dilution especially for juices and other beverages where a lower temperature final product is desired; (c) fully melting the frozen liquid contents as means for dispensing an undiluted melted liquid from the receptacle; (d) secondarily warming the melted/diluted beverage once it leaves the receptacle as it flows through the exit channel to a drinking cup or mug or other container to heat the final beverage to a more desirable temperature; (e) heating one of the needles used to perforate the receptacle to facilitate some level of easy penetration into the frozen liquid contents. In some embodiments, steam used for these purposes may be replaced by hot air or some other heated gas produced either inside the dispenser body or externally using electricity or some combustible fuel such as natural gas. The use of steam or a hot gas may provide a greater level of control in the heating/melting of the frozen liquid contents which may be especially important when cold beverages or food products are desired as the final consumable. This process also assumes a means for carefully metering/controlling the amount of steam or hot gas added to the total energy balance.

In some embodiments, a receptacle loaded into a dispenser is heated before puncturing the receptacle bottom. This allows the frozen liquid content to remain in contact with the bottom and sidewalls of the receptacle in order to increase the transfer of heat into the frozen liquid content. In such an implementation, the bottom of the receptacle is punctured after a selected time has passed, or after the receptacle has reached a selected temperature. The additional delay in perforating the closed end/bottom of the receptacle is intended to allow some amount of melting/diluting fluid to enter the receptacle and fully surround the frozen contents, filling any air gap between the sidewall and the displaced frozen content before an exit perforation is created. Doing so enables a continuation of the efficient transfer of heat from the receiver into the liquid and the frozen content without the insulating effects of an air gap.

Figure 13A:
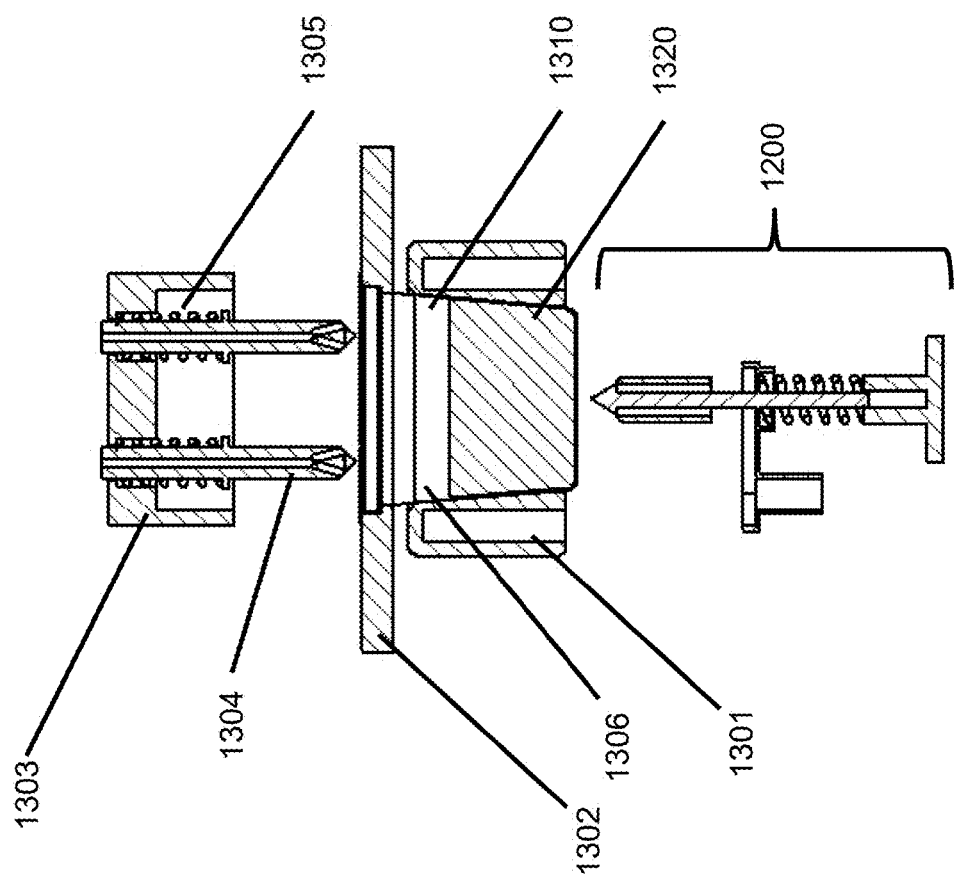

In one embodiment, as shown in FIG. 13A, a filterless receptacle 1310 with frozen liquid content 1320 and a headspace 1306 is placed into a supporting tray 1302 and a heatable receiver 1301 of a dispenser designed to receive the receptacle so that the sidewalls of the receptacle 1310 are in close contact with the walls of the receiver 1301 and the flange of the receptacle is supported by tray 1302. When the dispenser's cover 1303 is closed by the user, the dispenser will capture and seat that receptacle in the close-fitting tray 1302 and receiver 1301. The receiver is heatable using any of the techniques disclosed herein, and the close contact between the receiver walls and the receptacle sidewalls enable the dispenser to efficiently heat the receptacle's contents.

Figure 13B:
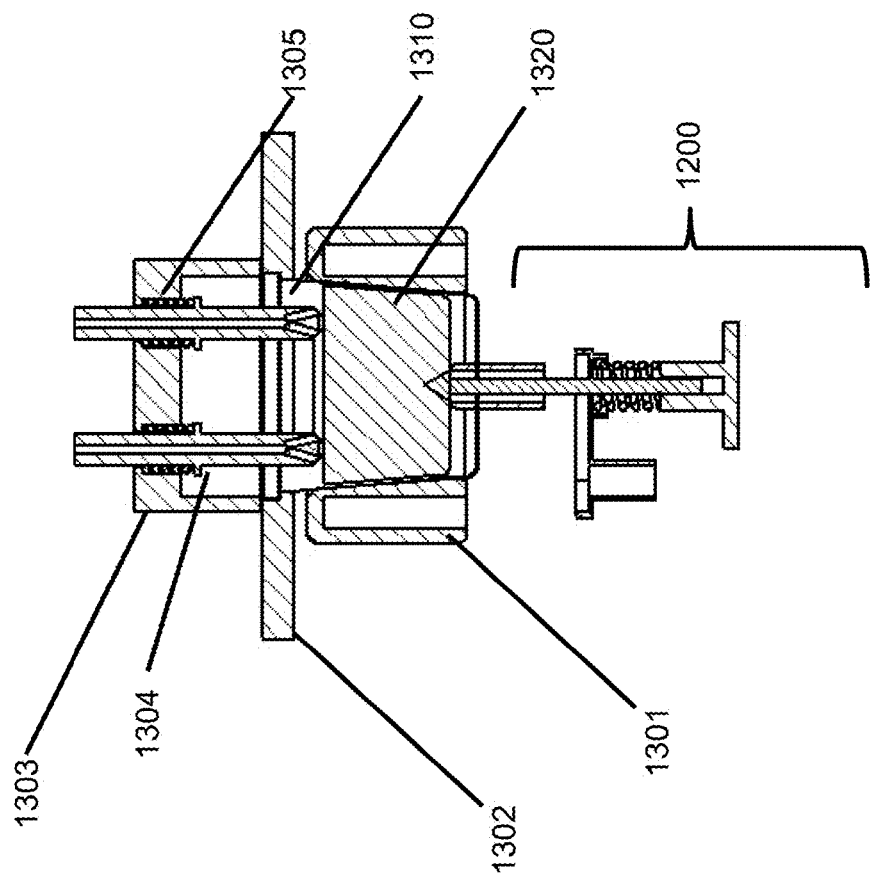

Referring to FIG. 13B, during closing of the receiver cover 1303, one or more spring-loaded supply needles 1304 penetrate the top lid of the receptacle, and one or more discharge needles 1200 penetrate the receptacle's bottom. The actuation of the needles can be powered by the manual force of the user closing the dispenser's receiver, or, alternatively, one or both of these actions can be done by a controlled actuator. As illustrated in FIG. 13B, these needles may also be made compliant with the help of a spring mechanism that limits the force applied by the needles in attempting to penetrate the frozen contents 1320.

Figure 12B:
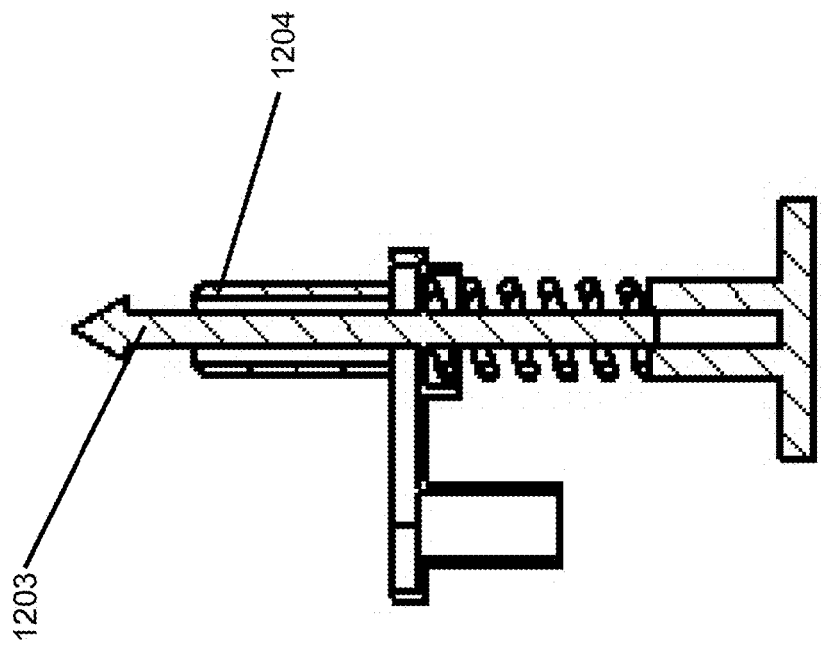
FIGS. 12A and 12B illustrate a spring-loaded needle, according to some embodiments.
Figure 12A:
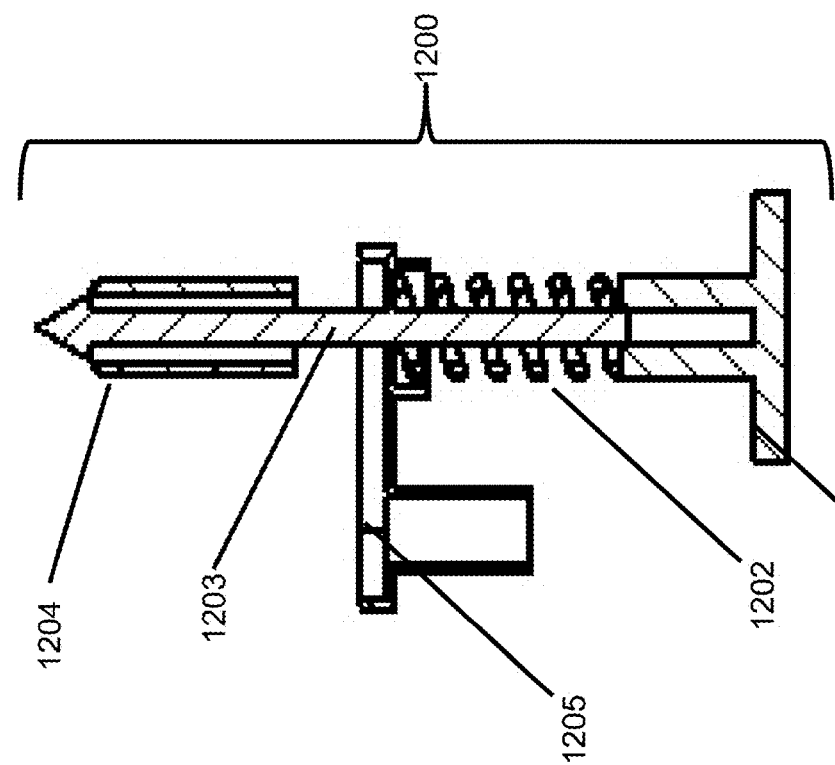

Referring to FIG. 10E, in some embodiments, a blunt tip 1008 on the discharge needle 1000E displaces the receptacle's frozen liquid content away from the receptacle's closed bottom and into the tapered headspace, where it is supported by that same blunt-tipped discharge needle. In one implementation, this blunt discharge needle utilizes a T-shaped passageway 1009 with openings in the sidewall of the needle located closer to the receptacle bottom to allow dual discharge flow without interference from the supported frozen liquid content, thereby emptying/venting the receptacle. In a different embodiment, the exit needle is part of an assembly as shown in FIGS. 12A and 12B. The needle assembly is anchored by a part of the dispenser frame 1201 and comprises a penetrator 1203, a compression spring 1202, a dome-shaped needle housing 1204, and a fluid collecting tray 1205. When the needle assembly 1200 first penetrates the closed end of the receptacle, the penetrator 1203 bears against needle housing 1204 and seals it to prevent fluid exiting the receptacle. Subsequently, penetrator 1203 is forced upward by spring 1202, opening a channel on the inside of needle housing 1204, allowing fluid to exit the receptacle and be collected by tray 1205, and thereafter dispensed into the user's cup.

Meanwhile, sharp tip(s) of the spring-loaded supply needle(s) 1304 penetrate the receptacle's lid and come to rest against the recently displaced frozen content 1320, where they may be stopped from further penetration due to the interference between the needle tips and the top surface of the frozen liquid content. The dispenser's heatable receiver 1301 controllably warms and thaws the receptacle's frozen liquid content thereby softening the recently repositioned frozen liquid content within the receptacle, readying the frozen liquid content for additional thawing and/or dilution. In some embodiments, a measured portion of liquid is injected into the receptacle simultaneously with needle insertion to help transfer heat from the receiver through the gap created when the frozen contents was displaced away from the receptacle bottom (and, potentially, the sidewalls) to accelerate the melting process.

In some embodiments, the injection of liquid into the receptacle is delayed until the supply needle(s) move further into the frozen liquid content of the receptacle under the influence of the spring pressure behind them as the frozen liquid content is softened due to the heating. This action further thaws and/or dilutes the frozen liquid content. In some implementations, the contents controllably flow out the twin T-shaped passageway 1009 of the blunt discharge needle 1000E at this point. In other implementations, the discharge needle is closed along its flow path as shown in FIG. 12A, thereby preventing contents discharge until the supply needle(s) reach a selected deployment depth as shown in FIG. 13C. Likewise, the injection of liquid is delayed to prevent receptacle rupture and/or overflow.

Figure 13D:
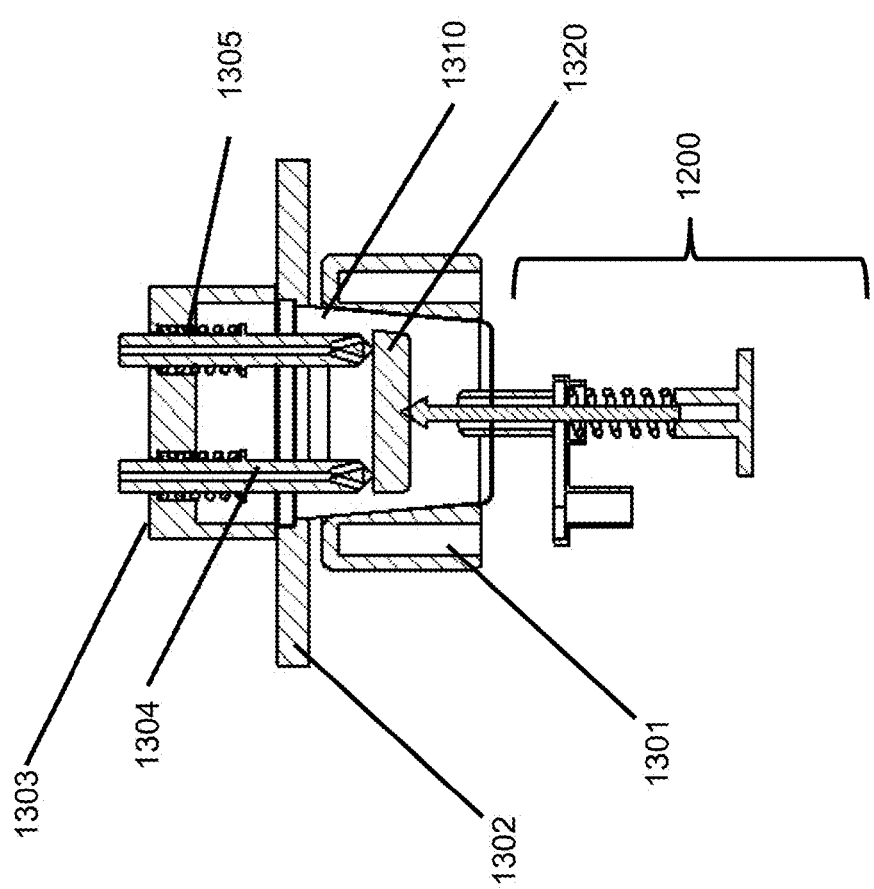

As the dispenser continues to thaw and dilute the frozen liquid content, the supply needle(s) extend fully by spring action to their fully deployed length as shown in FIG. 13D, which stops short of contacting the bottom of the receptacle. The supply needles may supply fluid within a range of temperatures and volumes as required by the food or beverage in the receptacle. In some embodiments, as shown in FIGS. 10C and 10D, these needles 1000C, 1000D have one or two internal passageways that are "L" shaped with an exit orifice that may direct the incoming fluid somewhat tangentially to the sidewall of the receptacle. This geometry is intended to controllably agitate the receptacle's frozen liquid content to provide better mixing, a cleaner spent cup, and to speed thawing through such mechanical agitation. This agitation inside the fixed receptacle can be rotational in any direction, or tumbling in an ever changing turbulent action, as designed by the needles' outlets and the flow control valves of the dispenser. Moreover, in some embodiments, the liquid is supplied to the supply needles in an alternating fashion so as to introduce a back and forth motion, a rotational motion, or other turbulent action. Such a liquid supply can be accomplished by the use of a multi-way valve controlled by the dispenser system. Further embodiments include a supply needle with a cruciform cross-sectional shape (e.g., as described elsewhere herein) that engages the top of the frozen liquid contents. The supply needle is motorized and directly agitates the frozen liquid contents inside the receptacle.

Optionally, a locking mechanism keeps the springs compressed until a certain criteria is met, e.g., a quantity of heat has been applied to the receptacle in order to sufficiently soften and liquefy the frozen content such that the needles will penetrate the content. In a further implementation, heat, in the form of gas, liquid, or steam is supplied through the supply needle(s) upon initial deployment. The supply of gas, liquid, or steam is continued until the needle(s) are fully extended or until other criteria are met.

In some embodiments the variables of the melting component, or plurality thereof, and dilution components, or plurality thereof, are programmable and adjustable to create a wider range of characteristics for creating beverages and liquid food products. For example, decreasing the temperature of a pressurized liquid used for dilution will decrease the temperature of a consumable liquid product created by the machine-based system and apparatus.

In one specific example embodiment, presented for illustrative purposes only, a frozen 1 oz. coffee extract with a TDS of 12, may be packaged in a receptacle and accommodated by a machine-based system that expedites the melting of the frozen liquid contents by delivering heated water to the receptacle to melt and dilute the contents thereof with 7 ounces of 200 degree water to create a single-serving of 8 ounces of a hot coffee beverage with a TDS of 1.5 at a desired temperature. In some embodiments, other measurement techniques can be used in place of TDS, such as BRIX. Alternatively, with adjustable dilution settings, the frozen coffee extract may be melted and diluted with only 1 ounce of water to create a 2 ounce espresso style beverage of a desired temperature with a TDS of approximately 6. Furthermore, the receptacle may only be heated such that the frozen extract barely melts, such that it may be added to a consumer provided liquid, like milk for a chilled or iced latte or another iced beverage like a juice, iced coffee or tea.

In some embodiments, the variables defining the frozen liquid contents, like temperature, volume, shape, size, portionality, etc. can also be adjusted during manufacturing of the liquids used to freeze the frozen liquid contents to better facilitate making a desired food or beverage from a machine-based system with limited machine settings/controls. For example, freezing a larger volume of a less potent fluid as the basis for the frozen liquid contents in a given receptacle may be used to create a beverage of a lower temperature, ceteris paribus.

It is also contemplated as part of the techniques described herein that the machine-based system includes sensor technology that can automatically adjust the settings of the melting and/or dilution component to produce a desired beverage or liquid food outcome. The perforation properties may also be programmable or automatically established using sensor technology that assists in recognizing the receptacle type, size, contents, bottom location and other properties. This sensor technology may also be used to inhibit certain settings from being applied. For example, a frozen broth concentrate receptacle may inhibit a consumer from implementing settings that would over-dilute and waste the product. As another example, a frozen broth concentrate receptacle may inhibit a consumer from implementing settings that would overheat, for example, an orange juice concentrate. In some embodiments, this sensor technology assists in creating a desirable product and eliminating human error. In some embodiments this sensor method is enabled using specific geometry formed into the receptacle. For example, as shown in FIGS. 8 and 9, an indentation of a specific length could be physically or optically sensed by the dispensing machine and this measurement used to convey information about the contents of the receptacle and thereby allow the dispensing machine to automatically choose the right melting/dilution process. Physical modifications to the shape of the receptacle as exemplified in FIGS. 8 and 9 may also assist in the mixing of the dilution liquid injected into the receptacle and thereby help to speed the liquefaction of the frozen liquid contents.

In some embodiments, the melting and/or diluting controls may be programmable or established using bar coded instructions or other visual data system on the receptacle to achieve a product satisfying a consumer's individual preference. The machine-based system may detect and read bar codes, data glyphs, QR Codes, patterns, external markings, RFID tags, magnetic strips, or other machine-readable labels using the appropriate sensors. In some embodiments at least one criterion of the receptacle or frozen liquid contents establishes or inhibits the settings of the accommodating machine-based system for creating a desired product. These criteria might include, but are not limited to, weight, color, shape, structure, and temperature. In some embodiments the machine-based system may include a thermocouple to detect the temperature of the frozen liquid contents and/or its receptacle and automatically adjust its settings to create a beverage of a desired flavor, strength, volume, temperature, and texture. This may include disabling the dilution function and engaging a melting component that does not dispense a liquid. Furthermore, the consumer may enter an exact desirable characteristic, like temperature or potency, and the machine-based system may use this in combination with available sensor technology to achieve desired parameters.

In addition, the machine-based system may be designed to create desirable beverage and liquid food products from a variety of receptacle styles, receptacle sizes and frozen liquid contents. In some embodiments, the machine-based system may include a mechanical function to distinguish and limit controls and settings for beverage creation.

Furthermore, the machine based system may include a mechanical function that is necessary for product creation for different receptacle and frozen liquid content types. In some embodiments the frozen liquid contents may be crushed or macerated by the machine-based system to increase the surface area of the frozen liquid contents to increase melting rates. This mechanical function may be initiated manually by the consumer or automatically implemented by a sensor trigger. For example, it has been contemplated herein that dislodging frozen liquid contents from receptacle walls may create issues and make it difficult to pierce the receptacle where it is in contact with the frozen liquid contents. In some embodiments the machine may recognize the specific frozen receptacle type, discriminating it from other frozen receptacles, using sensed criteria, like weight or temperature, and mechanically adjust the receptacle so it can be perforated in a specific location where no frozen liquid content is in contact with the receptacle. This may include flipping the receptacle upside down.

In some embodiments the machine-based system melts and dilutes the frozen liquid contents by flowing or pushing a specific amount of liquid, which may be heated and pressurized, through the receptacle to completely melt and dilute the frozen liquid contents to a desired flavor, strength, volume, temperature, and texture. In combination with this embodiment, the machine-based system may include an additional melting component, such as a receptacle heater, or heated puncture needles or the like, to facilitate the creation of a desired consumable liquid that the consumer does not desire to dilute. In some embodiments the flowing liquid melts the entire frozen liquid contents to eliminate waste and rinses the receptacle of any residue or contaminants as part of the melting or dilution process so that a receptacle of a homogeneous material is rendered free of grinds, residues, or filters, and is thus converted into an easily recyclable form. In some embodiments, focused specifically on recycling, the manufacturer would introduce a deposit requirement for each receptacle to encourage its return to the point of sale for a deposit refund.

In some embodiments the frozen food or beverage liquid is packaged to handle a flowing diluting liquid without an overflow. Again, this specific apparatus may involve freezing the food or beverage liquid into specific geometric shapes, structures, and proportionality to provide necessary flow paths through the receptacle to its exit.

For clarity, illustrative embodiments for different aspects of the system have been described with respect to the type and design of the receptacle, the nature of the frozen liquid content, the means for melting and/or diluting the frozen liquid content, and the delivery mechanism applied to the resulting liquid to create a consumable food or beverage on a just-in-time, consistent basis at the desired flavor, potency, volume, temperature, and texture. It will be apparent to one skilled in the art that these various options for receptacle type, form and characteristics of the frozen liquid content, mechanisms for melting and/or diluting the frozen liquid contents, and means for delivery of the liquefied contents can be combined in many different ways to create a pleasing final product with specific characteristics which can be conveniently enjoyed by the consumer.

It is clear from the above description that embodiments of the invention provide a filterless single chamber mixing vessel containing a frozen liquid contents that enables the creation of a diverse variety of food and beverage products. The receptacles are maintained as a sealed environment, optionally including an oxygen barrier, that preserves the final product, or a concentrated version thereof, in a frozen state until a user decides to create the product. Moreover, even after perforation by one or more inlets or outlets, the receptacle remains essentially a sealed mixing chamber in which a product is created by mixing a fluid or fluids with the frozen liquid contents while also providing for a controlled fluid outlet. Upon insertion into any of the dispenser embodiments described herein or other known single serving beverage makers/brewing systems, the receptacle functions as a filterless single chamber mixing vessel by accepting a melting and/or diluting liquid (e.g., water) that melts and combines with the frozen liquid contents to produce the desired product. Such use of embodiments of the receptacles described herein enables existing beverage makers/brewing systems to function as a dispenser without requiring a modification to the system, thereby allowing a user flexibility to use his or her existing system as a dispenser or brewer.

In some embodiments, the dispenser manipulates the timing, sequence, amount, and manner of the heating of, the agitation of, and/or the addition of dilution liquid to the receptacle and/or frozen liquid contents to control the melting and/or thawing of the frozen liquid contents. Optionally, the dispenser manipulates the temperature of the dilution liquid added to the receptacle and/or final product. In some implementations, the dispenser causes at least portions of the frozen liquid contents to transition from a frozen phase to a liquid phase while reducing or preventing the transition of the liquid and/or solid phases to a gaseous phase. For example, the dispenser can expose the receptacle and/or the frozen liquid contents to a non-diluting source of heat (i.e., a source of heat other than injecting a liquid into the interior of the receptacle that dilutes any melted frozen liquid contents) at a rate or a flux that causes the frozen liquid contents to melt but does not cause the resulting liquid to boil. Similarly, the dispenser can control the total amount of non-diluting heat supplied to the receptacle and/or frozen liquid contents during a multi-step food or beverage creation process so as to achieve an intermediate average temperature of the contents. When the dispenser then supplies a predetermined amount of diluting liquid at a known temperature to the interior of the receptacle, the diluting liquid and contents combine to form the product of the desired temperature and volume.

As described herein, embodiments of the dispenser can determine certain characteristics of the receptacle, frozen liquid contents, and/or final intended food or beverage product based on machine-readable labels. Likewise as described herein, implementations of the dispenser include sensors to gather data about the present state of the receptacles and/or contents therein. Further still, the dispenser can contain sensors to determine the temperature of a heated and/or ambient dilution liquid. Based on the available sensor information and characteristics gathered from the machine-readable labels, the dispenser modulates the heat, agitation, and dilution actions described herein to achieve the desired heating profile as well as a final product having the desired characteristics. For example, while supplying heat and agitation to a receptacle, the dispenser can monitor the temperature of the receptacle and modulate the heat supplied to ensure that its temperature remains below a predetermined value (e.g., below boiling or below a temperature at which the content's quality would be degraded). In a further example, the dispenser can supply heat in an intermittent fashion, either with or without agitation, with pauses in heating to allow the entire contents of the receptacle to equilibrate, again either with or without agitation during the pauses. Doing so is expected to increase the accuracy of the temperature reading with respect to the entire receptacle contents and increase the likelihood of generating "hot spots" in the receptacle. Likewise, the dispenser can control the frequency of the agitation (e.g., the speed at which vibration, reciprocation, etc. is modulated) depending on the characteristics of the receptacle, frozen liquid contents, and/or final intended food or beverage product.

In addition to monitoring the temperature of the receptacle and/or the entire contents of the receptacle, the dispenser can monitor the pressure inside of the receptacle. For example, before applying heat to the receptacle, the dispenser can perforate the receptacle with a needle having a lumen in fluid communication with a pressure sensor. Then, during a heating step, the dispenser can modulate the rate at which heat is applied to the receptacle based on detecting pressure increases inside the receptacle. In an alternative example, the dispenser can dispose a transducer (e.g., a stress gauge or a displacement gauge) in contact with a portion of the exterior of the receptacle. The transducer, such as a capacitive displacement sensor, can detect pressure increases inside the receptacle based on portions of the receptacle bulging during heating.

For example, the dispenser could heat the entire contents of a receptacle to an average temperature that remains relatively cold, potentially forming a partially melted "slush", based on detecting information that identifies the receptacle as containing a high TDS orange juice frozen liquid contents. The dispenser can then add the appropriate amount of an ambient temperature dilution liquid to create a chilled orange juice of the correct concentration. In this example, the dispenser softens the frozen liquid contents to enable easy mixing of the contents and dilution liquid, but the dispenser does not overheat the contents. This approach takes advantage of the relatively lower freezing point of the high TDS content to provide a chilling effect on the incoming ambient dilution liquid. Any or all of the steps of the process can include agitation.

In certain embodiments, sufficient open space remains within the mixing chamber of the receptacle to allow the frozen liquid contents to be displaced into the open space of the chamber so as to not interfere with liquid inlets and outlets (e.g., needles) and/or incoming and outgoing liquid. In some embodiments, the frozen liquid contents in the receptacle occupy less than half of the total volume of the mixing chamber of the receptacle. In other embodiments, the frozen liquid contents occupy more than half of the total volume of the mixing chamber.

As described above, in certain embodiments, the frozen liquid contents are dislodged from the bottom of the receptacle by the action of a needle. Tapered sidewalls of the receptacle help the frozen liquid contents release from the bottom portion of the receptacle. The tapered sidewalls also provide for a flow path around the frozen liquid contents after the contents have been displaced into what was formerly the empty space of the receptacle. Another factor impacting the amount of force required to dislodge the frozen liquid contents is the size of the frozen liquid content itself. Relatively smaller frozen liquid contents will be in contact with relatively less interior surface area of the chamber, thereby reducing the amount of force required to dislodge the contents relative to larger frozen liquid contents.

Controlling the size of the frozen liquid contents imparts additional benefits. For example, by maintaining the frozen liquid contents size within a selected range or below a particular threshold, embodiments of the invention ensure that the frozen liquid contents are completely melted before the full volume of dilution liquid has passed through the receptacle. In such embodiments, the fluid passing through the receptacle after the frozen liquid contents have melted washes the interior of the receptacle and product outlet flow path clean of residue. Doing so both increases the recyclability of the receptacle and reduces contamination of the product outlet flow path. In addition, by keeping the size of the frozen liquid contents within a range or below a certain threshold, one can ensure that the final product achieves the proper temperature range for the particular product.

Meanwhile, controlling the degree of concentration of the frozen liquid contents (e.g., as measured by TDS and/or Brix) enables one to ensure proper final product strength in view of the size of the frozen liquid content and the amount of dilution liquid used. Relatively larger frozen liquid contents require a lower degree of concentration than relatively smaller frozen liquid contents for the same final product using the same dilution and melting liquid. The desired final product concentration also determines the degree of concentration of the frozen liquid contents, e.g., a 2 oz. espresso with a final TDS of 6 will require a relatively more concentrated frozen liquid contents than would an 8 oz. cup of coffee with a final TDS of 1.25. Further still, in some embodiments, the degree of concentration of the frozen liquid contents is high enough to enable the size of the frozen liquid contents to be small enough to permit an outlet needle from a dispenser or known brewer to pass through the frozen liquid contents, thereby enabling the needle to access the open space above the frozen liquid contents without interference from the contents. Thus, certain embodiments of the receptacles disclosed herein have a size and shape to fit in known single serving brewing systems that have known outlet needle penetration depths. Because these dimensions are known, these embodiments have frozen liquid contents that have a degree of concentration that enables the contents to be in contact with substantially the entire end layer of the receptacle while having a contents height that is less than the penetration depth of the needle. In this way, embodiments of the invention are customized for known single serving brewing systems based on the known dimensions and characteristics of those systems.

As mentioned above, certain embodiments described herein include a receptacle with a frozen liquid content disposed inside the receptacle cavity that is in contact with the bottom of the receptacle (the end layer). In these embodiments, a needle from a dispenser or brewing machine perforates the bottom of the receptacle and lifts frozen liquid content into the otherwise unoccupied space inside the receptacle. In order for the frozen liquid contents to be displaced by the needle, the frozen liquid contents must be of sufficient hardness (at its temperature when placed into the dispenser/brewer) to prevent the needle from embedding in the frozen liquid contents. If the needle embeds into the frozen liquid contents, the contents are not displaced from the bottom layer of the receptacle, and the exit flow path for the final product formed by the mixing of the frozen liquid contents and incoming liquid is blocked. Similarly, if the frozen liquid contents bends at the point of impact of the needle, the frozen liquid contents will not be released from the inner walls of the receptacle chamber. This, too, will result in blockage of the exit flow path. Thus, in certain embodiments of the invention, the frozen liquid contents is sufficiently hard that when force is applied to it with a dispenser needle (e.g., a hollow cylindrical needle of about 2.5 mm outer diameter with about a 4 mm long diagonal pointed section), the frozen liquid contents is dislodged from the inner surface of the receptacle rather than the needle embedding into the contents or the contents deflecting away from the needle without dislodging. The illustrative dimensions of the needle given above is not limiting, as the frozen liquid contents of these embodiments with work with other needle dimensions, including those with larger or smaller bores as well as those with non-cylindrical cross-sections.

It is believed that hardness levels of between about 1 and about 6 on the Mohs scale (at between about 0° F. and about 32° F.) provide sufficient hardness to dislodge from the inner surface of the receptacles described herein rather than experience the undesirable effects set forth above. Thus, certain embodiments of the invention have a hardness of between about 1 and 5 on the Mohs scale at between about 0° F. and about 32° F. Other embodiments of the invention have a hardness of between about 1 and 4 on the Mohs scale at between about 0° F. and about 32° F. Still other embodiments of the invention have a hardness of between about 1 and 3 on the Mohs scale at between about 0° F. and about 32° F. Further embodiments of the invention have a hardness of between about 1 and 2 on the Mohs scale at between about 0° F. and about 32° F. Certain embodiments of the invention have a hardness of between about 0.5 and 1.5 on the Mohs scale at between about 0° F. and about 32° F. Other embodiments of the invention have a hardness of between about 1.5 and 2.5 on the Mohs scale at between about 0° F. and about 32° F. Yet further embodiments of the invention have a hardness of between about 0.75 and 1.25 on the Mohs scale at between about 0° F. and about 32° F. In some embodiments, the hardness of the frozen liquid contents is enhanced by the addition of food-grade hardening agents, e.g., thickeners, stabilizers, and emulsifiers. Other examples include guar gum, agars, alginates, carrageenans, gum Arabic, locust bean gum, pectin, sodium carboxymethyl cellulose, various starches, and xanthan gum.

Figure 14A:
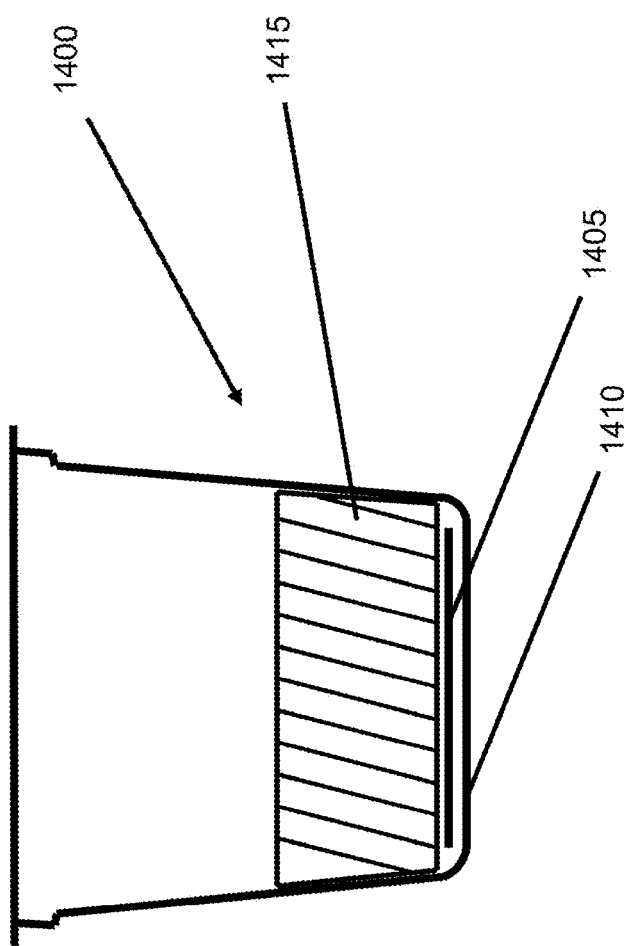
FIG. 14A illustrates a side cross-sectional view of a receptacle with an inner platform, according to some embodiments.

In certain embodiments, the frozen liquid contents will be of such a concentration (i.e., relatively high % TDS) that the contents will not be hard enough to be displaced by a dispenser or brewer needle, due to freezing point depression caused by, e.g., high sugar levels. Rather, the needle will embed into the contents, the contents will clog the needle, or the contents will flex away from the needle without dislodging from the receptacle chamber inner walls. FIG. 14A illustrates a side cross-section view of a receptacle 1400 with an inner platform 1405. The platform 1405 is located between an end layer 1410 of the receptacle 1400 and a frozen liquid contents 1415. In FIG. 14 A, the platform 1405 is shown spaced apart from end layer 1410 and frozen liquid contents 1415. In some embodiments, the platform 1405 rests on and is in contact with the end layer 1410, and the frozen liquid contents 1415 is in contact with the platform 1405 and, optionally, a portion of the end layer 1410. Herein, this platform may also be referred to as a "platform", a "pusher plate", a "displacement disc", or simply a "disc".

Figure 14B:
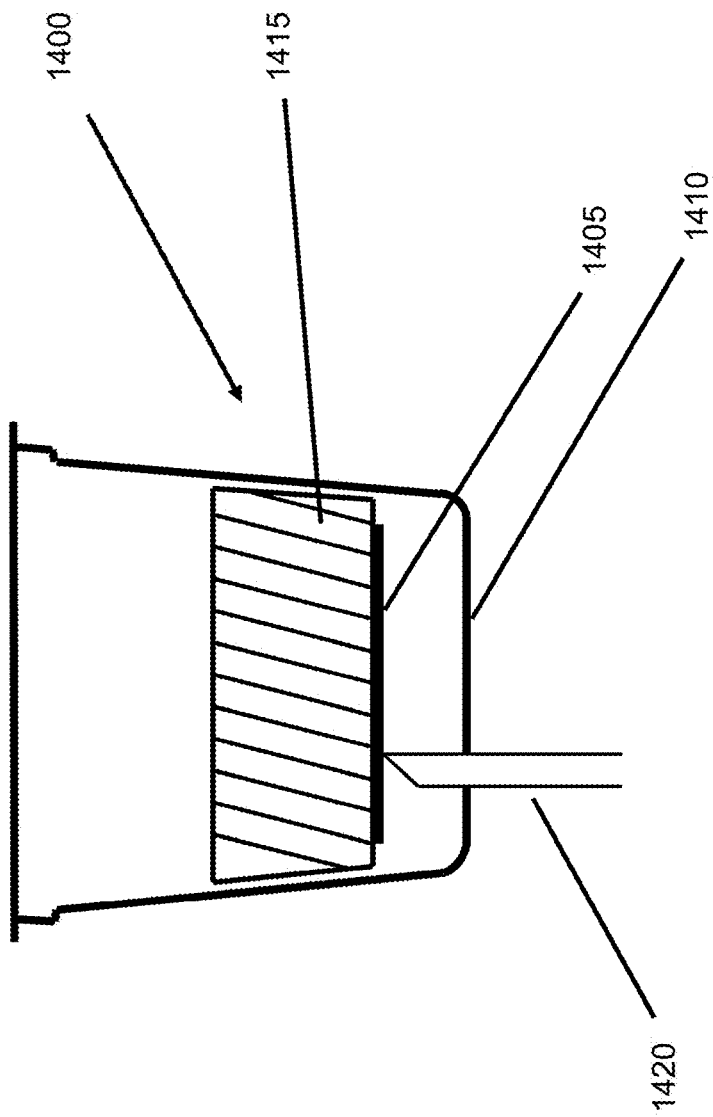
FIG. 14B illustrates a side cross-sectional view of a receptacle with an inner platform and a dislodged frozen liquid contents, according to some embodiments.

FIG. 14B illustrates a side cross-sectional view of the receptacle 1400 with the inner platform 1405 displaced away from the end layer 1410 and supporting the dislodged frozen liquid contents 1415. As shown in the figure, dispenser/brewer needle 1420 perforates the end layer 1410, but does not perforate platform 1405. Rather, the needle 1420 contacts the platform 1405 and dislodges the frozen liquid contents from the inner surface of the receptacle 1400. Thus, the platform 1405 enables frozen liquid contents to be displaced by a needle that on their own may otherwise lack sufficient hardness to be displaced by the needle. The various platforms described herein may also be used with frozen liquid contents that have sufficient hardness alone to be displaced through contact with a needle. Using a platform inside of the receptacle with a wide range of frozen liquid contents provides uniform displacement behavior. Platform 1405 is, optionally, made from the same material as receptacle 1400 to maintain the receptacle's recyclability (e.g., aluminum), but it may also be made from a different material than the receptacle to enhance its suitability for contact with food or for cost. The platform 1405 can be made harder than end layer 1410 by hardening treatments known in the art, and/or platform 1405 can be made of thicker material that end layer 1410. The platform may be made of a material known to have a higher or lower coefficient of friction than the receptacle material to aid in creating bypass flow around it or thru it.

Figure 14C:
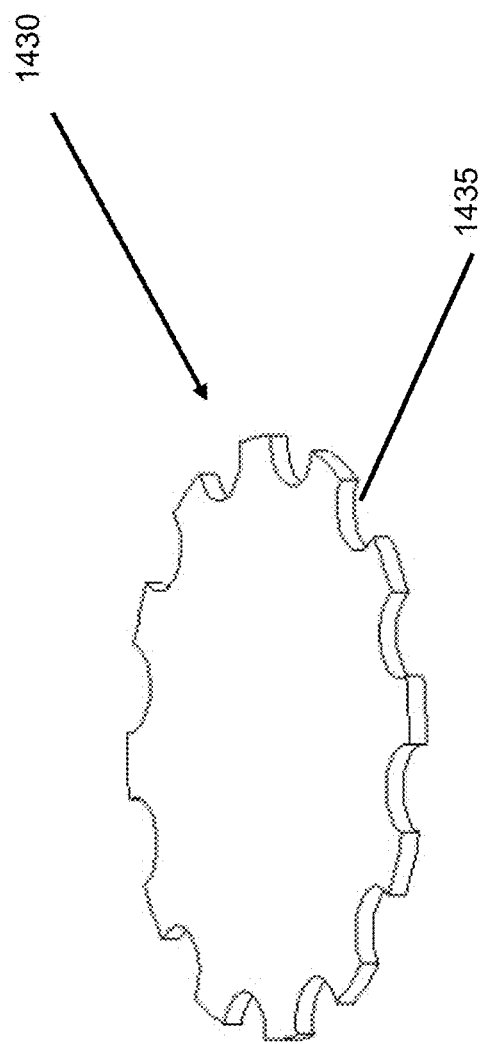
FIG. 14C illustrates a liquid frozen contents platform, according to some embodiments.

FIGS. 14A and 14B show the platform 1405 as a flat disc. However, other embodiments include those shown in FIGS. 14C and 14D. FIG. 14C shows a platform 1430 with a scalloped circumference 1435, and FIG. 14D shows a scalloped platform 1440 with an overflow tube 1445. The overflow tube 1445 forms a channel between the space above a frozen liquid contents disposed on the platform 1440 and the space created below the platform when the platform is raised by the dispenser needle (e.g., as in needle 1420 of FIG. 14B) or a compressed gas or liquid. Further details describing the overflow tube 1445 follow below. Still further embodiments include platforms that are slightly concave or convex (relative to the end layer), frusto-conical, corrugated, have stamped convolutions, or possess other non-flat profiles. Such embodiments reduce the likelihood that the platform would adhere to the end layer and/or reduce the likelihood of acting as a barrier to liquid flow through an outlet formed in the end layer. Platforms 1430 and 1440 may be flat or possess any other non-flat profile. Platforms 1430 and 1440 may have smooth edges or scalloped edges as shown in the figure.

Figure 15A:
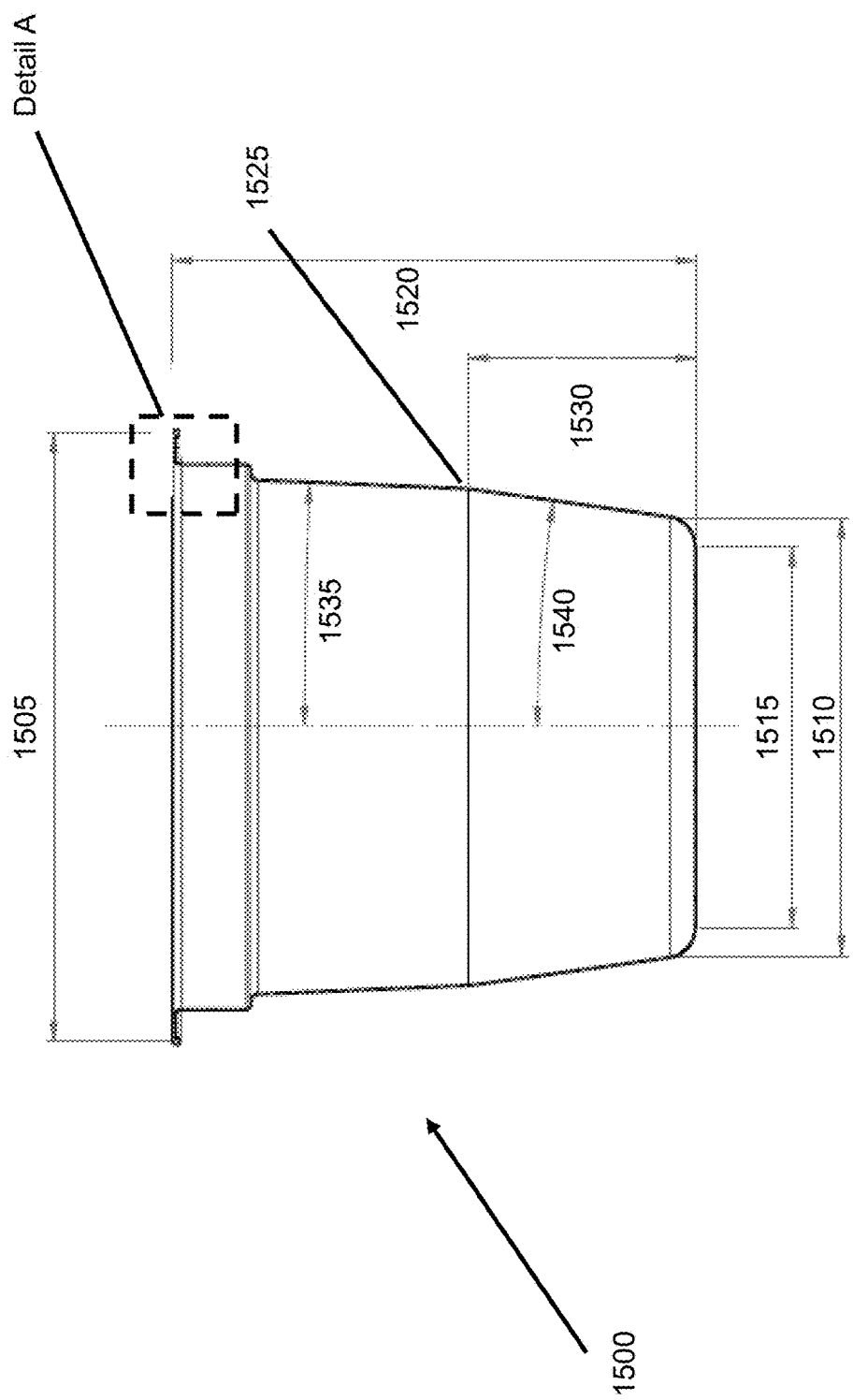
FIG. 15A illustrates a side cross-sectional view of a receptacle, according to some embodiments.

FIG. 15A shows an embodiment of a receptacle 1500 with a compound draft angle. Receptacle 1500 has a top flange diameter 1505 of about 2.00 inches, a bottom transition diameter 1510 of about 1.44 inches, and an end layer diameter 1515 of about 1.26 inches. Receptacle 1500 has a height 1520 of about 1.72 inches. Receptacle 1500 has a sidewall with a compound draft angle with a transition point 1525 that occurs about 0.75 inches from the end layer (1530). Above the transition point 1525, the draft angle 1535 is about 2.5 degrees, while the draft angle below the transition point 1540 is about 8 degrees. The greater draft angle in the lower portion of the sidewall facilitates release of frozen liquid content that rests on the end layer of the receptacle. Meanwhile, the lower draft angle of the upper section aids in securing the receptacle in a receiver of a dispenser and/or known single serving brewer.

Figure 15B:
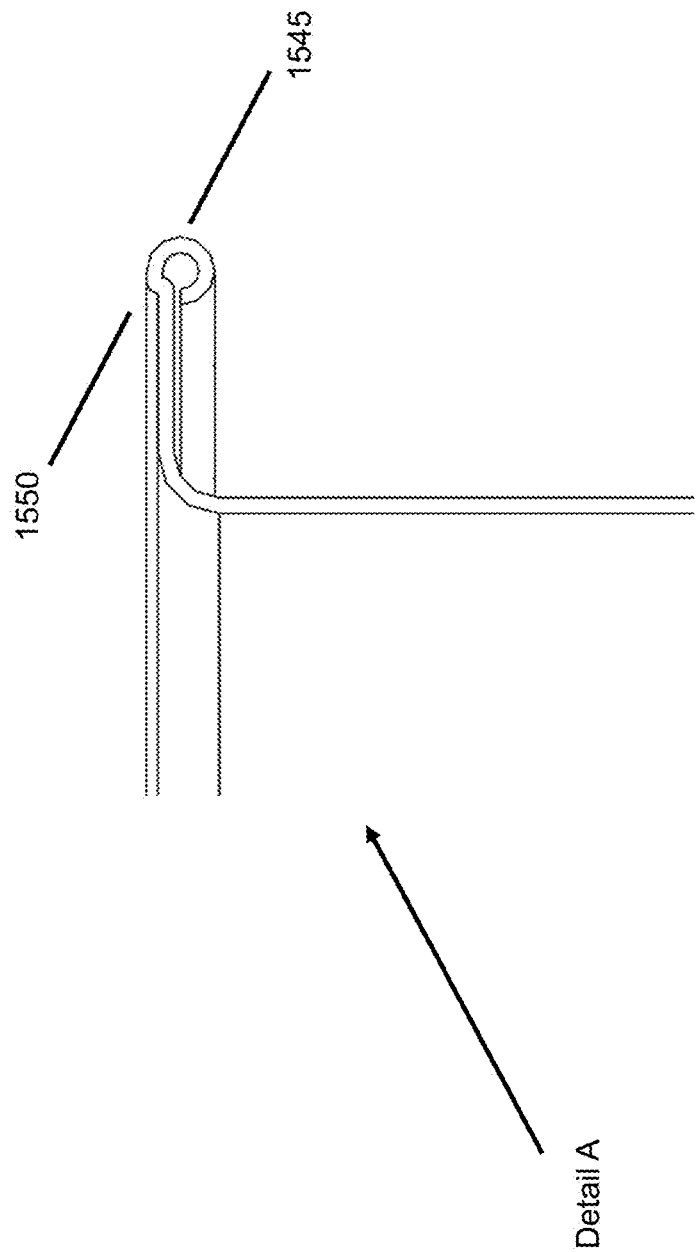
FIG. 15B illustrates a side cross-sectional view of a detail A of FIG. 15A, according to some embodiments.

FIG. 15B shows Detail A of the receptacle 1500 of FIG. 15A. This figure illustrates a rolled lip 1545 potion of the flange of the receptacle as well as an indentation 1550 that sits below the highest part of the rolled lip 1545. Certain materials, e.g., aluminum, will retain a sharp edge when machined or stamped. Such an edge can present a safety hazard to users of receptacles having such an edge. Rolled lip 1545 tucks the edge of the flange under the body of the flange, thereby protecting the user from any remaining sharp edges. Meanwhile, indentation 1550 allows a lid to be mounted to the flange body and maintain the top lid surface below the highest part of the rolled lip 1545. The specific sizes set forth above for receptacle 1500 can be varied while maintaining the compound draft angle and remain within the scope of the invention.

Figure 16:
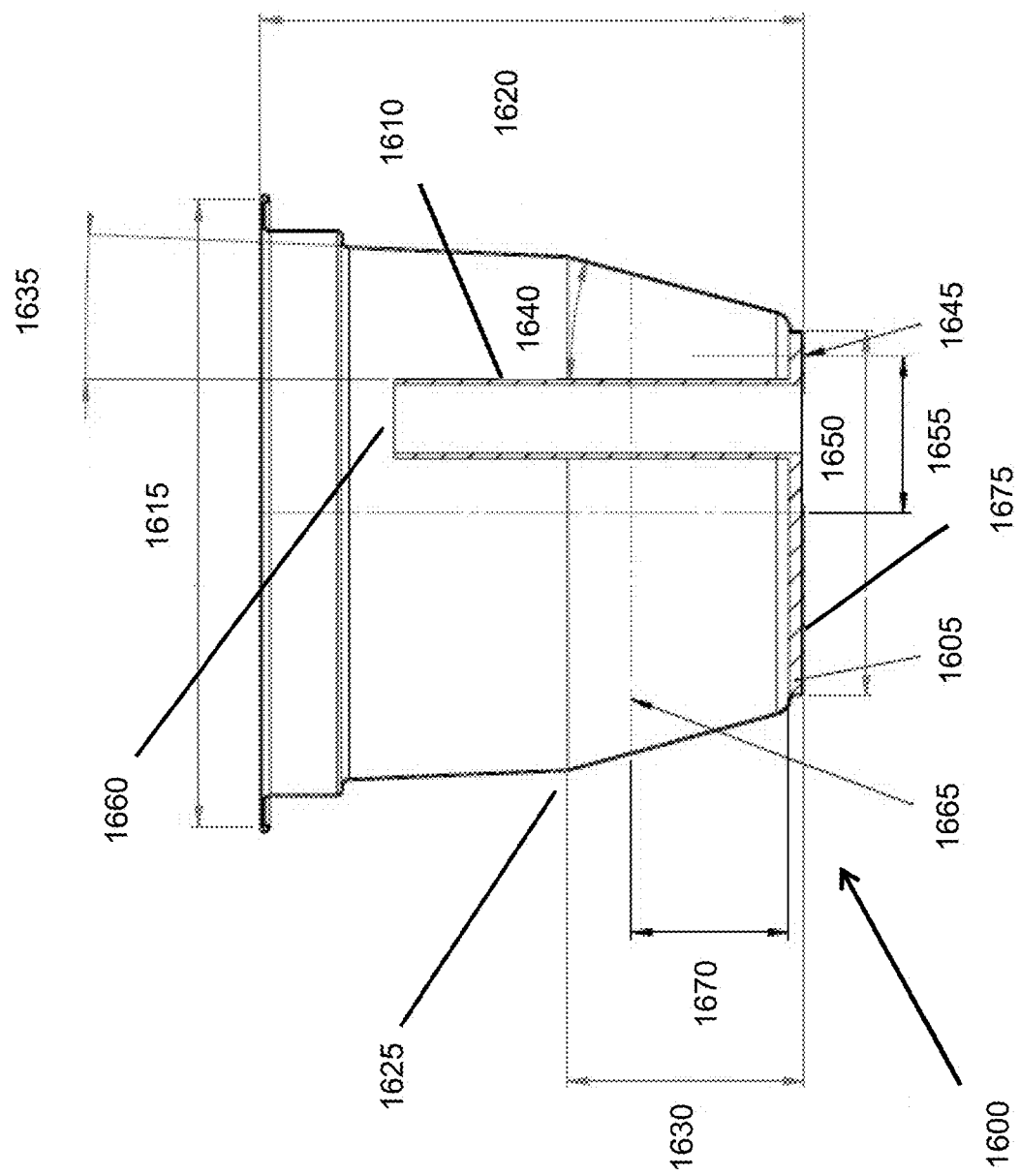
FIG. 16 illustrates a side cross-sectional view of a receptacle with a platform having overflow tube, according to some embodiments.

FIG. 16 illustrates a side cross-sectional view of a receptacle 1600 with a platform 1605 having an overflow tube 1610. Although platform 1605 is shown as a flat disc, it can be any of the shapes described herein. The receptacle has a flange diameter 1615 of about 2.00 inches and a height 1620 of about 1.72 inches. Receptacle 1600 has a sidewall with a compound draft angle with a transition point 1625 that occurs about 0.75 inches from the end layer (1630). Above the transition point 1625, the draft angle 1635 is about 2.5 degrees, while the draft angle below the transition point 1640 is about 15 degrees. The end layer of the receptacle 1600 has a stepped portion 1645 that accommodates the platform 1605 with little to no space between the outer circumference of the platform 1605 and the step. In the illustrated embodiment, the diameter of the platform 1650 and the stepped feature is about 1.16 inches. The close fit between the platform 1605 and the stepped portion 1645 reduces or prevents liquid contents from settling between the platform 1605 and the end layer 1675 before the contents is frozen, which could increase the amount of force required to dislodge the frozen liquid contents from the inner surface of the receptacle 1600 and allow frozen contents to flow into the bottom of the overflow tube 1610 blocking intended flow during the melting/dispense cycle. The close fit between the platform 1605 and the stepped portion 1645 acts to hold the platform firmly in place during liquid filling and until the liquid contents are frozen.

In other embodiments (not shown), a further stepped region exists below the platform 1605 to create a space between the platform 1605 and the end layer 1675 that is not occupied by frozen liquid contents. This space allows fluid to flow down the overflow tube 1610 and into the space between the platform and end layer in order to exit the receptacle through a perforation in the end layer.

In FIG. 16, the platform 1605 and overflow tube 1610 are show in cross-hatch to distinguish the platform and overflow tube from the end layer (bottom) 1675 of the receptacle 1600. The overflow tube 1610 is disposed inboard of a point about 0.50 inches from the receptacle center line (1655). This point is a common entrance point for one or more outflow needles of known single-serving and multi-serving brewers. Thus, when the outlet needle penetrates the end layer of the receptacle, the needle will lift the platform 1605 and frozen liquid contents (not shown) in a manner similar to that described for the embodiment in FIG. 14B rather than the needle entering the channel of the overflow tube 1610. The top of the overflow tube 1660 is above a nominal fill line 1665 for frozen liquid contents at about 0.50 inches from the top surface of the platform (1670). The specific sizes set forth above for receptacle 1600 can be varied while maintaining the compound draft angle and remain within the scope of the invention.

Figure 17:
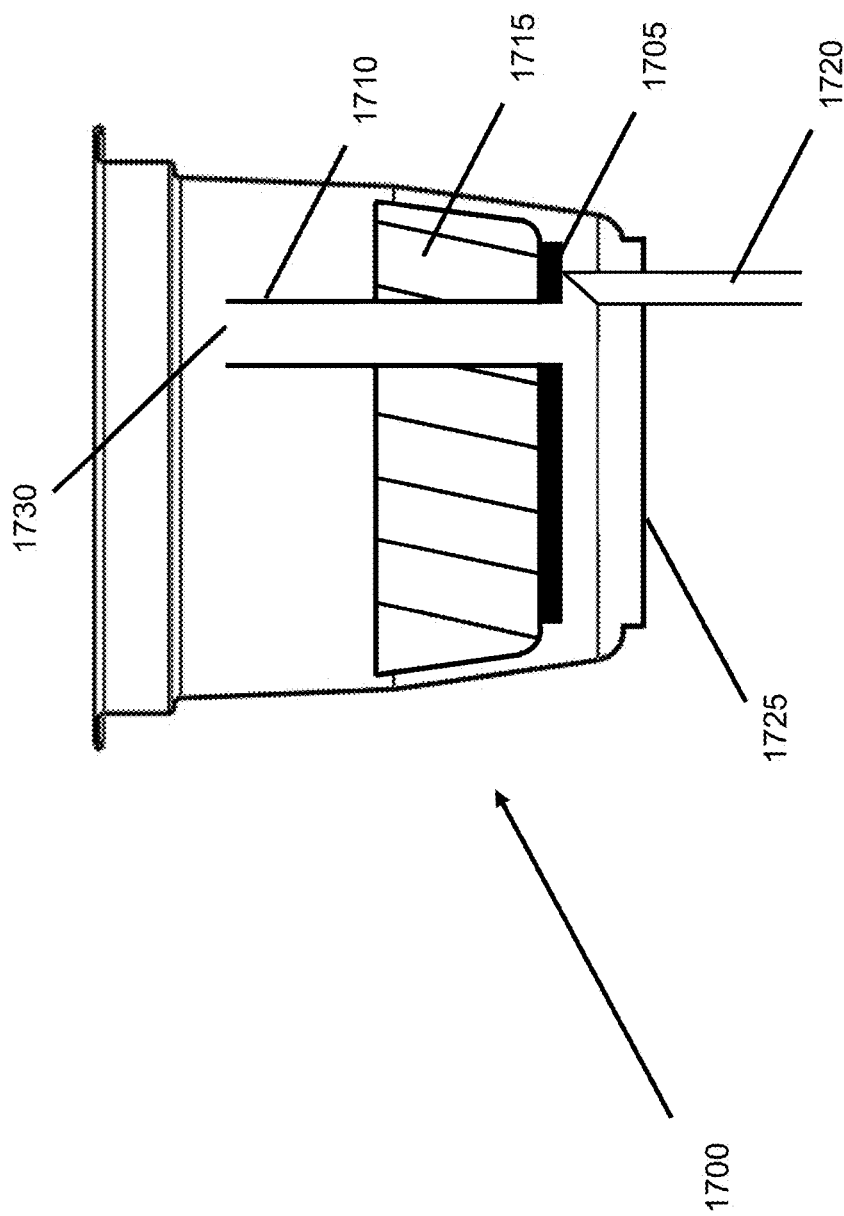
FIG. 17 illustrates a side cross-sectional view of a receptacle with a platform having an overflow tube, according to some embodiments.

FIG. 17 shows a receptacle 1700 with a platform 1705 and overflow tube 1710; a frozen liquid contents 1715 rests on the top surface of the platform 1705. This figure shows a needle 1720 of a dispenser or known single serving brewer that has penetrated an end layer 1725 of the receptacle 1700 and lifted the platform and frozen liquid contents. The overflow tube 1710 provides an alternate flow path for liquid injected into the receptacle 1700 (e.g., by an inlet needle that perforates a top lid (not shown)) in the event that the flow path around the frozen liquid contents becomes blocked or is insufficient for the incoming liquid flow. Rather than the excess liquid building-up inside the receptacle and overflowing outside the mixing chamber of the receptacle 1700, when the liquid level reaches the top inlet 1730 of the overflow tube 1710, the liquid is channeled to the space below the platform 1705 so it may exit via the needle 1720. During this process, water that is being introduced into the receptacle via a needle penetrating the lid must also be prevented from passing directly into the overflow tube, thereby defeating its purpose of melting and diluting the frozen contents. In certain embodiments, a needle geometry similar to that shown in FIG. 10C or 10D would be effective at directing the incoming water away from overflow tube 1610 and constructively toward the sidewalls of the receptacle.

Figure 18:
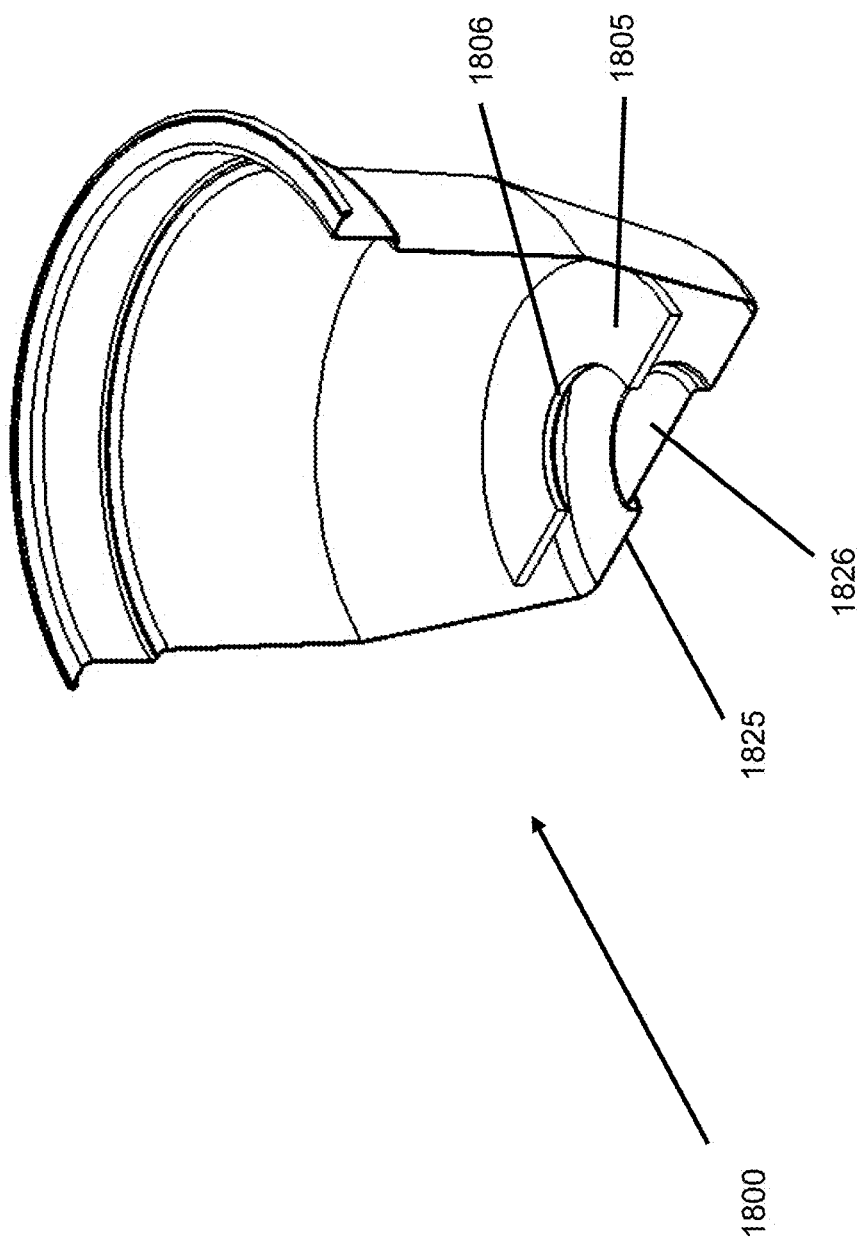
FIG. 18 illustrates a side cross-sectional view of a receptacle with an annular platform designed and sized to fit over a raised protrusion on the end layer of the receptacle, according to some embodiments.

FIG. 18 illustrates a receptacle 1800 with a raised circular protrusion 1826 (in essence, providing a depression 1825) in the end layer and an annular platform 1805 shown in a slightly raised position. This platform is designed and sized such that its center circular opening 1806 fits tightly around the raised protrusion 1826 in the receptacle during normal liquid filling and handling, with the friction created by a light interference fit between the two components holding the platform in place during filling and until the liquid contents have frozen. During use, the needle which penetrates the bottom of the receptacle dislodges the annular platform and helps displace the frozen contents to a second position. This annular shape for the platform serves the secondary function of reducing its weight and, when the platform is made from a different material than the receptacle, allowing the receptacle as a whole to be more easily recycled. For example, if a high density polyethylene (HDPE) platform is used in an aluminum receptacle, the recyclability of the entire assembly may be maintained, without requiring the platform to be separated from the receptacle, if the total percentage of HDPE in the receptacle assembly is kept below a threshold amount. In this embodiment, the size of the annular opening in the platform may be increased to the edge of the needle perforation zone to maximize weight reduction. Alternatively, the disc might be a hybrid design as, for example, a metallic washer shape enclosed in a plastic approved by the FDA for contact with food.

In some implementations, rather than, or in addition to, the interference fit between the platform and the raised protrusion 1826, the platform can have an interference fit between the circumferential edge of the platform and the sidewall of the receptacle. In these implementations, the platform can be any of the embodiments described herein.

Figure 19:
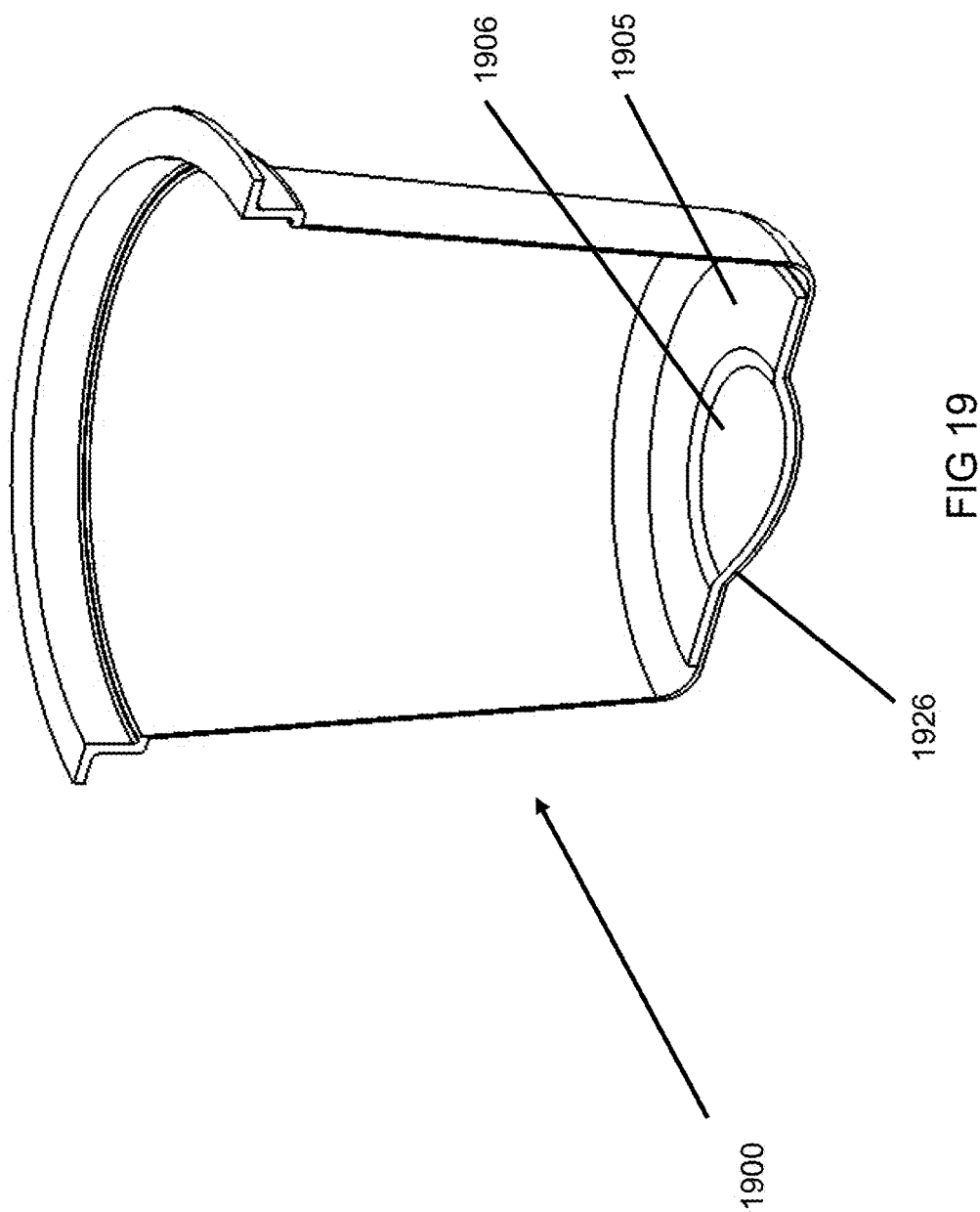
FIG. 19 illustrates a side cross-sectional view of a receptacle with a domed end layer, according to some embodiments.

FIG. 19 illustrates a receptacle 1900 with a domed end layer 1926 and a matching platform 1905 whose convex surface section 1906 is sized and designed to match the outward extension of the dome in the receptacle. Prior to insertion into a dispensing machine, or as part of the machine operation, the receptacle dome 1926 is intended to be pushed inward where it achieves a new stable position and holds or displaces the frozen contents into a second position with flow paths around its exterior surfaces. The convex surface 1906 of the platform is pushed upward, but does not reverse its position, i.e., does not become concave as seen from the closed end of the receptacle. Thus, in this embodiment the platform supports partially frozen or gummy/flexible contents in this raised position by bearing against the now inwardly protruding receptacle dome on the bottom and carrying the frozen contents above. Needle penetration from the bottom of the receptacle may assist in the displacement of the platform and the frozen contents. And as with other embodiments, the platform prevents the needle from being clogged by the partially frozen contents.

Figure 20:
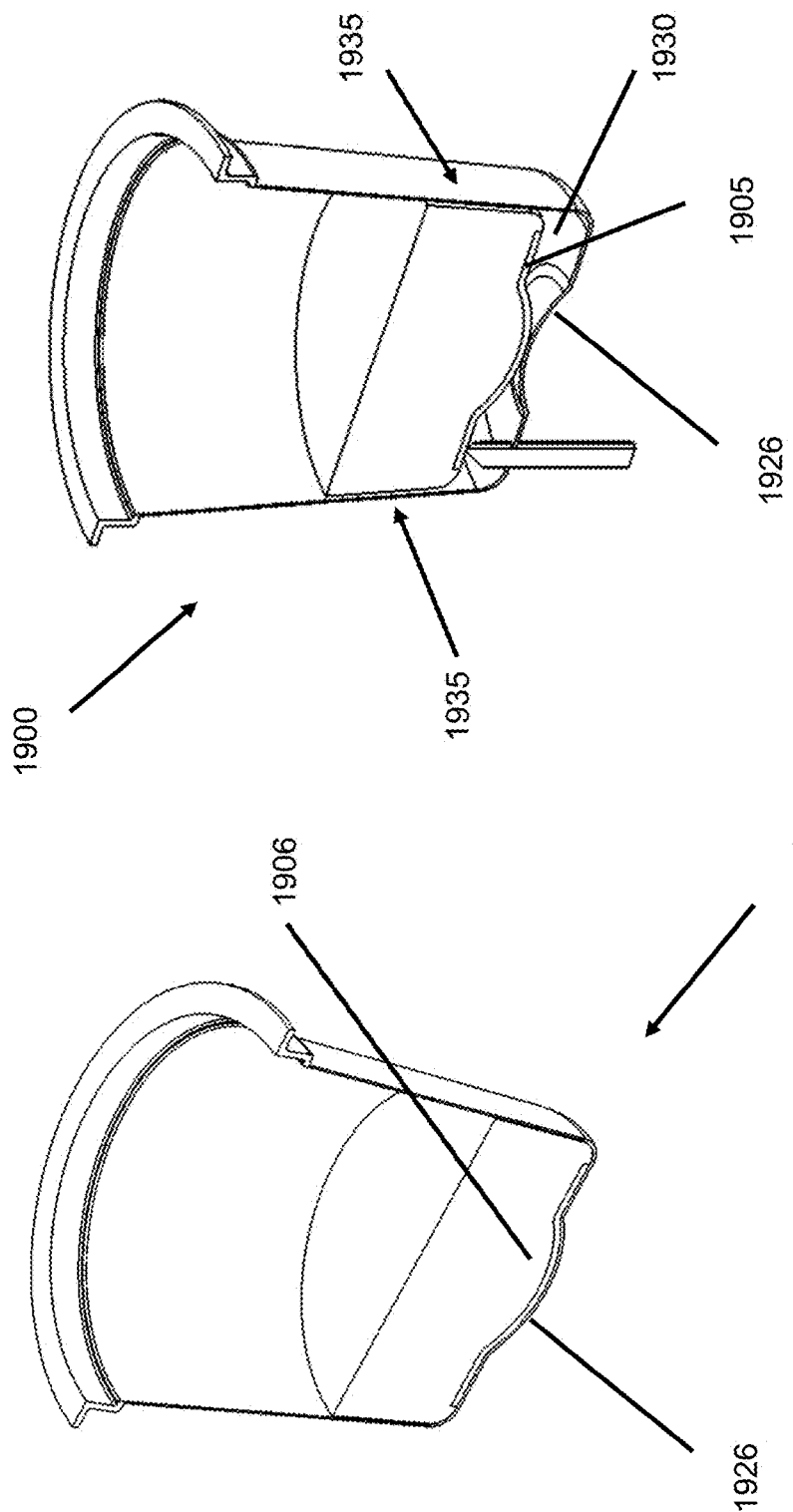
FIGS. 20A and 20B illustrate an operation of a receptacle with a domed end layer, according to some embodiments.

FIG. 20A illustrates the operation of receptacle 1900 shown in FIG. 19. In its initial position, domed end layer 1926 is in the convex configuration, which conforms to the convex surface of the platform 1905. In its second position, shown in FIG. 20B, domed end layer 1926 is in the concave configuration. A portion of the concave end layer interferes with the still convex portion of the platform 1905 to create a space 1930 between the bottom surface of platform 1905 and the top surface of the end layer 1926. This interference also creates and maintains flow paths 1935 around the frozen contents that rests upon the top of the platform 1935. Either or both of the domed sections of the end layer and platform can be bistable.

Figure 21:
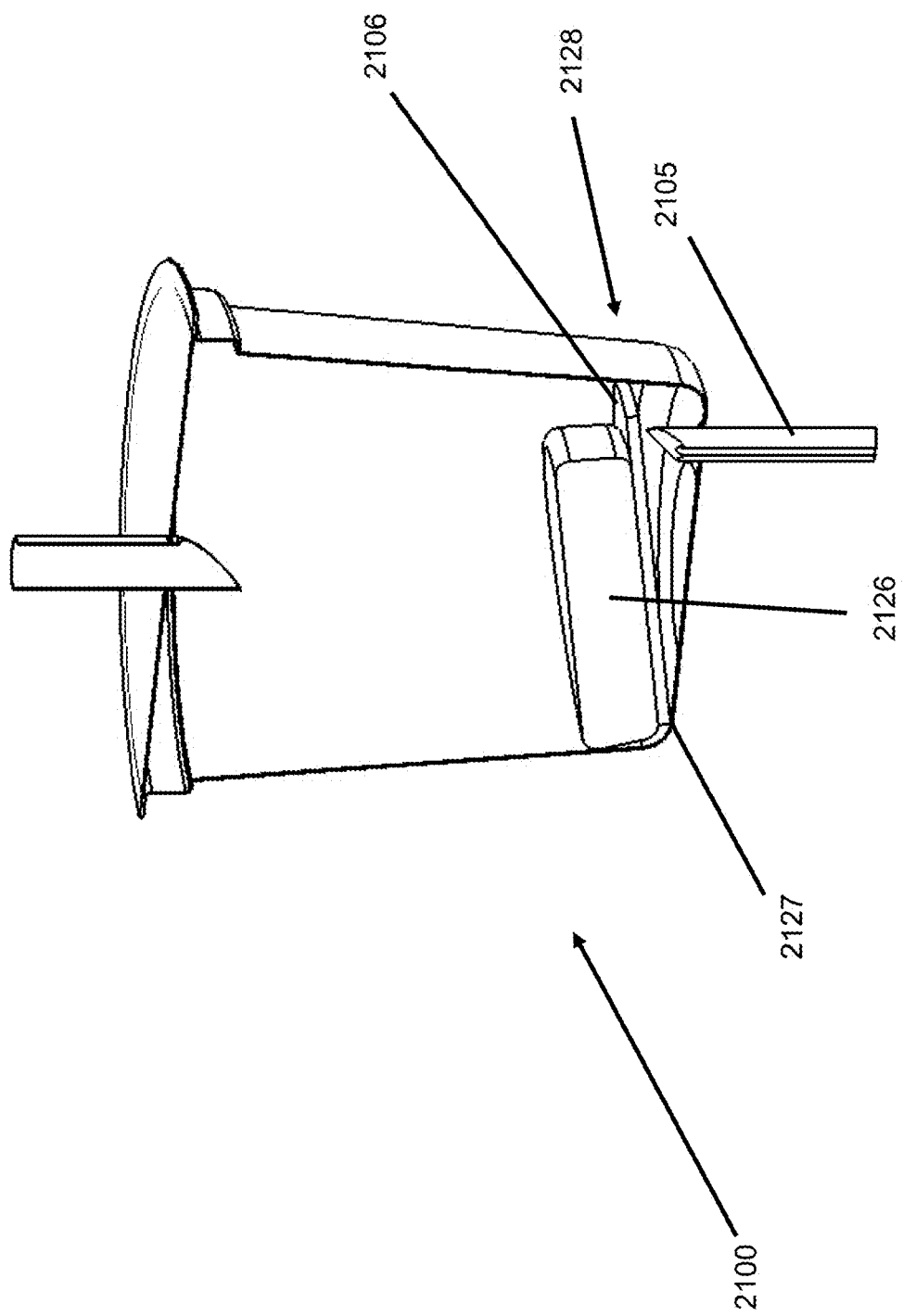
FIG. 21 illustrates a side cross-sectional view of a receptacle with a flat end layer and with partially melted frozen contents, according to some embodiments.

FIG. 21 illustrates a receptacle 2100 with a flat end layer and a flat platform 2106 supporting partially melted frozen contents 2126, held in place by the bottom needle 2105. This figure clearly shows a flow path 2128 around the frozen contents when the platform is raised off the end layer. In this particular embodiment, the frozen content is seen to have shifted slightly off-center of the platform and coming to rest against the side of the receptacle. In some embodiments, to prevent the platform from moving out of place, the edge 2127 in contact with the end layer is physically attached with a hinge mechanism such as a small spot weld (e.g., to create a living hinge). This embodiment may also require a keying feature such that the bottom needle always penetrates the end layer diametrically opposite the hinge.

Figure 22A:
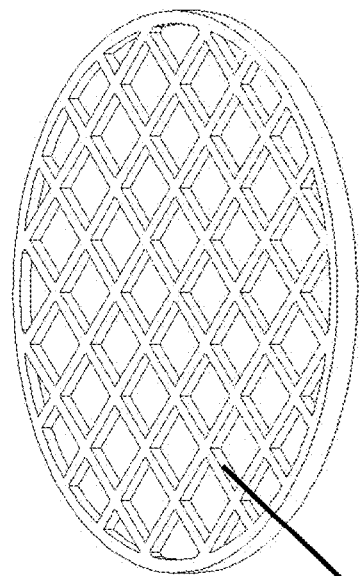
FIGS. 22A-D illustrate various features for increasing the rigidity of a platform for holding frozen contents, according to some embodiments.
Figure 22B:
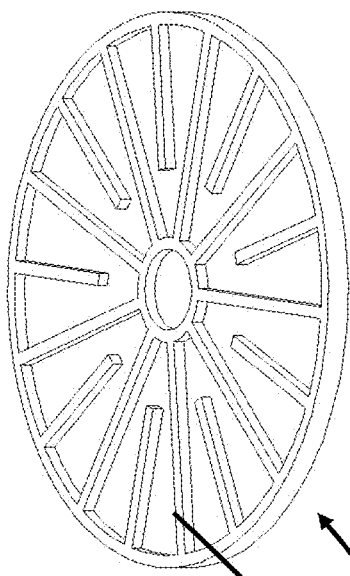
Figure 22C:
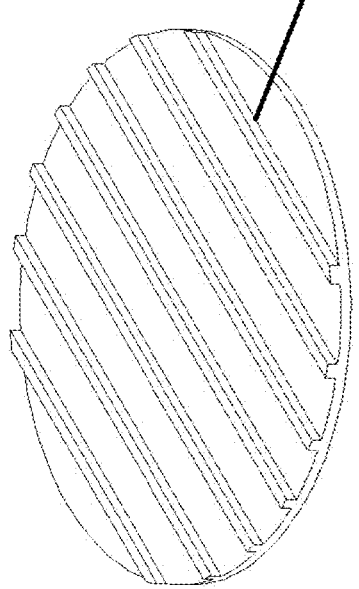
Figure 22D:
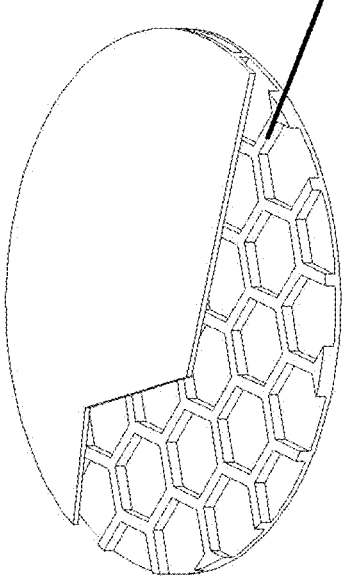

In some embodiments, the platform includes ridges in order to increase the section moment of inertia of the platform to thereby increase the platform's resistance to deformation. As shown in FIG. 22A, one such embodiment 2205 includes single direction ridges 2210. Another embodiment 2215, shown in FIG. 22B, includes a cross-hatch pattern 2220. FIG. 22C shows an platform 2225 that includes sandwich structures 2230 with ridges set at perpendicular orientations to provide increased bending stiffness in all directions. A similar effect can be achieved by layering materials having anisotropic rigidity. FIG. 22D shows a platform 2235 that includes radial ridge structures 2240. In some implementations, the ridge height is kept sufficiently low and the ridges are spaced sufficient close together so as to not interlock with a needle contacting the platform.

In further embodiments, the platform is maintained above the end layer so that some amount of the frozen contents is between the bottom surface of the platform and the top surface of the end layer. In these embodiments, the distance between the bottom surface of the platform and the top surface of the end layer is kept to a maximum such that a needle or other perforator is able to pass through the frozen contents, contact the platform, and still lift the platform sufficiently to create flow paths around the frozen contents.

Figure 23:
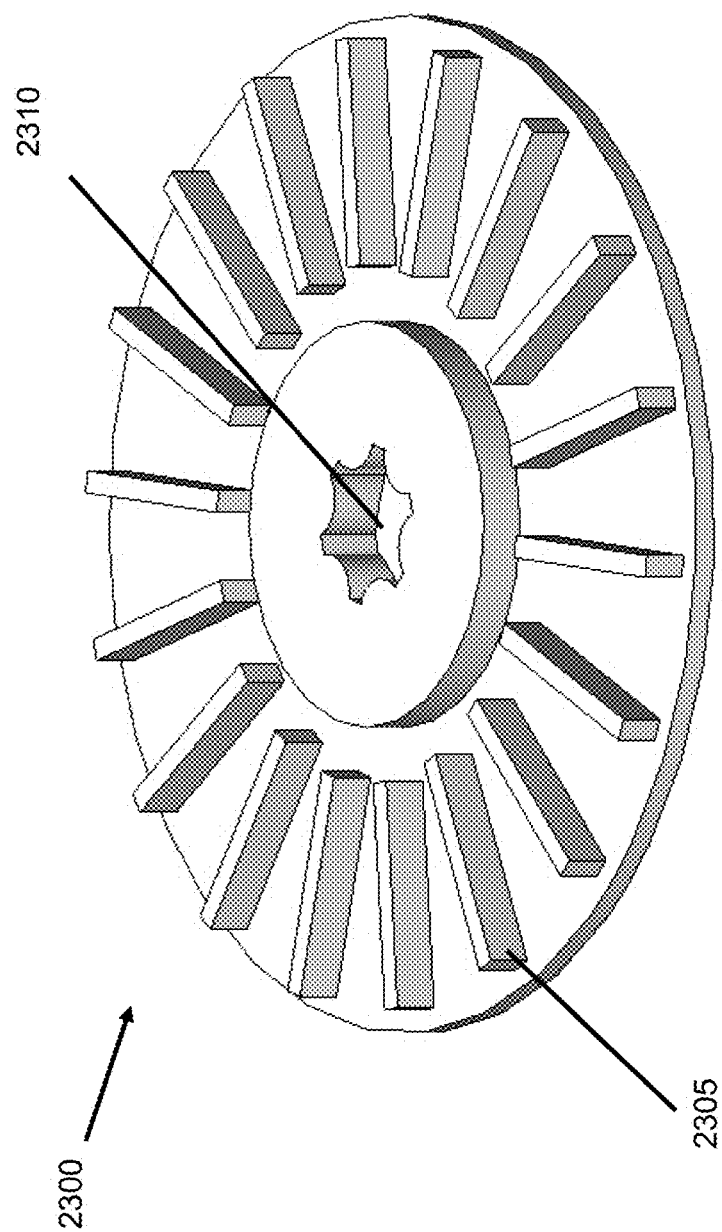
FIG. 23 illustrates a platform with mixing tabs protruding from the surface of the platform, according to some embodiments.
Figure 24:
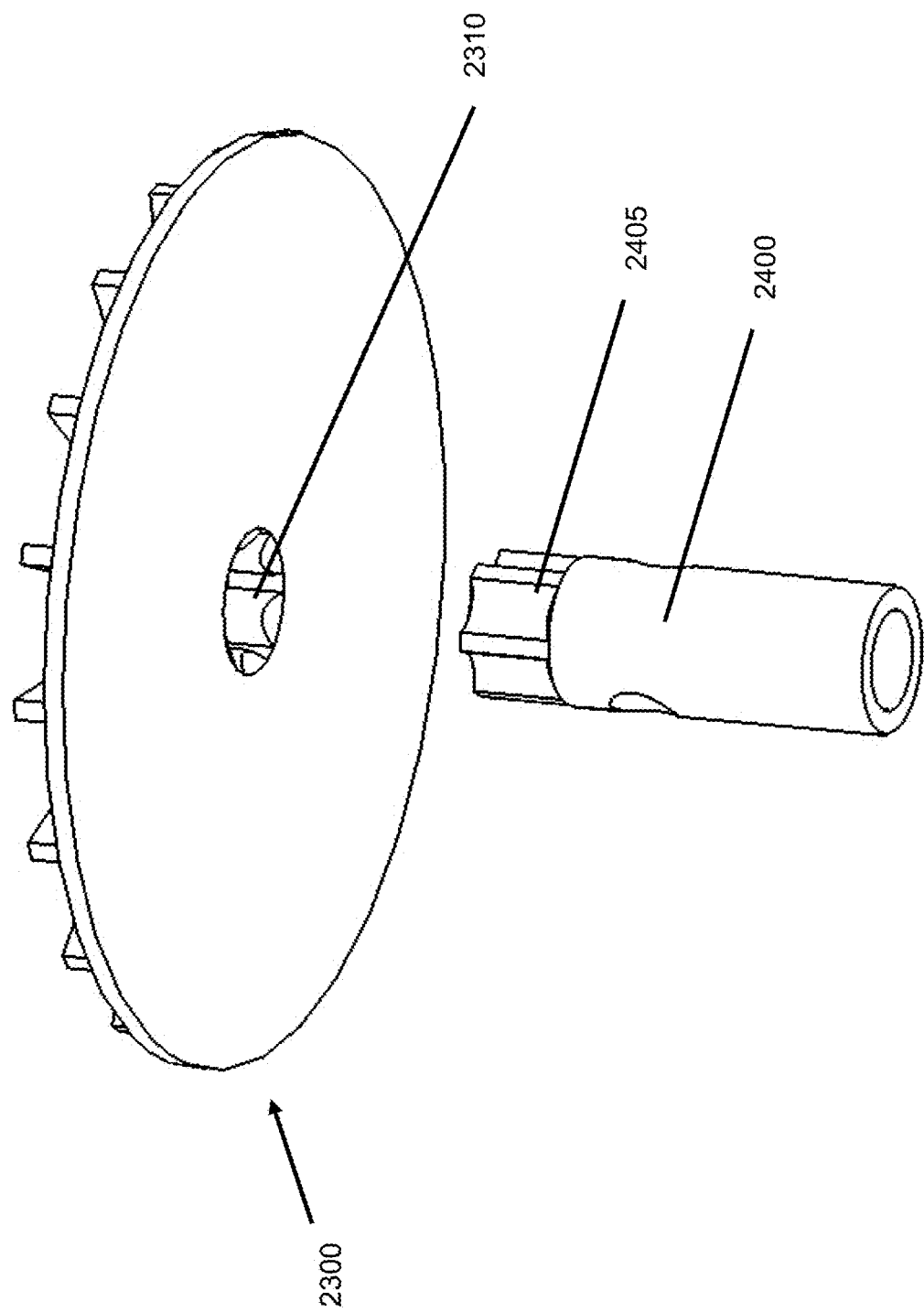
FIG. 24 illustrates an underside view of a frozen content mixing platform preparing to engage a perforator, according to some embodiments.
Figure 25:
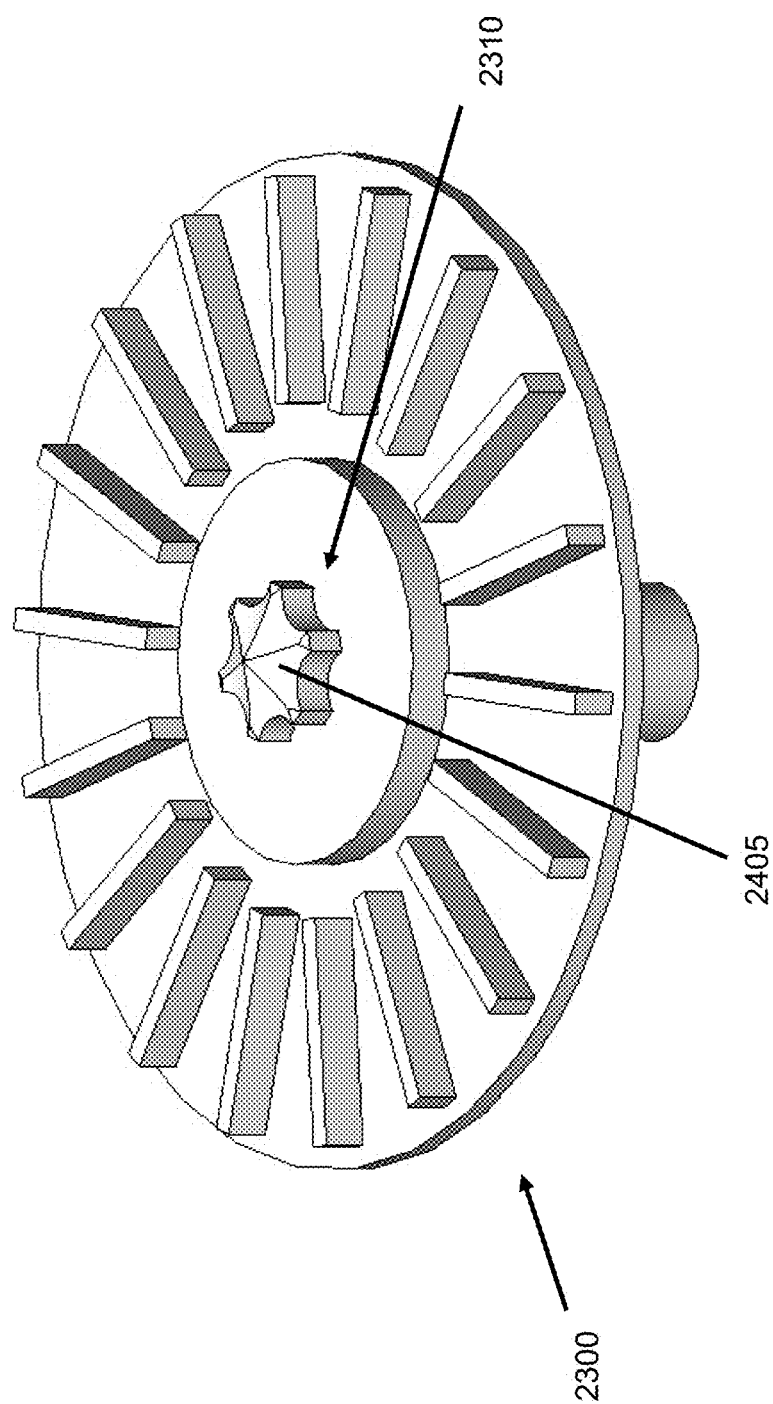
FIG. 25 illustrates engagement between a perforator and a frozen content mixing platform, according to some embodiments.

In other implementations, the platform includes embossing or slightly raised features which assist with melting and mixing the frozen contents with a melting liquid introduced into the receptacle when the assembly is rotated or agitated. In certain implementations, a perforator is designed to engage the platform to impart agitation or a stirring action. For example, as shown in FIG. 23 the top surface of a platform 2300 may have "tabs" 2305 that extend perpendicular to the top surface of the platform. Platform 2300 also has a keyed opening 2310 along its central axis. Keyed opening 2310 is shown in the figure as passing through the entire platform, however, in some embodiments, the opening is closed on the top surface of the platform that is in contact with the frozen liquid contents to prevent frozen contents from filling the opening. FIG. 24 shows an underside view of the platform 2300. A perforator 2400 has a keyed portion 2405 that has a shape that is complementary to keyed opening 2310 of the platform. FIG. 25 shows the keyed portion 2405 of the perforator engaged with the keyed opening feature 2310 of the platform 2300. This allows the perforator to impart a spinning, reciprocal, or other agitating motion to the platform by way of a drive mechanism such that the perforator spins the platform and frozen contents within the receptacle.

Figure 26:
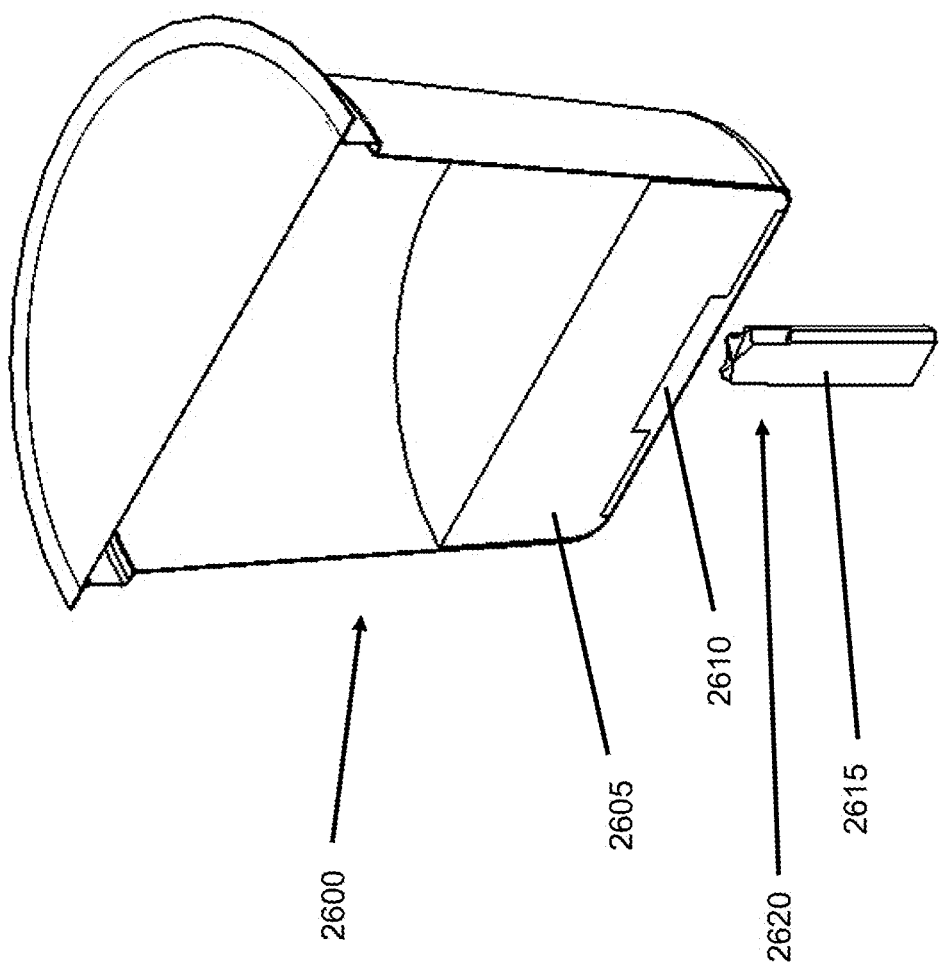
FIG. 26 illustrates a perforator outside of a receptacle preparing to engage a frozen content lifting platform within the receptacle, according to some embodiments.
Figure 27:
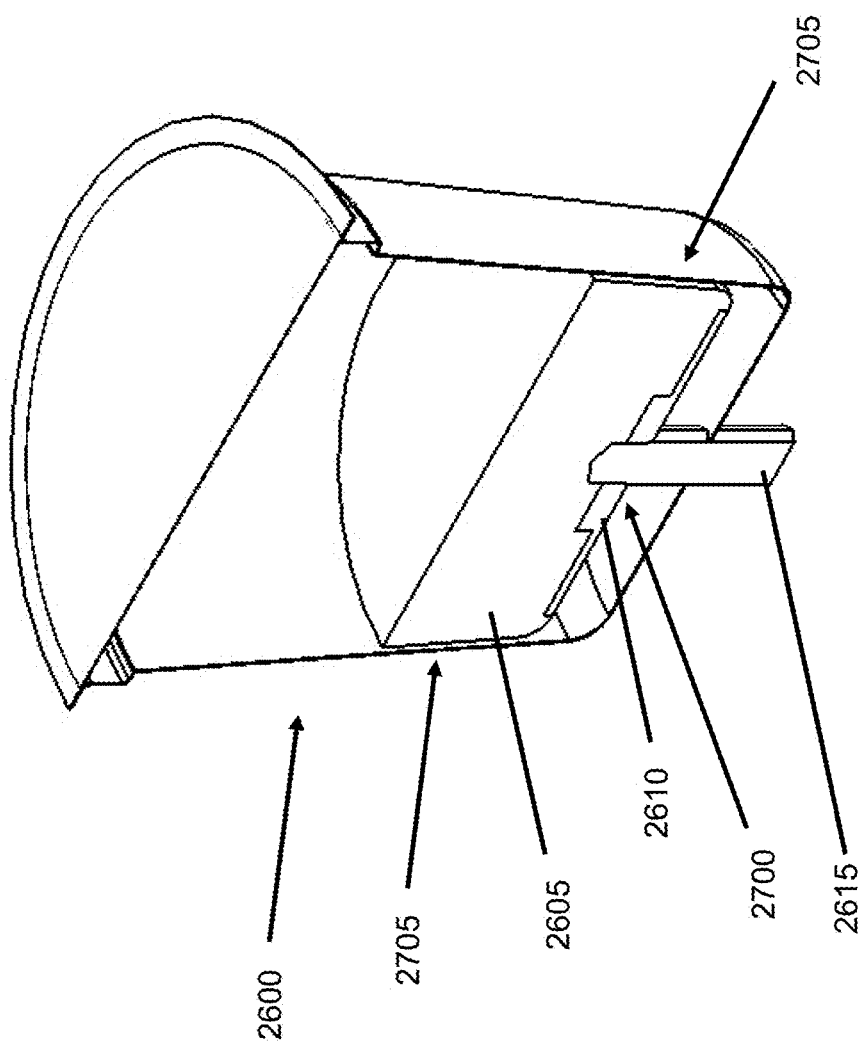
FIG. 27 illustrates engagement between a perforator and a frozen content mixing platform, according to some embodiments.
Figure 28:
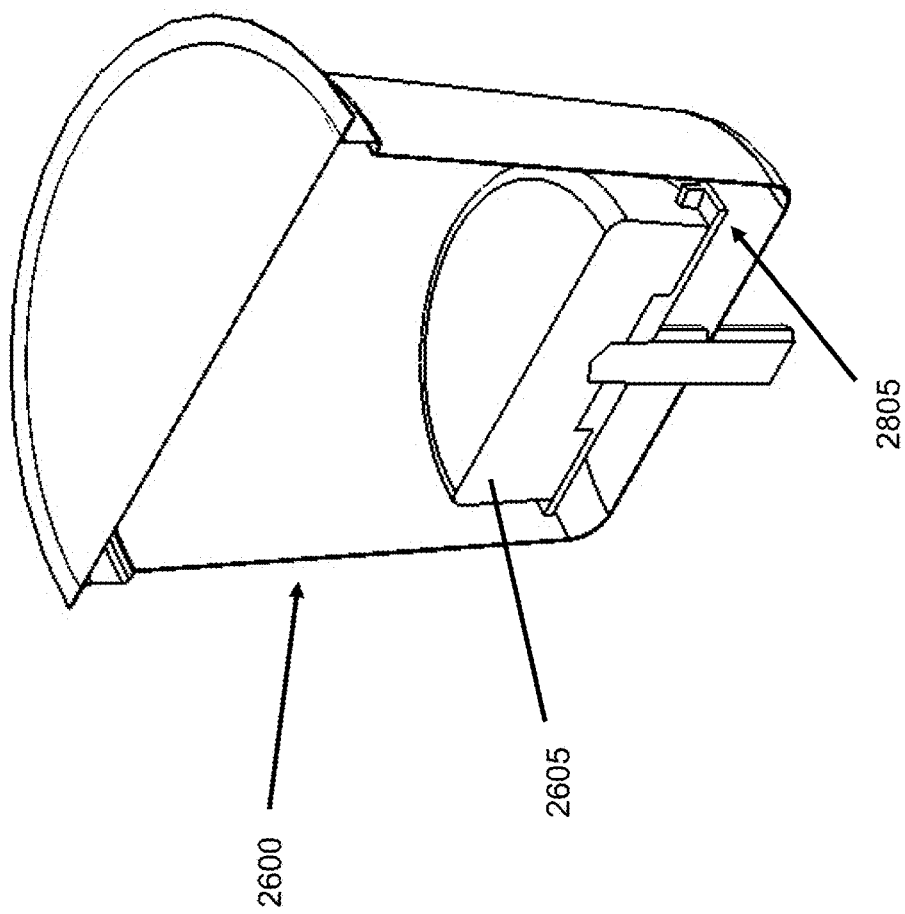
FIG. 28 illustrates partial melting of a frozen content disposed on a frozen content mixing platform, according to some embodiments.

FIG. 26 shows a cross-sectional view of a receptacle 2600 with a frozen liquid contents 2605 disposed on a platform 2610 that has tabs and a keyed opening, as described above. The figure shows a perforator 2615 with a keyed portion 2620 positioned to perforate an end layer of the receptacle 2600. FIG. 27 shows a cross-section view of the receptacle 2600, with frozen liquid contents 2605, disposed on platform 2610. Perforator 2615 has perforated the end layer of the receptacle and engaged the platform via the keyed opening of the platform and keyed portion of the perforator (at 2700). The perforator 2615 has raised the platform 2610 and frozen liquid contents 2605 to create space between the platform and end layer as well as to create flow paths around the frozen liquid contents 2705. When the receptacle 2600 and/or platform 2610 are rotated about its central axis by the perforator 2615, the tabs encourage the frozen contents 2605 to spin with the receptacle. As the frozen contents releases from the platform and liquid covers the top surface of the platform, the tabs introduce turbulence in the liquid and encourage mixing of still frozen portions of the frozen contents and the liquid in the receptacle. FIG. 28 shows receptacle 2600 of FIG. 27 after some of the frozen liquid contents 2605 has melted, exposing a portion of tabs 2805 embedded in the frozen contents.

Figure 29B:
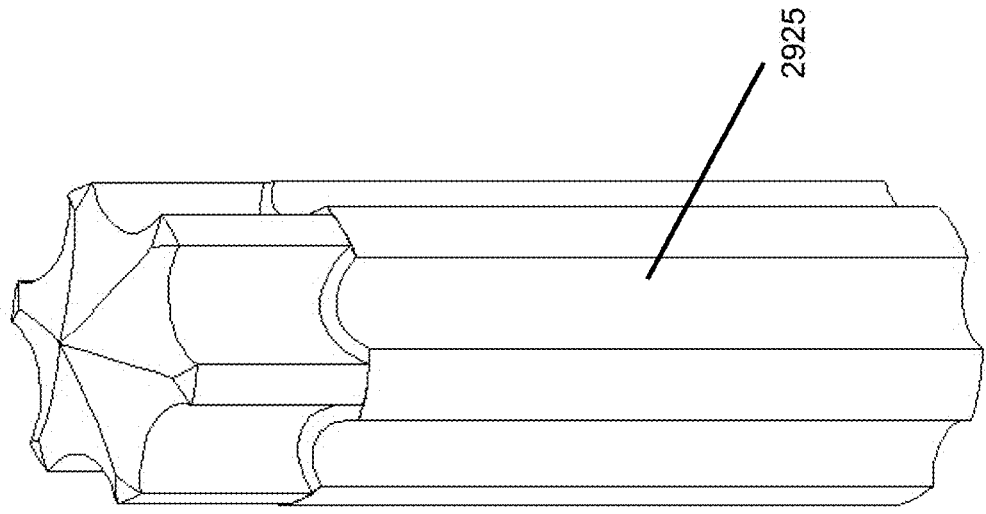
FIGS. 29A and 29B illustrate perforator internal and external channels permitting liquid flow, according to some embodiments.
Figure 29A:
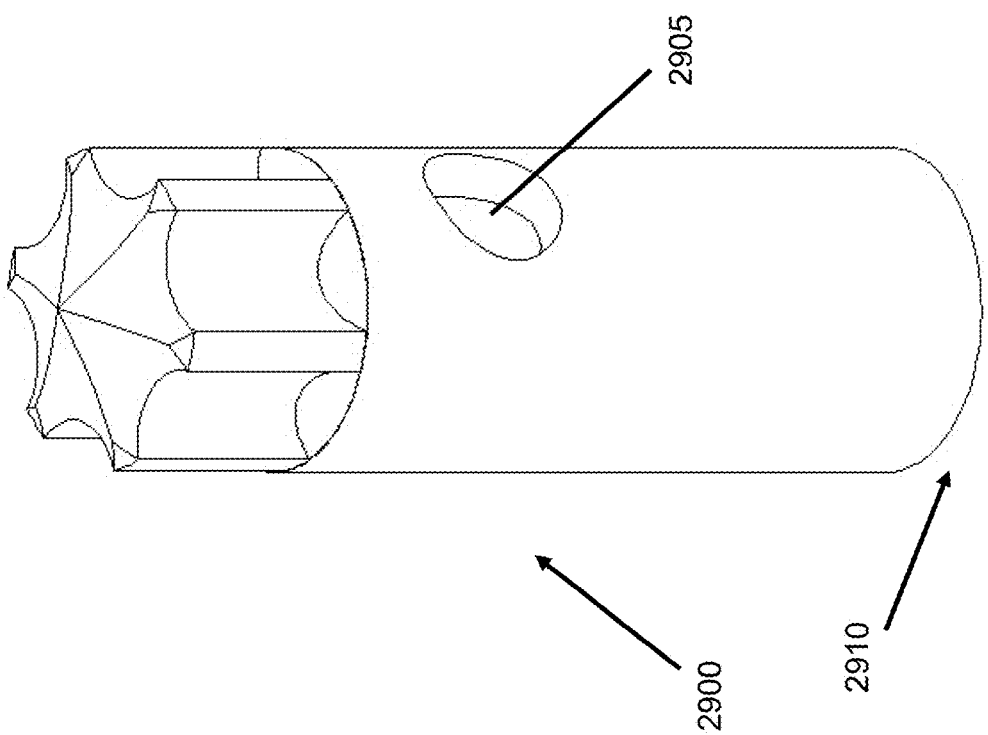

FIG. 29A shows a perforator 2900 with an opening 2905 along the length of the perforator. Opening 2905 communicates with one or more lumens in the perforator (not shown) to allow liquid to exit the receptacle via an opening 2910 at the base of the perforator 2900 that communicated with the lumen(s). Similarly, FIG. 29B shows a perforator 2920 that has channels 2925 on the outside of the perforator to enable liquid to exit the receptacles along the channels.

Figure 30B:
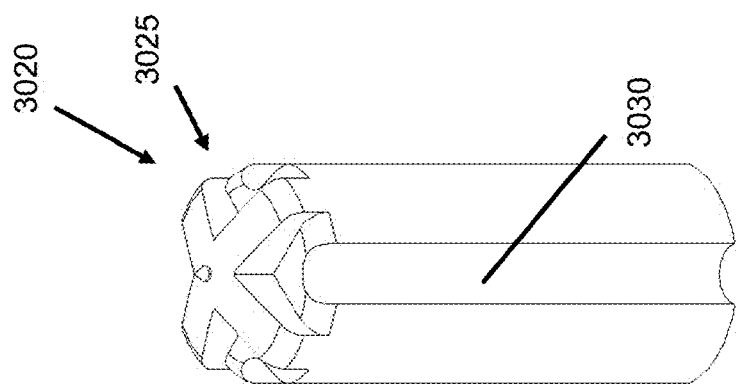
FIGS. 30A-D illustrate various perforators having channels or shapes to permit liquid flow through or past the perforator, according to some embodiments.
Figure 30A:
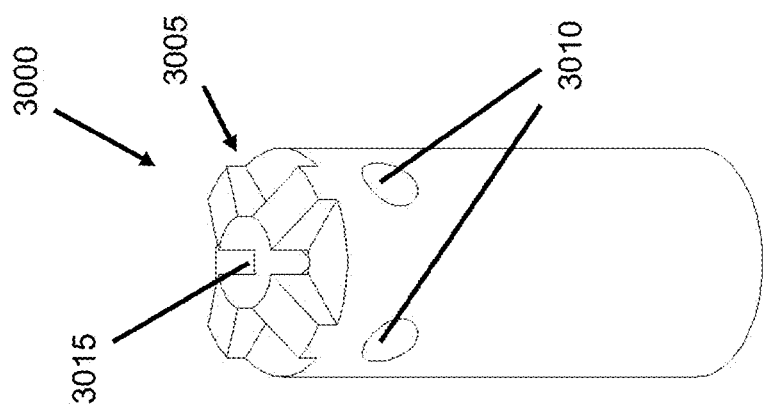
Figure 30D:
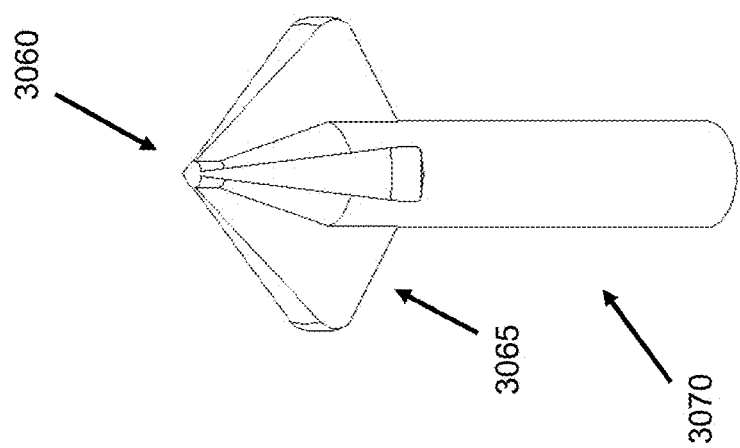
Figure 30C:
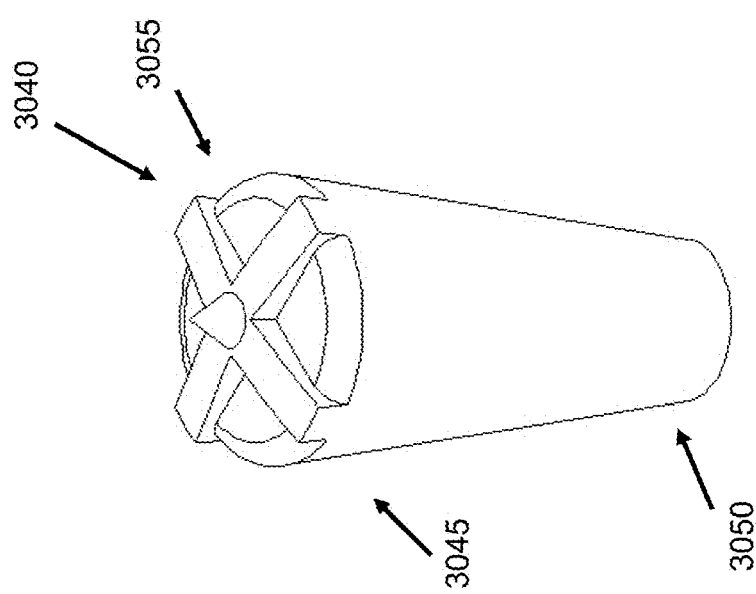

FIG. 30A shows a perforator 3000 that has a cruciform keyed portion 3005, side openings 3010, and a top opening 3015. Side openings 3010 and top opening 3015 communicate with a central lumen that passes through the perforator to a base of the perforator. FIG. 30B shows a perforator 3020 that also has a cruciform keyed portion 3025. Perforator 3020 has channels 3030 along the outside surface of the perforator. FIG. 30C shows a tapered perforator 3040 with a greater dimension at its distal end 3045 relative to the dimension at its proximate end 3050. Perforator 3040 also has a cruciform keyed portion 3055. Such a perforator would create a hole in an end layer of a receptacle that is larger than the proximate portion of the perforator, thereby leaving a flow path around the perforator for liquid to exit the receptacle. Similarly, FIG. 30D shows a perforator 3060 that has a cruciform head portion 3065 that has a larger dimension than a stem portion 3070. The head portion 3065 creates an perforation that is larger than the stem's diameter, creating a flow path for liquid to exit a receptacle. The cruciform portions of the above described perforators are designed to engage cruciform-shaped opening in platforms.

Figure 31:
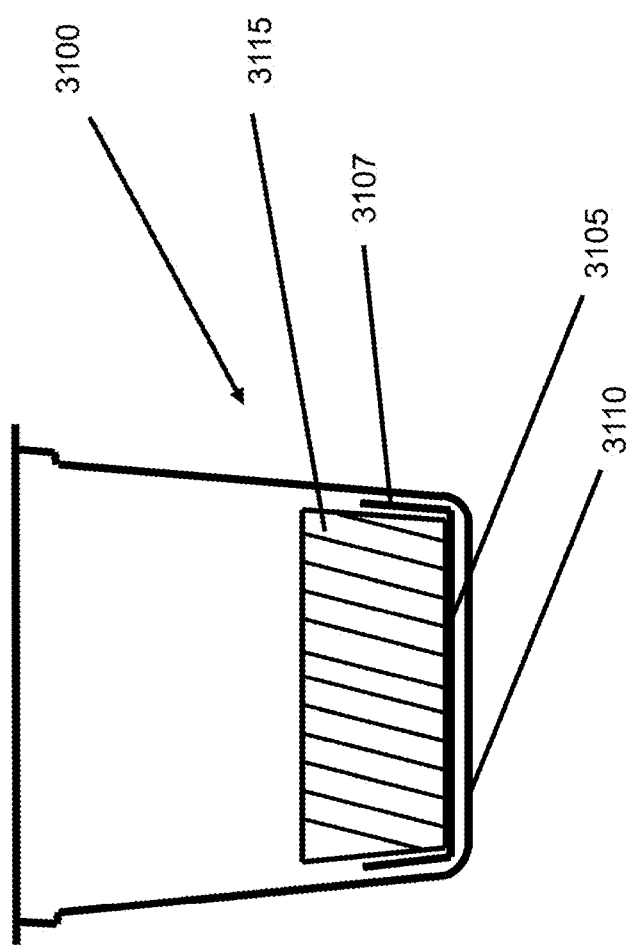
FIG. 31 illustrates a side cross-sectional view of a receptacle with a raised lip, according to some embodiments.

FIG. 31 illustrates a side cross-section view of a receptacle 3100 with an inner platform 3105 that is in the form of a cup with a raised lip 3107. Raised lip 3107 is shown spaced apart from frozen liquid contents 3115 and the side wall of the receptacle for illustration purposes only. In the envisioned embodiments, the raised lip 3107 may contact the receptacle side wall or be spaced apart. Moreover, the frozen liquid contents may contact the interior of the raised lip 3107. Raised lip 3107 may extend only partially along the side of the frozen contents, or the raised lip may extend to the top of the frozen contents or beyond. The platform 3105 is located between an end layer 3110 of the receptacle 3100 and the frozen liquid contents 3115. The platform 3105 is shown spaced apart from end layer 3110 and frozen liquid contents 3115. In some embodiments, the platform 3105 rests on and is in contact with the end layer 3110, and the frozen liquid contents 3115 is in contact with the platform 3105 and, optionally, a portion of the end layer 3110. In some implementations, the raised lip 3107 has an interference fit with the side wall of the receptacle, while still enabling the platform to be displaced from its position near the end layer. In some embodiments, the material of the platform 3105 and/or raised lip 3107 is perforated so as to enable any liquid remaining in the space defined by the platform and raised lip to drain.

Any of the receptacle embodiments disclosed herein can, optionally, possess a coating on the inner surface of the mixing chamber formed by the receptacle to promote ease of release of the frozen liquid content from the inner surface. Considerations for selection of the coating include that the coating must be food safe and not exhibit unacceptable levels of chemical leaching into the frozen liquid contents during storage or into the product during the melting and/or diluting process. Similarly, it must not absorb desirable flavor and aroma compounds or oils from the frozen contents, especially during filling and dispensing operations when the contents are in liquid form. Other factors include that the coating must have a favorable coefficient of static friction, porosity measure, and surface roughness measure so as to reduce the force required to release the frozen liquid contents from the receptacle relative to an uncoated surface. The coating must maintain the aforesaid desirable characteristics under the temperature range to which the receptacle will be exposed (e.g., about −20° F. to about 212° F.) In some embodiments, the coefficient of static friction of the coating ranges from 0.05 to 0.7. In other embodiments, the coefficient of static friction of the coating ranges from 0.3 to 0.4. In other embodiments, the coefficient of static friction of the coating ranges from 0.1 to 0.2. In other embodiments, the coefficient of static friction of the coating ranges from 0.05 to 0.1. In other embodiments, the coefficient of static friction of the coating ranges from 0.08 to 0.3. In other embodiments, the coefficient of static friction of the coating ranges from 0.07 to 0.4. In other embodiments, the coefficient of static friction of the coating ranges from 0.1 to 0.7. In some embodiments, the coating includes one or more of polypropylene, ultra-high-molecular-weight polyethylene, polytetrafluoroethylene, fluorinated ethylene propylene, high-density polyethylene, low-density polyethylene and/or mixtures and/or co-polymers of these materials, e.g., polypropylene/polyethylene mixture.

In one embodiment of the invention, a receptacle having any one of the geometries disclosed herein contains a frozen liquid contents that is sized to permit at least 5 mm of space between the frozen liquid contents and the end layer (bottom) of the receptacle while also maintaining at least 5 mm of space between the frozen liquid contents and the cover layer (top) of the receptacle when the contents are displaced from the end layer. In this embodiment, the frozen liquid contents is further sized to provide a final beverage product at a temperature between about 140° F. and 190° F. when the contents (at 15° F.) are combined with 8 ounces of water at 195° F. Further in this embodiment, the frozen liquid contents has a concentration level so as to produce a coffee beverage having a final product strength of between 1.15 TDS and 1.35 TDS when combined with 8 ounces of water. Still further in this embodiment, the frozen liquid contents (at a temperature between 0° F. and 32° F.) has a hardness level such that force from a dispenser and/or known single serve brewer needle (e.g., a hollow needle of about 2.5 mm outer diameter with about a 4 mm long diagonal pointed section) contacting the contents dislodges it from the inner surface of the receptacle rather than embedding in the contents or displacing only a portion of the contents away from the receptacle's surface. In other embodiments, the spacing between the frozen liquid contents and the top and bottom of the receptacle is at least 7 mm. In still other embodiments, the frozen liquid contents has a concentration level so as to produce a coffee beverage having a final product strength of about 1.25 TDS when combined with 8 ounces of water.

In some implementations, information about the hardness of the frozen liquid content is included in information gathered by dispenser, e.g., by way of QR code, RFID, or the other techniques described herein. The dispenser can use this information to determine whether, when, and where to puncture the receptacle during the product making process. For example, if the dispenser receives information that indicated the hardness of the frozen content is too soft to allow a perforator to dislodge the contents from its position in the receptacle, the dispenser may use a secondary heat source to partially melt the contents before perforating the receptacle in a location corresponding to the contents position opposite the location of perforation. In alternate embodiments, the dispenser has a hardness sensor (e.g., an ultrasonic hardness sensor or other known hardness sensor) that determines the hardness of the frozen contents.

Figure 32:
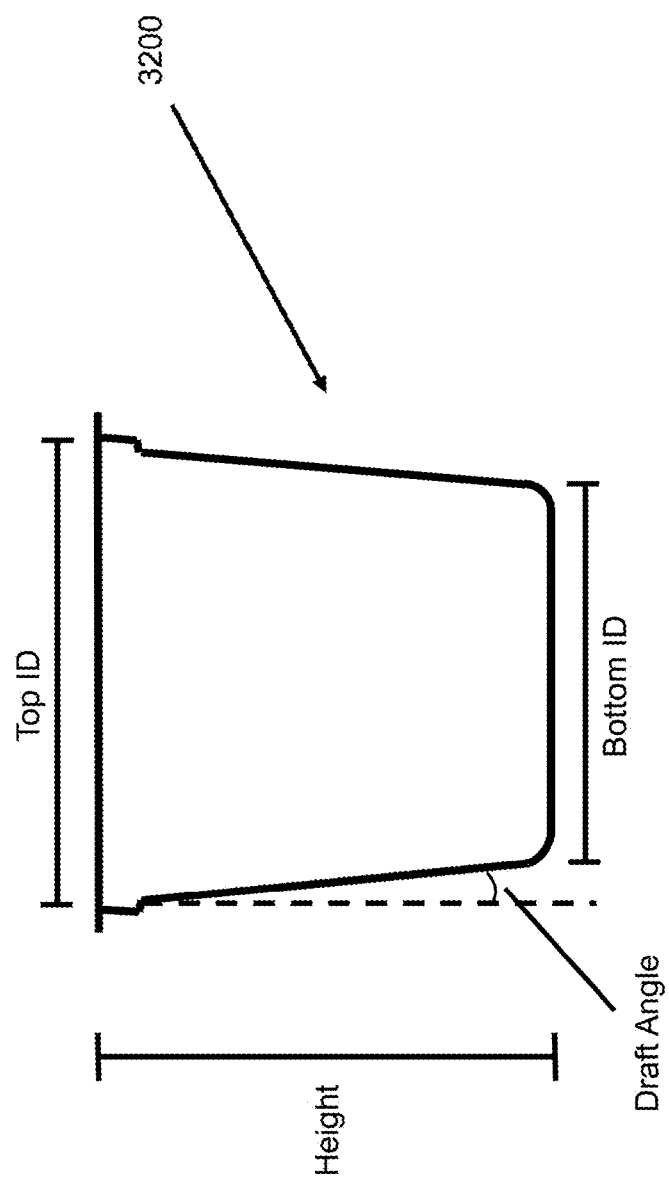
FIG. 32 illustrates a side cross-sectional view of a receptacle, according to some embodiments.

In addition to the receptacle geometry illustrated in FIG. 16, embodiments of the invention include tapered cylindrical receptacles having a profile similar to that of receptacle 3200 shown in FIG. 32 and having heights ranging from 1.65 inches to 1.80 inches, top inner diameters (Top ID) ranging from 1.65 inches to 2.00 inches, draft angles ranging from 4 to 6 degrees, and bottom inner diameters (Bottom ID) ranging from 1.30 inches to 1.75 inches (while maintaining the draft angle within the recited range.) In certain embodiments, the height ranges from 1.70 inches to 1.75 inches, the Top ID ranges from 1.70 inches to 1.95 inches, the draft angle ranges from 4 to 6 degrees, and the Bottom ID ranges from 1.35 inches to 1.70 inches (while maintaining the draft angle within the recited range.) In other embodiments, the height ranges from 1.65 inches to 1.80 inches, the Top ID ranges from 1.75 inches to 1.90 inches, the draft angle ranges from 4 to 6 degrees, and the Bottom ID ranges from 1.40 inches to 1.65 inches (while maintaining the draft angle within the recited range.) In still further embodiments, the height ranges from 1.65 inches to 1.80 inches, the Top ID ranges from 1.80 inches to 1.90 inches, the draft angle ranges from 4 to 6 degrees, and the Bottom ID ranges from 1.45 inches to 1.60 inches (while maintaining the draft angle within the recited range.) In one embodiment, the height is about 1.72 inches, the Top ID is about 1.80 inches, the draft angle is about 5 degrees, and the Bottom ID is about 1.45 inches. Other ranges of these parameters are within the scope of the invention.

Figure 33:
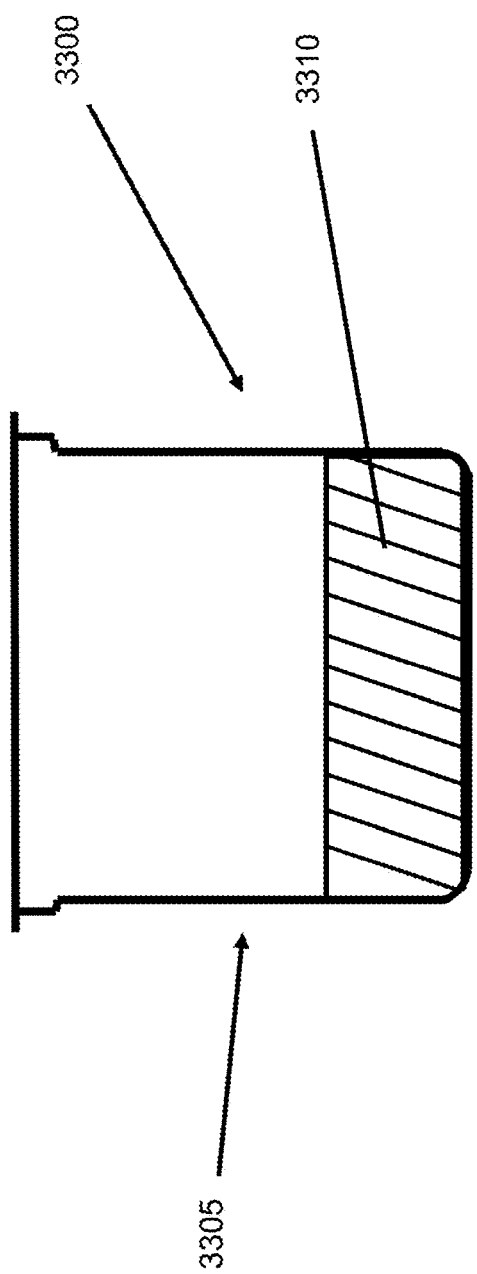
FIG. 33 illustrates a side cross-sectional view of a receptacle, according to some embodiments.

Various embodiments of the receptacles described above disclose a tapered sidewall. However, other embodiments of receptacles have straight sidewalls. FIG. 33 shows a cross-sectional view of a receptacle 3300 with straight sidewalls 3305 that have a uniform diameter from the top end to the bottom end of the receptacle. Embodiments having straight sidewalls can incorporate any of the various platform features described above. When using such embodiments to create a final food or beverage product, a dispenser can at least partially melt the frozen contents 3310 in order to provide a flow path from an inlet near the top of the receptacle, past the frozen contents, to an outlet near the bottom of the receptacle.

Figure 34:
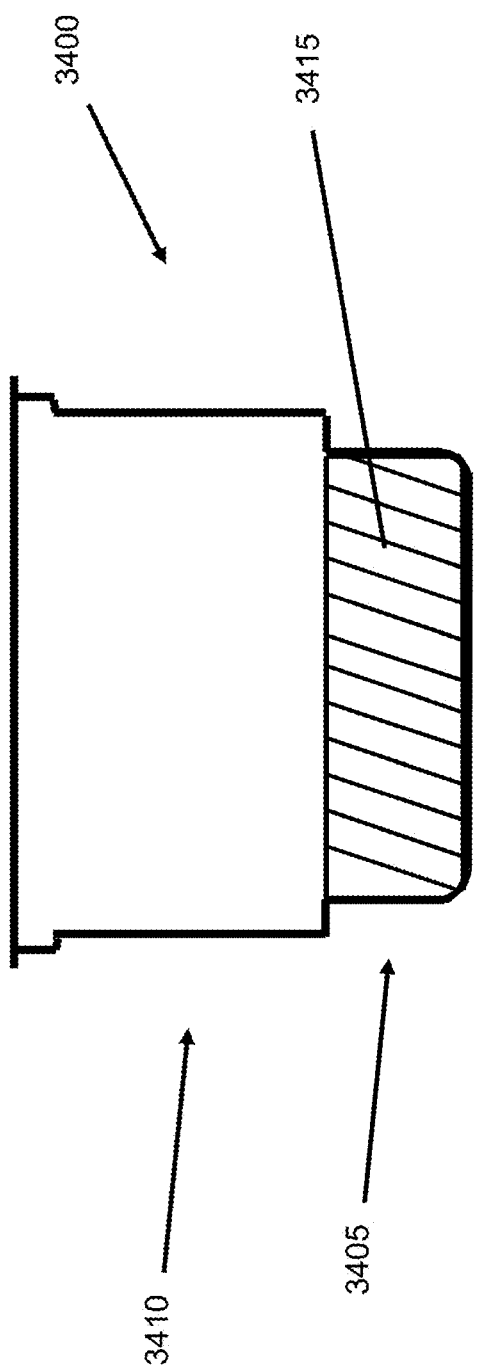
FIG. 34 illustrates a side cross-sectional view of a receptacle, according to some embodiments.

FIG. 34 shows a cross-sectional side view of a receptacle 3400 with a first straight sidewall section 3405 and a second straight sidewall section 3410. First sidewall section 3405 has a smaller diameter than second sidewall section 3410 such that when the frozen content 3415 is displaced, e.g., by an outlet perforator, a flow path through the receptacle is created. A platform with a raised lip, such as the embodiment shown in FIG. 31, can be used with receptacle 3400 to assist in displacing the frozen contents from the first sidewall section 3405 as described in more detail above. In such an embodiment, the raised lip of the platform can conform to the lower straight sidewall section 3405, or the raised lip of the platform can be displaced from the inner surface of the sidewall.

The following non-limiting examples are provided for illustrative purposes only. Other receptacle sizes and other frozen liquid contents remain within the scope of the invention.

EXAMPLE 1

Coffee Beverage

In one embodiment of the invention, a filterless single chamber mixing receptacle contains a frozen liquid contents. The receptacle has a profile similar to that shown in FIG. 32 and has a height of about 1.72 inches, a Top ID of about 1.80 inches, a draft angle of about 5 degrees, and a Bottom ID of about 1.45 inches. The receptacle is sealed on top with a perforable layer and the end layer is perforable (e.g., by a dispenser/brewer needle, such as, but not limited to, the needles described above). The frozen liquid contents is a concentrated coffee extract that is in contact with substantially the entire end layer and a portion of the sidewalls.

In order to produce a final coffee beverage product having a TDS of between 1.15% and about 1.35% TDS (with an optional target of 1.25% TDS), the frozen liquid contents, at 15° F., is melted and diluted with eight ounces of water at 195° F. Table 1 shows several alternative implementations of the frozen liquid contents of this embodiment as well as the impact on various parameters of varying the amount of frozen liquid contents and degree of concentration of the contents.

the contents from the end layer. Thus the contents can be further restricted to a height of between about 0.5 and about 0.1 inches, thereby having a corresponding degree of concentration of between about 60% and about 20% TDS. Doing so increases the headspace and empty volume relative to the previous example, which is expected to improve melting and mixing given the increased ratio of water in the mixing chamber relative to the frozen liquid contents.

It may be desired to limit the range of degree of concentration of the frozen liquid contents to no more than 35% TDS. For example, to conserve energy, as creating relatively frozen liquid contents with higher degrees of concentration consume more energy to produce than those with relatively lower degrees of concentration and may require secondary processing such as by reverse osmosis removal of water during the extraction process. In such a case, the frozen liquid contents possesses a weight of about 0.30 to about 0.5 ounces, leaving a headspace of between about 1.2 and about 1.45 inches with an empty volume of about 73% to about 85%.

EXAMPLE 2

Espresso Beverage

In another embodiment of the invention, a filterless single chamber mixing receptacle contains a frozen liquid contents. The receptacle has a profile and dimensions that are the same

TABLE 1

| Contents Volume ($in^3$) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 0.3 | 0.18 | 0.13 | 1.57 | 91 | 57 | 67 | 188 |
| 0.5 | 0.30 | 0.25 | 1.45 | 85 | 35 | 41 | 183 |
| 0.7 | 0.42 | 0.37 | 1.33 | 79 | 25 | 29 | 178 |
| 0.9 | 0.54 | 0.49 | 1.21 | 73 | 20 | 24 | 175 |
| 1.5 | 0.90 | 0.81 | 0.89 | 56 | 12 | 14 | 162 |
| 2.0 | 1.20 | 1.07 | 0.63 | 41 | 10 | 12 | 153 |
| 2.9 | 1.74 | 1.49 | 0.21 | 14 | 7 | 8 | 137 |

As shown in Table 1, in order to keep the coffee beverage temperature above 140° F. (e.g., to accommodate the addition of milk or cream while maintaining a beverage temperature above 120° F.), the frozen liquid contents weight is between about 0.15 and about 1.2 ounces at a degree of concentration of between about 60% TDS and about 8% TDS (where smaller contents require higher concentration). When included in the receptacle, the length of the empty space above the frozen liquid contents and below the top layer (i.e., headspace) is between about 0.6 and about 1.6 inches, which yields an empty space volume of between about 41% and about 91%.

Applicants have discovered that maintaining a frozen liquid contents height of about 0.5 inches or less from the end layer of the receptacle increases the ease of release of as the one described in Example 1. In this example, the frozen liquid contents is also a concentrated coffee extract that is in contact with substantially the entire end layer and a portion of the sidewalls.

In order to produce a final espresso beverage product having a TDS of between about 9.15% and about 9.35% TDS (with an optional target of about 9.25% TDS), the frozen liquid contents, at 15° F., is melted and diluted with sufficient water at 195° F. to yield a dispensed volume of four ounces (sometimes described as a double espresso). Table 2 shows several alternative implementations of the frozen liquid contents of this embodiment as well as the impact on various parameters of varying the amount of frozen liquid contents and degree of concentration of the contents.

TABLE 2

| Contents Volume ($in^3$) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 1.0 | 0.64 | 0.54 | 1.16 | 70 | 58 | 68 | 145 |
| 1.1 | 0.70 | 0.60 | 1.10 | 67 | 53 | 62 | 140 |

TABLE 2-continued

| Contents Volume (in³) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 1.2 | 0.76 | 0.65 | 1.05 | 64 | 48 | 56 | 134 |
| 1.3 | 0.83 | 0.71 | 0.99 | 61 | 45 | 53 | 128 |

Similar results can be obtained by using other receptacle designs disclosed herein with the various implementations of the frozen liquid contents set forth in the Tables 1 and 2 and as described in the accompanying descriptions above. Thus, the scope of the invention is not limited to the use of the specific implementations of frozen liquid contents in the receptacles with the profile as shown in FIG. 32.

As discussed throughout the description, embodiments of the invention provide many benefits. For example, because the receptacles are single chamber mixing vessels, the receptacles do not retain filter material, spent coffee grinds, used tea leaves, or other materials that prevent the receptacles from being easily recycled as a single stream. Moreover, by providing a frozen liquid contents that is created by an extraction process, the byproducts, such as coffee grinds, are maintained at a central facility, which can be more readily recycled or reused (such as a source of biomass energy and/or sustainable soil nutrients.) Further still, a much greater variety of final products can be supported through the use of frozen liquid contents, as described in more detail above. Thus, it is understood that frozen liquid contents having higher or lower TDS values than those given in the illustrative examples above are within the scope of the invention. Further examples include TDS values between 0.5 TDS and 68% TDS, including ranges of 1% TDS to 68% TDS, 2% TDS to 68% TDS, 3% TDS to 68% TDS, 4% TDS to 68% TDS, and 5% TDS to 68% TDS.

Also as discussed through the description, embodiments of the invention provide for automated systems and techniques for producing a wide variety of liquid food and beverage products based on information about the source materials (e.g., frozen liquid contents, dilution liquids, etc.) as well as information about the final product itself (e.g., desired volume, temperature, etc.). Further illustrative embodiments of systems and techniques for producing such products follow below. Aspects of these embodiments can be combined with any of the other aspects set forth above and remain within the scope of the invention.

Figure 35B:
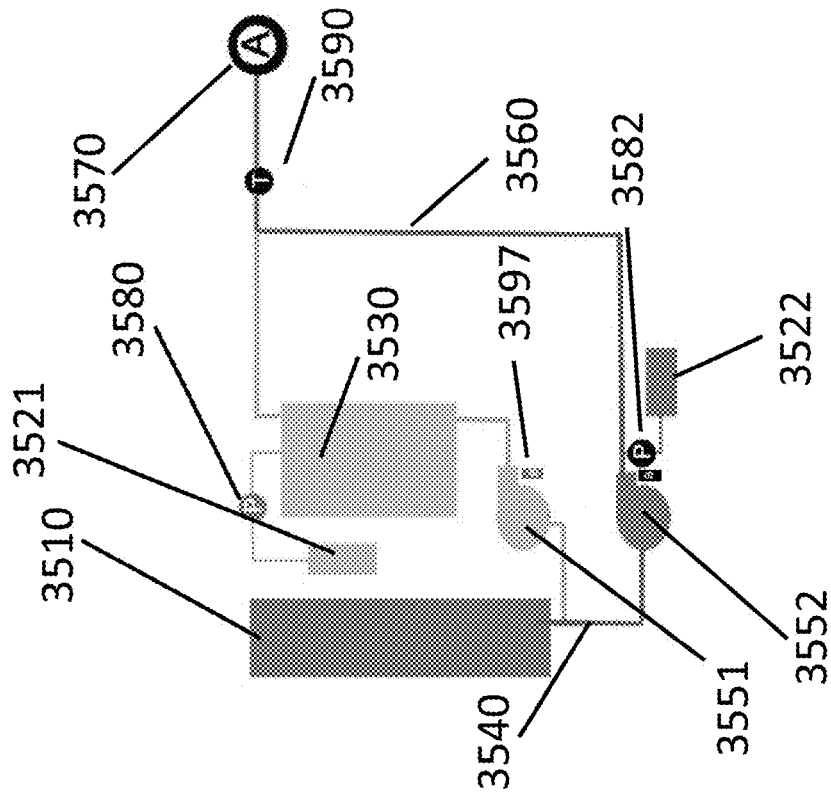
FIG. 35A-B illustrate portions of a dispenser system, according to some embodiments.
Figure 35A:
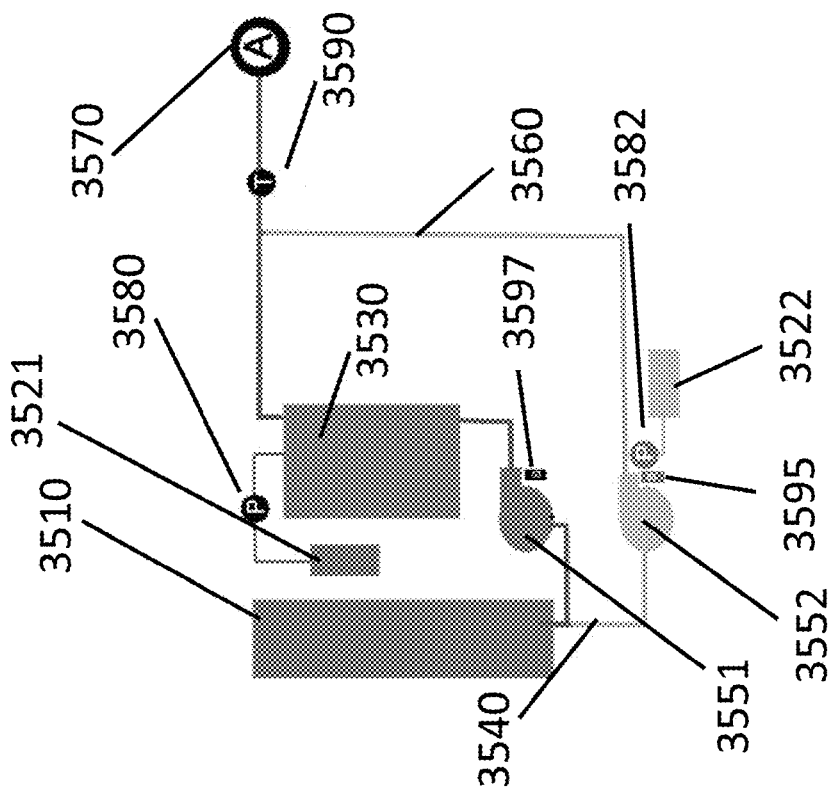
Figure 36B:
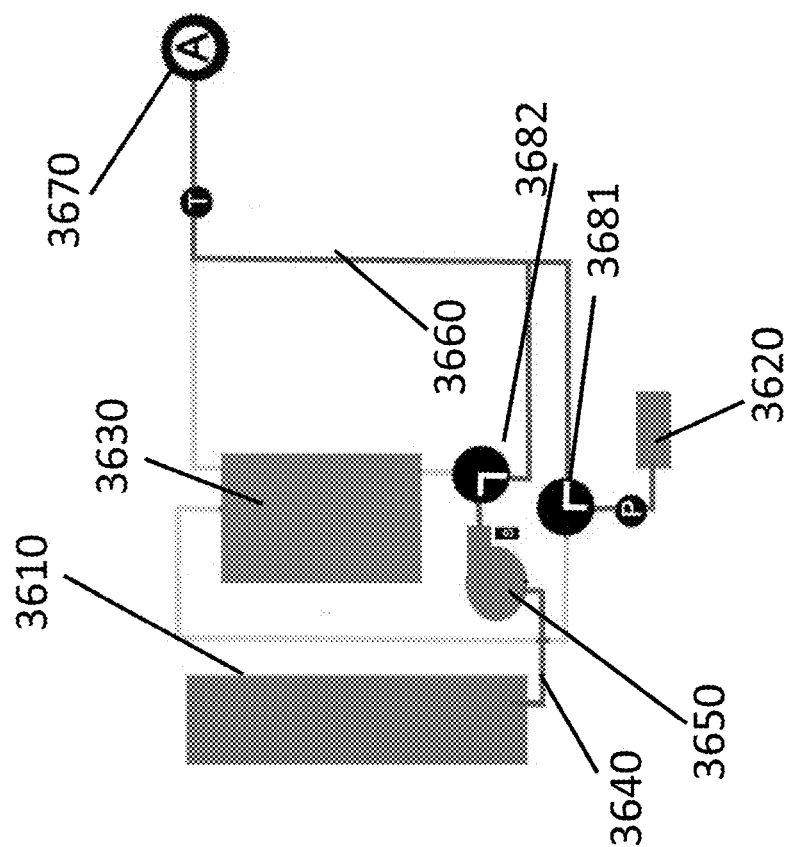
FIG. 36A-B illustrate portions of a dispenser system, according to some embodiments.
Figure 36A:
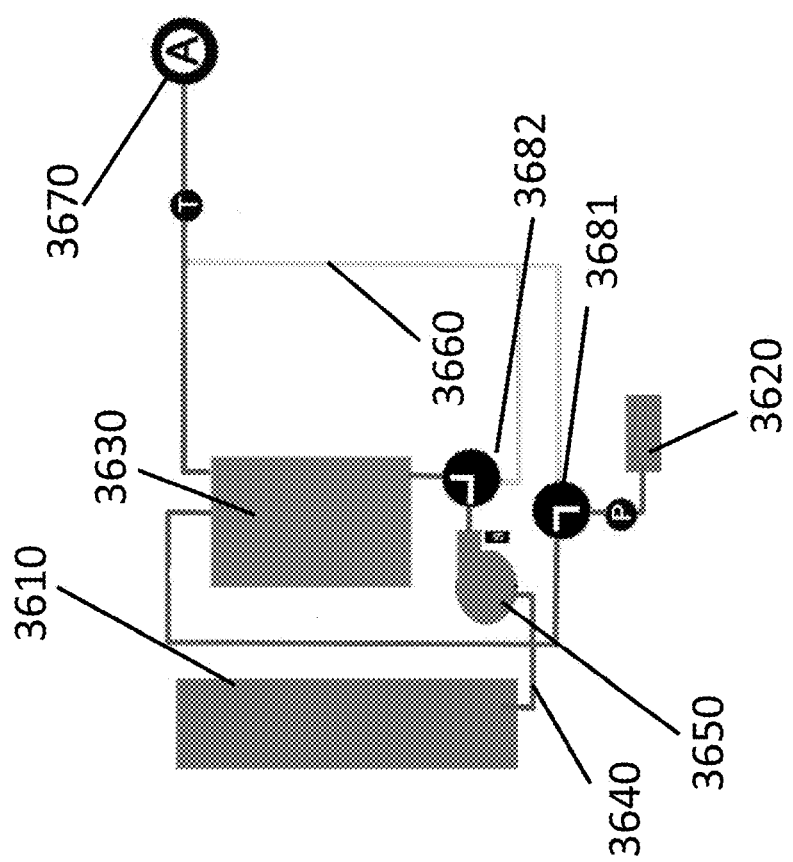

Referring to FIGS. 35A, 35B, 36A and 36B, two different embodiments of portions of a dispenser for creating liquid food and beverage products are shown. As noted above, portions of the dispenser include equipment, sensors, controls, etc. needed to store, optionally heat, and deliver liquid to a dispenser head (an inlet to supply liquid into a receptacle) as metered amounts of liquid in a set periods of time depending on the product being dispensed. In the following examples, water is used as the dilution liquid. A metered amount of water within a set temperature range is passed into the dispenser head in either continuous flow, pulsed or separated into volumes of water between air pulses. At the conclusion of the dispensing, air is blown through the lines to the dispenser head to purge the air/water lines and deal with residual water, thereby reducing sanitation issues. FIGS. 35A and 35B represent one embodiment in which separate fluid pumps 3551 and 3552, and separate air pumps 3521 and 3522, are used to route the dilution fluid (e.g., water) from the primary storage reservoir 3510 either through the heater 3530 or directly to the dispenser head via transfer point A 3570. FIGS. 36A and 36B represent a different embodiment in which only one pump fluid pump 3650 and one air pump 3620 are used with diverting valves 3681 and 3682 employed to control whether the fluids go through the heater 3630 or directly to the transfer point 3670.

FIG. 35A illustrates the case in which fluid pump 3551 and air pump 3521 are active, taking fluid from reservoir 3510 and pumping it through heater 3530 such that the fluid arrives at the transfer point A at some temperature greater than that in the reservoir. Air pump 3521, when activated, purges the heater 3530 and the air lines leading to point A 3570.

FIG. 35B illustrates the case in which fluid pump 3552 and air pump 3522 are active, taking fluid from reservoir 3510 and delivering it to point A 3570 at the same temperature as while stored in the reservoir 3510. In some embodiments it is possible to combine the operations shown in FIGS. 35A and 35B at different times during the product generation/dispense cycle such that the final beverage temperature can be tailored to meet the users expectation. As an example, for a cold beverage selection such as orange juice, it may be desirable to dispense a small amount of hot water at the beginning of the cycle to slightly warm the frozen contents in the receptacle and create a clear exit path for fluids to the receptacle exit. Then, to avoid producing an overly warm beverage, the balance of the dispense cycle is conducted using ambient temperature water directly from the reservoir with the expectation that this water will be somewhat cooled by the process of melting the remaining frozen contents in the receptacle. The air pumps 3521 and 3522 can be activated during dispense of water to increase cavitation/turbulence in the receptacle. Once the dispense cycle is complete, at least through the point that the consumer removes the beverage from the dispenser, a final portion of hot water may be passed through the system to clean various components in the dispenser head. This cleaning purge of hot water could then be followed by short air purges from both air pumps 3521 and 3522 to clear the lines. In some embodiments, this cleaning water is directed to a drip tray where it either evaporates or is periodically emptied by the user.

FIG. 36A illustrates a case where diverting valve 3682 is configured to divert fluid from the reservoir 3610 to heater 3630 and on to transfer point A, item 3670. Meanwhile, diverting valve 3681 is also configured to send air to heater 3630.

FIG. 36B illustrates a case where diverting valve 3682 is configured to divert fluid from the reservoir 3610 directly to transfer point A 3670. Meanwhile, diverting valve 3681 is also configured to send air to directly to transfer point A 3670.

For some embodiments, reservoir 3510 contains an unheated fluid that may be at ambient/room temperature or may contain a chilled fluid, even one such as water containing ice cubes. For some embodiments heater 3530 is an electrically heated vessel similar to those well known in the art for quickly heating small volumes of fluids. Heater 3530 may or may not be pressure rated and suitable for creating steam instead of hot liquid water. In some implementations, reservoir 3510 is insulated from heater 3530, e.g., to prevent the heater 3530 from heating the liquid in reservoir 3510. Although not shown, certain implementations of the dispensers include a filter disposed in the flow path of liquid exiting the reservoir. Similarly, a water conditioner, e.g., a water softening device, can be included in the flow path of liquid exiting the reservoir. In some embodiments, the reservoir is removable.

For some embodiments, pumps 3550, 3551 and 3552 are constant displacement pumps, e.g., piston pumps or peristaltic pumps or even dual lobe pumps. For some embodiments, pumps 3550, 3551 and 3552 are combined with a flow sensor for measuring and controlling the rate of flow as well as the absolute volume of the flow. Any of these pumps can be an axial or centrifugal pump that does not pump a constant volume over time or per revolution, but instead are controlled in a closed-loop process to deliver a measured amount of fluid as measured by the flow sensor. In some embodiments valves 3681 and 3682 are 3-way ball valves well known in the art. In some embodiments valves 3681 and 3682 are multi-port solenoid valves also well known in the art. In some embodiments valves 3681 and 3682 are motorized compression valves. In some embodiments pressures sensors 3580 and 3582, temperature sensors 3590 and stroke sensors for some pumps 3595 and 3597 are used to provide system performance information back to the controller for use in various feedback algorithms to keep the system operating as required to dispense a fluid in the right volume and at a preferred temperature to yield a final beverage that satisfies the user's preferences. In some embodiments the pressure sensor information is used to adjust the stroke of the pumps to fine tune the dispensed liquid for either system, hot or cold.

One beneficial aspect of embodiments of the dispenser is the system for supplying secondary (non-diluting) thermal energy to the receptacle and its frozen contents to help manage the final average temperature of the dispensed food or beverage product. As described herein, techniques for adding thermal energy can include direct conduction through the sidewall of the receptacle from an electrically heated or water heated collar, impingement of hot gases, air, or steam against the outside of the receptacle, use of various forms of electromagnetic energy that can heat either the receptacle or directly heat the frozen contents. Some examples of the latter include infrared irradiation, RF heating, microwave heating, and the like. FIGS. 37A-39B show three illustrative embodiments of portions of a dispenser system, illustrating how this secondary (non-diluting) metered thermal energy can be combined with (a) melting/diluting fluids delivered through transfer point A 3570 described above, (b) different forms of agitation to help expedite liquefaction of the frozen contents, and (c) different strategies for holding and perforating the receptacles to allow for venting, fluid addition, draining, and heating/melting using heated needles/perforators. To be clear, the characterization as these sources of heat as "secondary" does not require that the heat be applied second in time to another heat source or that the secondary heat source supplies less heat than some other source of heat. The term "non-diluting" describes a heat source that does not supply a dilution liquid to the interior of the receptacle as a way of heating the frozen contents.

FIGS. 37A-E illustrates one embodiment, among many possible, wherein a system for impinging hot air against the receptacle provides the secondary (non-diluting) thermal energy. In this exemplary system, a variety of different technologies are combined to create the overall system used for melting, diluting and dispensing the frozen contents within the receptacle into a beverage of desirable potency and volume satisfactory to the user. One skilled in the art will recognize that the various technologies illustrated in FIGS. 37A-E and throughout the other illustrations that follow can be combined in many different variations and combinations to realize the same objective. In some embodiments, the receptacle is first scanned to determine the nature of its contents using some type of optical sensor 3705. In some embodiments, a successful scan (e.g., the system recognizes the receptacle as acceptable via the scanned information) causes drawer 3703 to open so the receptacle cavity 3706 can be filled with the user's receptacle of choice 3704. In some embodiments, the user initiates the continuation of the dispense cycle by pushing a button, reengaging the drawer with the dispenser housing, or some other step to positively indicate a decision to proceed. In certain implementations, the dispenser has a lock that engages after the drawer 3703 is closed so that the drawer 3703 cannot be reopened until the dispenser completes the dispense cycle or otherwise unlocks the drawer.

In some embodiments, upon this signal, drawer 3703, supported by some structural elements 3710 in the dispenser slides closed. In some embodiments a mechanism such as plate 3707 is driven down onto the top of the receptacle to reinforce the receptacle lid against leakage and to puncture the lid with a liquid dispensing needle. In some embodiments, either before the start of agitation and addition of a diluting liquid or simultaneously with these steps, some amount of thermal energy is added to the receptacle 3706 to warm or partially or fully melt the frozen contents. In some embodiments this thermal energy is supplied by air blown by a fan 3701 through a duct 3702 and over a heater 3700. In some embodiments, the heater 3700 is electrically heated. In some embodiments the heater 3700 is a water-to-air heat exchanger using hot water from the heater tank (item 3530 in FIG. 35A) or some secondary heater (not shown). In some embodiments the heater 3700 is an element of a thermoelectric device that can be used to cool the receptacle or the cavity at some point later in the cycle or after the cycle to remove excess heat (e.g., a Peltier cooler and/or heater).

The effectiveness of hot air heating will be greatly enhanced if the sides of the receptacle are directly impinged by the hot air. Accordingly, in some embodiments, cavity 3706 is an open or porous structure which allows much or all of the sidewalls of receptacle 3704 to be directly contacted by the impinging air. For example, the cavity may consist solely of a collar which captures the uppermost portions of the receptacle sidewalls or stacking ring and does not extend downward in any way to shield the receptacle from the flow of air. In some embodiments, as noted above, either in conjunction with the addition of secondary thermal energy or later in the cycle in conjunction with the addition of a dilution fluid (e.g., water), some level of agitation of the receptacle and the frozen contents inside is initiated to increase the number of collisions between the dilution liquid and the frozen contents, break up any stagnant layers of diluting liquid, etc. to hasten the liquefaction of the frozen contents. In some embodiments, this agitation is caused by motor 3708. In some embodiments the agitation is rotary 3712. In some embodiments the rotation is reciprocating with either large motions (e.g., 90-120° in one direction before reversal and then repeated) or small motions (e.g., vibratory or <<90°). In alterative implementations, a solenoid is used to impart agitation.

In some embodiments, in conjunction with the agitation or before agitation begins, a melting/diluting liquid is added to the receptacle. This liquid is delivered from the portions of the dispenser described above via transition point A 3570. In some embodiments, this melting/diluting liquid is delivered directly from the water reservoir and arrives at approximately its original temperature in the reservoir. In some embodiments, this melting/diluting liquid is passed through a heater tank en route to transition point A. In some embodiments, in conjunction with the addition of melting/diluting liquids, the bottom of the receptacle 3704 is punctured with a second needle or perforator 3709 so the melted liquids can drain into the user's cup 3714. In some embodiments, once the dispense cycle is finished and almost all of the melting/diluting liquid has drained from the receptacle, having fully melted the frozen contents and washed the inside of the receptacle clean, drawer 3703 reopens and receptacle 3704 can be removed and discarded 3716. Optionally, before the draw reopens, the system can cool the receptacle by forcing ambient, or cooled, air through the duct 3702 into contact with the receptacle 3705.

As noted elsewhere in this description, agitation of the frozen liquid contents is an efficient means for increasing its rate of liquefaction. Regardless of the exact mechanism from a fluid dynamics perspective, whether that be breaking up boundary layers between solids and the heating liquid, increasing relative velocity between the two, the increased incidence of physical contact between solids, or even the small amount of kinetic energy converted to heat, the observed results are clear. Melting of the frozen contents occurs much faster with agitation than without.

In some embodiments this agitation takes the form of vibration or very small amplitude oscillatory movement of the contents. Systems and techniques for mechanically inducing vibration are well known in the art, including magnetic excitation of materials, supplying a varying electrical signal to piezo-electric components, and use of an off-center weighted rotating discs.

While vibratory-level oscillation is more effective than no agitation, the efficiency of liquefaction increases with the amplitude and energy level of the interaction between solid (frozen or partially frozen) components and the melting/diluting liquid. In some embodiments, this larger amplitude agitation is induced by mechanical or fluidic forces. Mechanical forces include imparting relatively larger angle rotations of the cavity and/or the receptacle, typically motor driven, either through a direct axial connection or through a belt, gear or friction drive arrangement. Asymmetric oscillation, wherein the clockwise and counterclockwise amplitudes of rotation about a neutral point are unequal over short periods of time has proven especially efficient as it prevents the creation of regular patterns, standing waves, etc. with a resulting increase in the local chaotic nature of the fluid. Multi-rotation motion, i.e., spinning complete revolutions for several seconds in one direction and then the other is also useful. This motion creates less chaotic movement of the fluid, but may introduce opportunities for preferentially directing the centrifugally driven fluids.

In some embodiments the driving motors for mechanical agitation are DC driven motors that are driven by the magnitude and polarity of the DC voltage fed to them by the controller, sometimes through a special motor power supply optimized for the particular motor. In some embodiments the driving motors are stepper or servo motors that can be more precisely programmed to execute specific patterns of motion and can be used, if keying features are incorporated into a receptacle and cavity, to return the keyed feature to a specific location for loading, unloading, scanning, and the like.

In some embodiments, as described above, melting/diluting fluids are injected into the receptacle tangentially once a small liquid bearing interface has been melted between receptacle inner surface and frozen contents. This liquid is injected for the purpose of causing the frozen contents to spin inside the receptacle for faster liquefaction of the frozen contents. In some instances, the volume of the melting/diluting fluid that can be added to the receptacle is limited and unavailable to keep the frozen contents spinning long enough to achieve the desired level of melting. In some embodiments, an alternative technique to cause the frozen contents to spin is the injection of compressed air or other gas through the needle such that this gas impinges upon the frozen contents near its outer diametric edge in a tangential direction. In some embodiments this gas is developed/compressed and stored in an appropriate vessel inside or proximate to the dispenser prior to when it is needed using mechanical or chemical means as are well known in the art, e.g., mechanical pumps or chemical reactions known to produce a gas.

In some embodiments a mechanical or chemical means of producing a gas continuously at the required pressure is used to supply the injection needle. For example, a larger pump could be used. In some embodiments the flow of this gas to the injection needle is timed and controlled by the dispenser system controller and coordinated with the flow of melting/diluting liquid through the same or a separate needle, before or after the injection of gas, or interspersed with the gas. For example, a small amount of liquid could be injected, followed by a burst or prolonged stream of gas, followed by more liquid, and so on, until the planned cycle is complete.

Fluid-based techniques of inducing agitation take advantage of the low friction coefficient that exists between frozen contents within the receptacle and the receptacle walls once a thin film of liquid has been melted between the two surfaces creating a liquid bearing interface. Under this circumstance, it is possible to use steady or pulsed flows from the injection needle, directed tangentially near the sidewall of the receptacle, to cause the frozen contents to begin to spin. Fluid induced agitation is particularly attractive in its reduction of mechanical complexity and cost within the dispenser. These benefits must be weighed against the loss of process control flexibility and limits imposed by the amount of melting/diluting fluids that may be available for some types of beverage or food receptacles. In some embodiments a long needle passes fully through the receptacle and the frozen contents and remains in place as a drip guide for the contents or the dilution fluids exiting the receptacle to the user's cup or dispenseware. In some embodiments this needle is shaped like a bayonet and is electrically heated to facilitate its passage through the frozen contents. Once the needle is in place, extending through the lid and closed end of the receptacle, a second needle is introduced into the receptacle and begins to inject a fluid tangential to the diametric curvature of the sidewalls of the receptacle to induce the frozen contents to spin within the stationary receptacle utilizing the thawed contents as a lubricant to spinning. In some embodiments the stationary receptacle is externally heated before and/or during the puncturing with the bayonet and introduction of fluids as a means for increasing the entropy of the system and facilitating liquefaction. The contents, as it melts, flows past the bayonet and drips off its lowermost tip. In some embodiments the last of the frozen contents melts before all of the diluting liquid has been injected, allowing a clean cup to be removed from the dispenser once the needle/bayonet is withdrawn.

FIGS. 38A-E illustrates another system and technique by which the receptacle can be captured in the dispenser and the frozen contents melted, diluted and dispensed. Because many of the features of this alternative system are similar to what was just described in connection with FIGS. 37A-E, further explanation will focus on the alternative technique for adding secondary (non-diluting) thermal energy. In some embodiments, as shown in FIG. 38, a receptacle is scanned (FIG. 38A) and inserted into a chamber 3801. The receptacle 3804 is held by a closely matched conical surface 3806 of the chamber. As an analogy which will be readily understood by one knowledgeable in the art, the mating tapered sidewall surfaces of the receptacle and the heater are ideally in contact much the same way that a machine tool and a holding chuck, both machined with matching Morse Tapers, are in intimate contact. In some embodiments the external matching surface 3806 is a part of an electrical resistance heater 3800 which may be controllably heated to a desired temperature, e.g., 195-205° F. (below the boiling point of the frozen contents once melted).

As with the previous example involving hot air, in some embodiments this heater 3800 can be activated for a period of time calculated by the dispenser controller using knowledge about the frozen contents gained from the initial scan and various on-board sensors. This period of time may be designed to warm, partially melt or fully melt the frozen contents depending on the desired final dispensed beverage/food temperature and planned volume. For this heating process, especially if the intent is to partially melt the frozen contents, knowledge of the freeze/thaw temperature of the frozen contents is needed. This information, which can be gathered from scanning the receptacle 3804, as described elsewhere herein, is used within a temperature feedback loop control. The nominal freeze/thaw point may also be estimated based on knowledge of the contents of the frozen contents (% water, % sugar, % fat, % protein, etc.). As described above in connection with FIGS. 37A-E, the receptacle can be agitated before, during, or after heating, and the liquid food or beverage product is dispensed (FIG. 38D). FIG. 38E shows the removal of the empty and cleaned receptacle 3804. Although not shown in the figures, the close-fitting relationship between the receptacle and the inner surface of the chamber could be achieved by submersing the receptacle in a heated liquid bath.

Figure 39A:
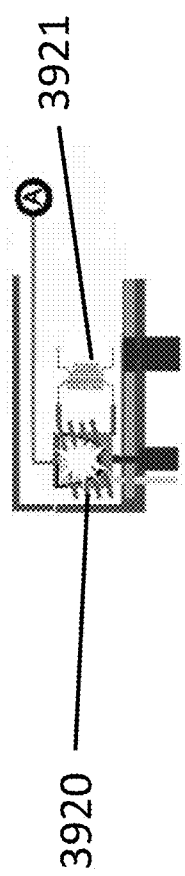
FIG. 39A-B illustrate portions of a dispenser system, according to some embodiments.

FIG. 39A illustrates the use of a radio frequency (RF) coil to provide the source of secondary thermal heat to the receptacle using otherwise a similar process as described for the embodiments shown in FIGS. 37A-E and 38A-E. In some embodiments, a power supply 3921 sends a high frequency electrical current to coil 3920. The oscillating electrical field is known to interact with ice, but with substantial dielectric losses that convert to heat. Oscillation frequencies in the range of 3 MHz have been shown to be particularly efficient in this heating process. As in the other illustrations presented herein, this secondary heat is managed by a micro-controller within the dispenser to coordinate the timing, duration and power with other events throughout the melting/diluting/dispensing cycle including agitation, addition of fluids inside the receptacle, and the schedule of different needle punctures.

Figure 39B:
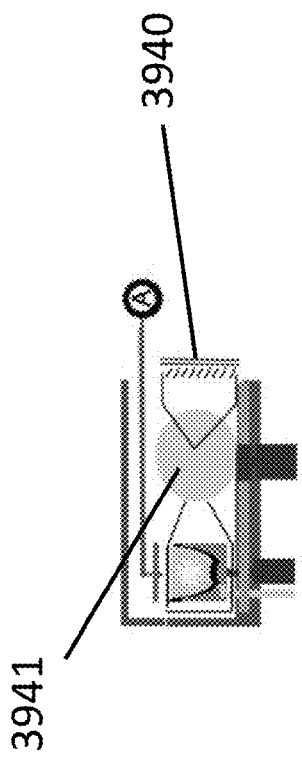

FIG. 39B illustrates the use of electromagnetic energy as a secondary heat source to heat the frozen contents. In one implementation, microwave energy is used. One knowledgeable in the art will recognize that the magnetron used to supply high frequency electromagnetic energy can be designed to develop frequencies from the low megahertz range to the gigahertz range. In an illustrative example, a power supply 3940 feeds a magnetron (alternating electrical frequency generator) 3941 to deliver a beam of energy to the receptacle. In some operating scenarios, the electromagnetic heating cycle is started before the receptacle is punctured by one or more needles. In other scenarios, the electromagnetic heating cycle is started after the receptacle is punctured by one or more needles. In some use cases, the initial puncture of the receptacle is managed to simply provide a small vent such that any vapor or steam created by the secondary heating process is able to escape the receptacle without any significant pressure buildup. In some embodiments, the receptacle is held within the dispenser cavity with its axis of symmetry oriented vertically during heating, dilution and agitation. In this instance, the electromagnetic energy is directed into the receptacle through the sidewalls of the receptacle. In some embodiments, the receptacle is held within the dispenser cavity with its axis of symmetry oriented horizontally during heating, dilution and agitation. In this instance, the electromagnetic energy is directed into the receptacle through the lid or closed end of the receptacle. In some implementations, in which the receptacle material is aluminum, some other metal or otherwise conductive, a "window" in the lid or the closed end of the receptacle (depending on which side faces the emitter) is produced from a material that is more transparent to the frequency of the energy being used. In some embodiments this window is a circular or rectangular patch (to match the shape of the emitter or receptacle) that is thermosealed over a hole in the closed end of the receptacle or a hole in the aluminum lid. In some embodiments the entrance and exit needles are shielded by ground planes.

Figure 54:
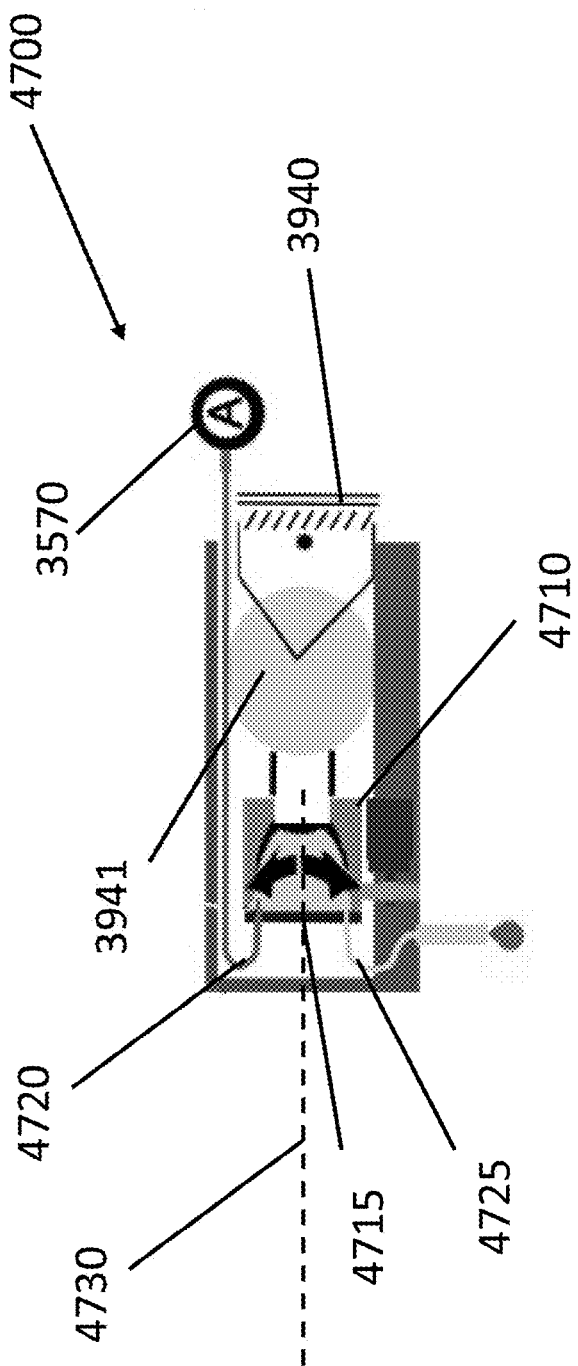
FIG. 54 illustrates portions of a dispenser system, according to some embodiments.

FIG. 54 illustrates a portion of a dispenser 4700 with a chamber 4710 that holds a receptacle 4715 in a horizontal position rather than a vertical position as shown in other embodiments. A dilution liquid inlet 4720 perforates the top of the receptacle (which may be covered in a metallic foil) at a position above the location at which a product outlet 4725 is formed in the top of the receptacle. In one implementation (shown by arrows), the chamber provides agitation about central axis 4730 of the chamber 4710. In an alternate implementation, the dispenser provides agitation along the central axis 4730. Tubing joining the dilution liquid inlet 4720 to transfer point A 3570 and/or tubing joining product outlet 4725 to the ultimate product outlet is flexible to accommodate motion imparted to the receptacle.

In one embodiment of the invention, a radio frequency (RF) dielectric heating system provides secondary heat (i.e., non-diluting heat) to the receptacle and/or the frozen liquid contents in the receptacle. In one implementation, the process use a high frequency electrical signal, e.g., in the range of 6-42 MHz, to cause rapid vibration of the water molecules in the compound. It is believed that the heating occurs throughout the entire volume of the contents of the receptacle simultaneously rather than being an outside-in process. Thus, RF dielectric heating, in some cases is faster at heating liquids than other known techniques, such as contact or convective heating.

Figure 40:
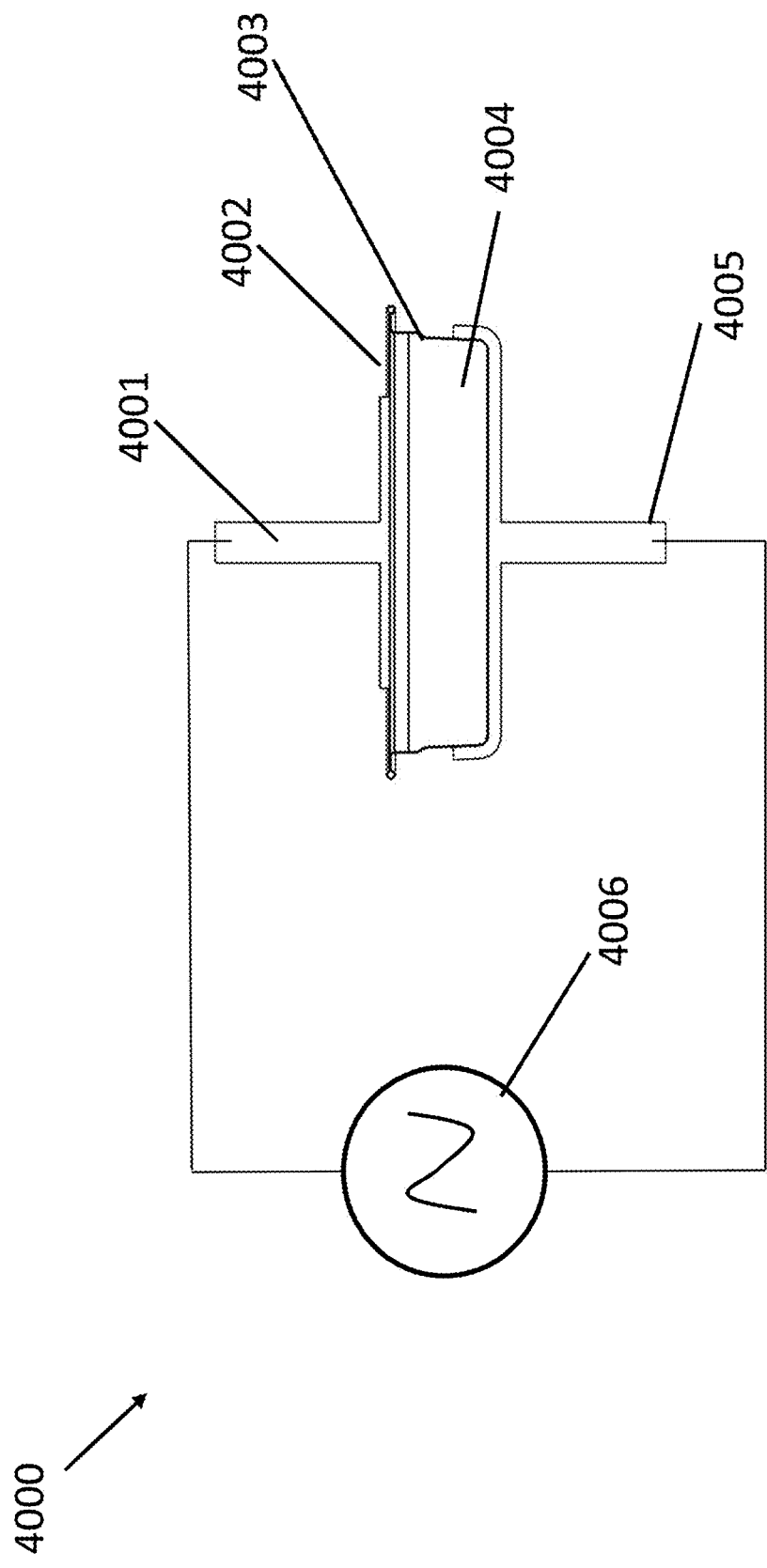
FIG. 40 is a cross-section view of a system for heating frozen liquid contents of a receptacle using radio frequency dielectric heating according to an embodiment of the invention.

FIG. 40 illustrates a cross-section view of a system 4000 for heating frozen liquid contents of a receptacle using RF dielectric heating. FIG. 40 shows a receptacle 4003 housing and a lid 4002 over the housing; the receptacle holds a frozen liquid contents 4004. The receptacle housing 4003 is metallic and conductive while the lid 4002 material is a non-conductive plastic, such as polypropylene. An RF power source 4006 is electrically connected to an upper contact 4001 and lower contact 4005. Lower contact 4005 is also in electrical contact with metallic receptacle housing 4003. The application of an alternating voltage between 4001 and 4005 creates an alternating electrical field which passes through the frozen contents 4004. Optionally, upper contact 4001 is sized to achieve fairly uniform field lines/ gradients through the frozen liquid contents so as to reduce hot spots. In one embodiment, the diameter of the upper contact 4001 is chosen to create an approximately equal gap between the edges of the upper contact and the side walls of the receptacle housing 4003.

In another implementation, again referring to FIG. 40, both the receptacle housing 4003 and lid 4002 are non-conductive plastic materials. Optionally, upper contact 4001 and lower contact 4005 are identically shaped and sized with the contact being flat (i.e., without un-turned sidewalls as depicted in FIG. 40), and the diameter of both would extend 1-2 mm beyond the edge of the receptacle lid 4002.

Figure 49:
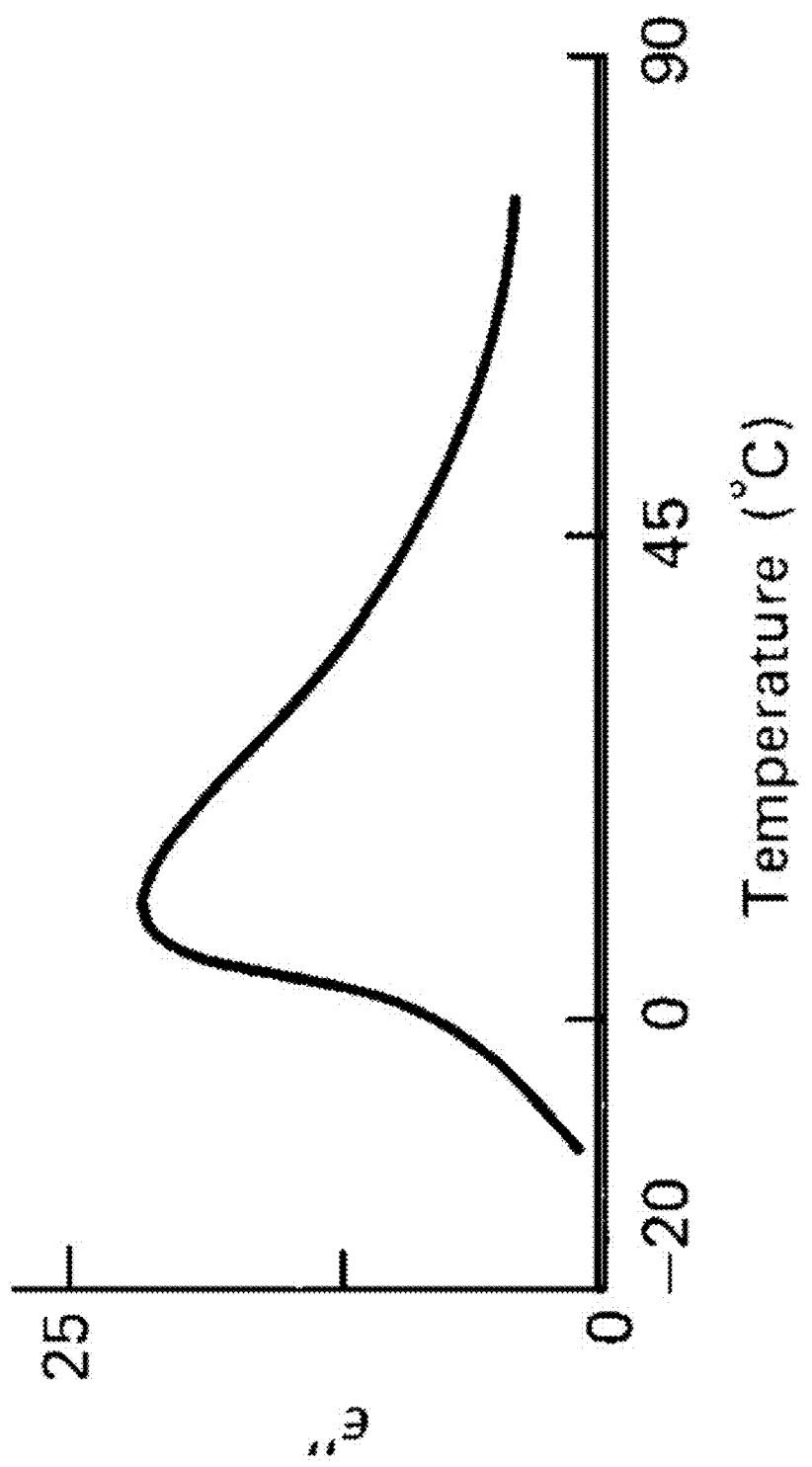
FIG. 49 is a graph depicting the dielectric loss factor of water and ice.

Referring to FIG. 49, one of the known problems with RF dielectric heating techniques involving both water and ice is the non-uniform heating nature of the process. When water molecules are captured within a crystalline structure, as is the case with ice, they are no longer free to follow the rapidly changing electrical orientation of the field between the two electrical contacts or that are created by impinging microwave energy. As shown in the graph for temperatures below 0° C., this results in a relatively low dielectric loss factor. Once the ice melts, however, the loss factor rises very quickly, and the melted water, existing in small localized pockets typically formed with RF or microwave heating within the overall ice structure, heats rapidly. This non-uniform heating can even result in localized boiling and steam creation if temperatures are not allowed to equilibrate.

Several methods have been developed to deal with this well-known problem. One known technique is to pulse the application of power in on/off cycles. Doing so allows some of the heat in the small pockets of water to pass into the surrounding ice and thereby progressively enlarge the volume of each pocket until the entire ice structure is converted to water. While this technique of heating is less efficient than what is possible with a product that is initially all liquid (where RF or microwave power can be applied continuously), it is still considerably faster than can be achieved with more conventional conduction heating methods. This is especially true when the temperature of an external heat source is necessarily limited to prevent damage to the heated liquid near the outside of the bulk frozen contents. For example, as in heating frozen orange juice, where excess heat can affect the structure of complex sugars and degrade taste.

Figure 41:
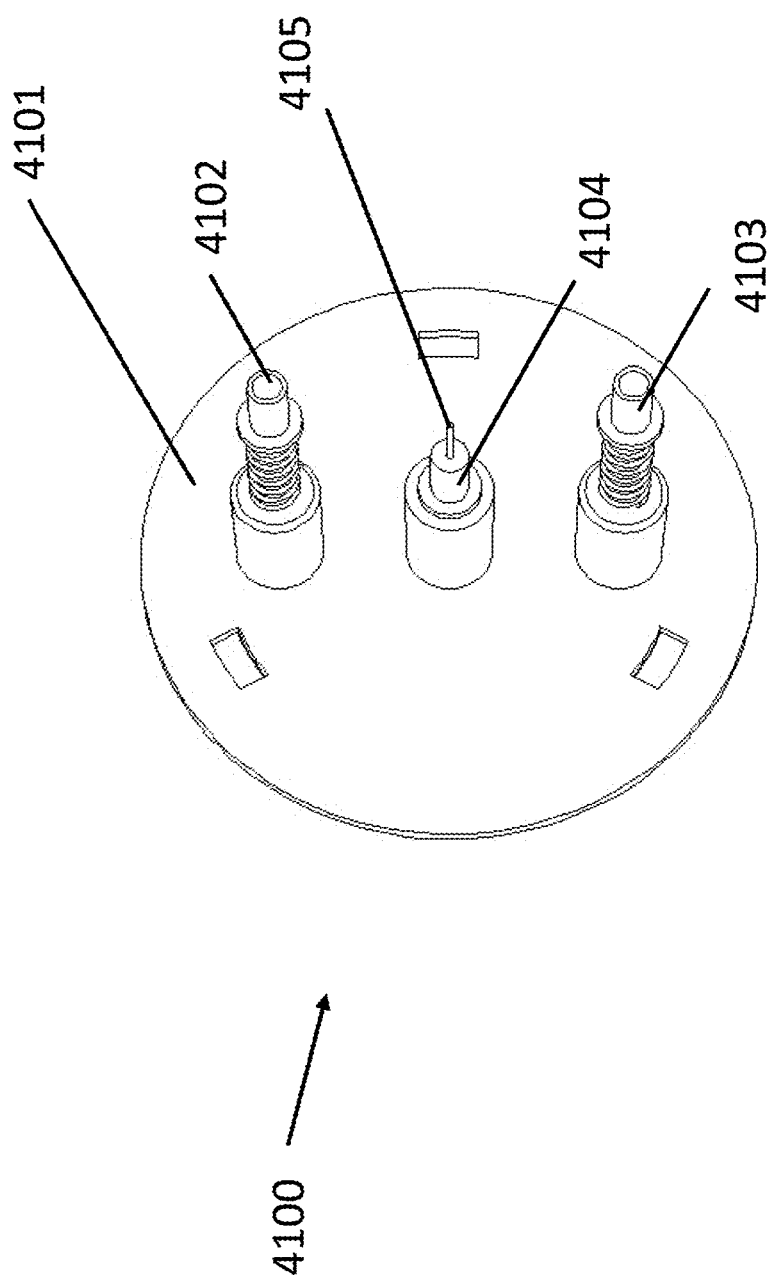
FIG. 41 is an isometric view of a cavity cover including two fluid delivery needles and a central electrode for ohmic heating according to an embodiment of the invention.

FIG. 41 is an isometric view of a cavity cover 4100 including two fluid delivery needles 4102, 4103 and a central electrode 4105 for ohmic heating. Ohmic heating can serve as an alternative to dielectric heating for heating the frozen liquid contents, and can still operate on a volumetric basis. This process requires frozen contents that conducts electricity, but still offers some resistance to electron flow. In one implementation, electric current is introduced at one contact, causing the electricity to flow through the frozen liquid contents or melted liquid, to a second contact. In this end view of assembly 4100, the cavity sealing plate 4101, made from a non-conducting material such as an injection molded plastic, locates and holds needles or penetrators 4102, 4103 for flowing a dilution liquid and/or a melted product. The plate 4101 also locates and holds the electrode 4105, which includes an insulating sheath 4104.

In some embodiments, the electrode assembly, the combination of sheath 4104 and electrode 4105, is fixed in place with one end protruding beyond the back of plate 4101. Optionally, this assembly is spring loaded, allowing the electrical contact to progressively move further into the receptacle as portions of the frozen contents melt so as to maintain contact with the frozen core. In some embodiments, insulator 4104 is a ceramic material, for example aluminum oxide, that has favorable strength and relatively high electrical resistivity.

Figure 42:
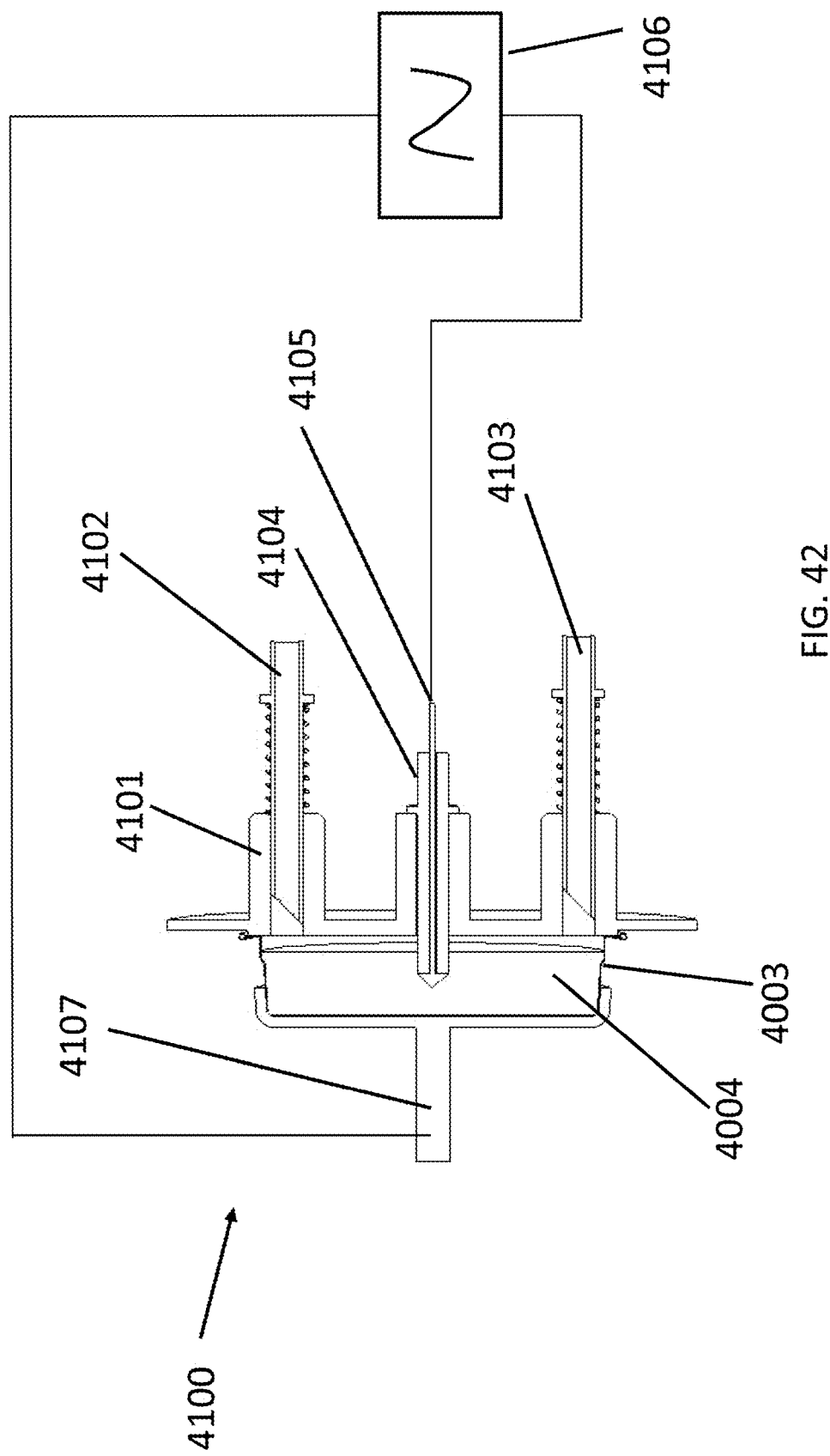
FIG. 42 is a cross-section view of a first implementation of the ohmic heating system of FIG. 41 according to an embodiment of the invention.

FIG. 42 is a cross-section view of a first implementation of the ohmic heating system 4100 of FIG. 41. The single electrical probe 4105 is shown slightly embedded in frozen contents 4004. Using an electrical insulator 4104 to cover conductor 4105 allows the use of a metallic lid, such as aluminum foil, to close the receptacle during packaging. During the secondary heating phase of a process for creating a liquid food or beverage, described in more detail above, electricity flows from electrical contact 4105 into the frozen contents 4004 to a conductive (e.g., aluminum) receptacle housing 4003, and finally to electrical contact 4107. Electrical power is supplied by a source 4106 that, in some embodiments, is an alternating current (AC) supply. Using an AC power supply is thought to avoid problems with electrolysis that may occur at one or both electrical contacts with the use of a direct current (DC) power supply.

Figure 43:
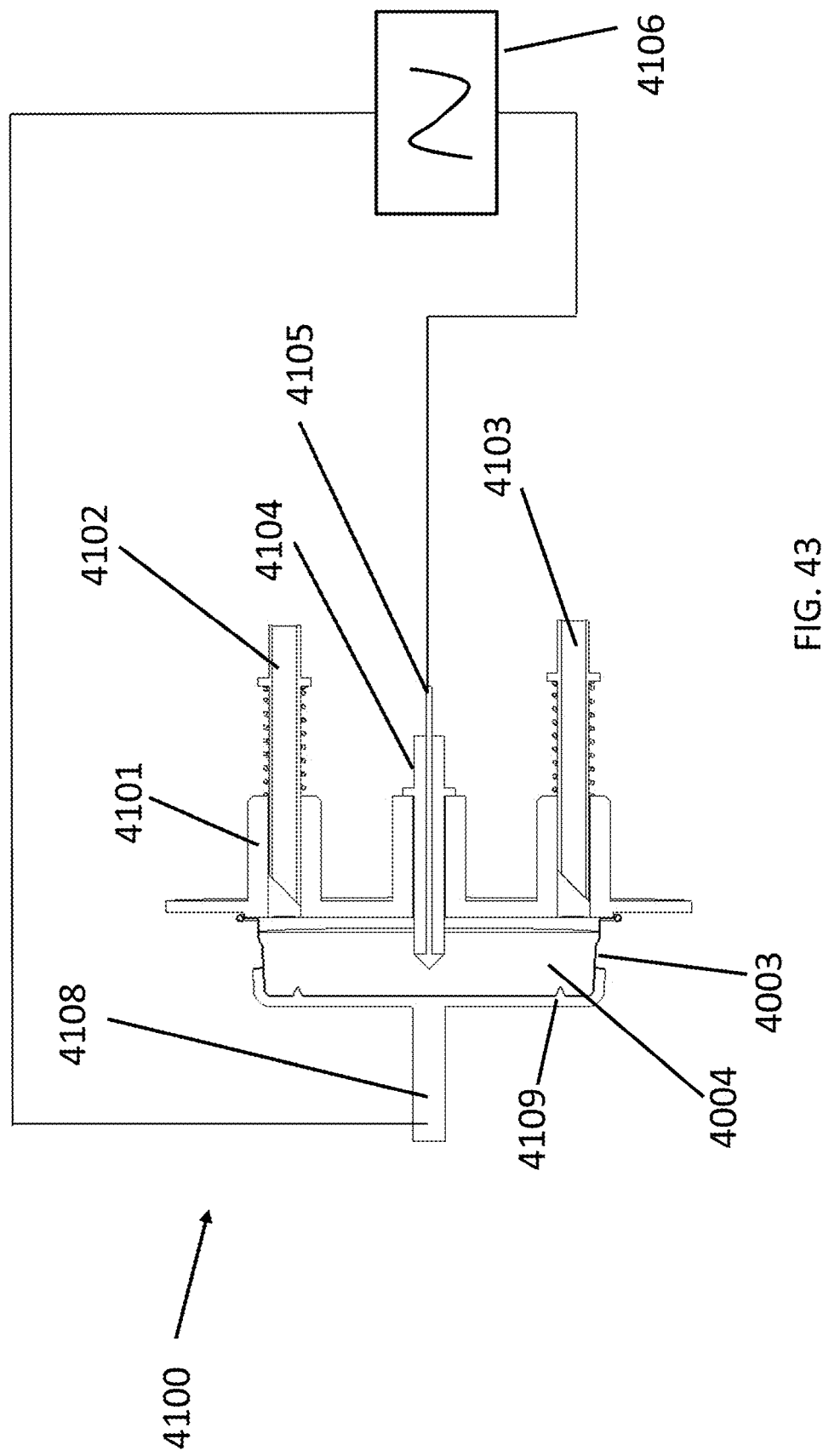
FIG. 43 is a cross-section view of a second implementation of the ohmic heating system of FIG. 41 according to an embodiment of the invention.

FIG. 43 is a cross-section view of a second implementation of the ohmic heating system 4100 of FIG. 41. In the embodiment shown, electrical contact 4108 is equipped with one or more small penetrating cones or similar shape bodies 4109 integral to the contact. These conical protrusions 4109 pierce the bottom of the receptacle housing 4003 to make a direct electrical connection between the frozen contents 4004 and the electrical contact 4108. This can be advantageous when the receptacle housing 4003 is non-metallic or the inside surface of the receptacle is covered with a non-conductive coating, e.g., a thin layer of polypropylene used to coat an aluminum receptacle to enhance food safety, eliminate chemical reactions between the aluminum and the food, and/or to provide a welding surface for the heat sealed lid.

Figure 44:
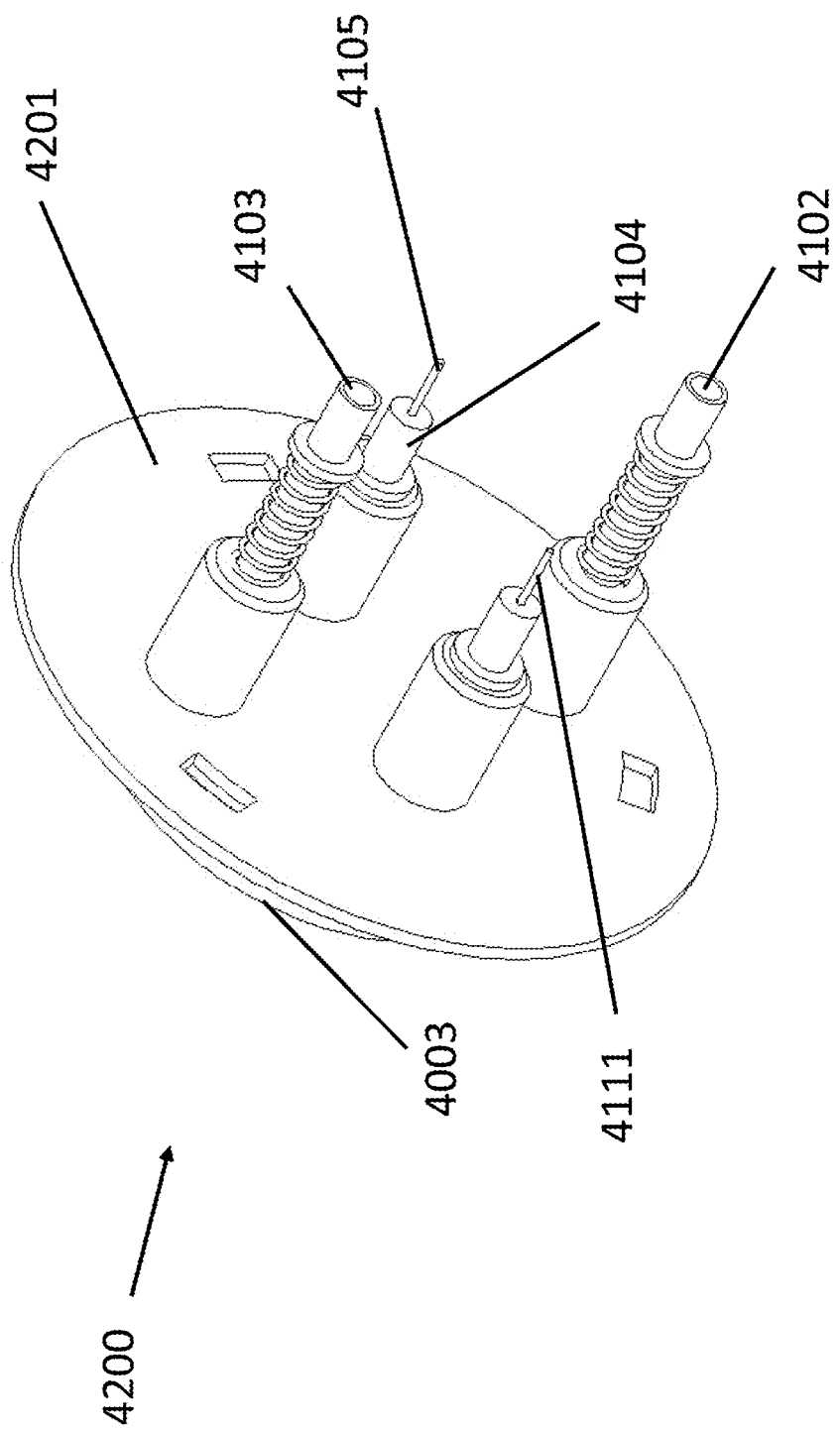
FIG. 44 is an isometric view of a cavity cover including two fluid delivery needles and two electrodes for ohmic heating according to an embodiment of the invention.
Figure 45:
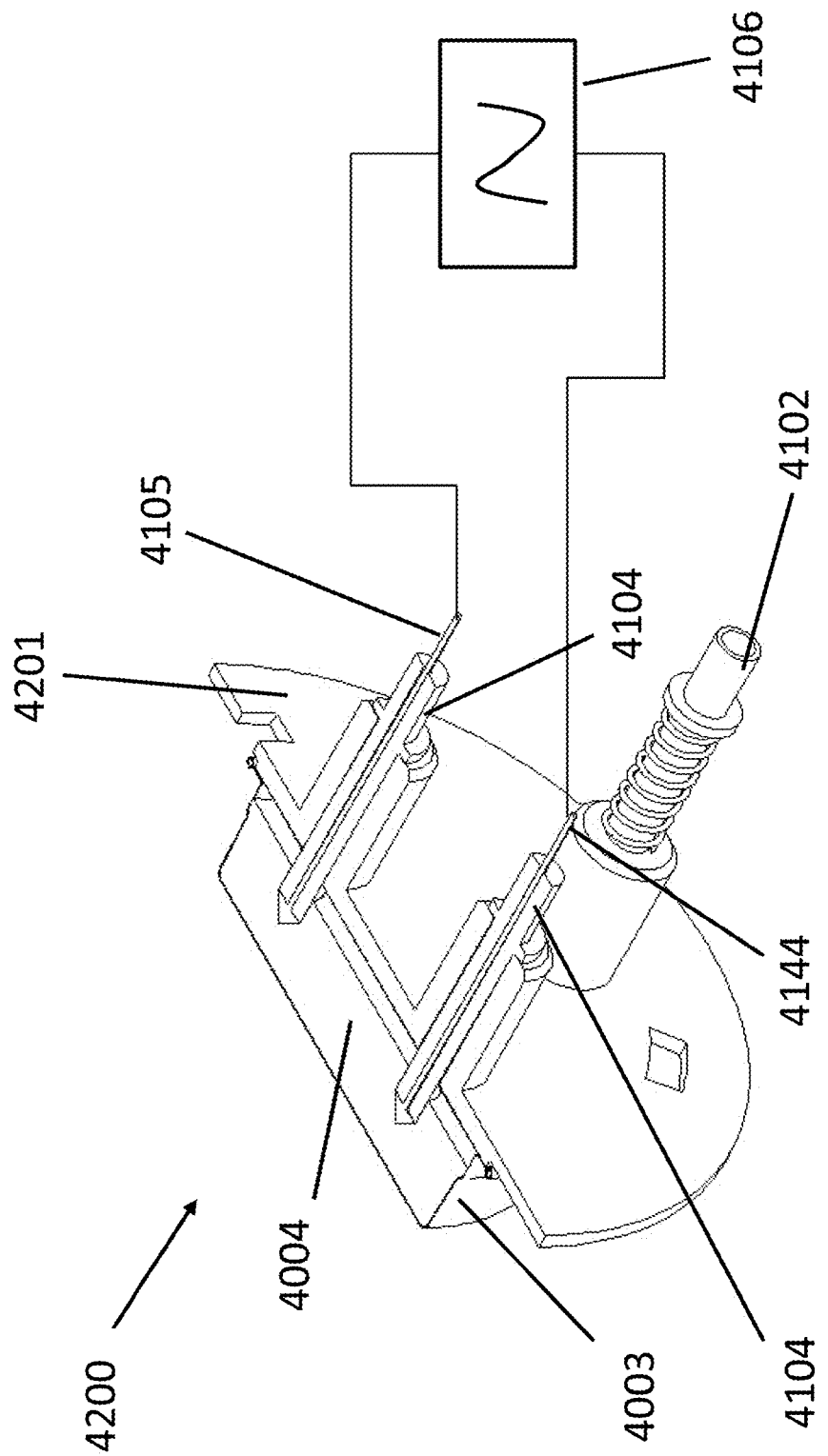
FIG. 45 is a cross-section view of the ohmic heating system of FIG. 44 according to an embodiment of the invention.

FIG. 44 shows an isometric view of a cavity cover 4200, including two fluid delivery needles 4102, 4103 and two electrodes 4105, 4111 for ohmic heating. Meanwhile, FIG. 45 is a cross-section view of the ohmic heating system 4200 of FIG. 44. System 4200 uses two electrical contacts 4105, 4111 located and held by end plate 4201. A complete electrical path includes the two electrical contacts and the frozen contents, without the need for a metallic receptacle housing 4003. Thus, this implementation will work equally well with conductive (metallic) and non-conductive (plastic) receptacle housings 4003. As described above, these electrode assemblies can be fixed or spring loaded. As with the other secondary heating sources set forth above, the implementations of ohmic heating can supply heat before, during, or after the addition of dilution fluids and/or with and without agitation. The concept can be easily adapted to any of the dispenser configurations set forth in more detail above, including, for example, the dispensers with vertically aligned cavities.

In some embodiments, power supply 4106 has circuitry to detect an impending breakdown of a dielectric and limit the current supply accordingly to prevent electrical arcing using known methods.

Figure 51:
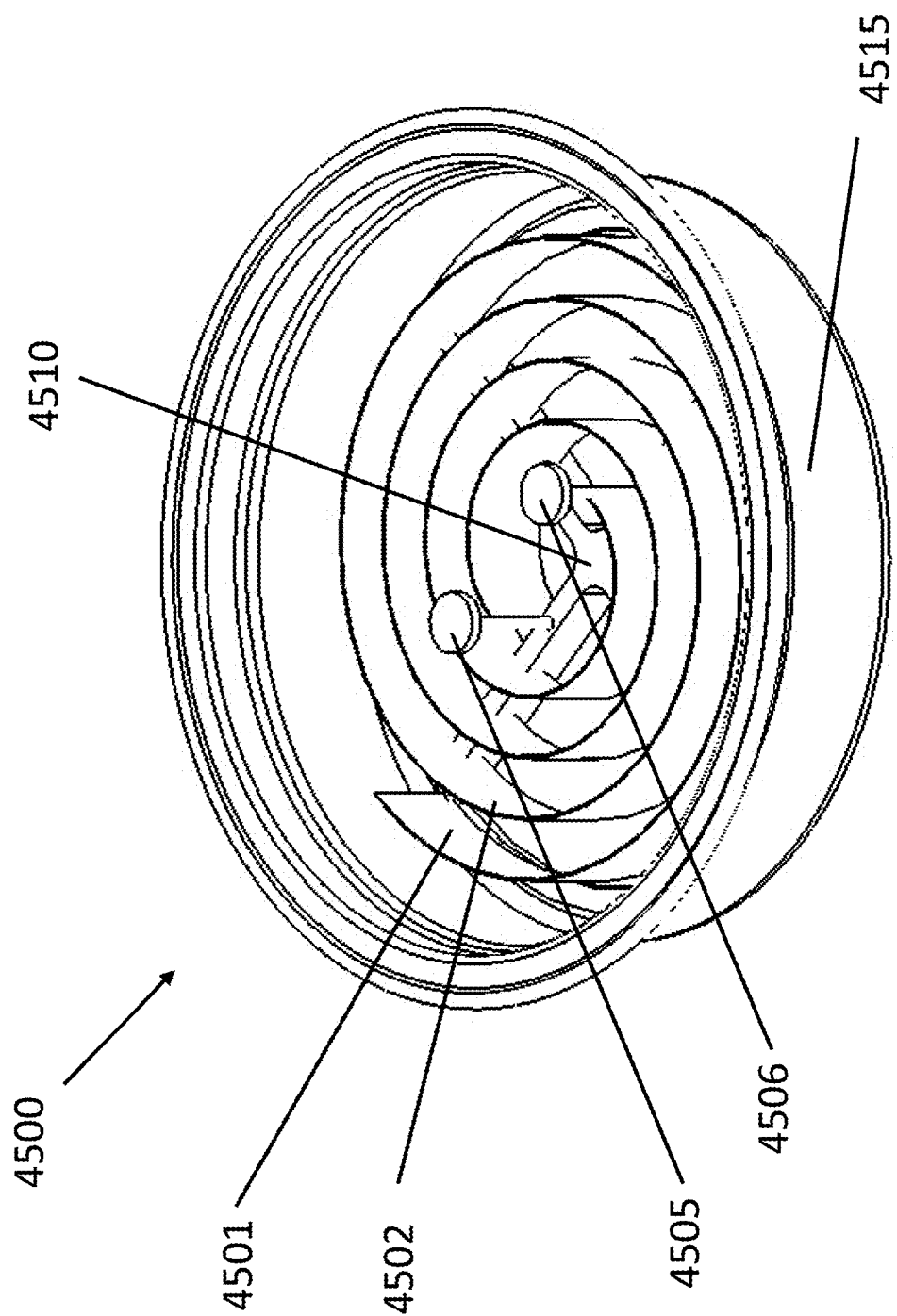
FIG. 51 is an isometric view of two spiral coiled electrodes according to an embodiment of the invention.
Figure 52:
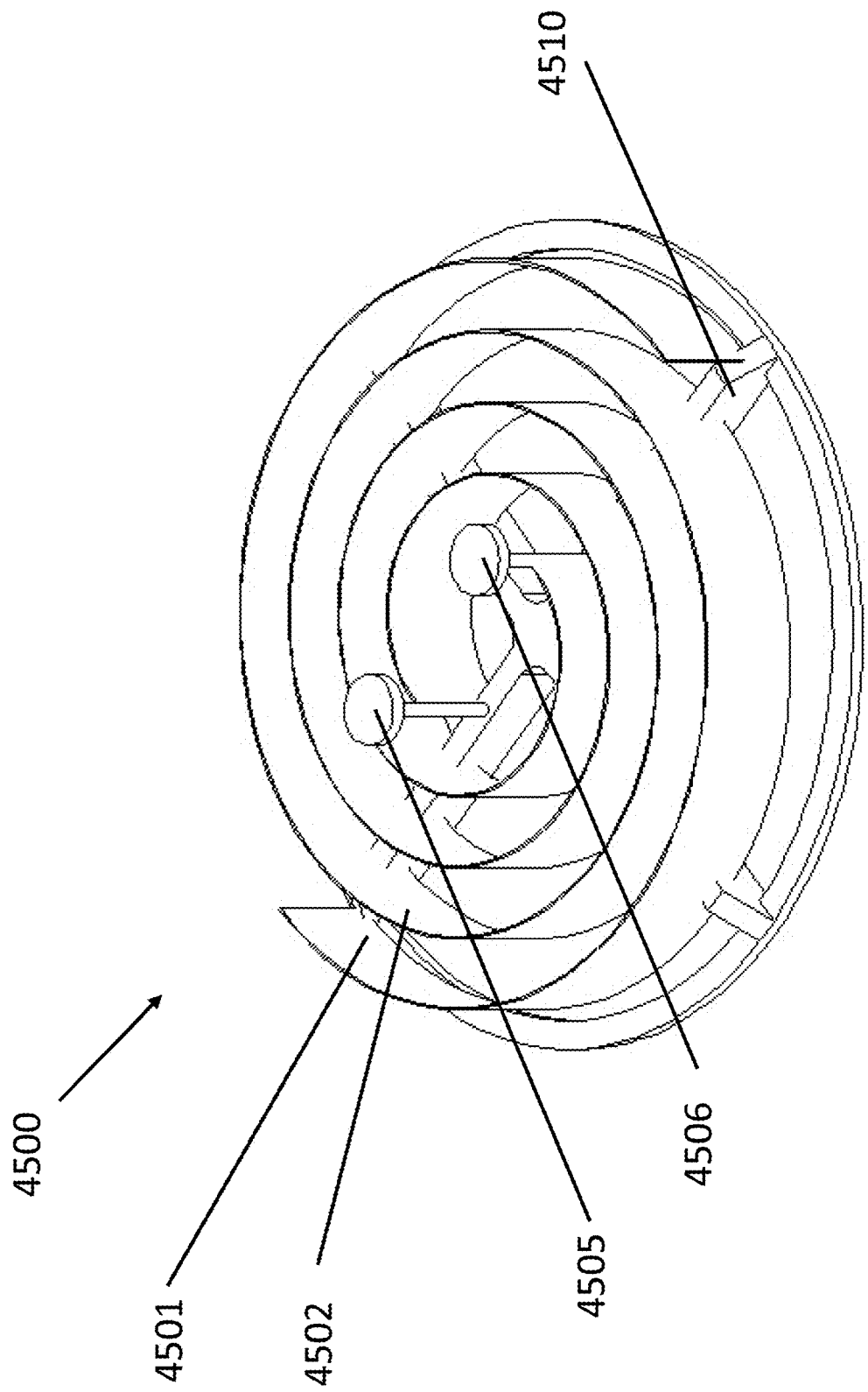
FIG. 52 is a second isometric view of the two spiral coiled electrodes of FIG. 52.
Figure 53:
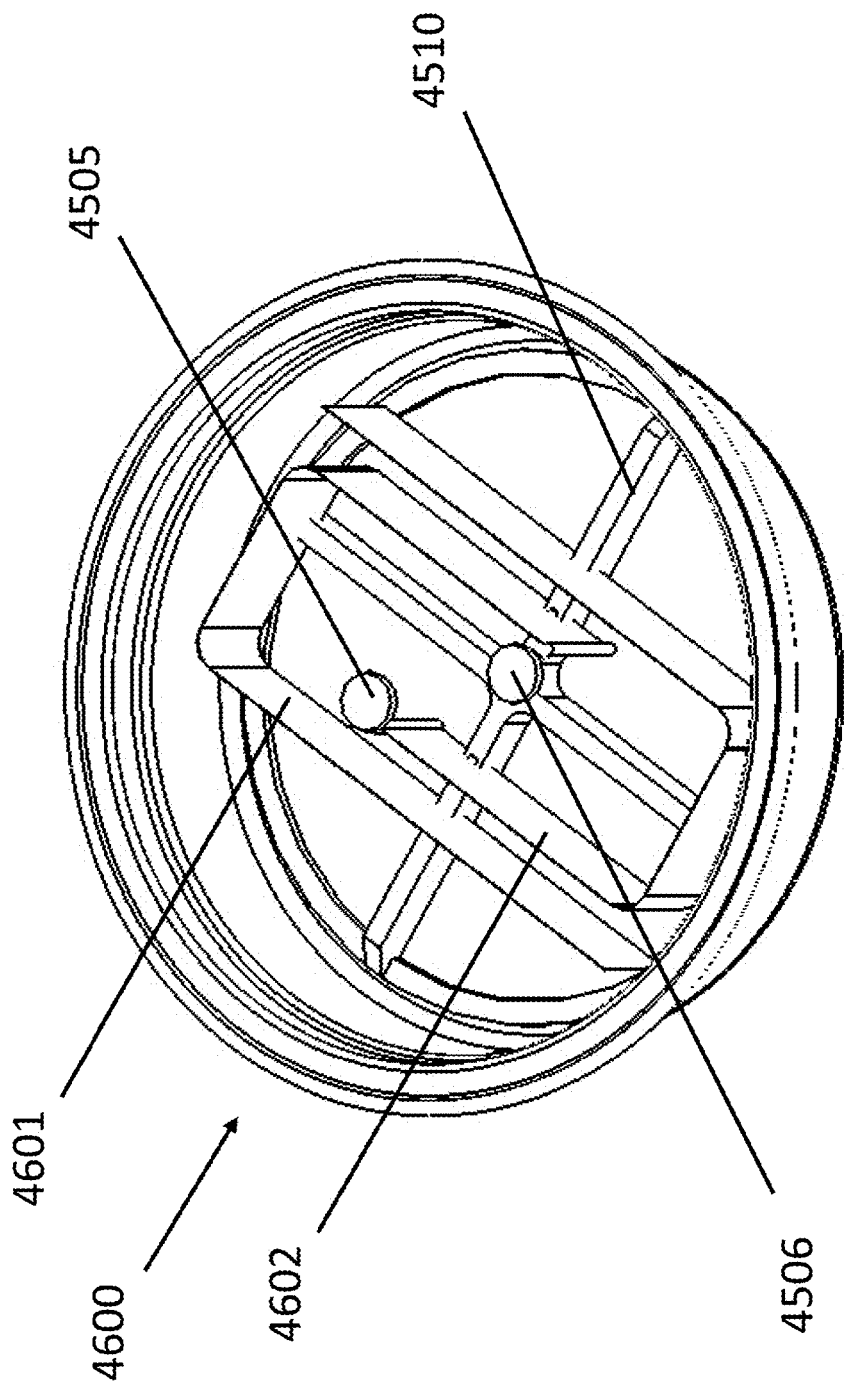
FIG. 53 is an isometric view of two rectangular electrodes according to an embodiment of the invention.

FIGS. 51 and 52 are isometric views of two spiral coiled electrodes 4500 for use with embodiments of the ohmic heating systems described herein. As described above, ohmic heating operates based on the resistivity of a frozen solid or liquid to cause heating when an electric current is passed through the material. Localized heating at the point of current introduction can lead to inefficiencies or ineffective heating. More uniform heating occurs when the electrical contact surfaces at the electrode/food interface are larger rather than smaller. In one embodiment, electrical contact surfaces (electrodes) are included in the receptacle prior to forming a frozen liquid content in the receptacle to increase the surface area available for electrical contact beyond what is achieved with needle-like electrodes.

FIG. 51 shows two spiral coiled shapes 4501, 4502 that act as the electrodes. In some embodiments, these coiled electrodes are stainless steel foil material attached to contact surfaces 4505 and 4506, respectively. FIG. 52 shows the same spiral coils 4501, 4502 and contact surfaces 4505, 4506 without the cup body 4515 for clarity. An insulating frame 4510 holds the coils in place. Contact surfaces 4505, 4506 are disposed in the receptacle so as to make contact with electrodes in a dispenser system when inserted into the receptacle (e.g., as shown and described for the embodiment of FIG. 45). FIG. 52 shows another embodiment of two electrodes 4601, 4602 formed as an open rectangular body.

Figure 46:
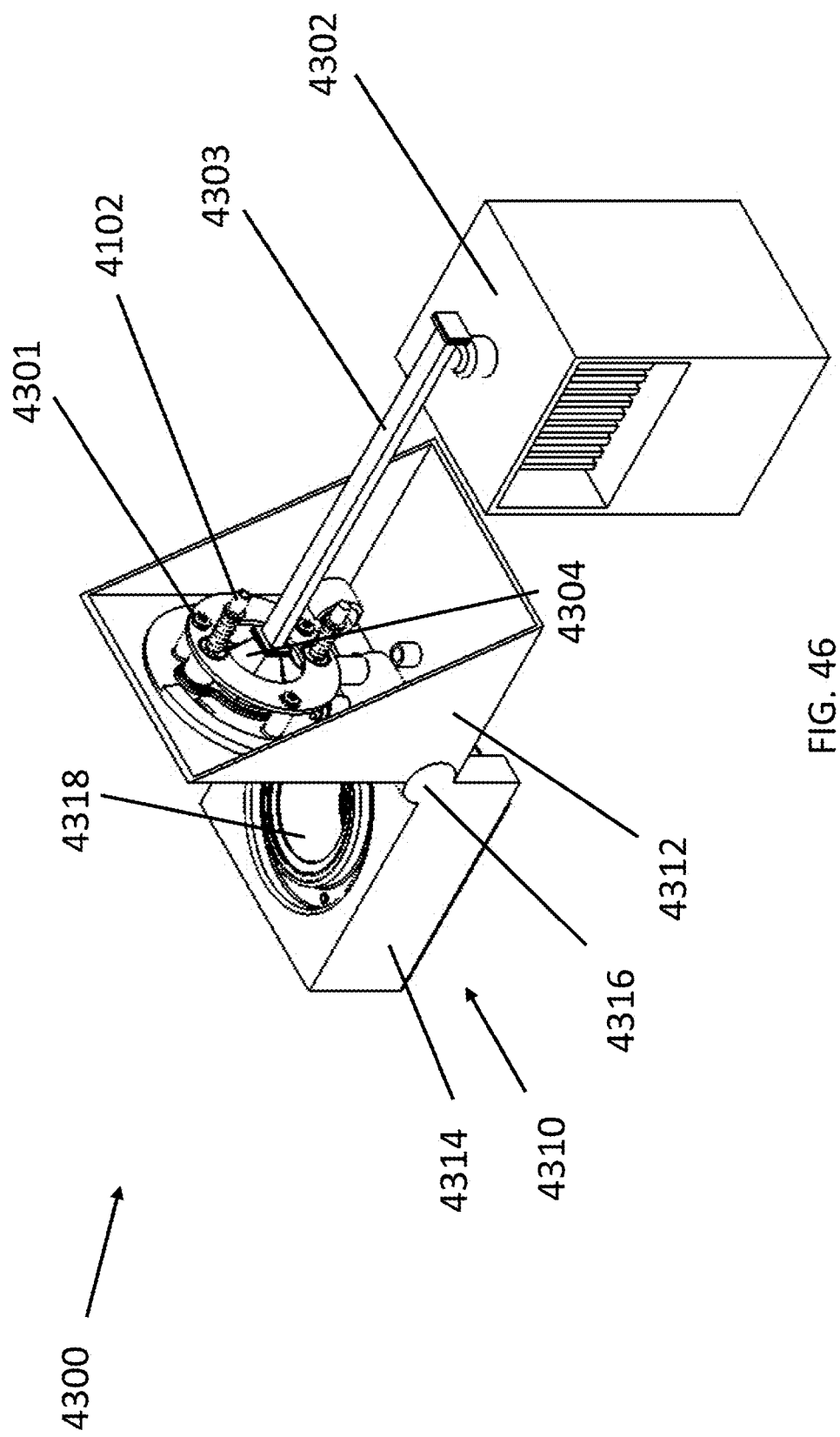
FIG. 46 is an isometric view, with a rotating cavity bottom shown open, for a heating system using microwave energy to heat frozen liquid contents according to an embodiment of the invention.
Figure 47:
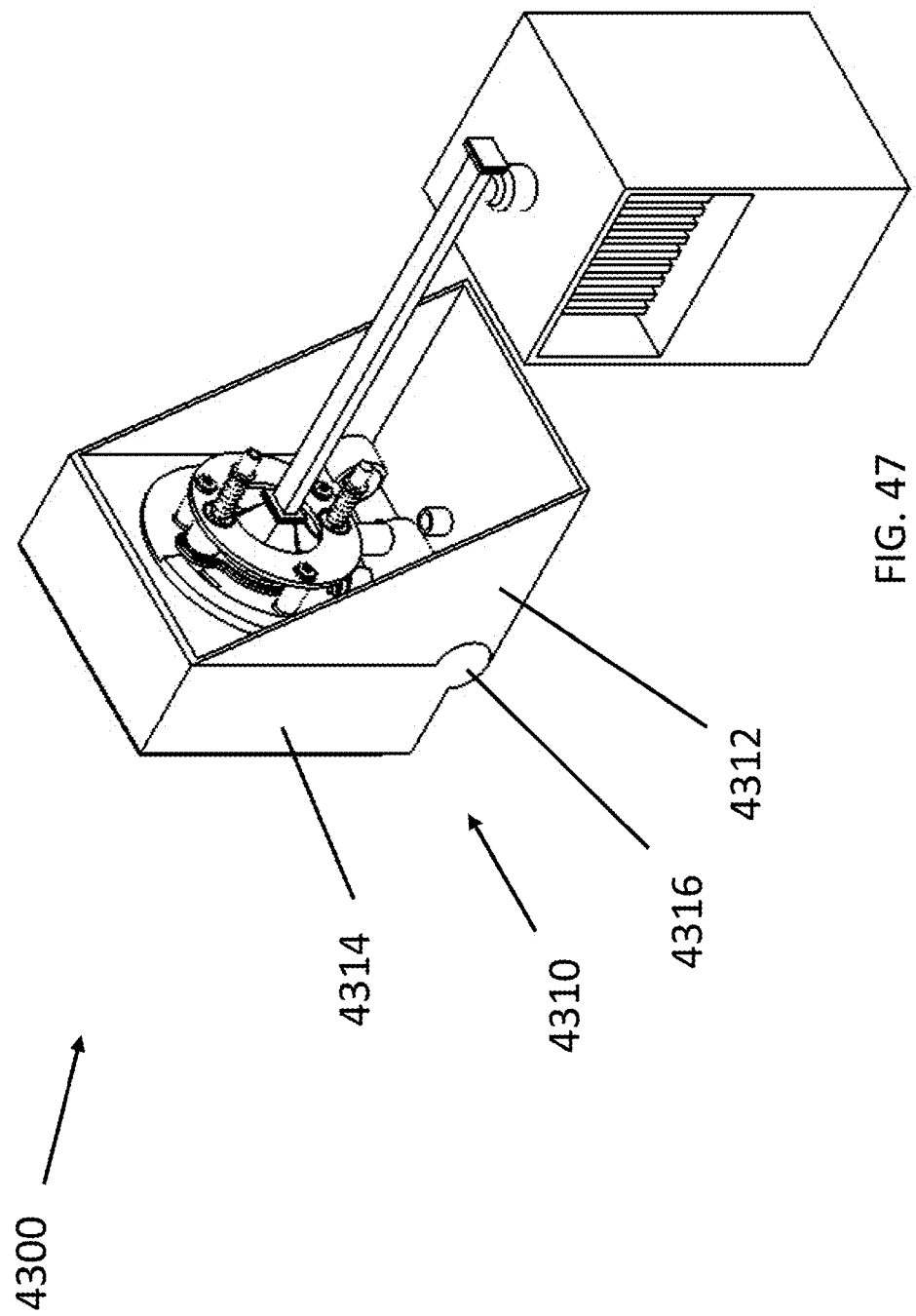
FIG. 47 is an isometric view of the rotating cavity bottom of FIG. 46, shown closed, according to an embodiment of the invention.
Figure 48:
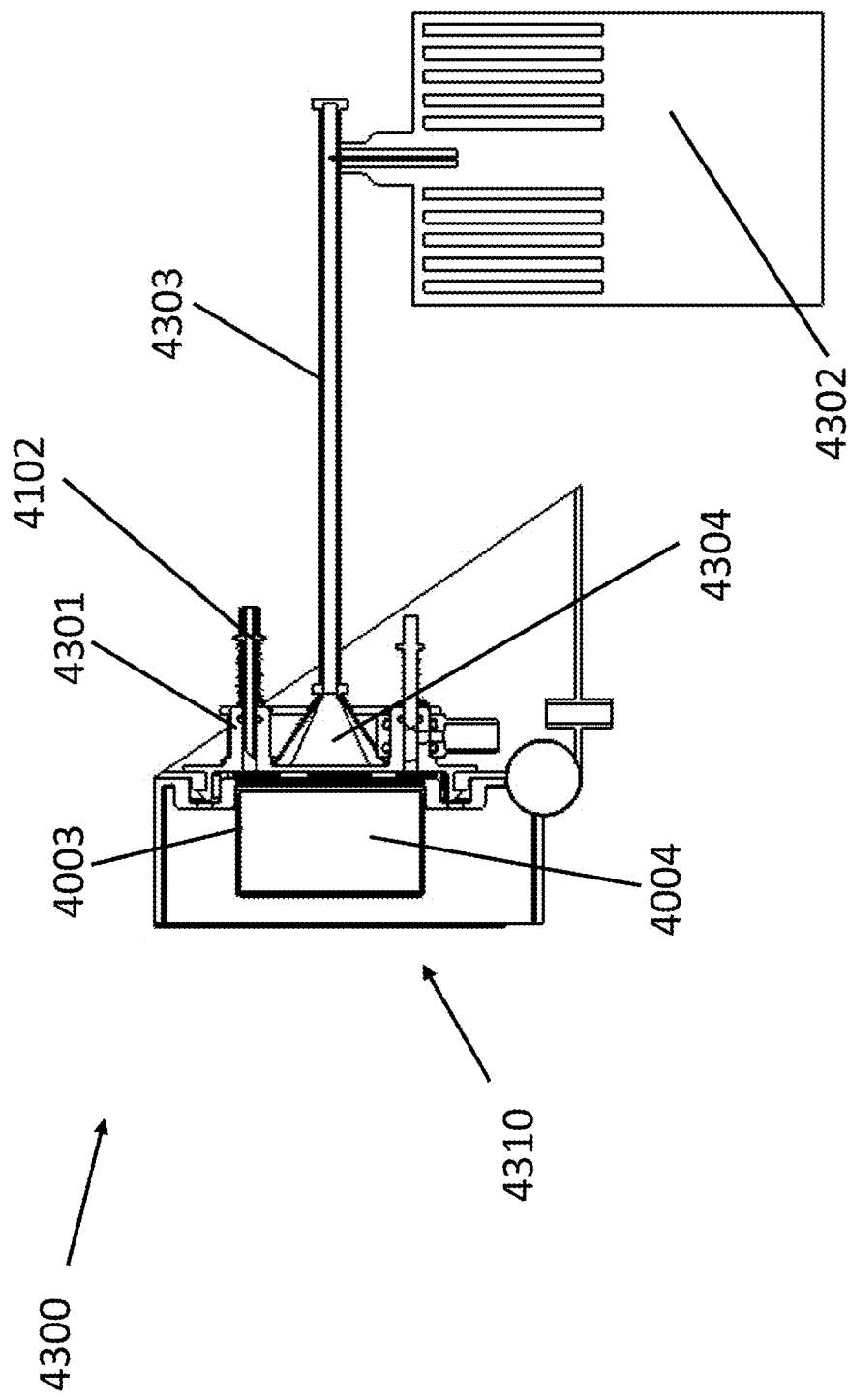
FIG. 48 is a cross-section view of the heating system of FIG. 46 according to an embodiment of the invention.

FIG. 46 is an isometric view of a heating system 4300 that uses microwave energy to heat frozen liquid contents in a receptacle. Heating system 4300 has a chamber 4310 with a chamber lid 4312 and a chamber body 4314, joined by a hinge 4316. The chamber body 4314 has a receptacle opening 4318 sized to receive a receptacle holding frozen liquid contents. FIG. 46 shows the chamber 4310 open, while FIG. 47 shows the chamber 4310 closed. Meanwhile, FIG. 48 shows a cross-section view of the heating system 4300 of FIGS. 46 and 47.

Heating system 4300 is yet another form of a secondary heating system that can be used with the several embodiments set forth herein. Heating system 4300 uses microwave energy, a source of high frequency electrical energy, which is transmitted to a receptacle when held in the chamber 4310. Some implementations of the heating system 4300 use a magnetron as the source of microwave energy. This magnetron can operate at, e.g., approximately 2.45 Gigahertz. Other embodiments use a magnetron that operates at 5.8 Gigahertz and delivering 700 Watts or more. Magnetrons operating at still higher frequencies are available and have relatively lower power levels. At present, magnetrons operating at 5.8 Gigahertz and higher are relatively more expensive than their 2.45 Gigahertz counterparts. However, use of magnetrons with relatively higher frequencies is within the scope of the invention and can offer benefits, as described below.

At the lower end of the microwave frequency spectrum, e.g., 2.45 GHz, transmission of the created waveforms is possible both by waveguide and by coaxial cable. Use of a coaxial cable beyond 3 GHz can impractical, at least at relatively higher power levels. It is believed that the use of coaxial cable for energy delivery is suitable at power levels of 700 Watts or less. Thus, in certain implementations, a coaxial cable is used for energy delivery to the receptacle when held in the chamber 4310. Such an implementation would benefit in terms of cost, flexibility and required volume within the dispenser for routing the RF energy signal. Adaptation to a coaxial cable transmission design could be accomplished, for example, in accordance with the techniques set forth in U.S. Pat. No. 5,216,327, incorporated by reference herein.

The disclosed techniques address challenges associated with using microwave energy to thaw and heat frozen contents. For example, as explained above, without implementing proper safeguards, portions of the frozen content volume that first transition from ice to liquid can overheat. Also as discussed above, techniques such as pulsed heating that work for RF dielectric heating will work for heating with microwave energy. Another challenge associated with using microwave energy inside of a conductive receptacle is the fact that the electrical field at the surface of the conductive material will always be essentially zero. This null condition sets up a zone of no heating that extends into the receptacle for about a quarter of the wavelength from the receptacle wall. If the receptacle is large enough, with respect to the wavelength, e.g., more than several wavelengths in depth, heating can occur in the remainder of the frozen contents. While this approach may still produce hot and cold spots if a standing wave is created, melting will occur. These hot and cold spots are dealt with in microwave ovens through dispersion fans, rotating platens, etc. Those known techniques can be applied in the systems disclosed herein.

One solution to the later challenge described above is to use a receptacle constructed of a non-conductive material, e.g., a polymer. Such a receptacle would be received in an enclosure that locates the top and bottom outer walls of the receptacle approximately a quarter of a wavelength of the propagated microwave frequency away from the corresponding top and bottom walls of the enclosure. For example, if a 2.45 GHz frequency microwave heating system is used, the wavelength is about 12.2 cm. One quarter of the wavelength is a distance of 3.05 cm or 1.2 inches. Thus, a metal enclosure that holds a plastic receptacle in the enclosure to maintain a gap between the top and bottom enclosure walls and corresponding receptacle walls of 1.2 inches would create a heated region roughly aligned with the center of the receptacle as measured between the top and bottom walls of the receptacle. The use of the top and bottom walls of the enclosure and the receptacle are illustrative only, other orientations of the receptacle relative to the enclosure are within the scope of the invention.

Meanwhile, another solution to the later problem when still using an aluminum receptacle or other conductive materials uses a relatively higher frequency microwave signal. Advantageously, the dielectric loss coefficient for water and ice increases with increasing frequency up to about 18 GHz. The dielectric heating effect is also proportional to the frequency as the energy converted to heat is the same for every cycle of vibration a molecule goes through. This combination suggests a frequency of 18-24 GHz would work well in this embodiment because the null zone between receptacle wall and the heated region would be in the range of about 0.12-0.16 inches. Optionally, a waveguide is used to deliver the microwave energy (instead of a coaxial cable). For example, for a frequency of 24.125 GHz (the highest allowable microwave frequency within the industrial-scientific-medical bands set aside for open use by the FCC and similar agencies worldwide), the optimum waveguide dimensions are 0.34×0.17 inches (WR34).

FIGS. 46-48 illustrate a microwave heating system 4300 that uses a magnetron 4302 supplying a 24.125 GHZ signal through waveguide 4303 to a transmitting horn 4304, through a partially microwave transparent cavity end plate 4301 into the open space 4318 defined by the chamber body 4314 (when the chamber is closed). A metallic receptacle and the frozen liquid contents therein receive the microwave energy. Modifications and additions to the basic illustrated design to insure optimum signal impedance matching, protecting the magnetron from back scatter, etc., are within the knowledge of one skilled in the art. Moreover, for any of the embodiments described herein employing electromagnetic radiation as the secondary heating source, portions of the chamber that hold the receptacle are opaque to the wavelengths the secondary heat source uses to heat the receptacle and/or the frozen contents. In some implementations, only a "window" into the chamber permits the electromagnetic radiation to enter, while the rest of the chamber does not permit the energy to pass through the remaining walls. The chamber walls are optionally insulated to reduce heat loss from the chamber.

Figure 50:
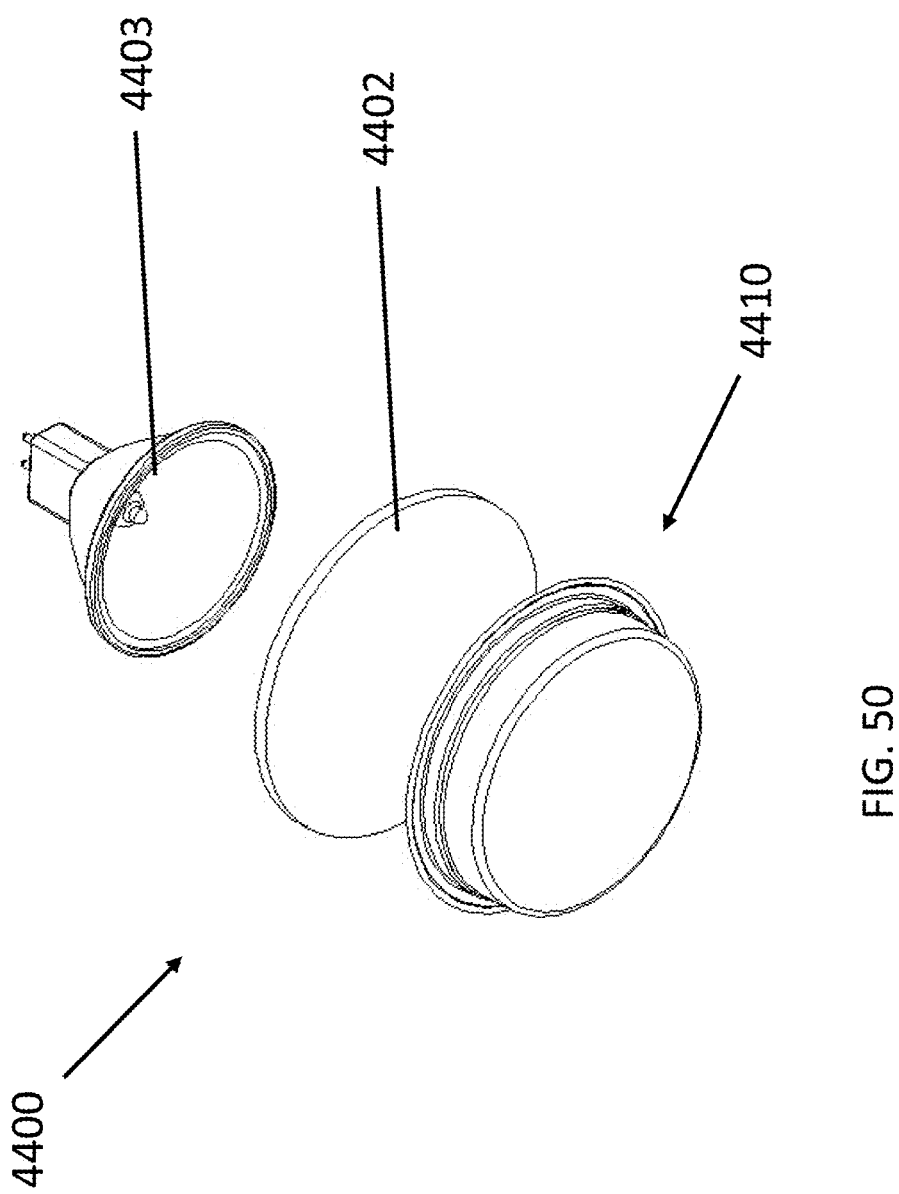
FIG. 50 is an isometric view of an infrared heating system according to an embodiment of the invention.

FIG. 50 is an isometric view of an infrared heating system 4400. Heating system 4400 is yet another example of a secondary heat source. The frozen contents contained within receptacle 4410 can also be melted and heated using an infrared (IR) heater. In some embodiments, the heat source 4403 is a combined IR heater and reflector powered by an on-board power supply (not shown). In some embodiments, this IR heater emits an IR spectrum centered on about 2-2.5 microns, corresponding with a black body emitter of approximately 1200° K, to match an optimum absorption band for water and ice. In some embodiments, a band pass filter 4402 allowing radiation in the range of about 2.0-3.3 microns to reach the receptacle 4410 is disposed between the heat source 4403 and the receptacle 4410. Such a filter reduces high absorption peaks typical of polypropylene or polyethylene materials used for covering and sealing receptacle 4410. Reducing the energy at these absorption peaks reduces the likelihood of melting the lid material while heating the frozen contents. In some embodiments, the IR heater is an incoherent light source. In some embodiments, the heater is an infrared laser system. In some embodiments, the laser system includes beam expander optics to enlarge the coherent beam to match the full diameter of the receptacle or some smaller diameter inside of the perforation needles.

In some embodiments, the dispenser may have predetermined heating and agitation functions for each receptacle that do not change regardless of temperature and content of the receptacle. The settings may be established to provide beverages at an acceptable temperature from frozen receptacles of varying temperatures. However, in certain implementations, the inclusion of thermal sensing equipment and systems for and techniques of receiving information about the frozen content or the receptacle give the dispenser the capability to process and formulate, via certain equations of state and/or a table of inputs and outputs, the variables of the beverage making process to achieve a beverage of a desired flavor, potency, volume, temperature, and texture in a timely manner.

The thermal sensing equipment incorporated within the dispensing apparatus may include any type of sensor including but not limited to RTDs, thermistors, thermocouples, other heat sensors and infrared energy sensors. Alternatively, a temperature indicating strip created, for example, using a variety of different thermochromic inks may be included on the receptacle to visually signal the temperature within the receptacle via a change in the appearance or properties of the temperature strip. This temperature strip could be both a signal to a consumer as to whether the pod is properly frozen before loading into the dispensing apparatus and used by the dispenser via some type of camera/monitor to translate the visual signal into an electronic reading. Some embodiments of the thermochromic inks are based on leuco dyes which are sensitive to heat and transition from transparent to opaque/colored as the temperature is reduced to their activation point. In some embodiments, these leuco dyes are configured in a strip of small printed squares on the outside of the receptacle, each square of a different leuco dye formulation, and ordered such that as the temperature of the cup falls, the length of the strip that is opaque/colored steadily grows in length or changes in shape.

Similarly, as a means to alert the consumer that the receptacle may have been exposed to an unacceptably high temperature prior to use, in some embodiments the outside of the receptacle may include an area covered with a material which irreversibly changes color if some activation temperature is reached or exceeded. Systems of this type, based for example on colored paper and a special wax formulated to melt at the desired temperature, are well known in the art.

As mentioned elsewhere herein, the receptacle may include a barcode, QR code, marking, image, number or other type of glyph to convey information about the frozen content or receptacle to the dispenser via an optical sensor. In some embodiments this information is encrypted to create a barrier to imitation by other producers. Without the code, the device stays inactive and/or will refuse to accept the receptacle. Alternatively, without the code the dispenser operates to deliver a beverage, but only with a reduced set of functions that may not yield an optimum user experience. The optical sensor may be an optical switch, camera or laser configuration and use any type of photoconductive, photovoltaic, photodiode, or phototransistor device. The receptacle may alternatively include electrically resistive printing that defines what beverage it contains. Simple probes mounted in the dispenser contact the paint to read the resistance.

The receptacle may alternatively include a physical structure acting as a key to define a property of the frozen contents within. In some embodiments, this geometry of the receptacle is detected by the dispenser and, based on this special geometry, various settings for beverage creation are adjusted to correspond with factory or user-generated parameters for that beverage.

In some embodiments, a probe could be used to pierce the receptacle and identify the contents based on spectrometry, chromatography, or other known techniques to identify compositional features. In other embodiments, a communication system utilizing electromagnetic sensors in the dispenser and compatible electromagnetic labels embedded in the receptacles (e.g., using RFID, NFC, Blue Tooth™ or the like) pass information about the frozen contents to the dispenser. In another embodiment, the receptacle could be weighed using a scale/weight sensor and a mass could be assigned to different products as a method of differentiation. Similarly, a mass sensor could be used to directly determine the mass of the filled receptacle.

The information detected by the dispenser may include the composition of the frozen contents or be a derivative thereof that may indicate the mass and/or certain thermodynamic properties of the content. In some examples, the contents could be classified by its amount of protein, fat, carbohydrates, fiber, ash or other food components. In other embodiments, it could be identified by a category, like juice, or a sub-category, like orange juice, that group receptacles with similar thermodynamic properties and desired drinking temperatures. With the mass, temperature, and a thermodynamic understanding of the frozen content the dispenser may use a microprocessor to adjust its beverage creation settings to carefully melt, dilute, and heat the frozen contents to a desired volume, potency, temperature, texture, etc.

Alternatively, the receptacle may include a representation of the thermodynamic properties derived from the frozen content's composition in the form of certain key variables. These thermodynamic properties and other properties acting as inputs may include, but are not limited to, mass, shape, density, specific heat, enthalpy, enthalpy of fusion, enthalpy of vaporization, thermal conductivity, thermal capacity, initial freezing point, freezing point depression, thermal diffusivity or any combination or derivation of the sort that is descriptive of melting and reheating properties. Other information about the frozen content and/or the receptacle includes volume of fill and/or headspace present in the receptacle.

In some embodiments, the information conveyed to the dispenser for determining certain process variables may include the date of manufacture. For example, in some embodiments the food components within the receptacle may include fresh fruit or vegetables which generate heat through respiration and lose moisture through transpiration. All of these processes should be included for accurate heat transfer calculations. In rare occasions, changes in thermodynamic properties based on a time variable should be accounted for. In other embodiments, the date of manufacture could be of importance in determining whether certain age sensitive components in the frozen contents have exceeded an allowable shelf life, which is optionally included in the information conveyed to the dispenser. In such embodiments the dispenser could be programmed to reject the receptacle and prevent its processing for the safety of the user.

The determination of beverage creation functions and settings may include an equation with one or more variables. For example, the dispenser could use temperature, mass, specific heats, and enthalpy of fusion in a multi-variable equation to determine the most efficient way to prepare a beverage or liquid food product to deliver it to the consumer's cup at a specific temperature, consistency, and volume. Alternatively, the determination of settings and functions may be based on a processor using a table of inputs and outputs in a database. For example, a receptacle with a detected category and temperature may be included in a database and thereby associated with variable functions to melt, dilute, and reheat. The database may be stored within the dispenser or at a remote location and accessed via a communications network. In some embodiments, a combination of equations and tables of inputs and outputs may be used to determine the proper beverage creation settings, including adjustments for dispenser altitude, voltage and in use voltage drop.

Every combination of mass and temperature of a frozen composition requires a certain amount of energy be added to enable it to be melted and heated to the desired temperature with a diluting liquid and other means of melting and reheating. In a thermodynamic modeling equation for creating a liquid food product at a desired temperature it is important to account for heat energy lost to atmosphere, receptacle walls, and other similar effects. In addition, ambient conditions in the environment where the product is being created may also play a factor in achieving a desired final temperature of a dispensed product. Embodiments of the dispensers described herein take into account such variables when determining the process and setting for product preparation.

The adjustable settings may include, but are not limited to, the duration, sequence, timing, amount, pulsing of the incoming dilution liquid, high pressure air during dispense or frequency of supplying heat, agitation, or other form of energy to a frozen contents, a period of rest between periods of agitation at specific points in the dispensing, the total diluting liquid volume, the diluting liquid temperature, a change in diluting liquid temperature, the rate of liquid injection (including pauses in the injection), the pressure of liquid injection, the positioning of the receptacle, the perforation location on the receptacle, the size of the perforation, the shape of the perforation, when a perforation is made, the number of perforations and any follow-up cleaning function such as a rinse of the injection cavity or maintenance notification. The variability, sequence, timing, reoccurrence, duration and combination of these functions may be implemented in many different ways to create a liquid product with desired characteristics. In further embodiments, the dispenser incorporates and adjusts the use of air to be co-injected with the diluting liquid as a supplement to the diluting and/or melting liquid added to the receptacle as a means to improve mixing of the contents and the efficiency of liquifaction.

In some embodiments, these functions may be combined to create a beverage in the least amount of time or using a minimum amount of energy. In some embodiments, the amount of time for a source of heat to achieve a certain temperature may be included in determining the beverage creation settings. For example, a heated diluting agent may be a faster source to melt the frozen content, but takes far longer to reach a certain required temperature of the frozen contents than would otherwise be required if that energy were added using electromagnetic radiation. As an example, a machine may be programmed to use more electromagnetic radiation to heat the frozen contents if the dispenser was only recently powered on and the temperature of the cavity or water in the heater tank is low. Conversely, if the water tank with the diluting agent is already hot, then the dispenser may revert to less electromagnetic radiation to create a desired product faster.

Alternatively, the combinations of these functions may be used to create a more uniform consistency when dispensing. For example, the settings of the dispenser may be adjusted to create a steady melting rate of the frozen contents or just the external portion of the frozen content so as to initiate flow so that potency of the liquid product is consistent for a longer duration of the dispense.

In some embodiments, the dispenser reads the temperature of a dispensed liquid and continually adjusts the beverage creation settings throughout the dispensing process. In some embodiments, a non-diluting heat source and a diluting agent may work harmoniously in the beverage creation cavity to heat, melt and/or dilute the frozen content.

In some embodiments, the dispenser has refrigeration components that chill a diluting agent for melting and diluting the frozen contents to create colder beverages. So long as the injected chilled diluting agent is warmer than the frozen contents, it will still act as a thermal resource for thawing the frozen contents.

In some embodiments the backpressure of the incoming liquid is measured with a pressure sensor to allow changes to the dispensing process for the diluting/melting liquid. For example, if a pressure higher than a threshold is detected, it may be the result of an insufficient flow path from the inlet, past the frozen contents, to the outlet. In such a case, the dispensing pump injecting liquid into the receptacle can be stopped temporarily to allow for some melting of the frozen contents to occur and, thereby create a larger/better flow path to the outlet before more liquid is added. This feature may prevent loss of liquid outside the receptacle or dispenser and lead to greater accuracy in the overall volume of the dispensed product.

In some embodiments, the desired potency, volume, texture, temperature, or other beverage characteristic is programmed or selected from a range of options by the consumer. The dispenser may take this desired output in combination with temperature and compositional information about the frozen contents to carefully adjust settings to create the desired finished product.

Although there are many possible embodiments for taking temperature and compositional information from a frozen liquid pod to adjust settings to create a desired beverage, there should be consistent changes in the output of dispenser functions based on certain increases and decreases in temperature, mass, and presence of certain compounds. In some embodiments, the dispenser will recognize and alert the user following the insertion of an empty/used receptacle.

In one example, a dispenser adjusts the settings for the creation of a beverage of the same volume, potency, and temperature from receptacles with identical frozen contents, but with different initial temperatures. The receptacle that is colder will require more transferred energy to melt and reheat the contents to a desired temperature. For the colder receptacle, the dispenser may adjust and implement a longer pre-heat, a hotter pre-heat, a hotter diluting agent, or more agitation to add the energy necessary to increase the temperature of the finished beverage to yield a final beverage that is nominally the same as one created from the initially warmer pod, ceteris paribus. Any described beverage creation settings above may be combined strategically to transfer additional energy to the colder receptacle.

It is understood that the mass and BRIX of a frozen content within a receptacle impacts the energy needed to melt and reheat the content to a certain temperature. In another embodiment, a user may choose from different size and potencies of a finished product at a standard temperature. This would require less or more of a diluting liquid, heat, and agitation supplied to the frozen content depending on the volume/potency selection.

The composition of the frozen contents dramatically impacts the temperature of a finished beverage with uniform liquid product creation settings. Each makeup of frozen contents at a given mass and temperature requires a certain amount of energy transferred to melt and reheat the contents. It should be understood that many additives impact the thermodynamic metrics of a composition. Detecting these differences in the frozen content receptacles allows the dispenser to adjust its settings to provide for a desired finished liquid product from the frozen contents. For example, a dispenser may adjust its settings to create a beverage of the same volume and temperature from receptacles having the same mass, but with one pod having a higher sugar content than the other. The additional sugar in one receptacle depresses the freezing point of the content and it impacts the specific heat, enthalpy of fusion, thermal conductivity, and more such that it requires a different amount of energy and/or melting environment to create a beverage of the same volume and temperature as the receptacle with less sugar content. Techniques are known for estimating the heat characteristics of foods and beverages and can be used with embodiments of the inventions herein.

As described, the dispenser can derive some thermal property representation of the frozen content in a variety of ways. This information can include multiple variables for increased precision of a final beverage. Alternatively, the information can be a single variable that represents a baseline of the ease of melting and reheating. Some examples of thermodynamic properties and how they may impact the beverage creation settings are described below.

Thermal conductivity is the property of a material to conduct heat. Increased thermal conductivity will facilitate the heat being uniformly distributed throughout the frozen contents. Thermal conductivity is also very important at the interface between the frozen contents and any diluting liquid and may be increased by agitation applied to the frozen content or other efforts to disrupt the thin surface layer of otherwise stagnant fluid at the interface. In general, increases in the amount of food components including, protein, fat, carbohydrates, fiber, and/or ash comprised in the frozen content will increase the thermal conductivity of the content.

Enthalpy of fusion, also known as the latent heat of fusion, is the change in system enthalpy required for the state to change from a solid to a liquid at the same temperature. In the case of this dispensing system, the enthalpy of fusion is the amount of energy required to melt a quantity of the frozen contents once it has already been warmed to its melting temperature. Enthalpy of fusion plays an important role in the ability of this dispenser system to create chilled beverages from frozen content without the use of a secondary mechanical cooling system because a significant amount of heat can be removed from the diluting liquid. The greater the enthalpy of fusion of the frozen content, the more energy it will take to melt the contents. Therefore more energy will be required to melt and reheat the frozen contents to a certain temperature for products with a higher enthalpy of fusion.

Thermal capacity or heat capacity is a measurable physical quantity determined as a ratio of heat given or taken from an object to the resulting temperature change of the object. Specific heat, a measure which is independent of the mass of an object, is described in metric units as the heat required to raise the temperature of one gram of material by one degree Kelvin. similar to enthalpy of fusion, the specific heat of a given composition plays an important role in the amount of heat necessary to first increase the temperature of the solid frozen composition to its point of fusion, and then to further heat the contents once it is a liquid. It is important to note that the specific heat may differ when a composition is in liquid versus solid form. For example, the specific heat of water in its solid form is about half of its value for its liquid form. This means it requires about half the energy to increase frozen water one degree Celsius as compared to a similar mass of liquid water.

It is important when calculating the beverage creation settings for the dispenser that these variables are highly inter-related. The entire reaction environment must be considered in making any adjustment for new conditions. For example, merely accounting for the amount of heat energy from the diluting liquid and/or an alternative heat source will not yield the desired final product equilibrium temperature if variables such as agitation and dilution liquid flow rate are not considered. For example, the flow rate, pressure, and agitation supplied to receptacle may be used to increase the thermal transfer between the supplied heat and the frozen content.

One embodiment of an algorithm for preparing a completely liquid food/beverage from a frozen content:
    input: scan pod bar code or QR code to gather:
        content mass ($M_{fc}$)
        content volume when liquid ($V_{fc}$)
        melting point of content ($T_{mp}$)

latent heat of fusion of content ($H_{fc}$)

specific heat capacity of solid content ($c_s$—use average)

specific heat capacity of content when liquid ($c_l$—use average)

final product acceptable temperature range final product acceptable volume range input: dispenser thermal sensor determines frozen content temperature ($T_{fc}$)

input: user provided desired volume ($V_d$) and temperature of final product ($T_d$), limited by scanned ranges (or these values are set by coded information)

input: dispenser thermal sensors determines ambient water temperature ($T_a$) and hot water temperature ($T_h$)

determine: amount of heat needed to bring entire frozen content to melting point and then to liquefy the entire content ($Q_l$):

$$Q_l = [M_{fc} \times c_s \times (T_{mp} - T_{fc})] + H_{fc}$$

$T_{mp}$ will likely be an empirically determined temperature rather than a sharp melting point for "mixed" foods/beverages determine: amount of heat needed to bring liquid content at melting point to desired product temperature, accounting for heat loss during the beverage creation process ($Q_d$):

$$Q_d = M_{fc} \times c_l \times (T_d - T_{mp})$$

determine: amount of excess heat available from hot dilution water ($Q_{ex}$):

$$Q_{ex} = (V_d - V_{fc}) \times (\text{volumetric heat capacity}) \times (T_h - T_d)$$

determine: amount of additional heat needed, if excess from dilution is not enough ($Q_{add}$):

if $Q_{ex} < Q_l + Q_d$: $Q_{add} = Q_l + Q_d - Q_{ex}$ for the supply of this additional heat, we will need to apply a loss factor for a microwave heat source, we will need to apply an "absorption" factor based on food/beverage content Determine: mix of hot water and ambient water, if excess from dilution is too much:

if $Q_{ex} \geq Q_l + Q_d$:

$$V_h = V_{dil} / ((T_d - T_h)/(T_a - T_d) + 1)$$

$$V_a = V_{dil} - V_h$$

where:

$V_h$ is volume of hot water $V_{dil}$ is volume of total dilution ($V_d - V_{fc}$)

$V_a$ is volume of ambient water or chilled water.

The duration and timing for the application of secondary (non-diluting) heat are two of many parameters that will affect the overall timing, efficiency and success (achieving a positive experience for the consumer as measured by beverage/food taste, temperature, potency, volume and required time/convenience) of the dispensing operation. In some embodiments all of these parameters are determined by a control algorithm built into the firmware or software of the system controller. Inputs to this algorithm may include user preferences for dispensed product temperature, volume, and strength or potency of the consumable as input by the user to an human machine interface at the start of the dispense cycle. Also included as inputs may be data gathered during a scan of the product bar code, QR code, RFID or other data transmission mechanism that are attached to the specific product chosen by the user for dispensing. This data may include information about the thermodynamic properties of the frozen contents; a range of dispensed volumes the contents can supply within preferred potency limits; and whether the contents have exceeded a recommended shelf life or whether they have been exposed to temperatures considered unsafe from a bacterial growth perspective. And finally, data gathered may include physical property and location information gathered from sensors embedded in the dispenser. In some embodiments this data will include temperature and volume of the reservoir fluid; temperature, mass and volume characteristics of the dispenseware; temperature of the receptacle and/or the frozen contents; knowledge about what was dispensed during the previous cycle and when that occurred; and the altitude where the dispenser is located since barometric pressure affects boiling temperature and in most instances it is not desirable to create steam within the system or the receptacle.

With all of this information available to the system controller's algorithm, the controller will, in some embodiments, use this algorithm to calculate/select various control values for cycle timing, temperatures, durations, liquid volumes, liquid flow rates, a decision about when to puncture or vent the receptacle, etc. to arrive at the desired end point of beverage quality given all the known starting conditions. In some embodiments the system controller also makes use of ongoing data input from sensors to "learn" during the cycle and adjust ongoing temperatures or durations or volumes to correct small observed out-of-spec or adverse-trending conditions. Thus the timing for lid venting or puncture, addition of secondary heating, addition of fluids, agitation timing and duration, and final dispense will all be set and adjusted in accordance with an algorithm. Over time (months or years) this algorithm can be updated via WiFi or other digital means as improvements are developed, new products are introduced, dangerous or counterfeit products are discovered, or unanticipated safety concerns become known. In some embodiments the algorithm adjusts the heating rate and maximum temperature of the frozen contents so as not to overheat certain thermally sensitive ingredients such as orange juice and thereby preserve the freshest taste possible.

Diluting fluid injection rates can vary widely depending on the type and size of the beverage/food product being dispensed. As discussed previously, these values will for some embodiments be calculated and set by the system controller. As a rough guide, however, a range of probable flow rates can be estimated, considering the creation of a 2-ounce espresso dispensed over 30 seconds on the low side and considering a 32 ounce carafe dispensed over 90 seconds on the high side. These flow rates suggest a range of flows of 0.02-0.25 gallons per minute as a specification for the fluid flow pumps. It is understood that faster and slower flow rates are within the scope of the invention, as is larger and smaller serving sizes.

In some embodiments the rate and timing of fluid flows are adjusted based on whether the water is sourced directly from the reservoir or must first pass through the heating chamber and whether some means is employed to take maximum advantage of the cooling effects possible from the frozen contents when making a cold beverage. For example, in some embodiments ambient temperature or tempered (mixed hot and ambient) water is first used to apply some heat to the exterior of a receptacle by passing it through a water jacket in close contact with the receptacle. As heat is passes to the receptacle, the temperature of the fluid passing through the water jacket is reduced. If this cooled water can be captured and stored in secondary container, e.g., a pressurized device (similar in function to a commercial product such as an Extrol tank), then the fluid can be subsequently flowed to the interior of the receptacle to further melt and dilute the frozen contents without use of additional pumps or motors. If the intermediate storage tank is large enough, it is not necessary to worry about balancing the volumes of heat transfer fluid and what is later to be injected into the receptacle. (Excess fluid in the storage tank can be returned to the reservoir at the end of a dispense cycle.) In this way it is possible to capture much of the "coldness" or "negative thermal energy" of the frozen contents to permit the dispensing of cold beverages without onboard mechanical refrigeration inside the dispenser.

The temperature of the water added to the receptacle is an important parameter in the dispense cycle as it greatly affects the finished product temperature and weighs heavily in the consumers judgment about whether the dispensed product has met their expectations. The water temperature is controlled by the system controller via mechanisms and sensors built into the dispenser. First, ambient temperature water supplied by the dispenser to the receptacle can be sourced directly from the dispenser's reservoir or be routed through a heater tank. The reservoir water itself can also range in temperature based on the season of the year if it comes from the user's tap, how long it has been given to equilibrate to room temperature, and whether the user has chosen to add ice when, for example, a cold beverage is planned. Water routed through the heater tank can be heated to a fixed temperature for all operations as is common in most coffee brewers today or it can be controlled to some other variable temperature based on output signals from the system controller. Delivered water can be tempered, that is, a combination of waters sourced from a hot water tank and the cooler water reservoir can be mixed together, with the final temperature determined by a set of proportional flow valves and a downstream thermal sensor. Some final "fine tuning" of the temperature of the water delivered to the receptacle can be made as it passes through a needle or tubing with secondary heater around it. And finally, the water exiting the receptacle can be further heated as it leaves the receptacle and flows through some dispensing channel to the user's coffee cup or other dispenseware.

It should be noted that since the device is a dispenser and not a brewer, the maximum water temperature required for proper functioning may be considerable lower than that found in most well-known coffee brewers today. (The water for brewers is typically supplied at a temperature between 190° and 205° F. to achieve the optimum level of solute extraction from, for example, coffee grounds.) Accordingly, concerns about high temperature settings that may actually exceed the local boiling point in some high-altitude locations can be easily addressed. It is possible, for example, to use a maximum temperature setting for the water of 180-185° F. and thereby insure the boiling point will not be exceeded for any location below approximately 12,000 feet mean sea level. Thus, while the system controller could be programmed to use input from a barometric sensor or estimate altitude based on a GPS or WiFi derived location, this complexity is not required to achieve excellent performance as well as operational safety related to boiling water concerns. In some embodiments the temperature of the water produced by the hot water tank is kept at the hottest temperature possible for local conditions based on location inputs and then that water is tempered as needed for optimizing the thermodynamics required to dispense a beverage at the temperature desired by the user.

In another embodiment, the principals of machine learning are applied to the calculation of the dispenser properties. For example, the scans of the pod and the temperatures of various components may be taken as initial input. Thereafter, however, the dispenser conducts a series of short "experiments" to validate or refine the inputted thermodynamic properties. For example, the secondary heat source is activated for five seconds and the resulting impact on temperature is noted. Given this level of energy input and the originally inputted properties of the frozen contents, a specific temperature rise will be expected. If the measured temperature rise differs sufficiently, the values for specific heat, thermal conductivity, etc. may be adjusted to more closely match the observed reality. These new parameter values can be used to immediately recalculate the planned dispenser "recipe" to more closely yield a beverage matching the users stated preferences.

In some embodiments the characteristics of the user's glass, coffee cup, bowl other container (hereinafter "dispenseware") are also communicated to the dispenser via bar code, QR code, RFID, or other means. This information is of interest to the dispenser to (1) ensure the receiving dispenseware for the melted and dispensed beverage liquid or food is of sufficiently large volume to receive all of the dispensed material without overflowing and (2) to better understand the cooling effect the dispenseware will have on the dispensed food or beverage so that the dispensed temperature setting for the control system can be adjusted. In some embodiments, the temperature of the dispensed beverage, as measured in the dispenserware after the dispensed fluid and the dispenserware have come to thermal equilibrium, is the temperature specified by the user as his/her preferred beverage/food temperature.

In some embodiments the dispenser includes an active device to heat or cool the user's dispenserware before or during the time the dispenser is melting/dispensing the frozen contents. In some embodiments this device is a surface plate that is heated or cooled by a thermoelectric device. In some embodiments the dispenserware communicates its actual temperature to the dispenser for more accurate adjustment of the dispensed fluid temperature.

In some embodiments, the addition of supplemental heat is controlled to limit the speed or localization of the liquefaction and vaporization of the frozen contents. In some embodiments, a non-diluting heat source may heat the receptacle in order to melt the frozen contents therein, or the dispenser may heat an ambient temperature liquid as a diluting liquid as it travels through the receptacle and beverage creation cavity.

In some embodiments, a secondary, non-diluting heat source may be applied to the receptacle while the receptacle is being agitated. In further embodiments, a diluting liquid may be dispensed through the receptacle while it is being agitation and heated by a non-diluting heat source. The combination of agitating while melting provides a means for a more even distribution of heat. Agitating the receptacle will allow heat to disperse throughout the receptacle instead of certain areas overheating.

In some embodiments, the diluting liquid does not travel through the receptacle, but rather bypasses an injection through the receptacle and is dispensed in a location proximate to the dispense location of the melted frozen content. Optionally, the cavity in which the receptacle is held has a mixing area that receives the melted liquid product from the receptacle and combines it with dilution liquid. In some embodiments, a perforator injected a pressurized air to rinse the receptacle clean and increase the pressure at which the melted frozen content mixes in a beverage container with the diluting agent. This may include an air compression system within the dispenser. The dispense of the diluting liquid and melted frozen content may happen in unison, or one dispense may happen before the other. In another embodiment, the dispense of the liquids could alternate multiple times. In some embodiments, an amount of the diluting liquid is dispensed through the receptacle and an amount is dispensed directly into a beverage container.

In some embodiments, water is only heated to one temperature in the dispenser, but the dispenser includes fluid paths that bypass the heating before being injected into a receptacle such that the water added to the receptacle is at ambient temperature. Bypassing the water heater could be done in at least two ways: (a) a 3 way valve after the piston pump could divert ambient water from a reservoir either through a hot water heating tank en route to the dispense head or directly into the dispense head. See L-type Valve in FIGS. 36A and 36B, or (b) a simple tee at the base of the water reservoir may feed two separate piston pumps in which one piston pump feeds water through the water heater en route to the dispense head and the other piston pump feeds water directly to the dispense head as shown in FIGS. 35A and 35B. In some embodiments, the plumbing system may include a dispense channel or bypass system to refrigerate diluting agents. Any of the described techniques enables the dispenser to control the temperature of the dilution liquid supplied to the receptacle.

In some embodiments, the dispenser has at least two reservoirs: one for ambient water and one for water that has been heated. The dispenser also has fluid paths to supply hot water separately from ambient water to the receptacle and/or final food or beverage container. In some implementations, the dispenser includes a source of carbon dioxide and an injection path to supply the carbon dioxide to the ambient water reservoir to carbonate the water. In other implementations, the dispenser has a separate vessel that receives water from the ambient water reservoir or another water supply, and the carbonation system carbonates the water in the separate vessel. In some embodiments, water can be carbonated in-line along a flow path. Thus, implementations of the invention include the ability to carbonate liquid that is supplied directly to the final food or beverage container.

The dispenser includes a supplemental (non-diluting) source of heat, which can include electromagnetic energy (e.g., microwaves), hot air, an electrical heater, or other sources. The dispenser can also use agitation (e.g., reciprocating or circular motion or vibration) to facilitate and control the melting, thawing and/or heating of frozen contents. The dispenser includes detection components (sensors) including, for example, temperature and pressure sensors, and an optical reader for obtaining information about the receptacle and its contents. It is important to note the sources of heat, agitation, and detection components described herein are purely exemplary and these steps may be applied with any means of heat, movement, or detection known within the art. In addition, the steps included in this embodiment are exemplary and steps may be added and deleted to form a similar outcome.

In some embodiments, the dispensing system includes a network interface and is capable of being connected to a communication network, such as a Local Area Network (LAN) or Wireless LAN (WLAN), so that it may communicate with other devices, e.g., a smart phone or a server system that records information about the dispenser's use. In some embodiments, the dispenser may record data about the dispenser's use, e.g., what products are being made with it, and record the data locally to be updated to a server when a network connection is re-established. In some embodiments this network connection can be used to diagnose issues and update software for new and future product parameters.

Illustrative examples of how embodiments of the dispensers described herein vary their operational parameters and overall process to create different types of liquid food or beverages follow below. Other food and beverage types are within the scope of the invention as are other method of operation to create such products.

In the first example, based on the detection of the beverage style and a 2 oz. setting selected by the user, the dispenser creates a ventilation opening in the top lid of the receptacle to allow any internal pressure generated during the beverage making process to escape to atmosphere. Next, some amount of supplemental (i.e., secondary) heat (provided as set forth above) is added to warm or melt (partially or fully) the frozen contents. In this instance, a hot beverage is desired and the beverage creation recipe calls for too small a diluting volume of heated water to properly melt and heat the contents to a desired temperature. Accordingly, the preheat duration is calculated to melt the entire frozen content and increase the temperature of the resulting liquid to about 85° F. before dispensing or adding a diluting agent. This heat up of the frozen/melted contents to 85° F. can be accomplished either in an open-loop manner based on knowledge of the thermal properties of the contents or in a closed-loop, feedback driven system wherein one or more thermal sensors track the heat-up of the contents and cut power to the secondary heater at the appropriate time. The reciprocating motion may be applied thereafter or in unison with the supplemental heat to homogenize the content. The intensity of the supplemental heat and its overall duration is also controlled to minimize the local vaporization of any of the frozen contents to steam.

Once the approximate 85° F. temperature is reached, the perforator located beneath the cavity in which the receptacle is disposed is thrust upwards through the bottom of the receptacle, perforating it and allowing the liquid content to flow out a channel of the perforator and through a nozzle of the dispenser into a beverage container. A perforator with a larger diameter than the vent hole made earlier (to ensure a tight fit around the periphery of the perforator) is inserted at the same location as the vent hole in the lid of the receptacle, creating a substantially leak-free fitting between the perforator and the receptacle lid so 1.25 oz. of water heated to 190° F. can be dispensed into the receptacle to mix, dilute and dispense the melted frozen content to create an espresso beverage with a TDS of 7.5, volume of 2 oz., and temperature of approximately 150° F. The hot water injection occurring at the end of the dispense cycle rinses the receptacle clean of all extract to optimize the suitability of the receptacle for recycling. Agitation may be added in sync with the dispensing of the hot diluting agent to better flush the receptacle and dispensing channels of any residue. The empty receptacle may then be removed and recycled.

In a second example, a 1 oz. receptacle contains 0.5 oz. of a frozen concentrated tea extract with a TDS of 40 and 0.25 oz. of a frozen peach concentrate with a Brix of 50, intended to create a hot peach green tea beverage. The dispenser gathers information from marks or other indicators on the receptacle, and for this beverage, does not provide an option to select a volume (the options being controlled by the information associated with the receptacle). Following receptacle detection, a button blinking red on the dispenser may communicate the beverage will be dispensed hot. The dispenser establishes a recipe based on the information associated with the receptacle detected by the dispenser. In this example, the dispenser establishes a pre-heat duration, time of puncture, time of injection, temperature of diluting liquid, and volume of diluting liquid based on information acquired. As in the example above, the receptacle is next loaded into the beverage creation cavity of the dispenser and secured in place, resting on an intermediate step in the cavity that accommodates more than one receptacle size.

Once the receptacle is secured, the user may initiate one final action, e.g., the press of a button on the dispenser or a connected device, to commence automated functions for product creation. Based on the detection of the beverage style settings, the dispenser creates a vent opening in the top lid of the receptacle and a supplemental preheat duration is initiated to only soften and liquefy an outside portion of the frozen content so the perforator beneath the step can penetrate the receptacle without great force, displacing the frozen content away from the entry point, if needed. After the outlet perforator has perforated the receptacle, a perforator with a larger diameter than the vent hole in the lid is inserted at the same location as the vent hole in the lid of the receptacle. This creates a tight fitting for the addition of 7.25 oz. of water heated to approximately 190° F. (as calculated by the processor based on the original recipe and subsequently modified based on an actual temperature measurement made of the receptacle at the conclusion of the preheat), which will be dispensed into the receptacle to mix, melt, dilute and dispense with the receptacles content to create an 8 oz. beverage with a desired concentration of green tea and peach flavoring.

The pre-heat function and 7.25 oz. of approximately 190° F. diluting agent bring the final dispensed product to a temperature of approximately 150° F. The hot water injection rinses the receptacle clean of substantially all contents, and again, agitation may be added in sync with the dispensing of hot diluting agent to better flush the receptacle and dispensing channels of any residue. The agitation may also increase the melting rate of the frozen content and provide for a longer rinse of pure water for sanitation. The empty receptacle may then be removed and recycled.

A second, higher capacity receptacle is designed to provide for, e.g., a cold single-serve beverage, a single-serve relatively larger hot beverage that includes components that are more difficult to concentrate, e.g., dairy, and large batch servings of hot beverages. In one example, a 2.25 oz. receptacle contains 2 ounces of a frozen concentrated orange juice with a BRIX of 47.2 intended to create an 8 oz. cold serving of juice. The dispenser gathers information about the frozen contents in the receptacle (by, e.g., reading an optical mark on the receptacle with an optical sensor) and establishes the necessary process settings to create an 8 oz. cold orange juice qualifying by FDA standards as 100% juice (BRIX of 11.8) from the receptacle contents. In addition, following receptacle detection, a button on the front of the dispenser blinks blue to communicate the beverage is a cold one, and perhaps remind the user to use the appropriate cup to receive the final dispensed product. (Optionally, the dispenser may have a sensor which checks for the presence of a glass or cup of the minimum size needed to receive the full 8 ounce serving.)

In this example, the dispenser establishes a pre-heat duration, time of puncture, time of injection, temperature of diluting liquid, volume of diluting liquid, and a flow rate of the injected diluting liquid based on information acquired by the dispenser. The receptacle is next loaded into the beverage creation cavity of the dispenser and is secured in place. The bottom depth of the cavity also has a perforator, and in this embodiment, can puncture inwards of the receptacle, retract, and also move side to side with its connected tubing to create a dispense channel capable of moving with agitation used to enhance liquefaction of the frozen contents. The perforator is initially positioned beneath the bottom depth of the cavity and does not enter the receptacle. Once the receptacle is secured the user may initiate one final action, e.g., the press of a button on the dispenser or a connected device, to commence automated functions for product creation.

Based on the detection of the beverage style, the dispenser creates a vent opening in the lid of the receptacle and initiates a period of supplemental preheat to only melt the outer-most portions of the frozen content inside the receptacle while keeping the majority of the content frozen. In this instance, because the desired beverage is to be cold, the enthalpy of fusion of the frozen content is to be used to lower the temperature of a diluting liquid to chilled temperatures. After the outer portion of the frozen orange juice content is melted, as determined open-loop by knowledge of the frozen contents and the amount of energy added or as determined closed-loop via information gathered by one or more thermal sensors, the perforator located beneath the bottom depth of the cavity is thrust upwards into the receptacle, perforating it and allowing the liquid content to flow out a channel of the perforator, through a nozzle in the dispenser, and into a beverage container. In addition, another perforator, this one with a larger diameter than the vent hole in the lid, is inserted at the same location as the vent hole in the lid of the receptacle, creating a tight fitting seal and allowing for delivery of about 6 oz. of ambient water into the receptacle at a slower rate than typically used for hot beverages to give the cooler injected liquid more time to interact with the frozen contents and promote fully melting the contents. Agitation is added to expedite the mixing of the frozen content and the diluting liquid to the target potency and temperature. In this way, the dispensed product created may reach refrigerated temperatures when equilibrium is reached between the frozen content and the ambient temperature diluting agent. The final product is a chilled glass of orange juice with a Brix of 11.8, meeting the FDA standard for 100% orange juice.

In another illustrative example, a 2.25 oz. receptacle contains 1 oz. of frozen condensed milk, ½ oz. of frozen heavy cream, 10 grams of sugar, and ½ oz. of a frozen coffee extract with a BRIX of 24, collectively intended to create a hot serving of a café latte. The dispenser reads a visual mark on the receptacle with an optical sensor and establishes the process settings to create an 8 oz. hot latte with a coffee concentration of 1.5% TDS and target dairy and sweetness levels. In addition, following receptacle detection, a button blinking red on the front of the dispenser may communicate the beverage will be dispensed hot.

In this example, the dispenser establishes a pre-heat duration, time of puncture, time of injection, temperature of diluting liquid, volume of diluting liquid, and the flow rate of the injected diluting liquid based on information acquired by the dispenser from the receptacle markings. As in the examples above, the receptacle is next loaded into the beverage creation cavity of the dispenser and is secured in place. Once the receptacle is secured the user may initiate one final action, e.g., the press of a button on the dispenser or a connected device, to commence functions for product creation. The dispenser creates a vent opening in the lid of the receptacle and initiates a period of supplemental heating to melt the majority of the frozen content. As before, this period of time can be open-loop or closed-loop controlled.

In this instance, since the desired beverage is to be hot and a full 2 oz. of frozen content must be melted and heated, a longer preheat is required than a similar sized hot coffee beverage created from the first lower capacity receptacle.

After the majority of the mass of the frozen content is melted, based on thermal sensor readings and/or total energy input, the perforator located beneath the bottom depth of the cavity is thrust upwards into the receptacle, perforating it and allowing the liquid content to flow out a channel of the perforator, through a nozzle of the dispenser, and into a beverage container. In addition, a perforator with a larger diameter than the vent hole in the lid is inserted at the same location as the vent hole of the receptacle, creating a tight fitting seal around the penetrator for delivery of 6 oz. of water, heated to 190° F. by the water heater, to the receptacle. The water fully melts any remaining frozen content, mixes with, dilutes, and heats the content of the receptacle to allow dispensing of a beverage of the target temperature and potency. Agitation and flowrate may be controlled to homogenize the melted contents and the dispensing liquid as much as possible within the receptacle.

In a further illustrative example, a 2.25 oz. receptacle contains 2 oz. of a frozen coffee extract with a BRIX of 44.8 intended to create a large batch serving of coffee. The dispenser reads a visual mark on the receptacle with an optical sensor and establishes the process settings to create 64 oz. of hot coffee with a TDS of 1.4. The dispenser may detect the water level in the reservoir and instruct the user to add more water if necessary. Following receptacle detection a button blinking red on the front of the dispenser may be used to communicate the beverage is hot and a reminder may notify the user to use a large beverage container to receive the dispensed product. Or the dispenser senses the presence of a carafe which has been designed to be easily detected (e.g., proximity sensor, RFID chip, bar or QR code, etc.) by the dispenser as being suitable for a 64 oz beverage serving. In this example, the dispenser establishes a pre-heat duration, time of puncture, time of injection, temperature of diluting liquid, volume of diluting liquid, and the flow rate of the injected diluting liquid based on information acquired by the dispenser.

As in previous examples, the receptacle is next loaded into the beverage creation cavity of the dispenser and is secured in place. Once the receptacle is secured the user may initiate one final action, e.g., the press of a button on the dispenser or a connected device, to commence functions for product creation. The dispenser creates a vent opening in the lid of the receptacle and a period of supplemental heating is initiated to melt a small outside layer of the content frozen. In this instance, the beverage with be diluted with a large amount of heated liquid and requires a minimal preheat only to soften the frozen contents for receptacle perforation. Once the preheat has commenced, the perforator located beneath the bottom depth of the cavity is thrust upwards into the receptacle, perforating it and allowing the liquid content to flow out a channel of the perforator, through a nozzle of the dispenser, and into a large beverage container. In addition, a perforator with a larger diameter than the vent hole in the lid is inserted at the same location as the vent hole in the top lid of the receptacle, creating a tight fitting seal for delivery of 62 oz. of water, heated to 190° F. The added water melts any remaining frozen portions of the contents, mixes with, dilutes, heats and dispenses the contents of the receptacle to create a large batch serving of coffee.

Any of the dispenser system embodiments herein can include a drip tray disposed beneath any or all of the components of the dispenser system. For example, the drip tray can be contained within the lowest part of the dispenser housing such that any uncontained liquid generated by any part of the dispenser is captured by the drip tray. Also, because the final product is dispensed into a container, such as a thermos, mug, cup, tumbler, bowl, and/or the like, the product container can be placed on a portion of the drip tray that has a grated opening to capture overflow or spillage. The drip can be disposed below the product outlet and/or diluting liquid outlet to capture liquid in the event that the product container is removed during the product making process. The drip tray is removable from the dispenser system, and can be removed manually or be motor driven. Optionally, the dispenser has a level sensor that detects a liquid level in the drip tray and alerts the user to empty the drip tray when a liquid threshold is reaches. Further, the dispenser can halt the final product creation process if the dispenser detects a high liquid level in the drip tray.

Optionally, many of the parts of the various embodiments of the dispenser systems described herein are removable and dishwasher-safe. That is, the parts may be cleaning using a standard commercial or residential dishwasher without suffering ill effects. For example, all or parts of the chamber, the perforator(s) used for dilution liquid supply inlets, the perforator(s) used for product outlets, and all or parts of the drip tray assembly can be cleaned in a standard dishwater. Alternatively, or in addition, certain implementations include self-cleaning mechanisms. For example, the dispenser may pass hot liquid or steam through the various liquid flow paths, chambers, vessels, and reservoirs to clean and sanitize those elements. Also, a UV light source may be included in areas of the dispenser that are prone to contamination to service as a way to clean those portions. For example, the chamber that holds the receptacle can contain a UV light source that exposes the inside of the chamber and/or the dilution liquid perforator/injector and final product outlet/perforator to UV light.

In another aspect of the invention, any of the dispenser systems described herein can be implemented without a chamber to hold the receptacle that contains frozen liquid contents. Rather, in the alternative implementations, the dispenser systems include an external connection that mates with a complementary connection on a frozen contents receptacle. The complementary connections enable the dispenser system to provide dilution liquid to the inside of the receptacle while minimizing leaks. Optionally, the receptacle inlet connection has an inlet seal that ruptures to permit dilution liquid flow into the receptacle. In some embodiments, the receptacle is a pouch that expands when the diluting liquid is injected. In other embodiments, the pressure of injected diluting liquid ruptures an outlet seal to provide an exit for a final food or beverage product. Although the receptacle is external to the dispenser, the various techniques for the dispenser learning information about the receptacle and/or the frozen liquid contents and the techniques for controlling the final product preparation are equally applicable.

Aspects of the techniques and systems related to producing a food or a beverage at a desired temperature and a desired volume and in an automated fashion as disclosed herein may be implemented as a computer program product for use with a computer system or computerized electronic device. Such implementations may include a series of computer instructions, or logic, fixed either on a tangible/non-transitory medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein.

What is claimed is:

1. A method of producing a melted food or beverage liquid product from a receptacle containing frozen liquid contents, comprising:
   receiving a receptacle in a chamber of a dispenser, the receptacle defining an enclosed inner volume containing a frozen liquid contents;
   supplying a dilution fluid to the inner volume of the receptacle when held in the chamber through a dilution fluid inlet disposed at a first location of the chamber;
   perforating the receptacle using a perforator disposed at a second location of the chamber to form a product outlet from the receptacle for a food or beverage liquid product;
   imparting motion to the receptacle to increase a flow path from the dilution fluid inlet to the product outlet taken by at least a portion of dilution fluid, when supplied, relative to a flow path from the dilution fluid inlet to the product outlet taken by the portion of dilution fluid without the imparted motion.

2. The method of claim 1, wherein imparting motion to the receptacle further increases a thermal transfer rate between the frozen contents and the supplied dilution fluid relative to a thermal transfer rate between the frozen contents and the supplied dilution fluid without the imparted motion.

3. The method of claim 1, wherein the motion imparted comprises one or more of:
   a rotary motion,
   a reciprocating motion,
   a vibratory motion,
   a rocking motion, or
   a shaking motion.

4. The method of claim 1, wherein imparting motion to the receptacle further increases an average duration of time the supplied dilution fluid flows in the inner volume of the receptacle relative to an average duration of time the supplied dilution fluid flows in the inner volume of the receptacle without the imparted motion.

5. The method of claim 1, wherein the dilution fluid inlet is disposed above the product outlet.

6. The method of claim 1, further comprising dispensing the melted food or beverage liquid product from the receptacle.

7. The method of claim 1, further comprising one or more of:
   heating the dilution fluid,
   cooling the dilution fluid,
   carbonating the dilution fluid, or
   pressurizing the dilution fluid.

8. The method of claim 1, wherein the dilution fluid is selected from the group consisting of a liquid, a gas and combinations thereof.

9. The method of claim 1, wherein the perforator comprises a heater.

10. The method of claim 1, wherein dispenser further comprises a reservoir configured to hold the dilution fluid.

11. The method of claim 10, wherein the reservoir includes one or more of a sensor configured to detect an amount of the dilution fluid within the reservoir or a flow rate sensor configured to measure a rate of fluid as used by the dispenser.

12. The method of claim 1, wherein the dispenser further comprises a non-diluting heater configured to heat one or more of the receptacle when held in the chamber or the frozen contents within the receptacle when held in the chamber, wherein the non-diluting heater does not add liquid to an interior of the receptacle when held in the chamber.

13. The method of claim 12, wherein the non-diluting heater is one or more of:
   a heater in contact with walls of the chamber,
   a heater incorporated into walls of the chamber,
   a heater spaced apart from walls of the chamber and configured to transmit energy to one or more of the receptacle or the frozen liquid contents by one or more of radiation or convection,
   an electric heater,
   a heated gas generator,
   a heated liquid bath,
   an electromagnetic radiation generator,
   a thermoelectric heater,
   a heated perforator, or
   a chemical heater.

14. The method of claim 1, wherein the chamber includes at least one chamber wall, and wherein the at least a portion of the chamber wall is opaque to a selected range of wavelengths of electromagnetic radiation, and the at least a portion of the chamber wall comprising insulation.

15. The method of claim 1, wherein one or more of the chamber, the perforator, or the dilution fluid inlet is removable from the dispenser and is dishwasher safe.

16. The method of claim 1, wherein the chamber defines a cavity having an open end and the chamber comprises a movable cover configured to seal the open end of the cavity.

17. The method of claim 16, wherein the chamber includes a lock to releasably retain the cover in the sealed position over the open end of the cavity.

18. The method of claim 1, further comprising injecting a pressurized gas into the enclosed inner volume of the receptacle through one or more of the dilution fluid inlet or the perforator.

19. The method of claim 1, further comprising one or more of:
  detecting a temperature of the food or beverage liquid product at the product outlet,
  measuring a pressure of the food or beverage liquid product at the product outlet, or
  detecting a flow of the food or beverage liquid product at the product outlet.

20. A method for producing a food or beverage liquid product from a frozen contents in a receptacle comprising:
  receiving a receptacle in a chamber of a dispenser, the receptacle defining an enclosed inner volume containing a frozen liquid contents;
  perforating the receptacle and removing at least a portion of the frozen liquid contents from the receptacle into a melting vessel;
  perforating the receptacle using a perforator disposed at the second end of the chamber to form a product outlet from the receptacle for a food or beverage liquid product;
  imparting motion to the melting vessel that increases a residence time of liquid in the melting vessel relative to a residence time of liquid in the melting vessel without the imparted motion;
  heating at least one of the melting vessel or the frozen contents within the melting vessel using a non-diluting heater, wherein the non-diluting heater does not add liquid to an interior of the receptacle when held in the chamber or to an interior of the melting vessel; and
  dispensing the food or beverage liquid product.

21. The method of claim 20, wherein the non-diluting heater is one or more of:
  a heater in contact with walls of the melting vessel,
  a heater incorporated into walls of the melting vessel,
  a heater spaced apart from walls of the melting vessel and configured to transmit energy to at least one of the melting vessel or the frozen liquid contents by one or more of radiation or convection,
  an electric heater,
  a heated gas generator,
  a heated liquid bath,
  an electromagnetic radiation generator,
  a thermoelectric heater,
  a heated perforator, or
  a chemical heater.

* * * * *